US011851034B2

(12) United States Patent
Davies et al.

(10) Patent No.: US 11,851,034 B2
(45) **Date of Patent: *Dec. 26, 2023**

(54) PREDICTING VEHICLE REPAIR OPERATIONS

(71) Applicant: We Predict Limited, Swansea (GB)

(72) Inventors: James Gareth Davies, Ann Arbor, MI (US); Anthony Peter Griffiths, Swansea (GB); Christopher Lee Davies, Swansea (GB); Martyn Neil Jones, Llandarcy (GB); Stephen David Norris, London (GB); Christopher George Reed, London (GB); Patrick James Tudor, Sketty (GB); Timothy Peter Davis, Warwick (GB); David Hong Sau Chung, London (GB); Michael Paul Nicholas, Ann Arbor, MI (US); Kelly Marie Nock, Cardiff (GB); Jonathan Michael Phillips, Bridgend (GB); Ashley Steven Burgess, St. Thomas (GB); Nicholas Peter Rees, London (GB); Steffan Rees, London (GB)

(73) Assignee: WE PREDICT LIMITED

( * ) Notice: Subject to any disclaimer, the term of this patent is extended or adjusted under 35 U.S.C. 154(b) by 176 days.

This patent is subject to a terminal disclaimer.

(21) Appl. No.: 17/400,490

(22) Filed: Aug. 12, 2021

(65) Prior Publication Data

US 2021/0380076 A1 Dec. 9, 2021

Related U.S. Application Data

(63) Continuation of application No. 16/834,036, filed on Mar. 30, 2020, now Pat. No. 11,117,555, which is a
(Continued)

(51) Int. Cl.
*B60S 5/00* (2006.01)
*G05B 23/02* (2006.01)
*G07C 5/08* (2006.01)

(52) U.S. Cl.
CPC ............ *B60S 5/00* (2013.01); *G05B 23/0283* (2013.01); *G07C 5/085* (2013.01); *G07C 5/0808* (2013.01); *G07C 5/0816* (2013.01)

(58) Field of Classification Search
None
See application file for complete search history.

(56) References Cited

U.S. PATENT DOCUMENTS 10,096,004 B2 * 10/2018 Viswanath ............ G06Q 10/20
11,117,555 B2 9/2021 Davies et al.
(Continued)

FOREIGN PATENT DOCUMENTS

JP 2003331087 A 11/2003
JP 2004021286 A 1/2004
(Continued)

OTHER PUBLICATIONS

International Search Report and Written Opinion in International Patent Application No. PCT/US18/53718 dated Dec. 26, 2018, 17 pages.
(Continued)

*Primary Examiner* — Abdhesh K Jha
(74) *Attorney, Agent, or Firm* — MARSHALL, GERSTEIN & BORUN LLP

(57) ABSTRACT

A method of producing vehicles comprises: in a vehicle production process, manufacturing vehicle components of different types, and assembling the vehicle components to form vehicles; creating a set of vehicle records, each being a record of one of the vehicles entering active service;
(Continued)

performing vehicle repairs on a subset of the vehicles after they have entered active service; creating a respective record of each of the vehicle repairs, each of which comprises or indicates a vehicle age or usage value, and records a vehicle component fault identified in the vehicle repair; receiving at a data processing stage the vehicle records and vehicle repair records, wherein a predictive algorithm executed at the data processing stage processes the received records so as to, for each type of vehicle component: 1) identify a respective set of the vehicle repair records relating to that type of vehicle component, and 2) use the respective set of vehicle repair records to predict a respective number of or resource value for vehicle component faults of that type for the set of vehicle records based on: a number of vehicles recorded in the set of vehicle records, and a current age or usage of each of the recorded vehicles; comparing the predictions for the different vehicle component types to identify a problem with a particular one of the vehicle component types; and adapting the vehicle production process, so as to remedy the identified problem with the particular vehicle component type for later vehicles produced in the adapted vehicle production process.

17 Claims, 112 Drawing Sheets

Related U.S. Application Data continuation of application No. PCT/US2018/053718, filed on Oct. 1, 2018, which is a continuation of application No. PCT/US2017/069021, filed on Dec. 29, 2017.

(60) Provisional application No. 62/570,469, filed on Oct. 10, 2017, provisional application No. 62/570,456, filed on Oct. 10, 2017, provisional application No. 62/565,933, filed on Sep. 29, 2017, provisional application No. 62/565,927, filed on Sep. 29, 2017.

(56) References Cited

U.S. PATENT DOCUMENTS

| | | | |
|---|---|---|---|
| 2005/0021245 | A1 | 1/2005 | Furuno et al. |
| 2005/0150094 | A1 | 7/2005 | Moore et al. |
| 2008/0004764 | A1 | 1/2008 | Chinnadurai et al. |
| 2010/0050025 | A1 | 2/2010 | Grichnik et al. |
| 2011/0119231 | A1 | 5/2011 | Namburu et al. |
| 2014/0188329 | A1 | 7/2014 | Chen et al. |
| 2016/0027223 | A1 | 1/2016 | Madison et al. |
| 2016/0035150 | A1 | 2/2016 | Barfield, Jr. et al. |

FOREIGN PATENT DOCUMENTS

| | | | |
|---|---|---|---|
| JP | 2004021290 | A | 1/2004 |
| JP | 2016021241 | A | 2/2016 |
| KR | 1020140013064 | A | 2/2014 |

OTHER PUBLICATIONS

International Search Report and Written Opinion in International Patent Application No. PCT/US2017/069021 dated Aug. 22, 2018, 17 pages.

Japanese Office Action and English translation thereof in Japanese Application No. 2020-539673 dated Jan. 4, 2022 8 pages.

Korean Office Action and English translation thereof in Korean Application No. 10-2020-7012729 dated Jan. 26, 2022 16 pages.

* cited by examiner

102c

102c

102c

102c indico Quality Module August 29,2016

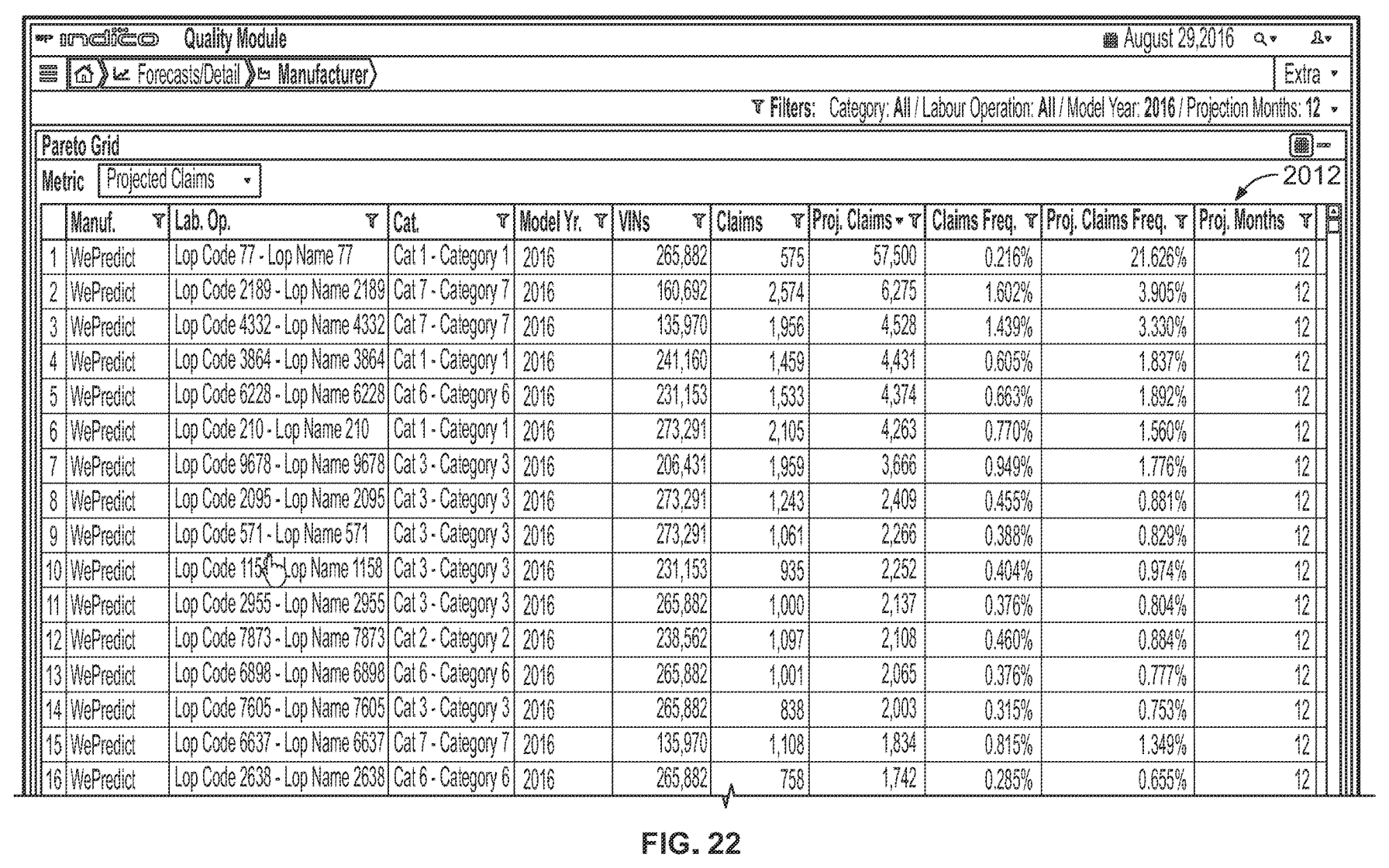

Forecasts/Detail > Manufacturer Extra

Filters: Category: All / Labour Operation: All / Model Year: 2016 / Projection Months: 12

Pareto Grid

Metric: Projected Claims

2012

| | Manuf. | Lab. Op. | Cat. | Model Yr. | VINs | Claims | Proj. Claims | Claims Freq. | Proj. Claims Freq. | Proj. Months |
|---|---|---|---|---|---|---|---|---|---|---|
| 1 | WePredict | Lop Code 77 - Lop Name 77 | Cat 1 - Category 1 | 2016 | 265,882 | 575 | 57,500 | 0.216% | 21.626% | 12 |
| 2 | WePredict | Lop Code 2189 - Lop Name 2189 | Cat 7 - Category 7 | 2016 | 160,692 | 2,574 | 6,275 | 1.602% | 3.905% | 12 |
| 3 | WePredict | Lop Code 4332 - Lop Name 4332 | Cat 7 - Category 7 | 2016 | 135,970 | 1,956 | 4,528 | 1.439% | 3.330% | 12 |
| 4 | WePredict | Lop Code 3864 - Lop Name 3864 | Cat 1 - Category 1 | 2016 | 241,160 | 1,459 | 4,431 | 0.605% | 1.837% | 12 |
| 5 | WePredict | Lop Code 6228 - Lop Name 6228 | Cat 6 - Category 6 | 2016 | 231,153 | 1,533 | 4,374 | 0.663% | 1.892% | 12 |
| 6 | WePredict | Lop Code 210 - Lop Name 210 | Cat 1 - Category 1 | 2016 | 273,291 | 2,105 | 4,263 | 0.770% | 1.560% | 12 |
| 7 | WePredict | Lop Code 9678 - Lop Name 9678 | Cat 3 - Category 3 | 2016 | 206,431 | 1,959 | 3,666 | 0.949% | 1.776% | 12 |
| 8 | WePredict | Lop Code 2095 - Lop Name 2095 | Cat 3 - Category 3 | 2016 | 273,291 | 1,243 | 2,409 | 0.455% | 0.881% | 12 |
| 9 | WePredict | Lop Code 571 - Lop Name 571 | Cat 3 - Category 3 | 2016 | 273,291 | 1,061 | 2,266 | 0.388% | 0.829% | 12 |
| 10 | WePredict | Lop Code 1158 - Lop Name 1158 | Cat 3 - Category 3 | 2016 | 231,153 | 935 | 2,252 | 0.404% | 0.974% | 12 |
| 11 | WePredict | Lop Code 2955 - Lop Name 2955 | Cat 3 - Category 3 | 2016 | 265,882 | 1,000 | 2,137 | 0.376% | 0.804% | 12 |
| 12 | WePredict | Lop Code 7873 - Lop Name 7873 | Cat 2 - Category 2 | 2016 | 238,562 | 1,097 | 2,108 | 0.460% | 0.884% | 12 |
| 13 | WePredict | Lop Code 6898 - Lop Name 6898 | Cat 6 - Category 6 | 2016 | 265,882 | 1,001 | 2,065 | 0.376% | 0.777% | 12 |
| 14 | WePredict | Lop Code 7605 - Lop Name 7605 | Cat 3 - Category 3 | 2016 | 265,882 | 838 | 2,003 | 0.315% | 0.753% | 12 |
| 15 | WePredict | Lop Code 6637 - Lop Name 6637 | Cat 7 - Category 7 | 2016 | 135,970 | 1,108 | 1,834 | 0.815% | 1.349% | 12 |
| 16 | WePredict | Lop Code 2638 - Lop Name 2638 | Cat 6 - Category 6 | 2016 | 265,882 | 758 | 1,742 | 0.285% | 0.655% | 12 |

FIG. 22

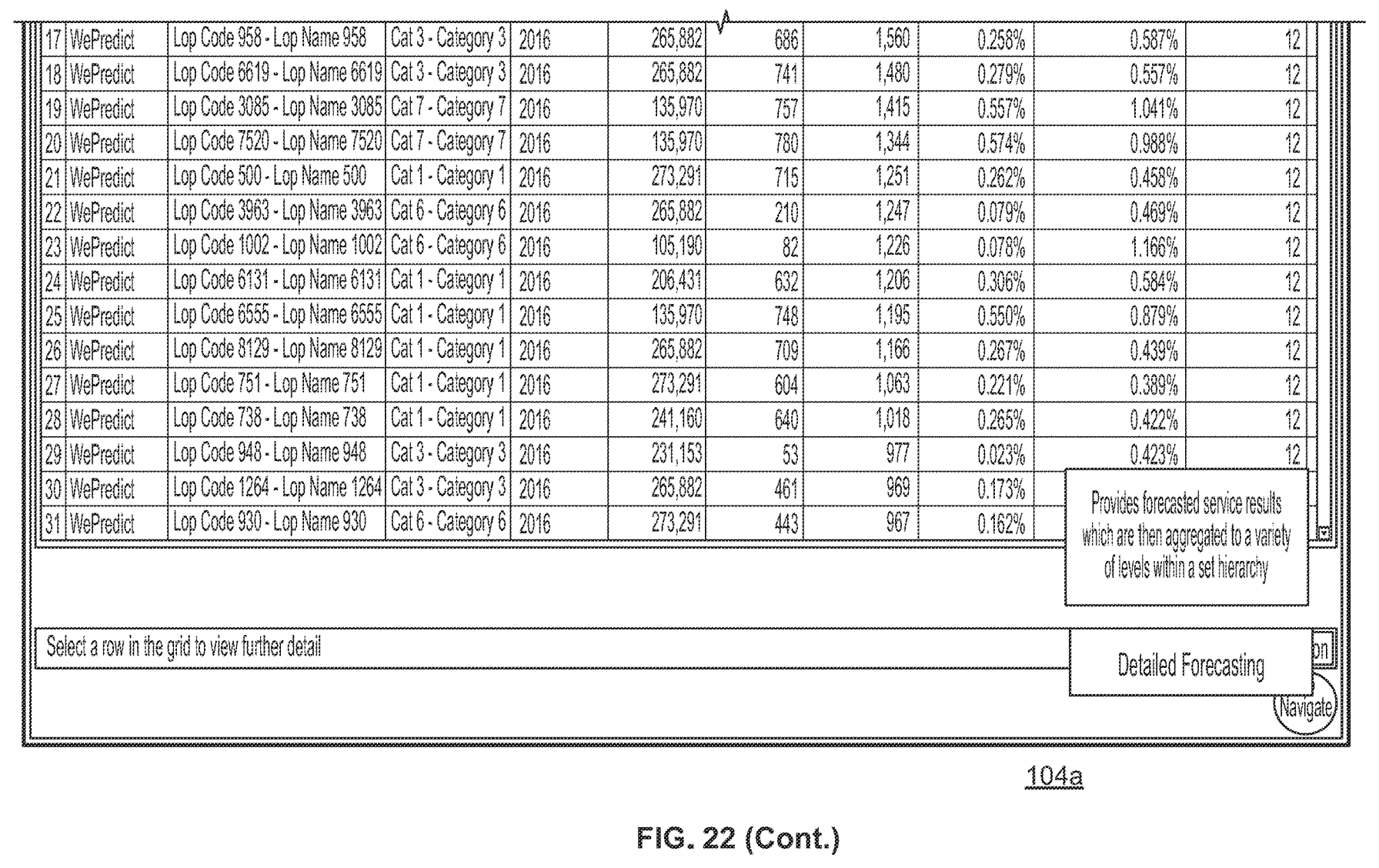

| | | | | | | | | | | |
|---|---|---|---|---|---|---|---|---|---|---|
| 17 | WePredict | Lop Code 958 - Lop Name 958 | Cat 3 - Category 3 | 2016 | 265,882 | 686 | 1,560 | 0.258% | 0.587% | 12 |
| 18 | WePredict | Lop Code 6619 - Lop Name 6619 | Cat 3 - Category 3 | 2016 | 265,882 | 741 | 1,480 | 0.279% | 0.557% | 12 |
| 19 | WePredict | Lop Code 3085 - Lop Name 3085 | Cat 7 - Category 7 | 2016 | 135,970 | 757 | 1,415 | 0.557% | 1.041% | 12 |
| 20 | WePredict | Lop Code 7520 - Lop Name 7520 | Cat 7 - Category 7 | 2016 | 135,970 | 780 | 1,344 | 0.574% | 0.988% | 12 |
| 21 | WePredict | Lop Code 500 - Lop Name 500 | Cat 1 - Category 1 | 2016 | 273,291 | 715 | 1,251 | 0.262% | 0.458% | 12 |
| 22 | WePredict | Lop Code 3963 - Lop Name 3963 | Cat 6 - Category 6 | 2016 | 265,882 | 210 | 1,247 | 0.079% | 0.469% | 12 |
| 23 | WePredict | Lop Code 1002 - Lop Name 1002 | Cat 6 - Category 6 | 2016 | 105,190 | 82 | 1,226 | 0.078% | 1.166% | 12 |
| 24 | WePredict | Lop Code 6131 - Lop Name 6131 | Cat 1 - Category 1 | 2016 | 206,431 | 632 | 1,206 | 0.306% | 0.584% | 12 |
| 25 | WePredict | Lop Code 6555 - Lop Name 6555 | Cat 1 - Category 1 | 2016 | 135,970 | 748 | 1,195 | 0.550% | 0.879% | 12 |
| 26 | WePredict | Lop Code 8129 - Lop Name 8129 | Cat 1 - Category 1 | 2016 | 265,882 | 709 | 1,166 | 0.267% | 0.439% | 12 |
| 27 | WePredict | Lop Code 751 - Lop Name 751 | Cat 1 - Category 1 | 2016 | 273,291 | 604 | 1,063 | 0.221% | 0.389% | 12 |
| 28 | WePredict | Lop Code 738 - Lop Name 738 | Cat 1 - Category 1 | 2016 | 241,160 | 640 | 1,018 | 0.265% | 0.422% | 12 |
| 29 | WePredict | Lop Code 948 - Lop Name 948 | Cat 3 - Category 3 | 2016 | 231,153 | 53 | 977 | 0.023% | 0.423% | 12 |
| 30 | WePredict | Lop Code 1264 - Lop Name 1264 | Cat 3 - Category 3 | 2016 | 265,882 | 461 | 969 | 0.173% | | |
| 31 | WePredict | Lop Code 930 - Lop Name 930 | Cat 6 - Category 6 | 2016 | 273,291 | 443 | 967 | 0.162% | | |

Provides forecasted service results which are then aggregated to a variety of levels within a set hierarchy Select a row in the grid to view further detail Detailed Forecasting on Navigate 104a

FIG. 22 (Cont.)

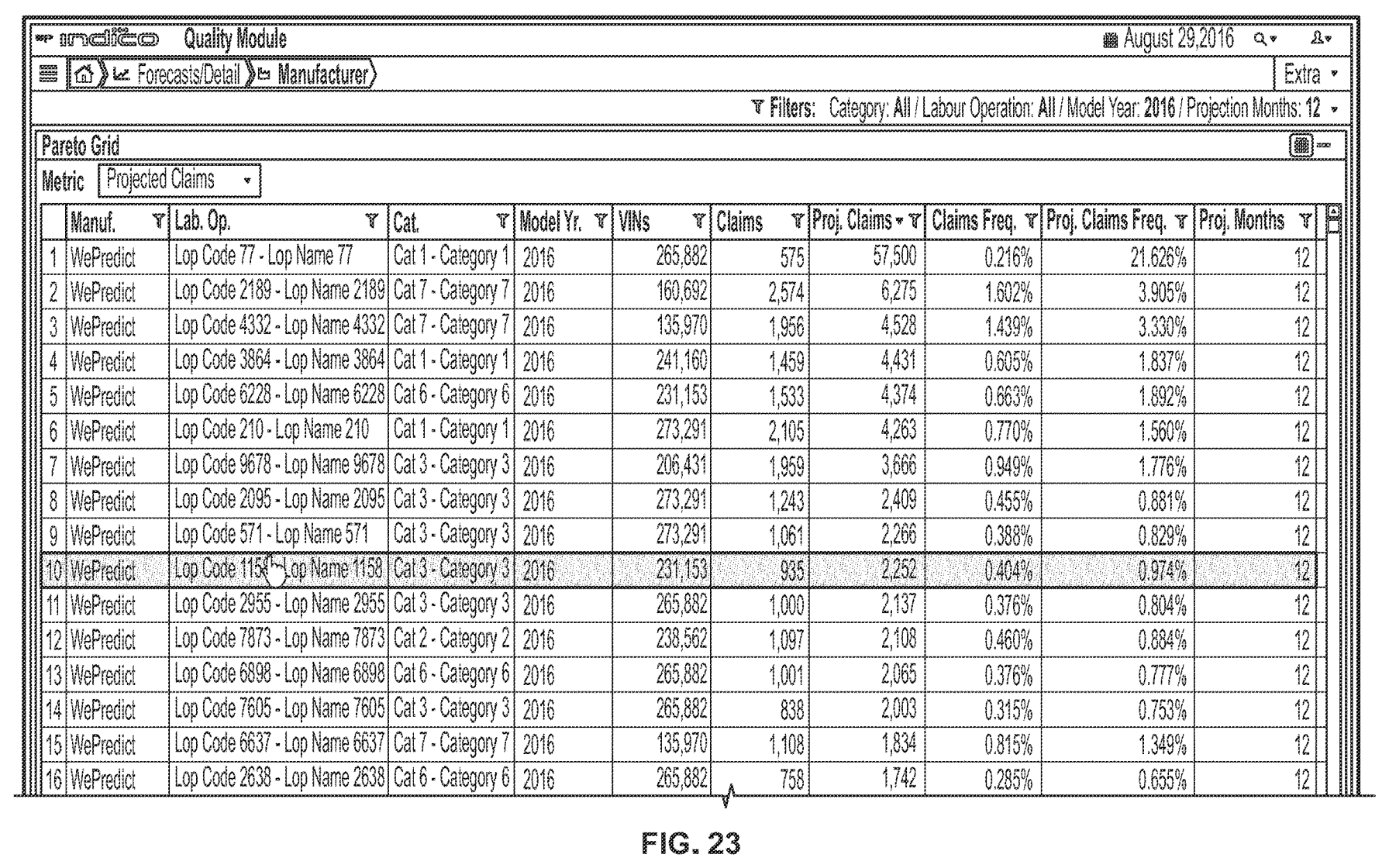

indico Quality Module August 29,2016

Forecasts/Detail > Manufacturer Extra

Filters: Category: All / Labour Operation: All / Model Year: 2016 / Projection Months: 12

Pareto Grid

Metric: Projected Claims

| | Manuf. | Lab. Op. | Cat. | Model Yr. | VINs | Claims | Proj. Claims | Claims Freq. | Proj. Claims Freq. | Proj. Months |
|---|---|---|---|---|---|---|---|---|---|---|
| 1 | WePredict | Lop Code 77 - Lop Name 77 | Cat 1 - Category 1 | 2016 | 265,882 | 575 | 57,500 | 0.216% | 21.626% | 12 |
| 2 | WePredict | Lop Code 2189 - Lop Name 2189 | Cat 7 - Category 7 | 2016 | 160,692 | 2,574 | 6,275 | 1.602% | 3.905% | 12 |
| 3 | WePredict | Lop Code 4332 - Lop Name 4332 | Cat 7 - Category 7 | 2016 | 135,970 | 1,956 | 4,528 | 1.439% | 3.330% | 12 |
| 4 | WePredict | Lop Code 3864 - Lop Name 3864 | Cat 1 - Category 1 | 2016 | 241,160 | 1,459 | 4,431 | 0.605% | 1.837% | 12 |
| 5 | WePredict | Lop Code 6228 - Lop Name 6228 | Cat 6 - Category 6 | 2016 | 231,153 | 1,533 | 4,374 | 0.663% | 1.892% | 12 |
| 6 | WePredict | Lop Code 210 - Lop Name 210 | Cat 1 - Category 1 | 2016 | 273,291 | 2,105 | 4,263 | 0.770% | 1.560% | 12 |
| 7 | WePredict | Lop Code 9678 - Lop Name 9678 | Cat 3 - Category 3 | 2016 | 206,431 | 1,959 | 3,666 | 0.949% | 1.776% | 12 |
| 8 | WePredict | Lop Code 2095 - Lop Name 2095 | Cat 3 - Category 3 | 2016 | 273,291 | 1,243 | 2,409 | 0.455% | 0.881% | 12 |
| 9 | WePredict | Lop Code 571 - Lop Name 571 | Cat 3 - Category 3 | 2016 | 273,291 | 1,061 | 2,266 | 0.388% | 0.829% | 12 |
| 10 | WePredict | Lop Code 115[illegible] Lop Name 1158 | Cat 3 - Category 3 | 2016 | 231,153 | 935 | 2,252 | 0.404% | 0.974% | 12 |
| 11 | WePredict | Lop Code 2955 - Lop Name 2955 | Cat 3 - Category 3 | 2016 | 265,882 | 1,000 | 2,137 | 0.376% | 0.804% | 12 |
| 12 | WePredict | Lop Code 7873 - Lop Name 7873 | Cat 2 - Category 2 | 2016 | 238,562 | 1,097 | 2,108 | 0.460% | 0.884% | 12 |
| 13 | WePredict | Lop Code 6898 - Lop Name 6898 | Cat 6 - Category 6 | 2016 | 265,882 | 1,001 | 2,065 | 0.376% | 0.777% | 12 |
| 14 | WePredict | Lop Code 7605 - Lop Name 7605 | Cat 3 - Category 3 | 2016 | 265,882 | 838 | 2,003 | 0.315% | 0.753% | 12 |
| 15 | WePredict | Lop Code 6637 - Lop Name 6637 | Cat 7 - Category 7 | 2016 | 135,970 | 1,108 | 1,834 | 0.815% | 1.349% | 12 |
| 16 | WePredict | Lop Code 2638 - Lop Name 2638 | Cat 6 - Category 6 | 2016 | 265,882 | 758 | 1,742 | 0.285% | 0.655% | 12 |

FIG. 23

| | | | | | | | | | | |
|---|---|---|---|---|---|---|---|---|---|---|
| 17 | WePredict | Lop Code 958 - Lop Name 958 | Cat 3 - Category 3 | 2016 | 265,882 | 686 | 1,560 | 0.258% | 0.587% | 12 |
| 18 | WePredict | Lop Code 6619 - Lop Name 6619 | Cat 3 - Category 3 | 2016 | 265,882 | 741 | 1,480 | 0.279% | 0.557% | 12 |
| 19 | WePredict | Lop Code 3085 - Lop Name 3085 | Cat 7 - Category 7 | 2016 | 135,970 | 757 | 1,415 | 0.557% | 1.041% | 12 |
| 20 | WePredict | Lop Code 7520 - Lop Name 7520 | Cat 7 - Category 7 | 2016 | 135,970 | 780 | 1,344 | 0.574% | 0.988% | 12 |
| 21 | WePredict | Lop Code 500 - Lop Name 500 | Cat 1 - Category 1 | 2016 | 273,291 | 715 | 1,251 | 0.262% | 0.458% | 12 |
| 22 | WePredict | Lop Code 3963 - Lop Name 3963 | Cat 6 - Category 6 | 2016 | 265,882 | 210 | 1,247 | 0.079% | 0.469% | 12 |
| 23 | WePredict | Lop Code 1002 - Lop Name 1002 | Cat 6 - Category 6 | 2016 | 105,190 | 82 | 1,226 | 0.078% | 1.166% | 12 |
| 24 | WePredict | Lop Code 6131 - Lop Name 6131 | Cat 1 - Category 1 | 2016 | 206,431 | 632 | 1,206 | 0.306% | 0.584% | 12 |
| 25 | WePredict | Lop Code 6555 - Lop Name 6555 | Cat 1 - Category 1 | 2016 | 135,970 | 748 | 1,195 | 0.550% | 0.879% | 12 |
| 26 | WePredict | Lop Code 8129 - Lop Name 8129 | Cat 1 - Category 1 | 2016 | 265,882 | 709 | 1,166 | 0.267% | 0.439% | 12 |
| 27 | WePredict | Lop Code 751 - Lop Name 751 | Cat 1 - Category 1 | 2016 | 273,291 | 604 | 1,063 | 0.221% | 0.389% | 12 |
| 28 | WePredict | Lop Code 738 - Lop Name 738 | Cat 1 - Category 1 | 2016 | 241,160 | 640 | 1,018 | 0.265% | 0.422% | 12 |
| 29 | WePredict | Lop Code 948 - Lop Name 948 | Cat 3 - Category 3 | 2016 | 231,153 | 53 | 977 | 0.023% | 0.423% | 12 |
| 30 | WePredict | Lop Code 1264 - Lop Name 1264 | Cat 3 - Category 3 | 2016 | 265,882 | 461 | 969 | 0.173% | | |
| 31 | WePredict | Lop Code 930 - Lop Name 930 | Cat 6 - Category 6 | 2016 | 273,291 | 443 | 967 | 0.162% | | |

Provides forecasted service results which are then aggregated to a variety of levels within a set hierarchy 104a Select a row in the grid to view further detail Detailed Forecasting Navigate

| | Lab. Op. Code | Lab. Op. Name | VINs | Claims | Proj. Claims Freq. | Current Rank | ΔW1 | ΔM1 | ΔM3 | ΔM6 | ΔM12 | ΔM24 | Max. Rank |
|---|---|---|---|---|---|---|---|---|---|---|---|---|---|
| 1 | Lop Code 77 | Lop Name 77 | 81,785 | 253 | 30.935% | 1 | | | | | | | 1 |
| 2 | Lop Code 2189 | Lop Name 2189 | 81,785 | 929 | 2.948% | 2 | | | | | | | 1 |
| 3 | Lop Code 210 | Lop Name 210 | 81,785 | 1,050 | 2.587% | 3 | | | | | | | 3 |
| 4 | Lop Code 9678 | Lop Name 9678 | 81,785 | 737 | 1.751% | 4 | | | | | | | 4 |
| 5 | Lop Code 2095 | Lop Name 2095 | 81,785 | 641 | 1.500% | 5 | | | | | | | 5 |
| 6 | Lop Code 7873 | Lop Name 7873 | 81,785 | 595 | 1.422% | 6 | | | | | | | 6 |
| 7 | Lop Code 7605 | Lop Name 7605 | 81,785 | 498 | 1.385% | 7 | | | | | | | 7 |
| 8 | Lop Code 2955 | Lop Name 2955 | 81,785 | 500 | 1.261% | 8 | | | | | | | 4 |
| 9 | Lop Code 6898 | Lop Name 6898 | 81,785 | 521 | 1.242% | 9 | | | | | | | 9 |
| 10 | Lop Code 571 | Lop Name 571 | 81,785 | 461 | 1.132% | 10 | | | | | | | 1 |
| 11 | Lop Code 4332 | Lop Name 4332 | 81,785 | 347 | 1.069% | 11 | | | | | | | 7 |
| 12 | Lop Code 751 | Lop Name 751 | 81,785 | 468 | 0.970% | 12 | | | | | | | 4 |
| 13 | Lop Code 6228 | Lop Name 6228 | 81,785 | 279 | 0.784% | 13 | | | | | | | 12 |
| 14 | Lop Code 4118 | Lop Name 4118 | 81,785 | 20 | 0.729% | 14 | | | | | | | 1 |

| | | | | | | | | | | | | | |
|---|---|---|---|---|---|---|---|---|---|---|---|---|---|
| 15 | Lop Code 6555 | Lop Name 6555 | 81,785 | 361 | 0.719% | 15 | | | | | | | 7 |
| 16 | Lop Code 6131 | Lop Name 6131 | 81,785 | 304 | 0.699% | 16 | | | | | | | 16 |
| 17 | Lop Code 3864 | Lop Name 3864 | 81,785 | 242 | 0.677% | 17 | | | | | | | 17 |
| 18 | Lop Code 6637 | Lop Name 6637 | 81,785 | 324 | 0.675% | 18 | | | | | | | 10 |
| 19 | Lop Code 3085 | Lop Name 3085 | 81,785 | 279 | 0.663% | 19 | | | | | | | |
| 20 | Lop Code 7520 | Lop Name 7520 | 81,785 | 304 | 0.660% | 20 | | | | | | | |
| 21 | Lop Code 500 | Lop Name 500 | 81,785 | 311 | 0.650% | 21 | | | | | | | |
| 22 | Lop Code 5040 | Lop Name 5040 | 81,785 | 5 | 0.611% | 22 | | | | | | | |
| 23 | Lop Code 1264 | Lop Name 1264 | 81,785 | 255 | 0.611% | 22 | | | | | | | |
| 24 | Lop Code 8142 | Lop Name 8142 | 81,785 | 270 | 0.611% | 22 | | | | | | | |
| 25 | Lop Code 1158 | Lop Name 1158 | 81,785 | 272 | 0.609% | 23 | | | | | | | |
| 26 | Lop Code 1805 | Lop Name 1805 | 81,785 | 298 | 0.595% | 24 | | | | | | | |

Shows how the relative ranks of forecasts have changed over a set period of time Select a row in the grid to view further detail Result Tracking on Navigate

| Sales and Claims; by Carline and Model Year | | | | | | |
|---|---|---|---|---|---|---|
| Carline | Model Year | VIN's | Claims | Warranty Time | | Warranty Expired |
| Carline 9 | All | 21,765 | 25,022 | C1,725 | 0.00 | |
| Carline 9 | 2018 | 31,765 | 25,022 | C1,705 | 0.00 | |

Pareto Grid

Metric: Projected Claims

| | Brd. Name | Model Yr. | VINs | Claims | Proj. Claims | Claims Freq. | Proj. Claims Freq. | Proj. Months |
|---|---|---|---|---|---|---|---|---|
| 1 | Brand 2 | 2016 | 206,431 | 84,848 | 172,664 | 41.102% | 83.642% | 12 |
| 2 | Brand 1 | 2016 | 66,862 | 10,668 | 28,072 | 15.955% | 41.985% | 12 |

Pareto Grid

Metric: Projected Claims

| | Prod. Name | Model Yr. | VINs | Claims | Proj. Claims | Claims Freq. | Proj. Claims Freq. | Proj. Months |
|---|---|---|---|---|---|---|---|---|
| 1 | Product 6 | 2016 | 81,785 | 34,931 | 63,923 | 42.711% | 78.160% | 12 |
| 2 | Product 5 | 2016 | 54,185 | 34,974 | 60,651 | 64.546% | 111.933% | 12 |
| 3 | Product 3 | 2016 | 70,461 | 14,943 | 48,090 | 21.207% | 68.251% | 12 |

Pareto Grid

Metric Projected Claims Frequency ▾

| | Car. Name | Model Yr. | VINs | Claims | Proj. Claims | Claims Freq. | Proj. Claims Freq. ▾ |
|---|---|---|---|---|---|---|---|
| 1 | Carline 8 | 2016 | 2 | 1 | 3 | 50.000% | 100.000% |
| 2 | Carline 3 | 2016 | 54,185 | 34,951 | 60,651 | 64.546% | 111.933% |
| 3 | Carline 9 | 2016 | 81,785 | 34,931 | 65,090 | 42.711% | 76.100% |
| 4 | Carline 5 | 2016 | 7,409 | 1,823 | 5,100 | 24.535% | 66.855% |
| 5 | Carline 1 | 2016 | 70,461 | 14,943 | 48,090 | 21.207% | 66.251% |
| 6 | Carline 6 | 2016 | 24,722 | 5,437 | 14,877 | 21.999% | 60.172% |
| 7 | Carline 10 | 2016 | 32,129 | 3,110 | 8,032 | 9.816% | 23.300% |

Pareto Grid

Metric: Projected Claims Frequency

| | Eng. Name | Model Yr. | VINs | Claims | Proj. Claims | Claims Freq. | Proj. Claims Freq. |
|---|---|---|---|---|---|---|---|
| 1 | Engine 28 | 2016 | 10,001 | 10,680 | 18,730 | 100.040% | 172.100% |
| 2 | Engine 35 | 2016 | 7,707 | 3,034 | 11,304 | 39.367% | 146.672% |
| 3 | Engine 26 | 2016 | 2,399 | 1,774 | 3,002 | 73.947% | 125.091% |
| 4 | Engine 27 | 2016 | 29,230 | 20,007 | 34,990 | 68.723% | 119.714% |
| 5 | Engine 29 | 2016 | 15,685 | 6,615 | 12,442 | 42.233% | 79.486% |
| 6 | Engine 37 | 2016 | 14,654 | 16,854 | 31,170 | 38.584% | 74.160% |
| 7 | Engine 31 | 2016 | 28 | 10 | 20 | 35.724% | 71.429% |
| 8 | Engine 34 | 2016 | 7,411 | 1,021 | 5,103 | 24.572% | 68.857% |

Pareto Grid

Metric: Projected Claims Frequency

| | Eng. Name | Prod. Name | Model Yr. | VINs | Claims | Proj. Claims | Claims Freq. | Proj. Claims Freq. |
|---|---|---|---|---|---|---|---|---|
| 1 | Engine 28 | Product 5 | 2016 | 9,163 | 10,408 | 17,435 | 113.587% | 190.276% |
| 2 | Engine 30 | Product 3 | 2016 | 7,707 | 3,034 | 11,005 | 39.307% | 140.072% |
| 3 | Engine 27 | Product 5 | 2016 | 15,615 | 11,753 | 20,162 | 75.159% | 129.119% |
| 4 | Engine 26 | Product 5 | 2016 | 2,393 | 1,774 | 3,001 | 73.947% | 225.094% |
| 5 | Engine 27 | Product 6 | 2016 | 13,613 | 8,354 | 14,334 | 61.345% | 109.029% |
| 6 | Engine 29 | Product 5 | 2016 | 6,097 | 3,168 | 5,443 | 51.960% | 89.030% |
| 7 | Engine 37 | Product 6 | 2016 | 23,357 | 11,555 | 20,094 | 49.471% | 86.030% |
| 8 | Engine 37 | Product 5 | 2016 | 3,626 | 1,003 | 2,888 | 48.456% | 79.647% |

Pareto Grid

Metric: Projected Claims Frequency

| | Eng. Name | Car. Name | Model Yr. | VINs | Claims | Proj. Claims | Claims Freq. | Proj. Claims Freq. |
|---|---|---|---|---|---|---|---|---|
| 1 | Engine 28 | Carline 3 | 2016 | 9,163 | 17,435 | 17,435 | 118.587% | 190.278% |
| 2 | Engine 34 | Carline 8 | 2016 | 2 | 1 | 3 | 50.000% | 150.000% |
| 3 | Engine 36 | Carline 1 | 2016 | 7,707 | 3,054 | 11,304 | 32.557% | 146.672% |
| 4 | Engine 27 | Carline 3 | 2016 | 16,615 | 11,753 | 20,362 | 75.139% | 129.119% |
| 5 | Engine 26 | Carline 3 | 2016 | 2,800 | 1,774 | 3,001 | 73.947% | 125.094% |
| 6 | Engine 27 | Carline 3 | 2016 | 13,616 | 8,854 | 14,634 | 61.345% | 108.929% |
| 7 | Engine 29 | Carline 3 | 2016 | 6,097 | 3,156 | 5,468 | 51.950% | 89.355% |
| 8 | Engine 37 | Carline 9 | 2016 | 23,307 | 11,666 | 20,091 | 49.471% | 86.030% |

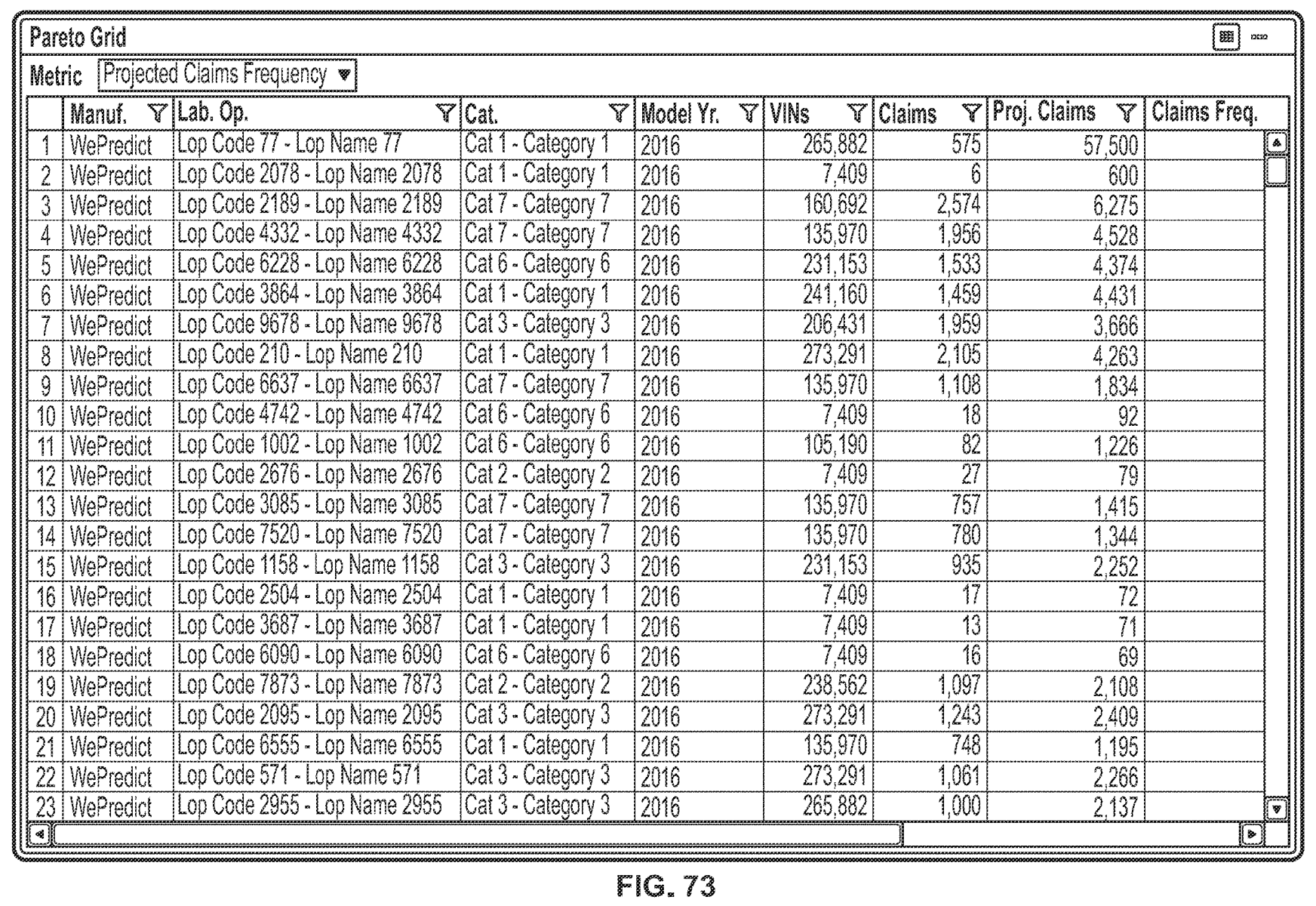

Pareto Grid

Metric: Projected Claims Frequency

| | Manuf. | Lab. Op. | Cat. | Model Yr. | VINs | Claims | Proj. Claims | Claims Freq. |
|---|---|---|---|---|---|---|---|---|
| 1 | WePredict | Lop Code 77 - Lop Name 77 | Cat 1 - Category 1 | 2016 | 265,882 | 575 | 57,500 | |
| 2 | WePredict | Lop Code 2078 - Lop Name 2078 | Cat 1 - Category 1 | 2016 | 7,409 | 6 | 600 | |
| 3 | WePredict | Lop Code 2189 - Lop Name 2189 | Cat 7 - Category 7 | 2016 | 160,692 | 2,574 | 6,275 | |
| 4 | WePredict | Lop Code 4332 - Lop Name 4332 | Cat 7 - Category 7 | 2016 | 135,970 | 1,956 | 4,528 | |
| 5 | WePredict | Lop Code 6228 - Lop Name 6228 | Cat 6 - Category 6 | 2016 | 231,153 | 1,533 | 4,374 | |
| 6 | WePredict | Lop Code 3864 - Lop Name 3864 | Cat 1 - Category 1 | 2016 | 241,160 | 1,459 | 4,431 | |
| 7 | WePredict | Lop Code 9678 - Lop Name 9678 | Cat 3 - Category 3 | 2016 | 206,431 | 1,959 | 3,666 | |
| 8 | WePredict | Lop Code 210 - Lop Name 210 | Cat 1 - Category 1 | 2016 | 273,291 | 2,105 | 4,263 | |
| 9 | WePredict | Lop Code 6637 - Lop Name 6637 | Cat 7 - Category 7 | 2016 | 135,970 | 1,108 | 1,834 | |
| 10 | WePredict | Lop Code 4742 - Lop Name 4742 | Cat 6 - Category 6 | 2016 | 7,409 | 18 | 92 | |
| 11 | WePredict | Lop Code 1002 - Lop Name 1002 | Cat 6 - Category 6 | 2016 | 105,190 | 82 | 1,226 | |
| 12 | WePredict | Lop Code 2676 - Lop Name 2676 | Cat 2 - Category 2 | 2016 | 7,409 | 27 | 79 | |
| 13 | WePredict | Lop Code 3085 - Lop Name 3085 | Cat 7 - Category 7 | 2016 | 135,970 | 757 | 1,415 | |
| 14 | WePredict | Lop Code 7520 - Lop Name 7520 | Cat 7 - Category 7 | 2016 | 135,970 | 780 | 1,344 | |
| 15 | WePredict | Lop Code 1158 - Lop Name 1158 | Cat 3 - Category 3 | 2016 | 231,153 | 935 | 2,252 | |
| 16 | WePredict | Lop Code 2504 - Lop Name 2504 | Cat 1 - Category 1 | 2016 | 7,409 | 17 | 72 | |
| 17 | WePredict | Lop Code 3687 - Lop Name 3687 | Cat 1 - Category 1 | 2016 | 7,409 | 13 | 71 | |
| 18 | WePredict | Lop Code 6090 - Lop Name 6090 | Cat 6 - Category 6 | 2016 | 7,409 | 16 | 69 | |
| 19 | WePredict | Lop Code 7873 - Lop Name 7873 | Cat 2 - Category 2 | 2016 | 238,562 | 1,097 | 2,108 | |
| 20 | WePredict | Lop Code 2095 - Lop Name 2095 | Cat 3 - Category 3 | 2016 | 273,291 | 1,243 | 2,409 | |
| 21 | WePredict | Lop Code 6555 - Lop Name 6555 | Cat 1 - Category 1 | 2016 | 135,970 | 748 | 1,195 | |
| 22 | WePredict | Lop Code 571 - Lop Name 571 | Cat 3 - Category 3 | 2016 | 273,291 | 1,061 | 2,266 | |
| 23 | WePredict | Lop Code 2955 - Lop Name 2955 | Cat 3 - Category 3 | 2016 | 265,882 | 1,000 | 2,137 | |

FIG. 73

Pareto Grid

Metric: Projected Claims Frequency

| | Brd. Name | Lab. Op. | Cat. | Model Yr. | VINs | Claims | Proj. Claims | Claims Freq. |
|---|---|---|---|---|---|---|---|---|
| 1 | Brand 2 | Lop Code 77 - Lop Name 77 | Cat 1 - Category 1 | 2016 | 206,431 | 537 | 53,700 | |
| 2 | Brand 1 | Lop Code 2078 - Lop Name 2078 | Cat 1 - Category 1 | 2016 | 7,409 | 6 | 600 | |
| 3 | Brand 1 | Lop Code 77 - Lop Name 77 | Cat 1 - Category 1 | 2016 | 59,451 | 38 | 3,800 | |
| 4 | Brand 2 | Lop Code 2189 - Lop Name 2189 | Cat 7 - Category 7 | 2016 | 135,970 | 2,561 | 6,211 | |
| 5 | Brand 1 | Lop Code 6228 - Lop Name 6228 | Cat 6 - Category 6 | 2016 | 24,722 | 233 | 859 | |
| 6 | Brand 2 | Lop Code 4332 - Lop Name 4332 | Cat 7 - Category 7 | 2016 | 135,970 | 1,956 | 4,528 | |
| 7 | Brand 2 | Lop Code 3864 - Lop Name 3864 | Cat 1 - Category 1 | 2016 | 206,431 | 1,458 | 4,428 | |
| 8 | Brand 1 | Lop Code 7840 - Lop Name 7840 | Cat 6 - Category 6 | 2016 | 7,409 | 37 | 158 | |
| 9 | Brand 2 | Lop Code 210 - Lop Name 210 | Cat 1 - Category 1 | 2016 | 206,431 | 2,030 | 3,997 | |
| 10 | Brand 2 | Lop Code 9678 - Lop Name 9678 | Cat 3 - Category 3 | 2016 | 206,431 | 1,959 | 3,666 | |
| 11 | Brand 2 | Lop Code 6228 - Lop Name 6228 | Cat 6 - Category 6 | 2016 | 206,431 | 1,300 | 3,515 | |
| 12 | Brand 1 | Lop Code 1158 - Lop Name 1158 | Cat 3 - Category 3 | 2016 | 24,722 | 141 | 386 | |
| 13 | Brand 1 | Lop Code 1243 - Lop Name 1243 | Cat 1 - Category 1 | 2016 | 34,729 | 109 | 490 | |
| 14 | Brand 2 | Lop Code 1002 - Lop Name 1002 | Cat 6 - Category 6 | 2016 | 70,461 | 65 | 953 | |
| 15 | Brand 2 | Lop Code 6637 - Lop Name 6637 | Cat 7 - Category 7 | 2016 | 135,970 | 1,108 | 1,834 | |
| 16 | Brand 1 | Lop Code 4742 - Lop Name 4742 | Cat 6 - Category 6 | 2016 | 7,409 | 18 | 92 | |
| 17 | Brand 2 | Lop Code 2095 - Lop Name 2095 | Cat 3 - Category 3 | 2016 | 206,431 | 1,189 | 2,247 | |
| 18 | Brand 1 | Lop Code 2676 - Lop Name 2676 | Cat 2 - Category 2 | 2016 | 7,409 | 27 | 79 | |
| 19 | Brand 1 | Lop Code 839 - Lop Name 839 | Cat 3 - Category 3 | 2016 | 24,722 | 95 | 260 | |
| 20 | Brand 2 | Lop Code 3085 - Lop Name 3085 | Cat 7 - Category 7 | 2016 | 135,970 | 757 | 1,415 | |
| 21 | Brand 2 | Lop Code 7873 - Lop Name 7873 | Cat 2 - Category 2 | 2016 | 206,431 | 1,090 | 2,086 | |
| 22 | Brand 2 | Lop Code 7520 - Lop Name 7520 | Cat 7 - Category 7 | 2016 | 135,970 | 780 | 1,344 | |
| 23 | Brand 1 | Lop Code 2504 - Lop Name 2504 | Cat 1 - Category 1 | 2016 | 7,409 | 17 | 72 | |

FIG. 76

Pareto Grid

Metric: Projected Claims Frequency

| | Prod. Name | Lab. Op. | Cat. | Model Yr. | VINs | Claims | Proj. Claims | Claims Freq. |
|---|---|---|---|---|---|---|---|---|
| 1 | Product 5 | Lop Code 77 - Lop Name 77 | Cat 1 - Category 1 | 2016 | 54,185 | 253 | 25,300 | |
| 2 | Product 6 | Lop Code 77 - Lop Name 77 | Cat 1 - Category 1 | 2016 | 81,785 | 253 | 25,300 | |
| 3 | Product 1 | Lop Code 2078 - Lop Name 2078 | Cat 1 - Category 1 | 2016 | 7,409 | 6 | 60 | |
| 4 | Product 4 | Lop Code 77 - Lop Name 77 | Cat 1 - Category 1 | 2016 | 34,729 | 25 | 2,500 | |
| 5 | Product 5 | Lop Code 2189 - Lop Name 2189 | Cat 7 - Category 7 | 2016 | 54,185 | 1,632 | 3,800 | |
| 6 | Product 5 | Lop Code 4332 - Lop Name 4332 | Cat 7 - Category 7 | 2016 | 54,185 | 1,609 | 3,654 | |
| 7 | Product 2 | Lop Code 77 - Lop Name 77 | Cat 1 - Category 1 | 2016 | 24,722 | 13 | 1,300 | |
| 8 | Product 3 | Lop Code 3864 - Lop Name 3864 | Cat 1 - Category 1 | 2016 | 70,461 | 1,065 | 3,557 | |
| 9 | Product 3 | Lop Code 77 - Lop Name 77 | Cat 1 - Category 1 | 2016 | 70,461 | 31 | 3,100 | |
| 10 | Product 5 | Lop Code 9678 - Lop Name 9678 | Cat 3 - Category 3 | 2016 | 54,185 | 1,220 | 2,228 | |
| 11 | Product 2 | Lop Code 6228 - Lop Name 6228 | Cat 6 - Category 6 | 2016 | 24,722 | 233 | 859 | |
| 12 | Product 5 | Lop Code 210 - Lop Name 210 | Cat 1 - Category 1 | 2016 | 54,185 | 928 | 1,744 | |
| 13 | Product 3 | Lop Code 6228 - Lop Name 6228 | Cat 6 - Category 6 | 2016 | 70,461 | 657 | 2,109 | |
| 14 | Product 6 | Lop Code 2189 - Lop Name 2189 | Cat 7 - Category 7 | 2016 | 81,785 | 929 | 2,411 | |
| 15 | Product 6 | Lop Code 210 - Lop Name 210 | Cat 1 - Category 1 | 2016 | 81,785 | 1,050 | 2,116 | |
| 16 | Product 5 | Lop Code 6637 - Lop Name 6637 | Cat 7 - Category 7 | 2016 | 54,185 | 784 | 1,282 | |
| 17 | Product 1 | Lop Code 7840 - Lop Name 7840 | Cat 6 - Category 6 | 2016 | 7,409 | 37 | 158 | |
| 18 | Product 6 | Lop Code 9678 - Lop Name 9678 | Cat 3 - Category 3 | 2016 | 81,785 | 737 | 1,432 | |
| 19 | Product 5 | Lop Code 2095 - Lop Name 2095 | Cat 3 - Category 3 | 2016 | 54,185 | 501 | 904 | |

FIG. 78

Pareto Grid

Group

Metric: Projected Claims Frequency

| | Car. Name | Lab. Op. | Cat. | Model Yr. | VINs | Claims | Proj. Claims | Claims Freq. |
|---|---|---|---|---|---|---|---|---|
| 1 | Carline 8 | Lop Code 6925 - Lop Name 6925 | Cat 2 - Category 2 | 2016 | 2 | 1 | 1 | 5 |
| 2 | Carline 3 | Lop Code 77 - Lop Name 77 | Cat 1 - Category 1 | 2016 | 54,185 | 253 | 25,300 | |
| 3 | Carline 9 | Lop Code 77 - Lop Name 77 | Cat 1 - Category 1 | 2016 | 81,785 | 253 | 25,300 | |
| 4 | Carline 5 | Lop Code 2078 - Lop Name 2078 | Cat 1 - Category 1 | 2016 | 7,409 | 6 | 600 | |
| 5 | Carline 10 | Lop Code 77 - Lop Name 77 | Cat 1 - Category 1 | 2016 | 34,729 | 25 | 2,500 | |
| 6 | Carline 3 | Lop Code 2189- Lop Name 2189 | Cat 7 - Category 7 | 2016 | 54,185 | 1,632 | 3,800 | |
| 7 | Carline 3 | Lop Code 4332 - Lop Name 4332 | Cat 7 - Category 7 | 2016 | 54,185 | 1,609 | 3,654 | |
| 8 | Carline 6 | Lop Code 77 - Lop Name 77 | Cat 1 - Category 1 | 2016 | 24,722 | 13 | 1,300 | |
| 9 | Carline 1 | Lop Code 3864 - Lop Name 3864 | Cat 1 - Category 1 | 2016 | 70,461 | 1,065 | 3,557 | |
| 10 | Carline 1 | Lop Code 77 - Lop Name 77 | Cat 1 - Category 1 | 2016 | 70,461 | 31 | 3,100 | |
| 11 | Carline 3 | Lop Code 9678 - Lop Name 9678 | Cat 3 - Category 3 | 2016 | 54,185 | 1,220 | 2,228 | |
| 12 | Carline 6 | Lop Code 6228 - Lop Name 6228 | Cat 6 - Category 6 | 2016 | 24,722 | 233 | 859 | |
| 13 | Carline 3 | Lop Code 210 - Lop Name 210 | Cat 1 - Category 1 | 2016 | 54,185 | 928 | 1,744 | |
| 14 | Carline 1 | Lop Code 6228 - Lop Name 6228 | Cat 6 - Category 6 | 2016 | 70,461 | 657 | 2,109 | |
| 15 | Carline 9 | Lop Code 2189 - Lop Name 2189 | Cat 7 - Category 7 | 2016 | 81,785 | 929 | 2,411 | |
| 16 | Carline 9 | Lop Code 210 - Lop Name 210 | Cat 1 - Category 1 | 2016 | 81,785 | 1,050 | 2,116 | |
| 17 | Carline 3 | Lop Code 6637- Lop Name 6637 | Cat 7 - Category 7 | 2016 | 54,185 | 784 | 1,282 | |
| 18 | Carline 5 | Lop Code 7840 - Lop Name 7840 | Cat 6 - Category 6 | 2016 | 7,409 | 37 | 158 | |
| 19 | Carline 9 | Lop Code 9678 - Lop Name 9678 | Cat 3 - Category 3 | 2016 | 81,785 | 737 | 1,432 | |

FIG. 80

Pareto Grid

Metric: Projected Claims Frequency

| | Eng. Name | Lab. Op. | Cat. | Model Yr. | VINs | Claims | Proj. Claims | Claims Freq. |
|---|---|---|---|---|---|---|---|---|
| 1 | Engine 29 | Lop Code 77 - Lop Name 6925 | Cat 1 - Category 1 | 2016 | 14,253 | 68 | 6,800 | |
| 2 | Engine 31 | Lop Code 2955 - Lop Name 2955 | Cat 3 - Category 3 | 2016 | 10 | 2 | 4 | 2 |
| 3 | Engine 28 | Lop Code 77 - Lop Name 77 | Cat 1 - Category 1 | 2016 | 10,881 | 39 | 3,900 | |
| 4 | Engine 37 | Lop Code 77 - Lop Name 77 | Cat 1 - Category 1 | 2016 | 42,852 | 138 | 13,800 | |
| 5 | Engine 32 | Lop Code 77 - Lop Name 77 | Cat 1 - Category 1 | 2016 | 59,636 | 187 | 18,700 | |
| 6 | Engine 27 | Lop Code 77- Lop Name 77 | Cat 1 - Category 1 | 2016 | 29,233 | 82 | 8,200 | |
| 7 | Engine 26 | Lop Code 9678 - Lop Name 9678 | Cat 3 - Category 3 | 2016 | 2,399 | 291 | 514 | 1 |
| 8 | Engine 26 | Lop Code 77 - Lop Name 77 | Cat 1 - Category 1 | 2016 | 2,399 | 5 | 500 | |
| 9 | Engine 28 | Lop Code 4332 - Lop Name 4332 | Cat 7 - Category 7 | 2016 | 10,881 | 1,011 | 2,237 | |
| 10 | Engine 31 | Lop Code 958 - Lop Name 958 | Cat 3 - Category 3 | 2016 | 10 | 1 | 2 | 1 |
| 11 | Engine 31 | Lop Code 6119 - Lop Name 6119 | Cat 6 - Category 6 | 2016 | 18 | 1 | 3 | |
| 12 | Engine 31 | Lop Code 571 - Lop Name 571 | Cat 3 - Category 3 | 2016 | 18 | 1 | 3 | |
| 13 | Engine 28 | Lop Code 2189 - Lop Name 2189 | Cat 7 - Category 7 | 2016 | 10,881 | 736 | 1,676 | |
| 14 | Engine 36 | Lop Code 2638 - Lop Name 2638 | Cat 6 - Category 6 | 2016 | 7,707 | 307 | 874 | |
| 15 | Engine 31 | Lop Code 673 - Lop Name 673 | Cat 2 - Category 2 | 2016 | 18 | 1 | 2 | |
| 16 | Engine 31 | Lop Code 8142 - Lop Name 8142 | Cat 1 - Category 1 | 2016 | 18 | 1 | 2 | |
| 17 | Engine 31 | Lop Code 483- Lop Name 483 | Cat 3 - Category 3 | 2016 | 18 | 1 | 2 | |
| 18 | Engine 31 | Lop Code 7082 - Lop Name 7082 | Cat 1 - Category 1 | 2016 | 18 | 1 | 2 | |
| 19 | Engine 36 | Lop Code 3864 - Lop Name 3864 | Cat 1 - Category 1 | 2016 | 7,707 | 215 | 828 | |

FIG. 83

Pareto Grid

Metric: Projected Claims Frequency

| | Eng. Name | Prod. Name | Lab. Op. | Cat. | Model Yr. | VINs | Claims | Proj. Claims |
|---|---|---|---|---|---|---|---|---|
| 1 | Engine 37 | Product 5 | Lop Code 77 - Lop Name 77 | Cat 1 - Category 1 | 2016 | 3,626 | 46 | |
| 2 | Engine 29 | Product 5 | Lop Code 77 - Lop Name 77 | Cat 1 - Category 1 | 2016 | 6,097 | 34 | |
| 3 | Engine 32 | Product 5 | Lop Code 77 - Lop Name 77 | Cat 1 - Category 1 | 2016 | 17,267 | 75 | |
| 4 | Engine 29 | Product 6 | Lop Code 77 - Lop Name 77 | Cat 1 - Category 1 | 2016 | 8,156 | 34 | |
| 5 | Engine 28 | Product 5 | Lop Code 77 - Lop Name 77 | Cat 7 - Category 1 | 2016 | 9,163 | 38 | |
| 6 | Engine 31 | Product 6 | Lop Code 2955- Lop Name 2955 | Cat 7 - Category 3 | 2016 | 10 | 2 | |
| 7 | Engine 27 | Product 5 | Lop Code 77 - Lop Name 77 | Cat 1 - Category 1 | 2016 | 15,615 | 55 | |
| 8 | Engine 37 | Product 6 | Lop Code 77 - Lop Name 77 | Cat 1 - Category 1 | 2016 | 23,357 | 82 | |
| 9 | Engine 32 | Product 6 | Lop Code 77 - Lop Name 77 | Cat 1 - Category 1 | 2016 | 34,926 | 109 | |
| 10 | Engine 28 | Product 5 | Lop Code 4332 - Lop Name 4332 | Cat 3 - Category 7 | 2016 | 9,163 | 997 | |
| 11 | Engine 26 | Product 5 | Lop Code 9678 - Lop Name 9678 | Cat 6 - Category 3 | 2016 | 2,399 | 291 | |
| 12 | Engine 26 | Product 5 | Lop Code 77 - Lop Name 77 | Cat 1 - Category 1 | 2016 | 2,399 | 5 | |
| 13 | Engine 31 | Product 6 | Lop Code 958 - Lop Name 958 | Cat 6 - Category 3 | 2016 | 10 | 1 | |
| 14 | Engine 27 | Product 6 | Lop Code 77 - Lop Name 77 | Cat 7 - Category 1 | 2016 | 13,618 | 27 | |
| 15 | Engine 28 | Product 5 | Lop Code 2189 - Lop Name 2189 | Cat 1 - Category 7 | 2016 | 9,163 | 723 | |
| 16 | Engine 31 | Product 5 | Lop Code 571 - Lop Name 571 | Cat 7 - Category 3 | 2016 | 18 | 1 | |
| 17 | Engine 31 | Product 5 | Lop Code 6119 - Lop Name 6119 | Cat 6 - Category 6 | 2016 | 18 | 1 | |
| 18 | Engine 37 | Product 5 | Lop Code 2189 - Lop Name 2189 | Cat 3 - Category 7 | 2016 | 3,626 | 204 | |
| 19 | Engine 36 | Product 3 | Lop Code 2638 - Lop Name 2638 | Cat 3 - Category 6 | 2016 | 7,707 | 307 | |

FIG. 85

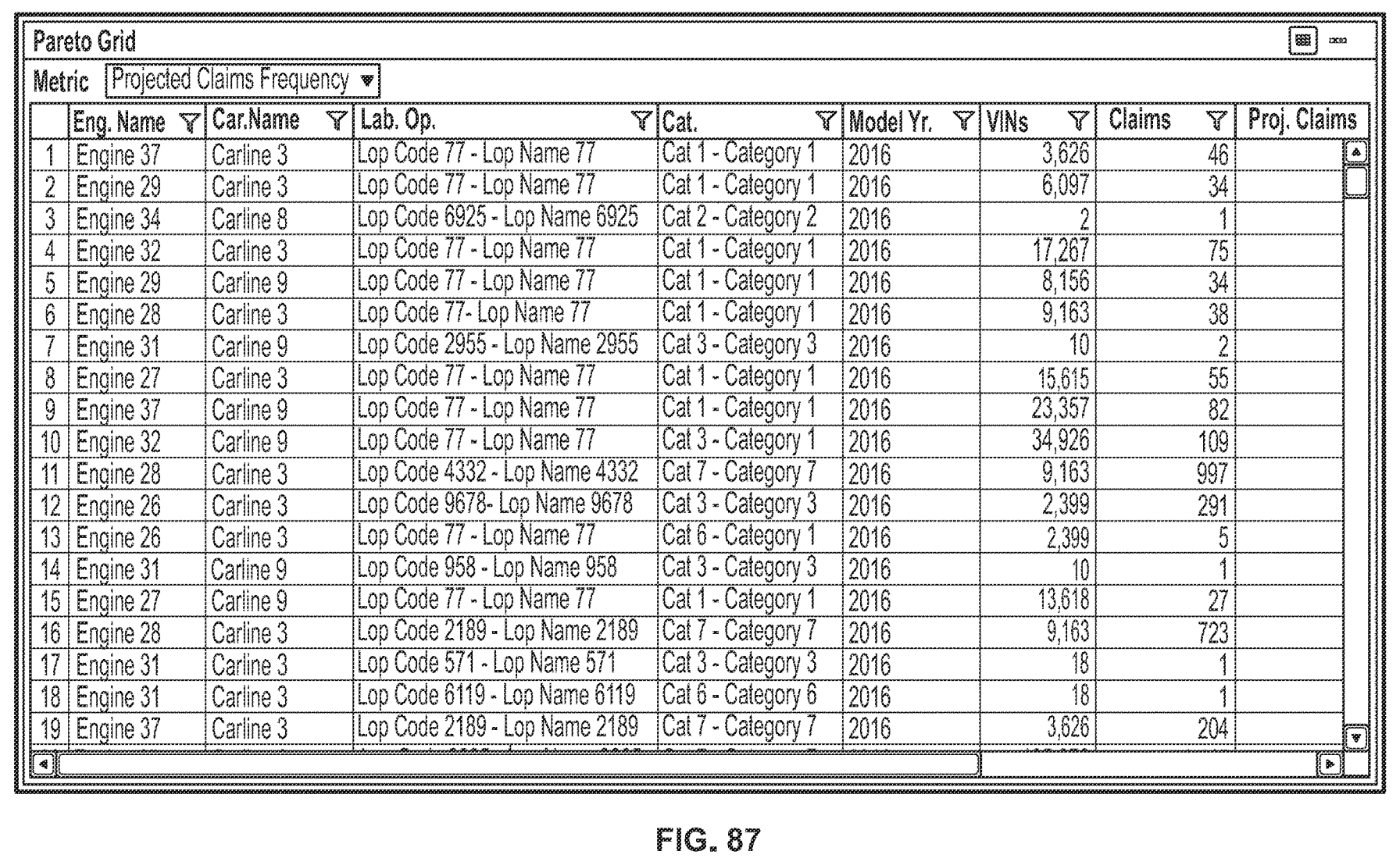

Pareto Grid

Metric: Projected Claims Frequency

| | Eng. Name | Car.Name | Lab. Op. | Cat. | Model Yr. | VINs | Claims | Proj. Claims |
|---|---|---|---|---|---|---|---|---|
| 1 | Engine 37 | Carline 3 | Lop Code 77 - Lop Name 77 | Cat 1 - Category 1 | 2016 | 3,626 | 46 | |
| 2 | Engine 29 | Carline 3 | Lop Code 77 - Lop Name 77 | Cat 1 - Category 1 | 2016 | 6,097 | 34 | |
| 3 | Engine 34 | Carline 8 | Lop Code 6925 - Lop Name 6925 | Cat 2 - Category 2 | 2016 | 2 | 1 | |
| 4 | Engine 32 | Carline 3 | Lop Code 77 - Lop Name 77 | Cat 1 - Category 1 | 2016 | 17,267 | 75 | |
| 5 | Engine 29 | Carline 9 | Lop Code 77 - Lop Name 77 | Cat 1 - Category 1 | 2016 | 8,156 | 34 | |
| 6 | Engine 28 | Carline 3 | Lop Code 77- Lop Name 77 | Cat 1 - Category 1 | 2016 | 9,163 | 38 | |
| 7 | Engine 31 | Carline 9 | Lop Code 2955 - Lop Name 2955 | Cat 3 - Category 3 | 2016 | 10 | 2 | |
| 8 | Engine 27 | Carline 3 | Lop Code 77 - Lop Name 77 | Cat 1 - Category 1 | 2016 | 15,615 | 55 | |
| 9 | Engine 37 | Carline 9 | Lop Code 77 - Lop Name 77 | Cat 1 - Category 1 | 2016 | 23,357 | 82 | |
| 10 | Engine 32 | Carline 9 | Lop Code 77 - Lop Name 77 | Cat 3 - Category 1 | 2016 | 34,926 | 109 | |
| 11 | Engine 28 | Carline 3 | Lop Code 4332 - Lop Name 4332 | Cat 7 - Category 7 | 2016 | 9,163 | 997 | |
| 12 | Engine 26 | Carline 3 | Lop Code 9678- Lop Name 9678 | Cat 3 - Category 3 | 2016 | 2,399 | 291 | |
| 13 | Engine 26 | Carline 3 | Lop Code 77 - Lop Name 77 | Cat 6 - Category 1 | 2016 | 2,399 | 5 | |
| 14 | Engine 31 | Carline 9 | Lop Code 958 - Lop Name 958 | Cat 3 - Category 3 | 2016 | 10 | 1 | |
| 15 | Engine 27 | Carline 9 | Lop Code 77 - Lop Name 77 | Cat 1 - Category 1 | 2016 | 13,618 | 27 | |
| 16 | Engine 28 | Carline 3 | Lop Code 2189 - Lop Name 2189 | Cat 7 - Category 7 | 2016 | 9,163 | 723 | |
| 17 | Engine 31 | Carline 3 | Lop Code 571 - Lop Name 571 | Cat 3 - Category 3 | 2016 | 18 | 1 | |
| 18 | Engine 31 | Carline 3 | Lop Code 6119 - Lop Name 6119 | Cat 6 - Category 6 | 2016 | 18 | 1 | |
| 19 | Engine 37 | Carline 3 | Lop Code 2189 - Lop Name 2189 | Cat 7 - Category 7 | 2016 | 3,626 | 204 | |

FIG. 87

Pareto Grid

Ranking changes from previous forecasts Order By Rank ▼ Metric Projected Claims Frequency ▼

| | Lab. Op. Code | Lab. Op. Name | VINs | Claims | Proj. Claims Freq. ▼ | Current Rank | ΔW1 | ΔM1 | ΔM3 |
|---|---|---|---|---|---|---|---|---|---|
| 1 | Lop Code 77 | Lop Name 77 | 81,785 | 253 | 30.935% | 1 | | | |
| 2 | Lop Code 2189 | Lop Name 2189 | 81,785 | 929 | 2.948% | 2 | | | |
| 3 | Lop Code 210 | Lop Name 210 | 81,785 | 1,050 | 2.587% | 3 | | | |
| 4 | Lop Code 9678 | Lop Name 9678 | 81,785 | 737 | 1.751% | 4 | | | |
| 5 | Lop Code 2095 | Lop Name 2095 | 81,785 | 641 | 1.500% | 5 | | | |
| 6 | Lop Code 7873 | Lop Name 7873 | 81,785 | 595 | 1.422% | 6 | | | |
| 7 | Lop Code 7605 | Lop Name 7605 | 81,785 | 498 | 1.385% | 7 | | | |
| 8 | Lop Code 2955 | Lop Name 2955 | 81,785 | 500 | 1.261% | 8 | | | |
| 9 | Lop Code 6898 | Lop Name 6898 | 81,785 | 521 | 1.242% | 9 | | | |
| 10 | Lop Code 571 | Lop Name 571 | 81,785 | 461 | 1.132% | 10 | | | |
| 11 | Lop Code 4332 | Lop Name 4332 | 81,785 | 347 | 1.069% | 11 | | | |
| 12 | Lop Code 751 | Lop Name 751 | 81,785 | 466 | 0.970% | 12 | | | |
| 13 | Lop Code 6228 | Lop Name 6228 | 81,785 | 279 | 0.784% | 13 | | | |
| 14 | Lop Code 4118 | Lop Name 4118 | 81,785 | 20 | 0.729% | 14 | | | |
| 15 | Lop Code 6555 | Lop Name 6555 | 81,785 | 361 | 0.719% | 15 | | | |

FIG. 89

Analysis Date

Pareto Grid

Ranking changes from previous forecasts Order By Rank Metric Projected Claims Frequency

| | Lab. Op. Code | Lab. Op. Name | VINs | Claims | Proj. Claims Freq. | Current Rank | ΔW1 | ΔM1 | ΔM3 |
|---|---|---|---|---|---|---|---|---|---|
| 1 | Lop Code 77 | Lop Name 77 | 81,785 | 253 | 30.935% | 1 | | 0 → | |
| 2 | Lop Code 2189 | Lop Name 2189 | 81,785 | 929 | 2.948% | 2 | | 0 → | |
| 3 | Lop Code 210 | Lop Name 210 | 81,785 | 1,050 | 2.587% | 3 | | 0 → | |
| 4 | Lop Code 9678 | Lop Name 9678 | 81,785 | 737 | 1.751% | 4 | | 2 ↑ | |
| 5 | Lop Code 2095 | Lop Name 2095 | 81,785 | 641 | 1.500% | 5 | | 0 → | |
| 6 | Lop Code 7873 | Lop Name 7873 | 81,785 | 595 | 1.422% | 6 | | 1 ↑ | |
| 7 | Lop Code 7605 | Lop Name 7605 | 81,785 | 498 | 1.386% | 7 | | 2 ↑ | |
| 8 | Lop Code 2955 | Lop Name 2955 | 81,785 | 500 | 1.261% | 8 | | 0 → | |
| 9 | Lop Code 6898 | Lop Name 6898 | 81,785 | 521 | 1.242% | 9 | | 1 ↑ | |
| 10 | Lop Code 571 | Lop Name 571 | 81,785 | 461 | 1.133% | 10 | | 2 ↑ | |
| 11 | Lop Code 4332 | Lop Name 4332 | 81,785 | 347 | 1.069% | 11 | | 0 → | |
| 12 | Lop Code 751 | Lop Name 751 | 81,785 | 466 | 0.969% | 12 | | 2 ↑ | |

FIG. 92

Claim Details (37 claims)

Grouped by: × Part Code × Failure Mode Name Metric Claims

| VIN | Claim Number | Claim Date | Paid Date | Prod. Date | In Service Date | Reg. Name | Car. Name | En |
|---|---|---|---|---|---|---|---|---|
| Part Cd 8502 (1 items) Claims: 37 | | | | | | | | |
| Failure Mode 1 (37 items) Claims: 37 | | | | | | | | |
| VIN 766383 | 3540906 | 06/24/2016 | 06/24/2016 | 02/26/2016 | 06/16/2016 | Region 11 | Carline 5 | |
| VIN 764170 | 3551427 | 06/26/2016 | 06/26/2016 | 01/17/2016 | 05/30/2016 | Region 11 | Carline 5 | |
| VIN 763219 | 3653233 | 08/15/2016 | 08/15/2016 | 02/12/2016 | 08/07/2016 | Region 11 | Carline 5 | |
| VIN 763514 | 4010286 | 05/01/2016 | 05/01/2016 | 01/15/2016 | 03/25/2016 | Region 11 | Carline 5 | |
| VIN 761517 | 4012648 | 05/05/2016 | 05/05/2016 | 02/12/2016 | 04/08/2016 | Region 39 | Carline 5 | |
| VIN 761517 | 3687642 | 04/09/2016 | 04/09/2016 | 02/12/2016 | 04/08/2016 | Region 39 | Carline 5 | |
| VIN 815038 | 3942465 | 06/16/2016 | 06/16/2016 | 04/03/2016 | 04/16/2016 | Region 54 | Carline 5 | |
| VIN 807026 | 4045566 | 08/14/2016 | 08/14/2016 | 03/05/2016 | 03/26/2016 | Region 54 | Carline 5 | |
| VIN 756287 | 3775646 | 05/02/2016 | 05/02/2016 | 11/29/2015 | 04/03/2016 | Region 54 | Carline 5 | |
| VIN 739334 | 3687847 | 04/09/2016 | 04/09/2016 | 01/29/2016 | 03/13/2016 | Region 54 | Carline 5 | |
| VIN 741227 | 3702740 | 06/09/2016 | 06/09/2016 | 03/03/2016 | 05/29/2016 | Region 54 | Carline 5 | |
| VIN 846368 | 3615986 | 05/17/2016 | 05/17/2016 | 03/12/2016 | 05/13/2016 | Region 54 | Carline 5 | |
| VIN 806436 | 3642873 | 08/12/2016 | 08/12/2016 | 02/25/2016 | 05/27/2016 | Region 54 | Carline 5 | |
| VIN 740781 | 4039746 | 08/01/2016 | 08/01/2016 | 03/04/2016 | 07/31/2016 | Region 54 | Carline 5 | |
| VIN 741317 | 3973160 | 08/22/2016 | 08/22/2016 | 01/29/2016 | 03/13/2016 | Region 54 | Carline 5 | |
| VIN 815398 | 3877787 | 07/04/2016 | 07/04/2016 | 04/03/2016 | 04/17/2016 | Region 54 | Carline 5 | |
| VIN 737889 | 3858346 | 05/19/2016 | 05/19/2016 | 01/27/2016 | 03/24/2016 | Region 54 | Carline 5 | |
| VIN 801923 | 3957041 | 07/24/2016 | 07/24/2016 | 03/25/2016 | 05/19/2016 | Region 54 | Carline 5 | |
| VIN 843794 | 3609936 | 04/23/2016 | 04/23/2016 | 01/10/2016 | 01/20/2016 | Region 54 | Carline 5 | |
| VIN 740556 | 3842628 | 04/10/2016 | 04/10/2016 | 02/28/2016 | 03/26/2016 | Region 54 | Carline 5 | |
| VIN 852627 | 3869539 | 06/23/2016 | 06/23/2016 | 04/18/2016 | 04/30/2016 | Region 54 | Carline 5 | |
| VIN 742088 | 3866095 | 06/25/2016 | 06/25/2016 | 03/05/2016 | 03/24/2016 | Region 54 | Carline 5 | |
| VIN 815398 | 3648142 | 08/01/2016 | 08/01/2016 | 04/03/2016 | 04/17/2016 | Region 54 | Carline 5 | |
| VIN 847534 | 3776515 | 06/02/2016 | 06/02/2016 | 04/01/2016 | 05/23/2016 | Region 54 | Carline 5 | |
| VIN 835242 | 3698358 | 06/03/2016 | 06/03/2016 | 01/15/2016 | 03/11/2016 | Region 54 | Carline 5 | |

FIG. 121

Part Code Grid - Top 200

| | Part Code | Part Name | Claims | VINs | Claims% of Total | Paid | Claims Freq. | CCPV |
|---|---|---|---|---|---|---|---|---|
| 1 | Part Cd 5990 | Part Name 5990 | 1,050 | 81,785 | 3.01% | $193,491 | 1.284% | $2.37 |
| 2 | Part Cd 3114 | Part Name 3114 | 929 | 81,785 | 2.66% | $329,941 | 1.136% | $4.03 |
| 3 | Part Cd 3652 | Part Name 3652 | 737 | 81,785 | 2.11% | $738,749 | 0.901% | $9.03 |
| 4 | Part Cd 587 | Part Name 587 | 641 | 81,785 | 1.84% | $339,669 | 0.784% | $4.15 |
| 5 | Part Cd 3822 | Part Name 3822 | 595 | 81,785 | 1.70% | $146,267 | 0.728% | $1.79 |
| 6 | Part Cd 8506 | Part Name 8506 | 521 | 81,785 | 1.49% | $44,422 | 0.637% | $0.54 |
| 7 | Part Cd 218 | Part Name 218 | 500 | 81,785 | 1.43% | $408,225 | 0.611% | $4.99 |
| 8 | Part Cd 2580 | Part Name 2580 | 498 | 81,785 | 1.43% | $109,560 | 0.609% | $1.34 |
| 9 | Part Cd 6731 | Part Name 6731 | 466 | 81,785 | 1.33% | $99,025 | 0.570% | $1.21 |
| 10 | Part Cd 458 | Part Name 458 | 461 | 81,785 | 1.32% | $76,222 | 0.564% | $0.93 |
| 11 | Part Cd 2447 | Part Name 2447 | 361 | 81,785 | 1.03% | $37,724 | 0.441% | $0.46 |
| 12 | Part Cd 4959 | Part Name 4959 | 347 | 81,785 | 0.99% | $129,677 | 0.424% | $1.59 |
| 13 | Part Cd 4240 | Part Name 4240 | 324 | 81,785 | 0.93% | $169,122 | 0.396% | $2.07 |
| 14 | Part Cd 1375 | Part Name 1375 | 311 | 81,785 | 0.89% | $21,773 | 0.380% | $0.27 |
| 15 | Part Cd 4343 | Part Name 4343 | 304 | 81,785 | 0.87% | $23,126 | 0.372% | $0.28 |
| 16 | Part Cd 5083 | Part Name 5083 | 304 | 81,785 | 0.87% | $44,882 | 0.372% | $0.55 |
| 17 | Part Cd 4936 | Part Name 4936 | 298 | 81,785 | 0.85% | $11,041 | 0.364% | $0.14 |
| 18 | Part Cd 4281 | Part Name 4281 | 279 | 81,785 | 0.80% | $260,113 | 0.341% | $3.18 |
| 19 | Part Cd 5867 | Part Name 5867 | 279 | 81,785 | 0.80% | $85,917 | 0.341% | $1.05 |
| 20 | Part Cd 1101 | Part Name 1101 | 272 | 81,785 | 0.78% | $30,624 | 0.333% | $0.37 |
| 21 | Part Cd 1666 | Part Name 1666 | 270 | 81,785 | 0.77% | $170,531 | 0.330% | $2.09 |
| 22 | Part Cd 4930 | Part Name 4930 | 265 | 81,785 | 0.76% | $127,832 | 0.324% | $1.56 |
| 23 | Part Cd 2290 | Part Name 2290 | 257 | 81,785 | 0.74% | $147,443 | 0.314% | $1.80 |
| 24 | Part Cd 2223 | Part Name 2223 | 255 | 81,785 | 0.73% | $26,813 | 0.312% | $0.33 |
| 25 | Part Cd 4941 | Part Name 4941 | 253 | 81,785 | 0.72% | $2,536 | 0.309% | $0.03 |
| 26 | Part Cd 1674 | Part Name 1674 | 246 | 81,785 | 0.70% | $42,113 | 0.301% | $0.51 |

FIG. 123

PREDICTING VEHICLE REPAIR OPERATIONS

CROSS-REFERENCE TO RELATED APPLICATIONS

This application is a continuation application of U.S. application Ser. No. 16/834,036, filed Mar. 30, 2020, and entitled, "Machine Analysis," which is a bypass continuation of PCT Application No. PCT/US2018/053718 filed Oct. 1, 2018, entitled "Machine Analysis," which is hereby incorporated herein by reference in its entirety.

PCT Application No. PCT/US2018/053718 is a continuation of PCT Application No. PCT/US2017/069021 filed Dec. 29, 2017, entitled "Predicting Vehicle Repair Operations," which is hereby incorporated herein by reference in its entirety.

PCT Application No. PCT/US2018/053718 claims priority to U.S. Application No. 62/570,456, filed Oct. 10, 2017, entitled "Machine Analysis," which is also hereby incorporated herein by reference in its entirety.

PCT Application No. PCT/US2018/053718 claims priority to U.S. Application No. 62/570,469, filed Oct. 10, 2017, entitled "Machine Analysis," which is also hereby incorporated herein by reference in its entirety.

PCT Application No. PCT/US2018/053718 claims priority to U.S. Application No. 62/565,927, filed Sep. 29, 2017, entitled "Machine Analysis," which is also hereby incorporated herein by reference in its entirety.

PCT Application No. PCT/US2018/053718 claims priority to U.S. Application No. 62/565,933, filed Sep. 29, 2017, entitled "Machine Analysis," which is also hereby incorporated herein by reference in its entirety.

TECHNICAL FIELD

This disclosure relates to predictive analytics for vehicles and other machines, and in particular predictive analytics relating to vehicle component faults and vehicle repair operations.

BACKGROUND

Component failure in complex machines such as vehicles is a significant problem. To illustrate the scale of the problem, FIG. 1 shows certain components 2 of an ordinary car 1 laid out so that they can be seen individually. An issue with even one of the smallest of the components 2 can result in the vehicle 1 requiring repair. Understanding which of the many components 2 might have issues is an extremely challenging task, but a very important one because the earlier that component-level issues can be identified, the sooner preventative action can be taken. Such action can include for example re-engineering, say, a particular model of vehicle to ensure that future vehicles coming off the manufacturing line do not suffer from the same component-level issue or taking pre-emptive repair action for vehicles that have already entered active service to prevent such issues from escalating.

SUMMARY

One way in which problematic vehicle components can be identified is to simply keep track of the number or costs of repairs for each component type per month and flag a particular type of component as problematic should that value reach some predetermined threshold in any given month. A problem with this approach is that many component-level issues can subsist for a significant period of time—several years even—before they are actually identified and repaired. A number of factors feed into, for example certain component-level issues can subsist for some time before they actually give rise to a fault that needs repair, or users may put off dealing with certain issues if they do not see them as critical. The upshot is that, with such an approach, it can take several years from the point at which, say, a particular model of vehicle with a particular component-level issue first starts coming out of the factory and the point at which the problem with that issue is actually identified. By this point, significantly more vehicles suffering from the same component-level will have been manufactured and entered active service than would have been the case had the issue been identified and rectified earlier.

One aspect of the invention provides a method of producing vehicles comprising: in a vehicle production process, manufacturing vehicle components of different types, and assembling the vehicle components to form vehicles; creating a set of vehicle records, each being a record of one of the vehicles entering active service; performing vehicle repairs on a subset of the vehicles after they have entered active service; creating a respective record of each of the vehicle repairs, each of which comprises or indicates a vehicle age or usage value, and records a vehicle component fault identified in the vehicle repair; receiving at a data processing stage the vehicle records and vehicle repair records, wherein a predictive algorithm executed at the data processing stage processes the received records so as to, for each type of vehicle component: 1) identify a respective set of the vehicle repair records relating to that type of vehicle component, and 2) use the respective set of vehicle repair records to predict a respective number of or resource value for of vehicle component faults of that type for the set of vehicle records based on: a number of vehicles recorded in the set of vehicle records, and a current age or usage of each of the recorded vehicles; comparing the predictions for the different vehicle component types to identify a problem with a particular one of the vehicle component types; and adapting the vehicle production process, so as to remedy the identified problem for later vehicles produced in the adapted vehicle production process.

Another aspect of the invention provides a method of predicting vehicle repair operations or vehicle component faults, the method comprising, at a processing stage: selecting, by a predictive algorithm executed at the data processing stage, a set of vehicle repair records for use in making a prediction, each of the vehicle repair records being a record of a vehicle repair performed after the vehicle entered active service, each of which comprises or indicates a historical vehicle age or usage value, and records a repair operation or vehicle component fault; wherein the predictive algorithm uses the selected set of vehicle repair records to predict a number of or resource value for repair operations or vehicle component faults for a set of vehicle records, each of the vehicle records being a record of a vehicle entering active service, based on: a number of vehicles recorded in the set of vehicle records, and a current age or usage of each of the recorded vehicles.

In embodiments, the set of vehicle repair records may be selected by filtering a larger set of available vehicle repair records based on a particular type of repair operation or a particular type of vehicle component, such that each repair record of the selected set relates to the particular type of repair operation/vehicle component, the predicted number or resource value being a predicted number of or resource value for repair operations/vehicle component faults of the particular type.

The set of vehicle repair records may be selected by filtering a larger set of available vehicle repair records based on a particular vehicle attribute or set of vehicle attributes, such that each repair record of the selected set relates to the particular (set of) vehicle attribute(s), wherein each of the vehicle records in the set of vehicle records relates to a vehicle having the particular (set of) vehicle attribute(s) or a similar (set of) vehicle attribute(s), the predicted number or resource value being a predicted number of or resource value for repair operations/vehicle component faults for vehicles having the particular vehicle attribute.

The larger set may be filtered based on the particular (set of) vehicle attribute(s) and the particular type of repair operation/vehicle component, such that each repair record of the selected set relates to the particular (set of) vehicle attribute(s) and the particular type of repair operation/vehicle component, the predicted number or resource value being a predicted number of or resource value for repair operations/vehicle component faults of the particular type for vehicles having the particular vehicle attribute.

The method may comprise: determining a profile for the set of vehicle repair records based on a number of or resource value for repair operations or vehicle component faults recorded in the set of vehicle repair records for different historical vehicle age or usage values, the profile being used to make the prediction.

The profile may comprise, for each of a set of historical vehicle age or usage values, a corresponding resource or count value calculated from the set of repair records.

The resource or count value may be a cumulative value calculated as a sum of the number of or resource values for repair operations/vehicle component faults recorded in the set of vehicle repair records up to that historical vehicle age or usage value.

The prediction may be made by performing a non-parametric analysis based on the number of vehicles recorded in the set of vehicle records, the current age or usage of each of the vehicles, and the resource or count values of the profile.

The step of determining the profile may comprise: determining a total number of resource value for repair operations/vehicle component faults recorded in the filtered set of vehicle repair records, each resource or count value being calculated as a proportion of the total.

The method may comprise calculating an earnings value for each of the historical vehicle age or usage values of the profile based on the corresponding resource or count value of the profile and the number of vehicles recorded in the set of vehicle records whose current age or usage matches that historical vehicle age or usage value of the profile.

The earnings value for each of the historical vehicle age or usage values of the profile may be calculated by multiplying the corresponding resource or count value of the profile with the number of vehicles recorded in the set of vehicle records whose current age or usage matches that historical vehicle age or usage value of the profile.

The method may comprise calculating a maturity value for the set of vehicle records from the earnings values.

The method may comprise determining a total number of vehicles recorded in the set of vehicle records, wherein the maturity value may be calculated by calculating a total earnings value from the earnings values as a proportion of the total number of vehicles.

The method may comprise: identifying one or more existing vehicle repair records corresponding to the set of vehicle records; and determining a number of or resource value for repair operations or vehicle component faults recorded in the existing vehicle repair records.

The predicted number of or resource value for repair operations or vehicle component faults for the set of vehicle records may be computed from the number of or resource value for repair operations or vehicle component faults determined for the existing vehicle repair records based on the number of vehicles recorded in the set of vehicle records and the current age or usage of each of the vehicles.

The profile may be used to compute the predicted number.

The predicted number of or resource value for repair operations or vehicle component faults for the set of vehicle records may be determined based on the maturity value calculated for the set of vehicle records and the number of or resource value for repair operations/vehicle component faults recorded in the existing vehicle repair records.

The predicted number or resource value may be determined by dividing, by the maturity, the number of or resource value for repair operations/vehicle component faults recorded in the existing vehicle repair records.

The set of vehicle repair records may be selected such that a current vehicle age or usage determined for each vehicle repair record of the selected set exceeds a prediction duration or usage threshold respectively, the predicted number or resource value being a number of or resource value for repair operations or vehicle component faults occurring within the prediction duration or below the usage threshold.

At least one of the existing vehicle repair records may have a current vehicle age or usage that does not exceed the prediction duration or usage threshold respectively.

Each of the vehicle repair records may comprise a vehicle identifier which links the repair record to a matching vehicle record.

At least one of the vehicle repair records may be augmented with data of the matching vehicle record.

At least one of the vehicle repair records may be augmented with an indicator of a vehicle attribute from the matching vehicle record.

The historical vehicle age or usage value may be calculated for at least one of the vehicle repair records from a claim date, fault date or paid date of the vehicle repair record and an in-service date of the matching vehicle record.

At least two sets of vehicle repair records may be selected, each by filtering the larger set based on a respective type of repair operation or vehicle component; wherein the predictive algorithm may use each of the selected sets of vehicle repair records to predict, for the set of vehicle records, a respective number of or resource value for repair operations/vehicle component faults of the respective type.

The predicted numbers or resource values determined using the said at least two sets of vehicle repair records may be aggregated to determine an aggregate predicted number or resource value for a combined set of the vehicle records.

The historical vehicle age value may be an age of the vehicle when the repair operation was performed or the vehicle component was repaired or replaced, or an age of the vehicle when the repair record was processed.

A current vehicle age may be determined for at least one of the vehicles from a date of the corresponding vehicle record.

The current vehicle age may be determined from the date of the corresponding vehicle record and a most recent date recorded in the repair claim records.

A current usage for the at least one of the vehicles may be inferred from the current vehicle age.

The current vehicle usage may be inferred based on at least one attribute of the vehicle.

The historical vehicle use age value may be a mileage or hour age reading taken as part of the vehicle repair.

Another aspect of the invention provides a method of predicting vehicle repair operations or vehicle component faults, the method comprising, at a processing stage: selecting a set of vehicle repair records for use in making a prediction, each of which comprises or indicates a historical vehicle age or usage value and records a repair operation or vehicle component fault, the set of repair records being selected by filtering a larger set of available vehicle repair records based on a particular type of repair operation or a particular type of vehicle component; and using the selected set of repair records to predict, for a population of vehicles, a number of or resource value for repair operations/vehicle component faults of the particular type, based on the number of vehicles in the population and a current age or usage of each of those vehicles.

Another aspect of the invention provides a method of predicting vehicle repair operations or vehicle component faults, the method comprising, at a processing stage: selecting a set of vehicle repair records for determining a profile, each of which comprises or indicates a historical vehicle age or usage value and records a repair operation or vehicle component fault; determining a profile for the set of repair records, the profile comprising, for each of a set of historical vehicle-age or usage values, a corresponding resource or count value calculated from the set of repair records; and using the selected set of repair records to predict a number of or resource value for repair operations or vehicle component faults for a population of vehicles, by performing a non-parametric analysis based on: the number vehicles in the population, a current age or usage of each of those vehicles, and the resource or count values of the profile.

Any of the methods disclosed herein may comprise step of using the predicted number of or resource value for repair operations/vehicle component faults to identify a problem relating to a particular vehicle attribute, a particular type of vehicle component, or a particular type of repair operation.

The method may comprise using the prediction to identify a problem with the particular type of vehicle component or repair operation used to filter the larger set of available vehicle repair records.

The method may comprise using the prediction to identify a problem relating to the particular vehicle attribute used to filter the larger set of vehicle repair records.

The method may comprise using the prediction to identifying a problem with the particular type of vehicle component or repair operation that is specific to vehicles having the particular vehicle attribute.

The problem may be identified by comparing the predicted number or resource value with at least one other predicted number of or resource value for repair operations/vehicle component faults.

The predictive algorithm may implement the following steps for each of a plurality of repair operation or vehicle component types: selecting a respective set of vehicle repair records relating to that type of repair operation/vehicle component; and using the respective set of vehicle repair records to predict, for the set of vehicle records, a number of or resource value for repair operations or vehicle component faults of that type based on the number of recorded vehicles and their current age or usage.

Each of the sets of vehicle repair records may be selected in accordance with any of the embodiments set out above.

The method may comprise comparing the predictions the repair operation/vehicle component types, to identify a problem with a particular one of the repair operations/vehicle component types.

The comparison may be performed by a comparison algorithm executed at the data processing stage to automatically identify the problem.

The method may comprise a step of remedying the identified problem.

The number or resource value may be a number or resource value per recorded vehicle.

The number or recourse may be an absolute number or resource value.

An expiry date may be comprised in or determined for each vehicle record, wherein any vehicle records having expiry dates that exceed the prediction threshold are excluded from the set of vehicle records.

The profile may be a repair operation profile determined for a particular vehicle attribute or set of vehicle attributes and a particular repair operation/vehicle component type.

The profile may be an overview profile determined for a particular vehicle attribute or set of vehicle attributes across all repair operations/vehicle component types.

Separate repair operation and category profiles may be determined for the same vehicle attribute or the same set of vehicle attributes.

The or each profile may be determined for a particular model of vehicle.

The profile may be a preferred profile, in that the profile matches the set of vehicle records according to primary matching criteria. For example, the method may comprise a step of determining that there is a sufficient number of vehicle records available to determine the preferred profile.

The profile may be a backup profile, in that profile matches the set of vehicle records according to secondary matching criteria, wherein the method may comprise a step of determining that no preferred profile matching the set of vehicle records according to primary matching criteria is available. For example, the method may comprise determining that there is an insufficient number of vehicle repair records available to determine such a profile.

The set of vehicle records may all relate to the same vehicle model, and the backup profile may be a profile for a different model of vehicle, or a model group comprising the vehicle model and at least one other vehicle model.

The profile may be determined for a category of repair operation, covering at least two specific types of repair operation, or a specific type of repair operation.

The prediction may be made for a particular type of repair operation, and the backup profile may be a profile for a particular category of repair operation covering multiple types of repair operation, or a profile across all repair operations.

The set of vehicle records may all relate to the same vehicle model and the prediction is made for a specific type of repair operation, wherein the determining step may comprise determining that no profile for that specific type of repair operation and that model is available, and the backup profile may be selected according to the following profile hierarchy:

1. a profile for the specific type of repair operation and a model group which comprises the vehicle model and at least one other vehicle model;
2. a profile for a similar vehicle model and the specific type of repair operation;

3. a profile for the same vehicle model and a repair operation category, which covers the specific type of repair operation and at least one other specific type of repair operation;
4. a profile for a similar vehicle model and said repair operation category,
5. a profile for the same vehicle model across all repair operations;
6. a profile for said model group across all repair operations;
7. a profile for a similar model of vehicle across all repair operations In determining the projected number/resource value, a time lag may be accounted for using a model of the time lag, the time lag caused by delays in receiving recent repair records.

The model may be used to adapt the earnings value.

Another aspect of the invention provides a system for predicting vehicle repair operations or vehicle component faults, the system comprising: electronic storage configured to hold computer readable instructions for executing a predictive algorithm; and a processing stage coupled to the electronic storage and configured to execute computer readable instructions, the computer readable instructions being configured, when executed, to implement any method of functionality disclosed herein.

Where this disclosure refers to remedying an identified problem, the identified problem may for example be remedied by:

reengineering the particular type of vehicle component,
reengineering a vehicle model having the particular attribute or the particular type of vehicle component
adapting a manufacturing process in which the particular type of vehicle component is manufactured,
adapting an assembly process in which a model of vehicle having the particular attribute or the particular type of vehicle component are assembled, or
adapting a procedure according to which the particular type of repair operation is performed.

Another aspect of the invention provides a method of predicting machine repair operations or machine component faults, the method comprising, at a processing stage: selecting, by a predictive algorithm executed at the data processing stage, a set of machine repair records for use in making a prediction, each of the machine repair records being a record of a machine repair performed after the machine entered active service, each of which comprises or indicates a historical machine age or usage value, and records a repair operation or machine component fault; wherein the predictive algorithm uses the selected set of machine repair records to predict a number of or resource value for repair operations or machine component faults for a set of machine records, each of the machine records being a record of a machine entering active service, based on: a number of machines recorded in the set of machine records, and a current age or usage of each of the recorded machines.

Another aspect of the invention provides a method of producing machines comprising: in a machine production process, manufacturing machine components of different types, and assembling the machine components to form machines; creating a set of machine records, each being a record of one of the machines entering active service; performing machine repairs on a subset of the machines after they have entered active service; creating a respective record of each of the machine repairs, each of which comprises or indicates a machine age or usage value, and records a machine component fault identified in the machine repair; receiving at a data processing stage the machine records and machine repair records, wherein a predictive algorithm executed at the data processing stage processes the received records so as to, for each type of machine component: 1) identify a respective set of the machine repair records relating to that type of machine component, and 2) use the respective set of machine repair records to predict a respective number of or resource value for machine component faults of that type for the set of machine records based on: a number of machines recorded in the set of machine records, and a current age or usage of each of the recorded machines; comparing the predictions for the different machine component types to identify a problem with a particular one of the machine component types; and adapting the machine production process, so as to remedy the identified problem for later machines produced in the adapted machine production process.

Another aspect of the invention is directed to a computer system for aggregating vehicle predictions comprising: a database configured to hold vehicle predictions, each comprising: at least one repair operation, vehicle component or vehicle attribute indicator, and an individual prediction value for the indicated repair operation, vehicle component or vehicle attribute; a filtering component configured to receive filtering criteria for filtering the vehicle predictions, and filter the vehicle predictions according to the filtering criteria, by comparing the repair operation, vehicle component or vehicle attribute indicators of the vehicle predictions in the database with the filtering criteria, to determine a filtered set of the vehicle predictions meeting the filtering criteria; and a controller configured to control a user interface to output, to a user, a prediction value determined from the filtered set.

The computer system may comprise an aggregation component configured to compute an aggregate prediction value from the individual prediction values of the filtered set of vehicle predictions meeting the filtering criteria, the outputted prediction value being the aggregate prediction value.

The outputted prediction value may be an individual prediction value of the filtered set.

The outputted prediction value may be one of multiple prediction values determined from the filtered set and outputted by the controller.

Each of the vehicle predictions held in the database may comprise a repair operation or vehicle component indicator and at least one vehicle attribute indicator, the individual prediction value being an individual prediction value for the indicated vehicle attribute and the indicated repair operation/vehicle component.

The filtering criteria may be such that each vehicle prediction of the filtered set relates to one of:

the same manufacturer, such that the filtered set contains vehicle predictions for a vehicle product group or at least two different vehicle product groups of the manufacturer;
the same vehicle product group, such that the filtered set contains vehicle predictions for at least two different vehicle products within that product group;
the same vehicle product, such that the filtered set contains vehicle predictions for at least two different models of that vehicle product;
the same vehicle model, such that the filtered set contains vehicle predictions for at least two different model years for that model;
the same vehicle model and the same model year;
the same vehicle engine;
the same vehicle transmission;

the same type of repair operation; or the same type of vehicle component.

The filtering component may be configured to receive second filtering criteria, and filter the vehicle predictions in the database according to the second filtering criteria, to determine a second filtered set of the vehicle predictions meeting the second filtering criteria, wherein the controller may be configured to control the user interface to output, to the user, a second prediction value determined from the second filtered set.

The aggregation component may be configured to compute a second aggregate prediction value from the individual prediction values of the second filtered set, the second outputted prediction value being the second aggregate prediction value.

The second prediction value may be one of multiple second prediction values determined from the second filtered set and outputted by the controller.

The filtering component may be configured to receive third filtering criteria, and filter the vehicle predictions in the database according to the third filtering criteria, to determine a third filtered set of the vehicle predictions meeting the third filtering criteria, wherein the controller may be configured to control the user interface to output, to the user, a third prediction value determined from the third filtered set.

The filtering component may be configured to receive fourth filtering criteria, and filter the vehicle predictions in the database according to the fourth filtering criteria, to determine a fourth filtered set of the vehicle predictions meeting the fourth filtering criteria, wherein the controller may be configured to control the user interface to output, to the user, a fourth prediction value determined from the fourth filtered set The filtering component may be configured to receive fifth filtering criteria, and filter the vehicle predictions in the database according to the fifth filtering criteria, to determine a fifth filtered set of the vehicle predictions meeting the fifth filtering criteria, wherein the controller may be configured to control the user interface to output, to the user, a fifth prediction value determined from the fifth filtered set The filtering component may be configured to: filter the vehicle predictions according to the filtering criteria by comparing at least the repair operation/vehicle component indicators with the filtering criteria, and filter the vehicle predictions according to the second filtering criteria by comparing at least the vehicle attribute indicators of the vehicle predictions in the database with the second filtering criteria.

The controller may be configured to control the user interface to display each of said prediction values simultaneously.

Each of the filtered sets determined by the filtering component may relate to a respective level of a prediction hierarchy.

The prediction hierarchy may have at least the following levels:

manufacturer, product group, product, model (or carline) or model-plus-model-year.

The prediction hierarchy may also have the following level:

model-engine or model-transmission.

The prediction hierarchy may also have the following level:

model-engine-transmission or model-transmission-engine.

The prediction hierarchy may also have at least the following level:

model year.

The prediction hierarchy may have at least the following levels:

engine or transmission, engine-product or transmission-product, engine-model or transmission-model.

The prediction hierarchy may also have the following level:

engine-product group or transmission-product group.

At least one of the filtered sets may relate to a particular type of repair operation for an entity at the respective level of the prediction hierarchy.

At least one of the filtered sets may relate to all types of repair operation for an entity at the respective level of the prediction hierarchy.

At least two of the filtered sets may relate to the same entity, wherein one of those sets relates to a particular type of repair operation for that respective entity and the other of the filtered sets relates to all types of repair operation for that entity.

The controller may be configured, in response to a mode switch instruction at the user interface, to switch between: i) an overview mode, in which prediction values are displayed for sets of the vehicle predictions wherein each of those sets relates to all types of repair operation for a respective entity at a respective level of the prediction hierarchy, and ii) a detailed mode for a particular type of repair operation, in which prediction values are displayed for sets of the vehicle predictions wherein each of those sets relates to that particular type of repair operation for a respective entity at a respective level of the prediction hierarchy.

The filtering criteria and the second filtering criteria may be such that the filtered set of vehicle predictions and the second filtered set of vehicle predictions relate to different levels of the prediction hierarchy.

The filtering criteria and the second filtering criteria may be such that the filtered set of vehicle predictions and the second filtered set of vehicle predictions relate to the same level of the prediction hierarchy.

The third filtering criteria may be such that the third filtered set relates to the same level of the prediction hierarchy as the filtered set and the second filtered set.

The third filtering criteria may be such that the third filtered set relates to a different level of the prediction hierarchy than the filtered set and the second filtered set.

The third filtered set of vehicle predictions may relate to an entity at a higher level of the prediction hierarchy than the filtered set and the second filtered set of vehicle predictions.

The controller may be configured to determine a display order for the filtered sets relating to the same level of the prediction hierarchy based on the prediction values determined for those sets, and control the user interface to display those prediction values in the determined display order.

The controller may be configured to determine a display location for the or each set of vehicle predictions based on the level of the prediction hierarchy to which that set relates, and control the user interface to display the prediction value for that set at the determined display location.

The controller may be configured to determine the display locations for the prediction value, the second prediction value, and the third prediction value such that the display locations for the prediction value and the second prediction value are grouped together in a display region separate from the display location for third prediction value.

The fourth and fifth sets may relate to the same level of the prediction hierarchy as each other, which is lower than the level to which the filtered set and the second filtered set of vehicle predictions relate.

The fourth and fifth sets may relate to different levels of the prediction hierarchy than each other, both of which are higher than the level to which the third filtered set relates.

The second filtering criteria may be such that each vehicle prediction of the filtered set relates to a different one of:

- the same manufacturer, such that the filtered set contains vehicle predictions for a vehicle product group or at least two different vehicle product groups of the manufacturer;
- the same vehicle product group, such that the filtered set contains vehicle predictions for at least two different vehicle products;
- the same vehicle product, such that the filtered set contains vehicle predictions for at least two different vehicle models;
- the same vehicle model, such that the filtered set contains vehicle predictions for at least two different model years for that model;
- the same vehicle model and the same model year;
- the same vehicle engine;
- the same vehicle transmission;
- the same type of repair operation; or
- the same type of vehicle component.

The controller may be configured to determine, for the or each set of vehicle predictions, at least one visual characteristic based on the prediction value for that set, and control the user interface to display a visual representation having the determined visual characteristic, thereby outputting the prediction value as the displayed visual representation having the determined visual characteristic.

The prediction value determined from the filtered set may be a future prediction value covering only predicted repair operations or vehicle component faults.

The prediction value determined from the filtered set may be a future-plus-historic prediction value covering both predicted repair operations or vehicle component faults and repair operations or vehicle component faults that have already occurred.

The system may be configured to compute, for the or each set of vehicle predictions: i) a future-plus-historic prediction value covering both predicted repair operations or vehicle component faults and repair operations or vehicle component faults that have already occurred, and ii) a future prediction value covering only predicted repair operations or vehicle component faults; wherein the controller may be configured to control the user interface to output, to the user, the overall prediction value in association with the future prediction value.

The computer system may also configured to determine, for the or each set of vehicle predictions, a historical value covering only repair operations or vehicle component faults that have already occurred, wherein the controller may be configured to control the user interface to output, to the user, the prediction value in association with the historical value.

The historical value may be an aggregate historical value corresponding to the aggregate prediction value.

The historical value may be an individual historical value corresponding to the individual prediction value determined from the filtered set.

The controller may be configured to determine a first visual characteristic of the visual representation based on one of, and a second visual characteristic of the visual representation based on a different one of: the future prediction value, the historical value, and the future-plus-historic prediction value for that set.

The (or each) visual characteristic may be (a different) one of a size or a colour of the visual representation.

The prediction value may be a future prediction value covering only predicted repair operations or vehicle component faults, wherein the controller may be configured to control the user interface to display a visual representation of an future-plus-historic prediction value for that set covering both predicted repair operations or vehicle component faults and repair operations or vehicle component faults that have already occurred, the visual representation having two visually distinct portions, a first of which represents the historical value and a second of which represents the future prediction value.

The first and second portions may have respective sizes determined by the controller based on the historical value and the future prediction value respectively.

Each of the vehicle predictions may comprise a projection length, wherein the filtering is such that the or each set of vehicle predictions relate to the same projection length.

At least two of the vehicle predictions may relate to different projection lengths.

The aggregation component may be configured to determine the filtering criteria for the or each set at least in part according to filter selection parameters set by at the user at the user interface.

The prediction hierarchy may be predetermined or user-defined.

The or each aggregate value computed for the or each set may comprise a number of or resource value for repair operations or vehicle component faults per vehicle for that set, or an absolute number of or resource value for repair operations or vehicle component faults for that set.

The controller may be configured to use each of the filtered sets to render a respective element of a multi-element object displayed on the user interface.

The multi-element object may be: a node tree, a column chart, a dynamic grid, a map, a sunburst chart, or a time series.

Each of the vehicle predictions may comprise a vehicle production timing or time-in-service indicator, wherein each of the filtered sets relates to a different vehicle production timing or a different time-in-service.

Each of the vehicle predictions may comprise a vehicle production timing indicator and a time-in-service indicator.

The controller may be configured to display the aggregate predictions values as a time series in order of production timing or time-in-service.

The controller may be configured to control the user interface to display each of the prediction values as a node of a node tree, the node tree structured according to the prediction hierarchy.

The controller may be configured to control the user interface to display the nodes representing the prediction value and the second prediction value within the node tree as children of the node representing the third prediction value.

The controller may be configured to control the user interface to display each prediction value determined from the filtered sets as an element of a sunburst chart, the sunburst chart structured according to the prediction hierarchy.

The controller may be configured to control the user interface to display each of the prediction values determined from the filtered sets as a column of a column chart.

Each of the vehicle predictions may comprise a model and a model year indicator and each of the filtered sets relates to a different model year, The controller may be configured to display the or each prediction value determined from the filtered set(s) as an element of a grid.

The controller may be configured to control the user interface to display separate grids for each level of the prediction hierarchy.

The repair operation type indicator may indicate a category of repair operation or a specific repair operation.

Another aspect of the invention provides a computer system comprising: at least one record database configured to hold vehicle or vehicle repair records; a prediction database configured to hold vehicle predictions, each comprising: a prediction value derived from a respective set of vehicle or vehicle repair records from which the prediction has been derived, and, for each of those records, a corresponding database key for locating that record in the record database in which it is held; a controller configured to control a user interface to display, to a user: the prediction value of one of the vehicle predictions, or an aggregate prediction value derived from the prediction values of at least two of the vehicle predictions, wherein the controller is configured to locate at least one of the vehicle or vehicle identification records in the record database in which it is held, using the corresponding database key held in the prediction database, and display data of the located vehicle or vehicle repair record in association with the displayed prediction value.

The computer system may comprise: a vehicle record database configured to hold vehicle records; and a repair record database configured to hold vehicle repair records.

The controller may be configured to locate at least one vehicle record in the vehicle record database and at least one vehicle repair record in the repair record database, and display data of both of those records in association with the displayed prediction value.

The controller may be configured to locate the at least one vehicle record and the at least one vehicle repair record using respective corresponding database keys held in the prediction database.

The controller may be configured to locate the at least one vehicle record using the corresponding database key held in the prediction database, and locate the at least one vehicle repair record by matching an identifier in the vehicle record to an identifier in the vehicle repair record.

The controller may be configured to display the data of the vehicle or vehicle repair records in association with the displayed prediction value in that: the data is displayed simultaneously with the displayed prediction value, or the data is displayed in response to a user input received whilst the prediction value is being displayed.

The controller may comprise a filtering component configured to receive a set of filtering criteria, and determine a filtered set of the vehicle predictions meeting the received filtering criteria; wherein the controller may be configured to locate, in the records database, a corresponding set of the vehicle or vehicle repair records matching the same filtering criteria, using the database keys of the filtered set of vehicle predictions, and display data of the corresponding set of records in association with at least one individual or aggregate prediction value derived from the filtered set of vehicle predictions.

In any of the embodiments referred to in the above, a visual representation having visual elements may be rendered on a page of a user interface. Each of the visual elements may represent a respective set of filtered predictions (that is, a set of one or more predictions satisfying a particular set of filtering criteria. Each visual element can represent an aggregate predicted value or an individual predicted value). Each of the visual elements may be selectable, to allow a user to navigate to another page of the user interface corresponding to the set of filtered predictions represented by the selected element.

Another aspect of the invention provides a computer system for aggregating machine predictions comprising: a database configured to hold machine predictions, each comprising: at least one repair operation, machine component or machine attribute indicator, and an individual prediction value for the indicated repair operation, machine component or machine attribute; a filtering component configured to receive filtering criteria for filtering the machine predictions, and filter the machine predictions according to the filtering criteria, by comparing the repair operation, machine component or machine attribute indicators of the machine predictions in the database with the filtering criteria, to determine a filtered set of the machine predictions meeting the filtering criteria; and a controller configured to control a user interface to output, to a user, at least one prediction value determined from the filtered set.

Another aspect of the invention provides a computer system comprising: at least one record database configured to hold machine or machine repair records; a predication database configured to hold machine predictions, each comprising: a prediction value derived from a respective set of machine or machine repair records from which the prediction has been derived, and, for each of those records, a corresponding database key for locating that record in the record database in which it is held; a controller configured to control a user interface to display, to a user: the prediction value of one of the machine predictions, or an aggregate prediction value derived from the prediction values of at least two of the machine predications, wherein the controller is configured to locate at least one of the machine or machine identification records in the record database in which it is held, using the corresponding database key held in the prediction database, and display data of the located machine or machine repair record in association with the displayed prediction value.

Another aspect of the invention provides a non-transitory computer readable medium having computer readable instructions configured, when executed, to implement any method or functionality disclosed herein.

BRIEF DESCRIPTION OF FIGURES

For a better understanding of the present invention, and to show how embodiments of the same may be carried into effect, reference is made to the following figures in which:

FIGS. 4 to 45 shows a series of pages rendered as part of a user interface in an example use-case;

FIGS. 46 to 123 show examples of various visual representations that can be rendered as part of a user interface in order to represent vehicle predictions generated by the predictive analytics system;

DETAILED DESCRIPTION

Figure 1:
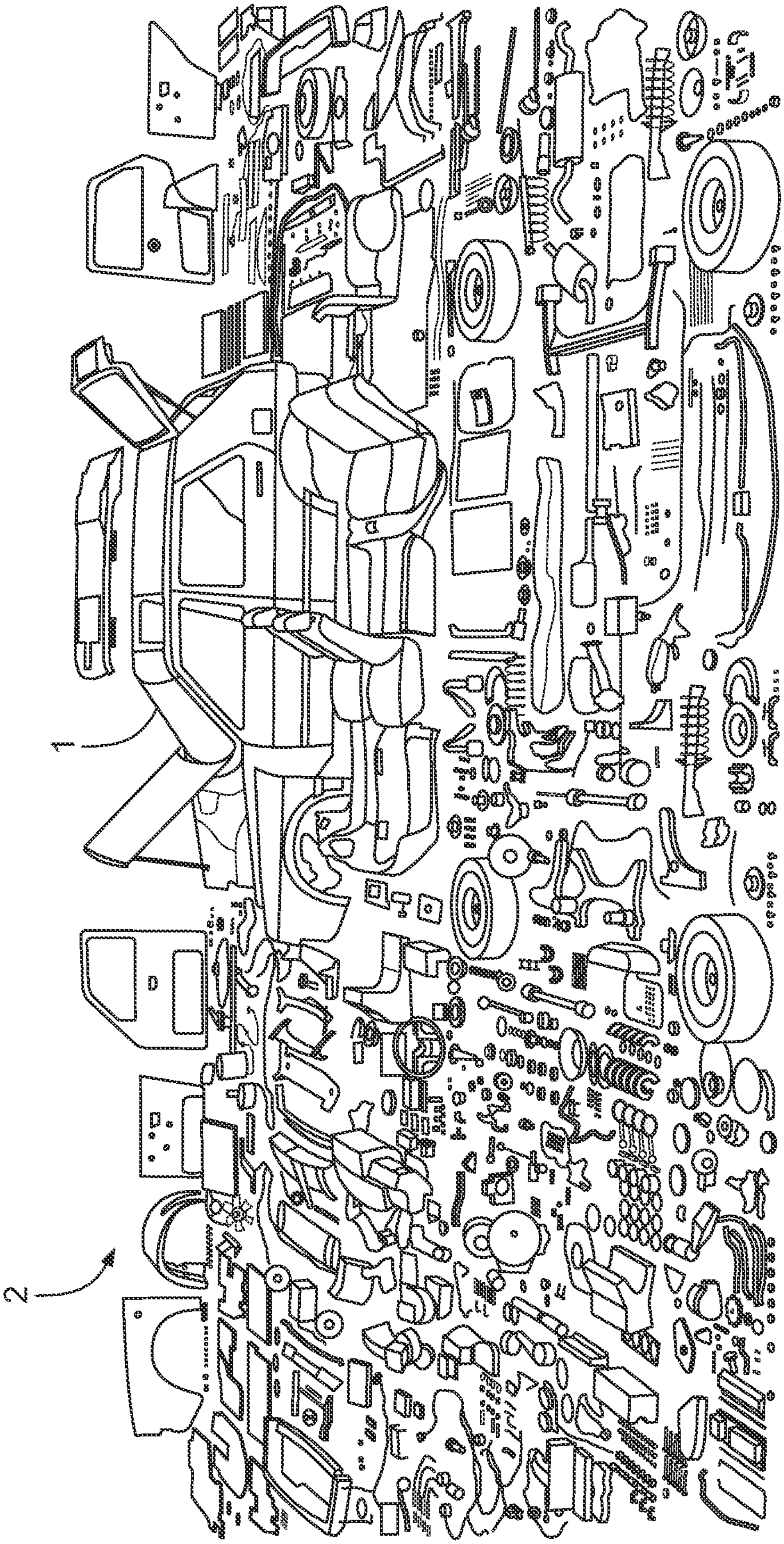
FIG. 1 shows an image of certain vehicle components laid out side-by-side.

Example embodiments of the invention will now be described by way of example only.

A predictive analytics system, referred to herein as "We Predict" and also "Indico", provides a predictive analytics service, which can make accurate predictions about the number of or resource value for repair operations (labour operations) or vehicle component failures/other faults (or both) for a population of vehicles, within a projection period having a certain duration (projection duration), such as the first 1 to 3 years of each vehicle's life. Note, the terms "prediction", "projection" and "forecast" are used interchangeably in the following description.

The predictive analytics service uses core data sets of vehicle records, which record vehicles entering active service, and vehicle repair records for all relevant products. This data is used to build predictive models which are applied at scale systematically to all products, models/carlines and labour operations currently under warranty to forecast future behaviour.

Four metrics used for forecasting are:

1. claim counts (D),
2. defects per unit (DPU), or "claims frequency"
3. resource value (C), and
4. resource value per unit (CPU).

The models and methods used by We Predict are unique in the industry and allow the user key insights into their data which ultimately allow much earlier issue detection and correct prioritisation of issues.

The core information generated is aggregated in several different ways that allow analysis by a chosen hierarch ("projection hierarchy"), such as:

1. Manufacturer or "OEM" (one or more)
2. Brand (Product Group)
3. Product (Business Unit),
4. Carline/Sales Model (Machine Type),
5. Engine Generation,
6. Labour Operation (Service Code), and
7. Part Code (Part Number).

The flexible nature of the system allows easy analysis within and across Products and Carlines to detect and better understand issues in common components used in several applications.

More granular breakdowns can also be provided, e.g. according to model year, production months and/or time-in-service. Examples are given later.

Information is presented to the user via a user interface (UI), in the form of dashboards that contain a series of interactive charts and objects that allow interrogation in a top down manner, or using search functionality investigation of a specific Product, Carline/Model, Labour Operation or Component.

Via the dashboards, an authorized user can navigate through different levels of the projection hierarchy.

Database keying is also used to link individual projections back to the vehicle repair records from which they have been derived, to allow the user to navigate from a particular projection to the individual vehicle repair records on which it is based. This, in combination with the projection hierarchy, is an extremely powerful tool, which allows the user to pin point issues very precisely, for example by navigating down through the hierarchy to increasingly specific projections, and from there to individual set of vehicle repair records relating to problematic vehicles or components. Tools are also provided to allow intuitive (retrospective) analysis of those records, once they have been located in this manner.

The UI thus permits both projection-based and retrospective analysis, and a key component of the user interface is the mechanism by which a user can navigate between the two.

The system can be hosted on dedicated servers and is delivered to authorised users via a web portal, for example.

A key innovation underpinning the described system is the use of vehicle repair records in combination with records of the vehicles entering active service for predictive analysis. By combining these data, powerful and accurate predictions can be made about future repair operations that will be required, or future vehicle component failures that will occur, for a population of vehicles provided by a particular manufacturer. This represents a novel use of this combination of data, and one which has been found to provide unprecedented levels of insight.

The system can operate on different levels and classes of "variant". A "variant" in this context refers to a vehicle attribute or set of vehicle attributes, wherein all vehicles having that/those attribute(s) are considered to be of that variant. That is, a variant is a type of vehicle defined by one or more vehicle attributes. A variant could for example be all vehicles of a particular brand, product, model (any model year), model and specific model year or years etc., or all vehicles with a particular model or class or engine or transmission system etc.

A distinction is drawn between a vehicle attribute and a vehicle component. A vehicle attribute corresponds to a large-scale (high-level) characteristic of a vehicle, such as the manufacturer, brand, product or model ID, or an entire subsystem such as the engine or transmission. By contrast, a vehicle component corresponds to a specific (low-level) component of a vehicle subsystem, such as a specific component (mechanical or software) of the engine, transmission, breaking system, suspension, chassis, carriage body, control system, on-board computer system or other vehicle subsystem.

Examples of vehicle components, and associated labour operations, are given later to further aid illustration.

Other examples of vehicle attribute include hydraulic systems and cabs for certain types of vehicle/machine.

A distinction is drawn between an "atomic" prediction, generated using the unique methodologies set out below, and an aggregate prediction, which is generated by aggregating atomic predictions.

Atomic predictions are generated at the level of an individual labour operation and/or vehicle component, for a particular class of variant or a limited number of variant classes. In the examples described later, up to three classes of variant are used as a basis for atomic predictions:

1. Carline (model)
2. Engine
3. Transmission

Accordingly, where all three variant classes are used, separate predictions are generated across a range of carlines, a range of engines, and a range of transmission systems. This admits some overlap, in that (for example) different engines may be found in a particular carline, and the same engine or transmission system may be used across multiple carlines.

Broadly speaking, these three classes of variant have been found to provide a sufficient basis for the atomic predictions. Depending on the implementation, the variants within each of these classes can be broadly defined (e.g. carline irrespective of model year) or narrowly defined (e.g. separate predictions for each unique combination of carline and model year; so separate projections for Carline A, 2017; Carline A 2016, Carline A, 2015; . . . Carline B 2017, Carline B 2017; Carline C, 2016 etc.). Variant classes, and the specificity of variants within those classes, can be chosen flexibly to suit a particular manufacturer's needs.

Via the UI, a user of the system has access to not only the atomic predictions, but also aggregate predictions generated by aggregating the atomic predictions according to the chosen hierarchy, which is designed to find issues intuitively from an engineering perspective. The UI allows the user to navigate down through the hierarchy quickly and efficiently. There is a degree of flexibility in how the hierarchy is selected, and it can be tailored somewhat to suit the needs of different manufacturers. However, there are certain guiding principles that are followed when choosing the hierarchy to ensure that the UI remains intuitive from an engineer's perspective.

This is described later, but for now suffice it to say that an engineer can (for example) start at the top of the hierarchy, very quickly identify an area where there may be an issue, and very quickly drill down through the hierarchy to pinpoint the issue, via increasingly-specific predictions. This could for example be an issue with one component, causing it to fail or need repair sooner than it should, in one carline for a particular model year, out of hundreds of carlines, each with 10,000+ components.

Because the system is based on predictions, specific issues can be identified much earlier than would be possible from a purely retrospective analysis. This makes it possible to locate specific issues in a vast population of vehicles that it would be difficult to identify using existing analytical techniques particularly with a measure of significance attached.

Once such an issue has been identified, the engineer is in a position to re-engineer the component or carline (say), to prevent the issue from occurring future vehicles, or adapt the manufacturing or assembly process, or even recall vehicles for repair/replacement if the issue is severe.

As noted, predictions can also be linked to the underlying records, to make them easily accessible to the engineer as part of his or her analysis.

The We Predict system has a data processing stage, in the form of one or more processing units (such as CPUs). The data processing stage executes data processing code, which implements the described functionality of the system. For example, a distributed computing environment may be provided by a set of interconnected and co-operating servers, which can perform parallel data processing operations to efficiently carry out the functions disclosed herein.

To aid illustration, FIG. 1 shows a highly-schematic overview of the We Predict system. Conceptually, the system can be divided into functional layers shown in FIG. 1, where each layer represents part of the system's functionality. All of this functionality is described in detail later, but first a brief overview is provided.

Each of the layers constitutes a functional component of the system, which can be implemented as code executed at the data processing stage.

In the following examples, the vehicle records and vehicle repair records are in the form of vehicle sales and warranty claim records respectively. However, the description applies equally to other forms of vehicle and vehicle repair records which record, respectively, the vehicles entering active service on repairs that are performed on those vehicles.

The system operates on a periodic update cycle, with updates typically being received from customers on a monthly basis. Each update provides new customer data 2N, comprising new sales records 4N and new warranty claim records 6N since the last update. A pre-processing layer 12 processes the sales and warranty claim records 4N, 6N into a form suitable for use at a prediction layer 14. This involves combining the new sales and warranty claim records 104N, 104N with any existing sales and warranty claim records held for the customer, in a sales database 4D and warranty claim database 6D respectively, removing duplicates where necessary. The new warranty claims records 6N are also augmented with data from matching sales records—either the new sales records 4N or the existing sales records held in the sales database 4D—and the augmented warranty claim records are stored in the warranty claim database 6D. Unique vehicle identifiers (IDs), in the form of vehicle identification numbers (VINs), are provided in the sales and warranty records to allow corresponding warranty claim records and sales records to be matched. Sales records held in the database 4D are labelled 4, and can be a mixture of new and old sales records; likewise warranty claim records 6D, held in the database 6D, are augmented warranty claims records, and can be a mixture of new and old warranty claim records.

The prediction layer 14 has access to the sales and warranty claim databases 4D, 6D, and uses those records to generate atomic predictions according to a methodology that is described later. As described above, atomic predictions are generated for three variant classes—carline, engine and transmission—at blocks 14*a*, 14*b* and 14*c* of the prediction layer 14 respectively. The atomic predictions 20—labelled 20*a*, 20*b* and 20*c* for carline, engine and transmission respectively—are stored in an atomic prediction database 14D.

A filtering layer 15 has access to the atomic predictions database 14D, and filters the atomic predictions 20 stored therein according to various sets of filtering criteria. Each set of filtering criteria is in the form of one or more filtering parameters, and the system is constructed to handle both pre-defined filtering criteria 21P, that are stored electronically in the system and can be seen as a form of system parameter, and also user-defined filtering criteria 21U, which can be set dynamical ("on-the-fly") by a user via the UI, for example by selecting from on-screen filtering options, as described later.

In response to a received set of filtering criteria, the filtering layer 15 searches the atomic predictions database 20 for any of the atomic predictions 20 that meet the filtering criteria (i.e. match the one or more filtering parameters).

Assuming one or more of the atomic predictions 20 does meet the set of filtering criteria in question, the result is a determined set of the one or more of the atomic predictions 20 that meet those filtering criteria (filtered set). Depending on the context, the set of filtering criteria can be entirely pre-defined, entirely user-defined, or a combination of both (e.g. a user may use a pre-defined set of filtering criteria which s/he refines as desired). The ability to filter the atomic predictions flexibly is a key component of the system. It allows on-screen objects to be populated and refreshed dynamically as the user navigates through the UI and modifies the applied settings. With pre-defined filters, the filtering can be performed dynamically, or in advance with the results of the filtering being stored for later use.

For the avoidance of doubt, it is noted that the term "filtered set of vehicle predictions" determined according to (a set of) filtering criteria can cover a single vehicle prediction only, in the event that only a single vehicle prediction matches the filtering criteria. Thus where, for example, this disclosure refers to a filtered set of vehicle predictions (or similar) that can be any number of predictions matching the filtering criteria in question.

An aggregation layer 16 operates to aggregate sets of multiple atomic predictions 20, according to a clearly defined projection hierarchy. In particular, a function of the aggregation layer 16 is to aggregate filtered sets containing multiple atomic predictions. This can be a dynamic process, in which the aggregations are generated dynamically "on-the-fly" in response to UI input, or it may be more practicable to generate at least some of the aggregations in advance, for example on each update cycle. For example, aggregations may be performed for pre-defined filters in advance. Generally, either approach, or a combination of both approaches, may be used depending on the context. The aggregate predictions are labelled 22, and can be pre-stored in a database or generated dynamically in electronic storage as appropriate.

A user interface layer 18 has access to both the atomic predictions 20 and the aggregate predictions 22, and controls a display device to render a user interface, via which a user can navigate the predictions, moving up and down thorough the hierarchy as desired. The user interface can for example be in the form of a Web interface, where the user interface layer 18 provides instructions to a user device for rendering the UI, or the UI layer 16 can be part of an application executed on the user device that has access to the underlying prediction data 20, 22. The atomic and aggregate projections 20, 22 to be outputted are selected based on navigation inputs 24 received from the user via the UI, and also any user-defined filtering criteria 121U set by the user at the UI. The filtering and (where applicable) aggregation, by the filtering and aggregation layers 15, 16 respectively, is used as a basis for rendering the UI, and in particular for populating the UI with appropriate predictions in response to the user's navigation inputs 24 and user-defined filtering parameter(s) 21U.

Figure 2A:
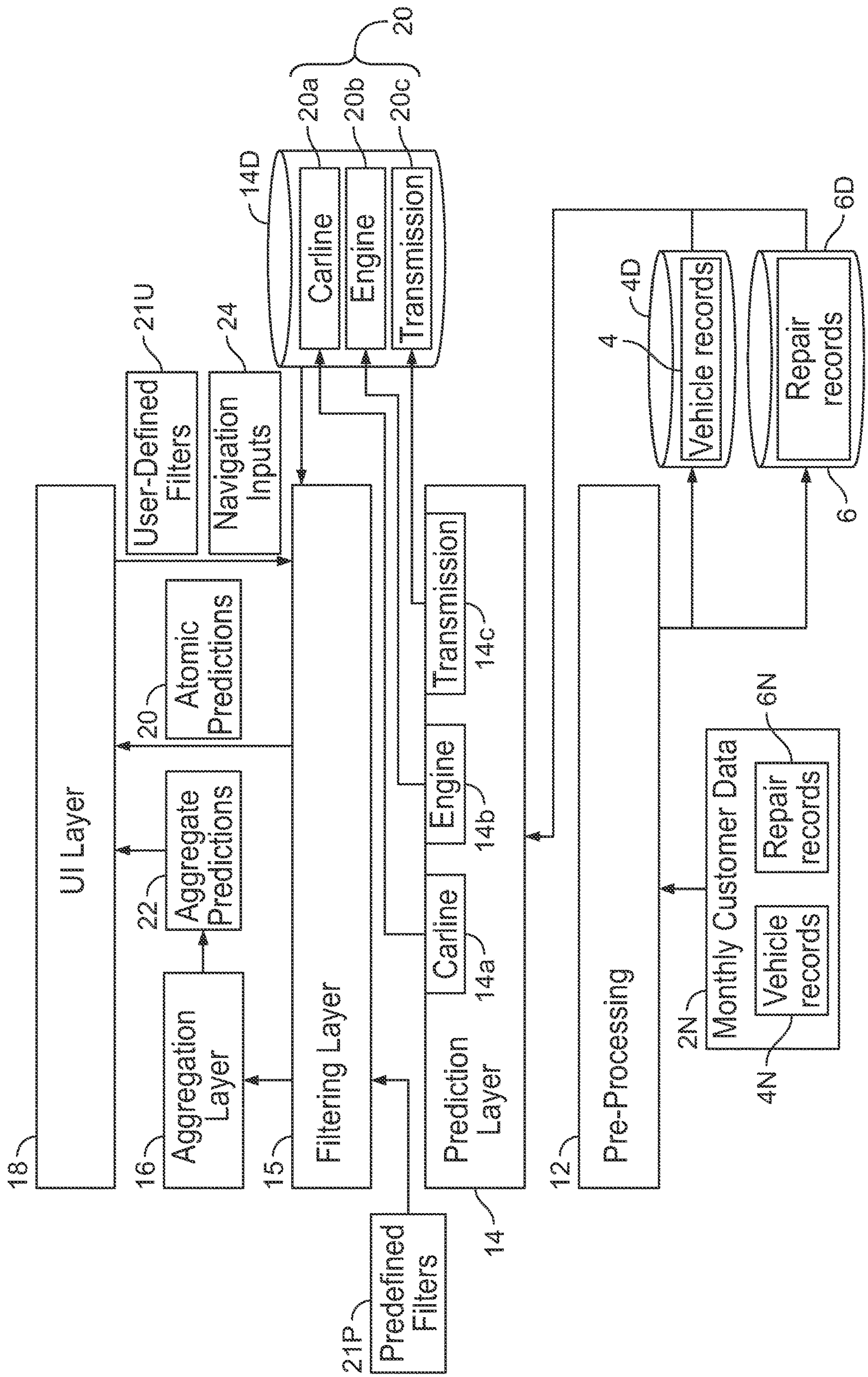
FIG. 2A shows a schematic block diagram of a predictive analytics system.
Figure 2B:
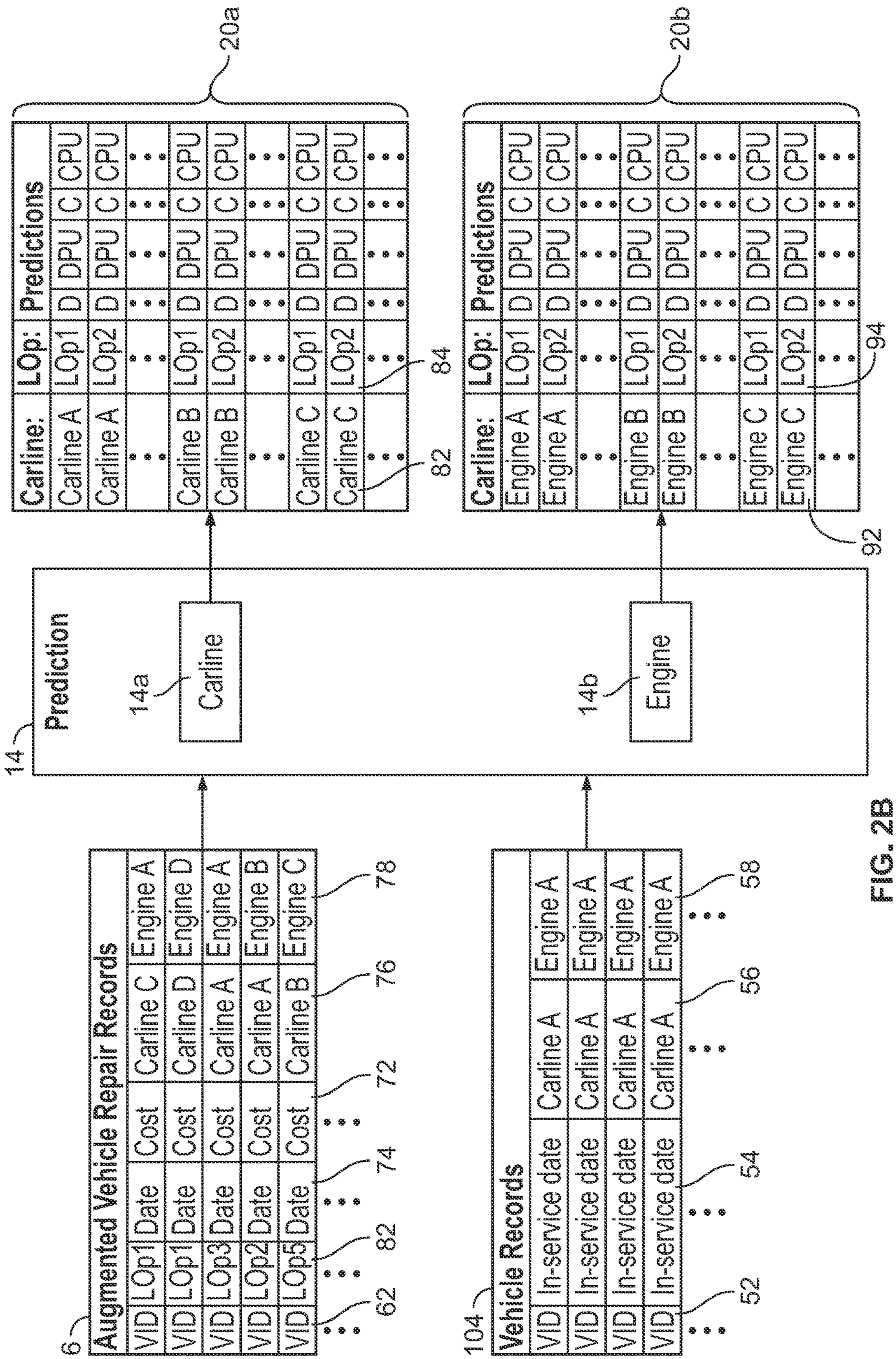
FIG. 2B shows an example of vehicle predictions generated by the predictive analytics system.
Figure 2C:
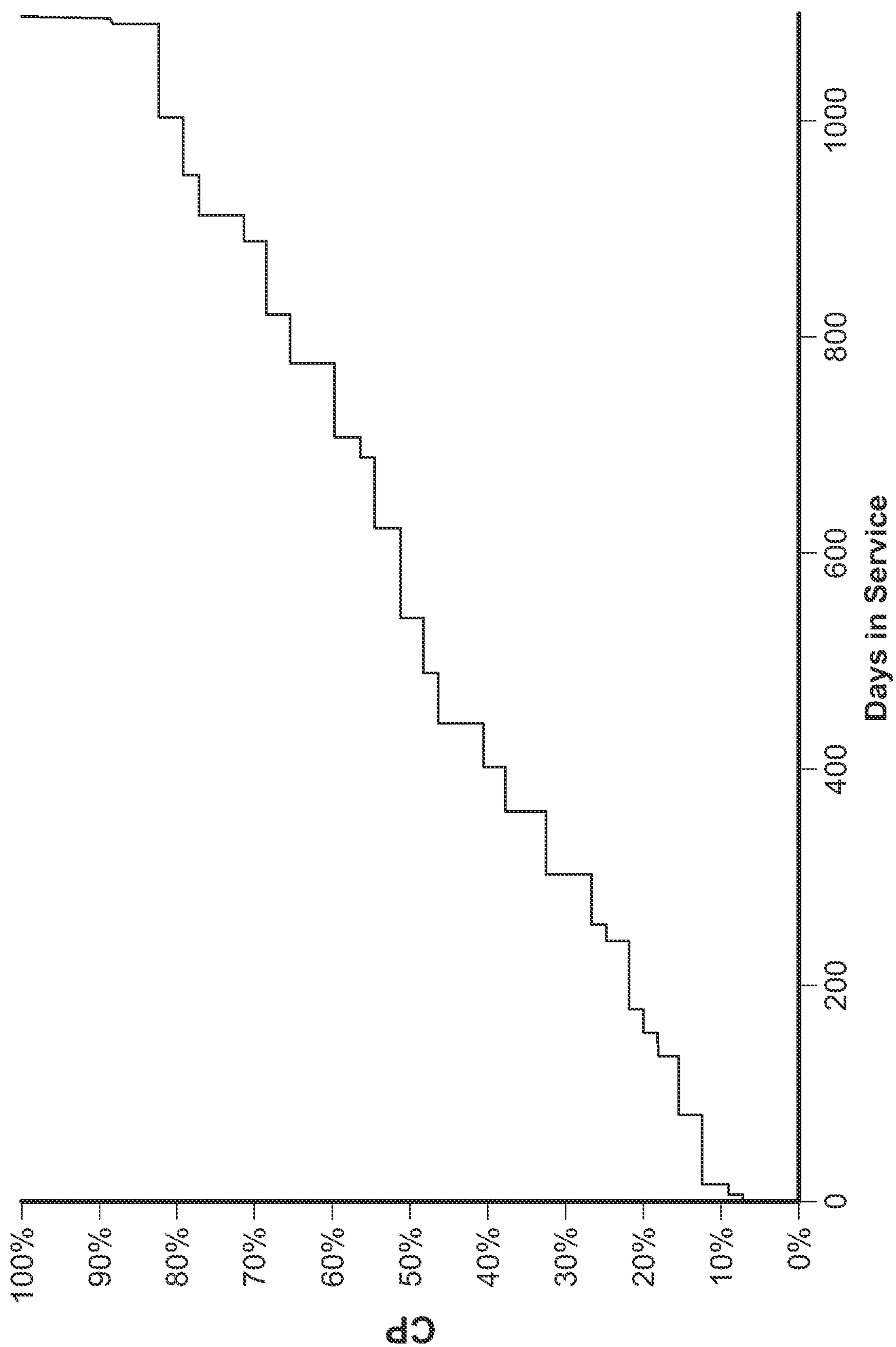
FIG. 2C shows an example of a profile generated by the predictive analytics system.

FIG. 2 shows certain structure of the sales and warranty claim records 4, 6, and the atomic predictions 20*a* and 20*b* generated for the carline and engine variant classes. The transmission class is omitted from FIG. 2 for simplicity, but it will be appreciated that the description applies equally to the transmission variant class, and indeed to other forms of variant class.

Each atomic prediction relates to a particular variant of the variant class in question (e.g. a particular carline model or particular carline model and model year, a particular engine type or class etc.), and is at the level of an individual labour operation or an individual vehicle component. In the following examples, each atomic prediction relates to a particular variant and a particular labour operation, and comprises four metrics:

1. Total predicted number of labour operations of that type for that variant, referred to as "defects" (D); this can be calculated or estimated as a total count of warranty claims;
2. Total number of labour operations of that type (defects) per unit (vehicle) for that variant (DPU)
3. Total predicted resource value for (i.e. cost of) that type of labour operation for that variant (C); and
4. Total predicted resource value for (i.e. cost of) that type of labour operation per unit for that variant (CPU).

The terms "resource value" and "cost" are synonymous herein. Cost is useful metric in this context as it is a reasonably reliable indicator as to the severity of the problem in question.

Each of these is calculated over the projection period in question, such as the first 1-3 years of each vehicle's life. Different sets of predictions can also be computed for different projection period durations. Each metric can provide labour operations already performed as well as predicted labour operations (i.e. a total cost/count of labour operations that have been performed and labour operations that are expected), or only predicted labour operations, or separate values can be provided for each, giving up to eight metrics in total.

Although the examples are described for labour operations, the description applies equally to vehicle components in place of labour operations. A warranty claim record may relate to one labour operation, but multiple vehicle components that are subject to the labour operation. This can be handled by "splitting" the warranty claim record, as described later.

FIG. 2 illustrates further details of the operation of the prediction layer. In particular, FIG. 2 shows a highly schematic example of atomic predictions generated at the carline and engine blocks 14*a*, 14*b* respectively.

The sales records 4 and augmented claims records 6 are received at the prediction layer 14. Each sales records 4 constitutes a record of a vehicle entering active service (that is, when the owner starts using it and the manufacturer becomes responsible for repairs under the warranty), and records details of the vehicle in question. In this example, each of the sales records 4 is shown to comprise:

a vehicle identification number (VIN) 52 an in-service date 54, a carline indicator 56, and an engine indicator 58.

Each of the augmented warranty claim records 6 typically constitutes a record of a repair performed on a vehicle after it has entered active service, generally to identify and repair or replace a faulty component (although a small percentage of the warranty claim records may relate to operations where no repair was actually performed). Each claim record 6 is shown to comprise:

a vehicle identification number (VIN) 62, to allow it to be matched to the corresponding sales record, an indicator of a type of labour operation 80, a date 74 relating to the warranty claim in question, which can be the date on which the labour operation was performed, the date the record was created, or the date on which the claim was processed (for example), a carline indicator 76, an engine indicator 78, and a cost value 72, denoting the cost incurred as a result of the warranty claim.

One of the problems with forecasting vehicle component failures or repairs is the availability of data to use as a basis for the forecasting. One of the key realizations underpinning the described techniques is that, within a predetermined window of a vehicle's "lifetime" (the warranty period), comprehensive data about component faults/failures within that widow is available to the manufacturer ("lifetime" in this context commences when the vehicle enters active service (the in-service date)). This is because, during that time window, whilst the vehicle is still under warranty, it is the manufacturer who bears the responsibility for such failures/repairs. To ensure a reliable data set to use as a basis for forecasting, all that is needed is to ensure that the claim records sent back to the manufacturer when vehicles repairs are performed under warranty contain sufficient information about the work that has been performed on the vehicle, that the original sales records contain sufficient information about the vehicle itself, and that each claim record can be matched to the corresponding sales record for the vehicle in question. This allows accurate predictions to be made over the duration of a projection window (the projection duration), which is typically the first 1-3 years or so of a vehicles life. Repair work could also be curtailed due to a usage threshold. The projection window can be chosen to correspond to the full window in which the manufacturer is responsible for, and therefore has comprehensive data about, repairs, or it could be a shorter window.

Note, although warranty claims are used as an example herein, the technology is not limited to this. Other applications include extended warranty periods and "good will" repairs that manufacturers' may provide in certain circumstances. In general, what is material is that there exits, for whatever reason, a window of life in which comprehensive repair data is more-or-less guaranteed to be communicated to the vehicle manufacture, to allow comprehensive forecasting, which in turn can be used to make engineering decisions about later vehicles/machines.

In this example, the VINs 52, 62 in the sales and warranty records respectively can be used, where necessary, to augment the claims records with data of the sales records, such as the carline and engine data 76, 78 of the augmented warranty claim records 6.

The output of the carline prediction block 14*a* is the atomic carline predictions 20*a*. In this example, an atomic carline prediction is generate for every possible combination of carline and labour operation. Each of the atomic carline predictions 20*a* is shown to comprise an indicator of the carline 82 and an indicator of the labour operation type 84 to which it relates, as well as individual predicted values for that carline-labour operation combination. As indicated above, each individual prediction corresponds to a predicted count or cost—absolute or per vehicle—of that type of labour operation (D, DPU, C, CPU). This can be an overall predicted value, i.e. which includes not only the anticipated future count/cost but also the historical count/cost already recorded, or a future predicted value only, i.e. which only includes the anticipated future count/cost. Corresponding historical metrics can also be provided for each prediction 120*a*, i.e. the historical count/cost—absolute or per vehicle—recorded for that labour operation-carline combination only.

The output of the engine prediction block 14*b* is the atomic engine predictions. In this example, an atomic engine prediction 20*b* is generated for every possible combination of engine and labour operation indicated by engine and labour operation indicators 92, 94 respectively. Predicted values, and optionally corresponding historical values, are provided in the same way as the atomic vehicle predictions 20*a*, however in each engine prediction 20*b* those values correspond to the cost/count for the particular engine and labour operation combination in question.

Although not shown in FIG. 2, atomic predictions can also be generated for every possible labour operation and transmission combination in the same way, or indeed for any desired combination of labour operations, vehicle components and vehicle attributes.

It is also possible to generate more granular atomic predictions, such as predictions for specific model years (i.e. separate predictions for each year of a particular model, for each possible labour operation), or predictions for carline-engine combinations (i.e. a separate prediction for every possible combination of carline, engine and labour operations, where the values correspond in that case to a count/cost of that type of labour operation for that engine and that carline), and so on. An appropriate level of granularity can be chosen depending on the context.

It is also possible to generate less granular atomic predictions, such as predictions for a given model or model-plus-model-year over all labour operations. In this case, each prediction omits the labour operation indicator, as it applies to all labour operations for the model in question.

In the examples described later, predictions are generated at multiple levels of granularity. In particular:

atomic predictions across all labour operations for individual models are generated, for use in an "overview" mode (overview predictions), and atomic predictions for individual models and labour operations are generated for use in a "detailed" mode (detailed predictions).

Each prediction can be generated from a prediction model (profile) that is determined at the appropriate level of granularity, from a relevant set of warranty claim records. So in the examples below, separate profiles are determined for each vehicle model across all labour operations, and also for each individual labour operation. More generally, for a UI with one or more levels of granularity (such as detailed and overview), separate profiles are generated at the or each corresponding level of granularity. This is preferable, as it ensures the models at each level of granularity make full use of the available repair data.

The Indico system uses a systematic, non-parametric approach to make its predictions, which is described later.

Systematic analysis and forecasting of claims rates and costs can be provided on a regional, country and climatic basis with even the weather on the date of the claim considered.

Section 1—Overview

User Interface—Overview

For a complex UI, numerous sets of filtering criteria may be applied at different times, in order to:

locate and, where appropriate, aggregate a set of atomic predictions to be used to populate a particular page of the UI;

locate and, where appropriate, aggregate subsets of the predictions for a particular page, in order to populate on-screen objects on the page.

In rendering the UI, various prediction hierarchy are used at different level of the UI, which broadly fall into two categories:

inter-page hierarchies, according to which different pages are generated, to allow intuitive navigation between pages;

intra-page hierarchies, used to generate hierarchical objects on a particular page, such as node trees, tree maps and sunburst charts. There can be multiple intra-page hierarchies for a given page, corresponding to different objects on the page.

An object in this content refers to an on-screen representation of a set or sets of filtered predictions. That is, a chart, table or other visual representation of data with a set of constraints, according to which the object is populated. Objects can be populated dynamically as the user navigates the user interface, based on filtering and, where applicable, aggregation of the predictions. This can be dynamic (on-the-fly) filtering/aggregation, or the filtering/aggregation can be performed in advance where appropriate, as noted elsewhere.

In the described system, inter-page hierarchies are predetermined. The predetermined hierarchies may take into account the needs of a particular manufacturer.

Some predetermined intra-page hierarchies may be provided, however generally the user has more control over these, either to define his/her own hierarchies, or modify predetermined "default" or "template" hierarchies. For on-screen objects with user-configurable hierarchies, the objects can be refreshed dynamically as the user modifies the hierarchy. This can for example be achieved by re-filtering, where applicable, aggregating the atomic predictions according to the users specified hierarchy, and re-populating the on-screen objects with the results. The result can be ordered according to predefined or user-specified ordering criteria. It is expected that in the majority of cases it may be desirable to order the results according to the predicted values, e.g. to put the highest projected costs/counts (absolute or per vehicle) first, to show intuitively where problems are forecasted.

Inter-Page Hierarchies

As described later, inter-page hierarchies can operate in two modes: detailed and overview. In both modes, page-level vehicle hierarchies, based on vehicle attributes, are used as a basis for the rendering pages and navigating between pages. There can be one or multiple inter-page hierarchies, such as one or more of: a vehicle-based hierarchy, an engine-based hierarchy, and a transmission-based hierarchy.

An intuitive vehicle-based inter-page hierarchy can for example be defined as follows:

manufacturer
brand
product
model/carline

A separate page of the hierarchy being made available for each entity at each level of the vehicle hierarchy—so typically one (but potentially multiple) manufacturer page(s), then a page for every brand of vehicle (multiple brand pages per manufacturer typically), a page for every vehicle product (multiple vehicle product pages per brand typically), and a page for every model of vehicle (multiple model pages per product typically).

An intuitive engine inter-page can be defined as:

Engine;
Engine-product;
Engine-model.

So one page for every engine (whatever model of vehicle it is used in), one page for each possible combination of vehicle product and engine, and one page for each possible vehicle model-engine combination.

Similar, a transmission hierarchy can be defined in the same way, with transmission in place of engine: An intuitive transmission inter-page can be defined as:

Transmission;
Transmission-product;
Transmission-model.

Engine-brand or transmission-brand levels may also be provided if desired.

In the detailed mode, a particular labour operation is selected, and only predictions for that labour operation are shown on each page.

A user can also specify on-page filtering options. e.g. to focus on a specific selection of brands, products, models, engines etc. The inter-page hierarchy is applied in the same way, but is limited to predictions 120 that meet the user's selection criteria.

In both detailed mode, atomic predictions at the appropriate granularity (overview atomic predictions or detailed atomic predictions) are used to provide atomic results at the lowest level the hierarchy, and to populate on-screen objects. Those atomic predictions are aggregated to provide results and populate on-screen objects further up the hierarchy, for individual labour operations in the detailed mode and across all labour operations in the overview mode.

Intra-Page Hierarchies

Node Trees

A node tree or tree map is a tree diagram, whose visual structure is set to match a prediction hierarchy according to which it is generated. Each node of the node tree corresponds to a particular set of filtering criteria, according to which the predictions 120 are filtered to populate that node. Each level of the node tree corresponds to a level of the prediction hierarchy according to which it is generated.

A node tree can be generated according to a prediction hierarchy that matches one of the inter-page hierarchies, to provide a means of navigating between pages at different levels. So, for example, a node tree generated according to the vehicle-based hierarchy given above would have:

a root node representing a particular manufacturer;
child nodes of the root node representing different brands;
children of each brand node representing different products within that brand;
children of product node representing models of that product.

The nodes corresponding to an inter-page hierarchy can be selectable to navigate to the corresponding page. (The same applies for the engine and transmission hierarchies).

The hierarchy can also be extended, to provide additional granularity below vehicle model within the node tree (for example), and/or other forms of on-page object, such as those described below, can be provided to give additional granularity. Alternatively, separate node trees can be provided on a page: one which matches the (fixed) inter-page hierarchy for the page in question, and the other according to a user-configurable hierarchy. For example, for the second node tree the user may be able to switch between the following two hierarchies at least:

model,
model-engine,
model-engine-transmission;
and:
model,
model-transmission, model-transmission-engine.

Dynamic Grids

A dynamic grid (Pareto grid) is configurable grid representing a set of atomic predictions 20 or aggregate predictions 22. The ordering of the grid can be set by the user, and the option of ordering on the predicted values is provided. Pareto grids are configurable, and afford significant flexibility.

In the examples described later, one option is to provide a breakdown of the projections for the current page according to labour operation. That is, for whichever entity the current page relates to (manufacturer, brand, product, model, engine, engine-product etc.), a Pareto grid can provide at least one prediction value for each possible labour operation for that entity. Depending on where the current page sits in the inter-page hierarchy, the prediction values provided in the Pareto grid for individual labour operations can be aggregate predictions (e.g. for each labour operation, aggregating all of the individual prediction values D/DPU/C/CPU120 of the predictions 120 of figure B relating to a particular manufacturer, brand or product) or the individual prediction values D/DPU/C/CPU that have been generated for particular models or engines. The Pareto grid for a given page is generated by filtering the predictions 120 according to whatever criteria are used to populate the grid, and aggregating the filtered predictions where appropriate, for example to match the level of the inter-page hierarchy at which the given page lies.

Column Charts

Another use case of filtering/aggregation is to provide column charts, where each column of the chart again corresponds to a filtered and possibly aggregated set of predictions. In the example described later, column charts are used as a basis for comparing predictions for different model years. A set of columns is displayed, each of which corresponds to the same model but a different model year. The columns are generated by filtering the predictions 20 according to model year (note: although not shown in the example of FIG. 2B, as noted above, prediction can be generated for each unique model and model year combination to allow this level of granularity).

Also note: model year break-down is not restricted to the model level of the hierarchy. For example, results aggregated to brand, product or even manufacturer can be broken down by model year, using suitable filtering and aggregation of the predictions 120, as described later.

Time Series—Production Month, Time in Service (TIS)

Somewhat similar to column charts, another breakdown that can be provided at any level of the inter-page hierarchy is a time series according to production month and time in service.

Database Keying

As indicated, predictions 20 in the predictions database 14D comprise respective database keys, for locating the corresponding sales and warranty records 104, 106 in databases 4D and 6D respectively. This allows the UI to be rendered such that a user can switch easily between a projection or set of projections (atomic and aggregated) and the corresponding records. Any filters, such as page-specific or user-defined filters, applied to the predictions 20 are also applied to the corresponding records 4, 6.

Section 2: Generating Predictions

This section details methods performed by Indico to produce vehicle warranty frequency and cost forecasts at a component, category and carline level. That is, the process by which atomic predictions 120 are computed at the prediction layer 14 of the system.

Data

This section describes data elements for producing the projected results. The two key sources of data are vehicle sales data 14, which documents the production and sale of every vehicle in the population, and warranty claims data 6, which provides detailed information on all the warranty claims associated with the population of vehicles.

The following sections describe elements of the data processing at the pre-processing layer 12 before describing how the data is used to build forecasts.

Vehicle Sales

Vehicle sales data is used because it provides a record of vehicles entering active service and details of each vehicle, however other forms of vehicle record capturing this information can be used.

Information about vehicles is usually captured in one table, and often contains many more fields of information than those given in the table below, such as vehicle trim detail and Issuing Dealer, however this information is not critical to creating projections.

Some fields of information, such as warranty coverage length, are sometimes supplied in separate datasets. In this case, they simply need to be linked by the appropriate columns, such as the VIN, or a combination of Carline and Model Year.

If vehicle Model Year is not provided in the vehicle sales dataset, it may be derived from the $10^{th}$ character of the VIN. A Model Year Code Dictionary is required if this method is to be used.

| Field | Field Description |
|---|---|
| VIN | Vehicle Identification Number (key field). |
| Carline | Vehicle Model Description (e.g. C Class). |
| Model Year | Model Year of Vehicle. |
| Production Date | Date the vehicle was built. |
| In Service Date | Date the vehicle was sold to the customer and warranty commenced. |
| Warranty Coverage Length | Length of warranty coverage for the vehicle. This could be in time or mileage, or both. |

Warranty Claims

Warranty claims data is used because it is a comprehensive source of vehicle repairs data within the initial period of a vehicle's life that is collated at a central point, i.e. the manufacturer. However, the description applies equally to other forms of vehicle repair records.

Warranty Claims data contains information about repairs made on vehicles covered under warranty. The amount of data captured in this dataset will vary by manufacturer, but key fields given in the table below are always present. This dataset is linked to the Vehicle Sales dataset via the VIN. Note that it is likely that some vehicles will not have any warranty claims, however all warranty claims records should have an associated vehicle record in the Vehicle Sales dataset.

Other information often captured in warranty claims data includes: data on the dealership that performed the repair, the type of warranty that the repair is covered under, other associated dates (such as failure date or claim submission date), other payment fields, and any relevant description (descriptive) fields.

Descriptions for Labour Operations, Categories and Part Numbers provide context, and are often supplied in separate dictionary datasets to make these large datasets more efficient to interrogate.

| Field | Field Description |
|---|---|
| VIN | Vehicle Identification Number (key field). |
| Claim Number | A unique ID number for the claim. |
| Labour Operation | A code for the type of repair performed on the vehicle. |
| Category | A code of the area of the vehicle that the repair was performed. |
| Part Number | The causal part number in the claim. |
| Report Date | Initial process date of the claim. |
| Payment Date | Date the claim was paid by the OEM to the dealer. |
| Odometer | Vehicle Odometer reading at the breakdown date. |
| Labour Total | Cost of labour charged on the claim. |
| Part Total | Cost of parts charged on the claim. |
| Claim Total | The gross repair cost. |

Data Cleansing

The following section outlines steps which are taken to prepare the raw datasets for analysis.

Vehicle Expiry Date

A Vehicle Expiry Date generally is derived and added to the Vehicle Sales dataset, unless it is already included in the raw dataset. The Vehicle Expiry Date is simply the date at which the vehicle expires its period of interest in the analysis. i.e. it is no longer considered in analysis (after this date). The period of interest is usually the same length as the warranty coverage, but it is more important to consider it in terms of the required forecasting period, rather than simply the warranty coverage. For example, if a vehicle with three year warranty is sold on Jan. 1, 2015, then its expiry date would normally be Jan. 1, 2018, since a three year forecast is generally of most interest. However, if we are only concerned with making a forecast on the first 12 months in service, even though it has a three year warranty, then the vehicle's expiry date would be Jan. 1, 2016. The period of interest is generally fixed across a manufacturer, or at least at a Carline—Model Year level.

Duplicates

Vehicle Sales and Warranty Claims datasets provided are generally updated at regular periods in time, such as every week or every month. Duplicates are common, for instance, payments may be updated as a claim is processed and settled. It is usually best practice to replace any such duplicates with the latest version of the record, on the assumption that the latest version will contain the most up-to-date information.

Vehicle Age at Claim

The age of a vehicle at the time the warranty claim is performed or processed is a piece of information which is calculated if it does not already exist. It is derived by linking the warranty claims dataset with the vehicle sales dataset via the VIN and calculating the number of days between the Report Date (or Payment Date) and the vehicle In Service Date. If the age at claim is negative, i.e. the repair occurred before the vehicle went into service, then the age at claim is instead set to 0.

The choice of using Report Date or Payment Date from the warranty claims dataset to calculate age at claim depends on whether forecasts are required from a frequency or cost perspective. Payments can take time to process, which would have an impact on when a manufacturer is exposed to these costs.

This is appropriate for a time-based analysis, however usage (mileage or hourage) can be used in place of vehicle age for a usage-based analysis. Accordingly, all description pertaining to vehicle age applies equally to current usage in that context.

Warranty Claims Data Treatment

Treatment of the Warranty Claims Data varies by manufacturer depending on their methods for recording warranty claims and how they wish projection results to be presented.

Examples of warranty claims treatment for two different manufacturers are given below.

1. Manufacturer A wishes to view forecasts at a part number level, therefore the parts associated with a claim are considered as separate claims and the total claim costs are allocated proportionally across the parts.
2. Manufacturer B wishes to view forecasts at a labour operation level, and since each related labour operation and costs are split out across separate rows for each claim, no further manipulation of the warranty claims data is required.

Methods

This section details the steps required to create frequency and cost projections at the carline, category or labour operation level. Profiles of claims patterns are generated using historic warranty claims data and used to form the basis for projections when combined with the current vehicle population and claims counts or costs.

Data Date

The Data Date is the first piece of information to be derived. It is defined as the most recent date of any claim in the warranty claims dataset, and can be considered as the date at which the projections, and any analysis, are valid. It is used to determine which warranty claims are eligible to be used to build profiles, and also to calculate the current age of all vehicles in the population.

Profiling

Profiles are the basis for all projections at the prediction layer 14. They are used to reflect the consistent patterns seen in warranty data for specific types of repair. For example, some components will fail throughout the warranty period at a fairly constant rate, whilst other components may fail at an increased rate towards the end of warranty. Each type of repair has it's own characteristics which mean unique profiles are required. To demonstrate how profiles are created, an illustrative example follows which considers a Labour Operation 'E0123' on a Carline 'Compact A'. The prediction layer 14 uses this method to create profiles for every required combination of carline, category and labour operation.

The first step is to identify all warranty claims which can be used to form the profile. Only claims which have occurred on vehicles which have passed their expiry date are considered for analysis. This is to ensure the profile is not unfairly weighted towards warranty claims occurring at low times in service. The following table gives the age at claim and amount paid for 30 claims which meet this criteria for the Labour Operation E0123.

| Claim ID | Age at Claim | Claim Total |
|---|---|---|
| 1 | 0 | $79.00 |
| 2 | 0 | $79.00 |
| 3 | 1 | $141.00 |
| 4 | 5 | $79.00 |
| 5 | 15 | $141.00 |
| 6 | 79 | $121.00 |
| 7 | 134 | $121.00 |
| 8 | 155 | $79.00 |
| 9 | 176 | $79.00 |
| 10 | 240 | $121.00 |
| 11 | 255 | $79.00 |

-continued

| Claim ID | Age at Claim | Claim Total |
|---|---|---|
| 12 | 302 | $247.00 |
| 13 | 361 | $79.00 |
| 14 | 361 | $141.00 |
| 15 | 402 | $121.00 |
| 16 | 444 | $247.00 |
| 17 | 489 | $79.00 |
| 18 | 540 | $121.00 |
| 19 | 623 | $141.00 |
| 20 | 689 | $79.00 |
| 21 | 707 | $141.00 |
| 22 | 776 | $247.00 |
| 23 | 821 | $121.00 |
| 24 | 888 | $121.00 |
| 25 | 912 | $247.00 |
| 26 | 950 | $79.00 |
| 27 | 1003 | $141.00 |
| 28 | 1090 | $247.00 |
| 29 | 1094 | $251.00 |
| 30 | 1095 | $247.00 |

Claims are then grouped by Carline, Labour Operation and Age at Claim, and the count and sum of the Claim Total is taken for each grouping. This is shown in the table below.

| Carline | Labour Operation | Age at Claim | Claim Count | Sum Paid |
|---|---|---|---|---|
| Compact A | E0123 | 0 | 2 | $158.00 |
| Compact A | E0123 | 1 | 1 | $141.00 |
| Compact A | E0123 | 5 | 1 | $79.00 |
| Compact A | E0123 | 15 | 1 | $141.00 |

-continued

| Carline | Labour Operation | Age at Claim | Claim Count | Sum Paid |
|---|---|---|---|---|
| Compact A | E0123 | 79 | 1 | $121.00 |
| Compact A | E0123 | 134 | 1 | $121.00 |
| Compact A | E0123 | 155 | 1 | $79.00 |
| Compact A | E0123 | 176 | 1 | $79.00 |
| Compact A | E0123 | 240 | 1 | $121.00 |
| Compact A | E0123 | 255 | 1 | $79.00 |
| Compact A | E0123 | 302 | 1 | $247.00 |
| Compact A | E0123 | 361 | 2 | $220.00 |
| Compact A | E0123 | 402 | 1 | $121.00 |
| Compact A | E0123 | 444 | 1 | $247.00 |
| Compact A | E0123 | 489 | 1 | $79.00 |
| Compact A | E0123 | 540 | 1 | $121.00 |
| Compact A | E0123 | 623 | 1 | $141.00 |
| Compact A | E0123 | 689 | 1 | $79.00 |
| Compact A | E0123 | 707 | 1 | $141.00 |
| Compact A | E0123 | 776 | 1 | $247.00 |
| Compact A | E0123 | 821 | 1 | $121.00 |
| Compact A | E0123 | 888 | 1 | $121.00 |
| Compact A | E0123 | 912 | 1 | $247.00 |
| Compact A | E0123 | 950 | 1 | $79.00 |
| Compact A | E0123 | 1003 | 1 | $141.00 |
| Compact A | E0123 | 1090 | 1 | $247.00 |
| Compact A | E0123 | 1094 | 1 | $251.00 |
| Compact A | E0123 | 1095 | 1 | $247.00 |

This table is filled out to cover every day in service and Cumulative totals for Claim Count and Sum Paid are derived. In the present example there are 1095 points, representing the number of days in a three year warranty period. To create a one year profile, it would have 365 points, etc. The following table shows the first 20 rows and the last 10 rows of the resulting profile table.

| Carline | Labour Operation | Age At Claim | Cumulative Claims | Cumulative Paid | Claims Percentage | Paid Percentage |
|---|---|---|---|---|---|---|
| Compact A | E0123 | 0 | 2 | $158.00 | 6.67% | 4% |
| Compact A | E0123 | 1 | 3 | $299.00 | 10.00% | 7% |
| Compact A | E0123 | 2 | 3 | $299.00 | 10.00% | 7% |
| Compact A | E0123 | 3 | 3 | $299.00 | 10.00% | 7% |
| Compact A | E0123 | 4 | 3 | $299.00 | 10.00% | 7% |
| Compact A | E0123 | 5 | 4 | $378.00 | 13.33% | 9% |
| Compact A | E0123 | 6 | 4 | $378.00 | 13.33% | 9% |
| Compact A | E0123 | 7 | 4 | $378.00 | 13.33% | 9% |
| Compact A | E0123 | 8 | 4 | $378.00 | 13.33% | 9% |
| Compact A | E0123 | 9 | 4 | $378.00 | 13.33% | 9% |
| Compact A | E0123 | 10 | 4 | $378.00 | 13.33% | 9% |
| Compact A | E0123 | 11 | 4 | $378.00 | 13.33% | 9% |
| Compact A | E0123 | 12 | 4 | $378.00 | 13.33% | 9% |
| Compact A | E0123 | 13 | 4 | $378.00 | 13.33% | 9% |
| Compact A | E0123 | 14 | 4 | $378.00 | 13.33% | 9% |
| Compact A | E0123 | 15 | 5 | $519.00 | 16.67% | 12% |
| Compact A | E0123 | 16 | 5 | $519.00 | 16.67% | 12% |
| Compact A | E0123 | 17 | 5 | $519.00 | 16.67% | 12% |
| Compact A | E0123 | 18 | 5 | $519.00 | 16.67% | 12% |
| Compact A | E0123 | 19 | 5 | $519.00 | 16.67% | 12% |
| Compact A | E0123 | 20 | 5 | $519.00 | 16.67% | 12% |
| . . . | . . . | . . . | . . . | . . . | . . . | . . . |
| Compact A | E0123 | 1086 | 27 | $3,471.00 | 90.00% | 82% |
| Compact A | E0123 | 1087 | 27 | $3,471.00 | 90.00% | 82% |
| Compact A | E0123 | 1088 | 27 | $3,471.00 | 90.00% | 82% |
| Compact A | E0123 | 1089 | 27 | $3,471.00 | 90.00% | 82% |
| Compact A | E0123 | 1090 | 28 | $3,718.00 | 93.33% | 88% |
| Compact A | E0123 | 1091 | 28 | $3,718.00 | 93.33% | 88% |
| Compact A | E0123 | 1092 | 28 | $3,718.00 | 93.33% | 88% |
| Compact A | E0123 | 1093 | 28 | $3,718.00 | 93.33% | 88% |
| Compact A | E0123 | 1094 | 29 | $3,969.00 | 96.67% | 94% |
| Compact A | E0123 | 1095 | 30 | $4,216.00 | 100.00% | 100% |

The Claims Percentage (CP) and Paid Percentage (PP) columns are the frequency and cost profiles respectively. The cost profile is plotted in the graph of FIG. 2C which plots CPP as a function of days in service.

In practice, the prediction layer 14 avoids building profiles with less than 100 claims. This is to minimise the occurrence of major jumps (which can be seen clearly in the profile of FIG. 2C), as they can have an impact on the consistency of projections calculated using the profile.

Profile Cleansing

Warranty activity is sometimes classed in two ways—regular warranty activity and irregular warranty activity. Regular warranty activity covers those claims which occur in a predictable fashion, e.g. due to a component defect in vehicle infancy or due to normal component wear. This type of warranty is a main reason why using a profile based on historic claims activity is such an effective model in this scenario. Irregular claims activity occurs when components fail due to a specific issue or error in the production line. Failures of this type fall outside the predictable pattern of regular warranty and are therefore hard to model effectively. Technical service bulletins, campaigns or recalls often occur for serious issues and are normally labelled as such in warranty data. However component issues or batch issues not requiring special action can often be left untouched in warranty data and be classed equivalently to regular warranty activity. As a result, irregular warranty activity can end up in profiles, which has a resulting impact on the quality of projections.

Irregular warranty activity should be removed from data used to generate profiles, where possible, although it is not always easy to identify. One straight forward method builds component profiles for each model year and tests for consistency. Any years which obviously differ, i.e. contain potentially irregular warranty, can be removed.

Backup Profiles

Indico includes a set of rules which allow Labour Operations, Categories or Carlines to be mapped to another appropriate profile in the event that not enough historic warranty claims exist to build a specific profile. This hierarchy of profiles is given below, with the first profile to match being used for projections.

Own Carline Labour Operation Profile

Own Carline Group Labour Operation Profile

Backup Carline Labour Operation Profile

Own Carline Category Profile

Backup Carline Category Profile

Own Carline Profile

Own Carline Group Profile

Backup Carline Profile

Carline Group refers to a collection of carlines which are considered similar in a manufacturer carline portfolio. These groups are agreed with the manufacturer during set up.

A Backup Carline is set for every carline. It can be considered as the most similar, and is often an older version of a carline with more historic data and hence viable profiles.

Current Vehicle Age

The current age of each vehicle in a population is defined as the number of days between the vehicle In Service Date and the Data Date. Any vehicles which have a Production Date or In Service Date which is greater than the Data Date are removed from analysis, along with the vehicle's associated warranty claims.

Vehicle Earnings and Maturity

This section describes how "vehicle earnings" and "maturity" metrics are calculated against a profile. This is an important process which compares all related vehicles to a profile to determine an overall population maturity with respect to the profile. The maturity value is directly used to calculate a projection for the Labour Operation in question.

The example described in the Profiling section is continued by considering a population of 1000 Compact A—Model Year 2017 vehicles. The Data Date is 10 Feb. 2017 and these vehicles have so far experienced five claims and the aim is to calculate a three year (end of warranty) projection for cost per unit. The vehicles are grouped by their Current Age, and linked to the profile by Current Age and Profile Age at Claim. The earnings for each age grouping are the product of the Profile Paid Percentage and the number of vehicles in the group. The following table displays all these steps.

| Carline | Model Year | Current Age | Vehicle Count | Paid Percentage | Earnings |
|---|---|---|---|---|---|
| Compact A | 2017 | 1 | 145 | 7.09% | 10.28344402 |
| Compact A | 2017 | 5 | 180 | 8.97% | 16.13851992 |
| Compact A | 2017 | 12 | 200 | 8.97% | 17.9316888 |
| Compact A | 2017 | 15 | 135 | 12.31% | 16.61883302 |
| Compact A | 2017 | 20 | 25 | 12.31% | 3.07756167 |
| Compact A | 2017 | 25 | 30 | 12.31% | 3.693074004 |
| Compact A | 2017 | 31 | 120 | 12.31% | 14.77229602 |
| Compact A | 2017 | 40 | 50 | 12.31% | 6.15512334 |
| Compact A | 2017 | 55 | 40 | 12.31% | 4.924098672 |
| Compact A | 2017 | 71 | 25 | 12.31% | 3.07756167 |
| Compact A | 2017 | 92 | 15 | 15.18% | 2.277039848 |
| Compact A | 2017 | 115 | 12 | 15.18% | 1.821631879 |
| Compact A | 2017 | 135 | 8 | 18.05% | 1.44402277 |
| Compact A | 2017 | 170 | 4 | 19.92% | 0.796963947 |
| Compact A | 2017 | 201 | 3 | 21.80% | 0.653937381 |
| Compact A | 2017 | 210 | 3 | 21.80% | 0.653937381 |
| Compact A | 2017 | 220 | 2 | 21.80% | 0.435958254 |
| Compact A | 2017 | 230 | 1 | 21.80% | 0.217979127 |
| Compact A | 2017 | 245 | 1 | 24.67% | 0.246679317 |
| Compact A | 2017 | 260 | 1 | 26.54% | 0.265417457 |

Maturity is calculated by dividing the total earnings by the number of vehicles in a population. The maturity in this example is therefore 105.49/1000=0.10549.

Maturity here describes the proportion of liability realized at the point of analysis. That is, the fraction of the total number or cost of repairs that are estimated to have been performed so far.

As will be appreciated, to compute a predicted frequency (claims per unit), exactly the same steps can be applied but with the profile claim percentage in place of the paid percentage.

Warranty Claims Lag

There is often a time lag for warranty claims being added to a historic warranty claims table, meaning the claim records are not complete to the data date and the rate at which they're incomplete is consistent. This time lag can often be months long. This lag varies by manufacturer, but is normally consistent within a manufacturer. Once the time lag has been modelled and understood, an additional step can be added to adjust the earnings, taking the claims lag into account. Several values need to be derived to implement this step.

DD—Data Date. The date of the latest claim.

FPDD—Fully Processed Data Date. This is the date at which the claims data is fully realised. FPDD<=DD.

AF—Adjustment Factor for age. A value to be calculated based on proportion of claims processed during vehicle age equivalent. Calculated by multiplying the PP by the claims lag distribution for each age.

PP—Proportion Processed. The proportion of claims processed between FPDD and DD. This is derived from the calculated claims distribution.

If vehicle age is less than or equal to the number of days between DD and FPDD, then New Earnings=Earnings×AF If vehicle age is greater than the number of days between DD and FPDD, then Earn fully to FPDD Earn fully to DD New Earnings=FPDD+[(DD−FPDD)×PP]

Projections

Projections are simple once a maturity value has been calculated. A Projected Paid (respective claim) amount can be calculated by dividing the total cost for a group of claims (respective total number of claims) by the maturity. Cost per unit values are then derived by considering the number of vehicles in the population.

The table below gives details on five claims for Labour Operation E0123 on Compact A—2017.

| VIN | Claim Number | Labour Operation | Report Date | Claim Total |
|---|---|---|---|---|
| ABCDEFGHIJK000001 | 1 | E0123 | Oct. 1, 2016 | $81.00 |
| ABCDEFGHIJK000002 | 2 | E0123 | Nov. 11, 2016 | $121.00 |
| ABCDEFGHIJK000003 | 3 | E0123 | Nov. 23, 2016 | $81.00 |
| ABCDEFGHIJK000004 | 4 | E0123 | Jan. 3, 2017 | $263.00 |
| ABCDEFGHIJK000005 | 5 | E0123 | Feb. 4, 2017 | $121.00 |

The last step combines vehicle and claims summaries with the derived maturity value to give a Projected Paid amount of $6,323.13 and a Cost per Unit amount of $6.32.

| Carline | Model Year | Vehicle Count | Labour Operation | Maturity | Claim Count | Total Paid | Projected Paid | PCPU |
|---|---|---|---|---|---|---|---|---|
| Compact A | 2017 | 1000 | E0123 | 0.10549 | 5 | $667.00 | $6,323.13 | $6.32 |

This method is repeated for all combinations of Carline and Labour Operation across the dataset. Some examples of different labour operation types are given in the following table. A profile or profiles, as appropriate can be built for each such labour operation using the described method. Carline and Category projections are created using the same method.

Example Repair Operations

| Repair Operation Code | Repair Operation Description | Sub System |
|---|---|---|
| 1 | CLUTCH LINES, AIR BLEED | Transmission system |
| 2 | TRUNK LID OR LIFT GATE, ADJUST | Body |
| 8 | HIGH TENSION LEAD, CHECK | Electronics |
| 9 | SHORT ENGINE, R&R | Engine components and parts |
| 15 | CYLINDER BLOCK, R&R | Engine components and parts |
| 16 | ENGINE MOUNT RUBBER NO.1, R&R | Engine components and parts |
| 25 | EXTENSION INTAKE MANIFOLD | Exhaust system |
| 26 | BYPASS VALVE, R&R | Exhaust system |
| 29 | FUEL TANK, R&R | Fuel supply system |
| 30 | FUEL FILLER LID OPENER, R&R | Fuel supply system |
| 34 | OXYGEN SENSOR, R&R | Electronics |
| 36 | DRIVE BELT TENSIONER, R&R | Engine components and parts |
| 45 | DIFFERENTIAL ASSEMBLY, R&R | Transmission system |
| 51 | OIL PIPE, R&R | Engine components and parts |
| 58 | SELECTOR LEVER, R&R | Transmission system |
| 60 | PROPELLER SHAFT ASSY, R&R | Engine components and parts |
| 63 | FRONT WHEEL HUB BOLTS, R&R | Suspension and steering systems |
| 74 | ANTI-LOCK BRAKE SYSTEM,DIAGNOSE | Braking system |
| 81 | WHEEL NUT, R&R ONE | Suspension and steering systems |
| 85 | FRONT SHOCK ABSORBER, R&R | Suspension and steering systems |
| 95 | ORNAMENT(GRILLE), R&R | Body |
| 107 | CYLINDER HEAD, R&R | Engine components and parts |
| 108 | CAMSHAFT, R&R | Engine components and parts |
| 120 | FUEL RETURN HOSE, R&R | Fuel supply system |
| 123 | EGR MODULATOR VALVE | Fuel supply system |
| 127 | STARTER, DIAGNOSE | Electronics |
| 142 | GEARSHIFT LEVER,WAVE WASH | Transmission system |
| 163 | INSPECT, REPLACE EGR HOSE | Fuel supply system |
| 175 | LOWER ARM BUSH(ES), R&R | Suspension and steering systems |
| 176 | CROSSMEMBER, R&R | Suspension and steering systems |
| 188 | TRUNK LID HINGE, R&R | Body |
| 200 | REAR DISC BRAKE, CLEAN AND REFURB. | Braking system |
| 202 | CLIMATE MODE CONTROL, CHECK | Electronics |
| 214 | TURBOCHARGER BRACKET, R&R | Engine components and parts |
| 278 | REAR SHOCK ABSORBER, R&R | Suspension and steering systems |
| 282 | AIR BAG CONTROL SYSTEM, DIAGNOSE | Electronics |
| 327 | PILOT BEARING, R&R | Transmission system |
| 328 | CLUTCH RELEASE FORK, R&R | Transmission system |

-continued

| Repair Operation Code | Repair Operation Description | Sub System |
|---|---|---|
| 441 | FRONT AXLE OIL SEAL, R&R | Suspension and steering systems |
| 632 | CAMSHAFT POSITION SENSOR, R&R | Electronics |
| 691 | BATTERY, CLEAN AND CHECK | Electrical supply system |
| 694 | PARTIAL ENGINE, R&R | Engine components and parts |
| 773 | GLOVE BOX ASSEMBLY, R&R | Body |
| 798 | POWER DOOR LOCK MOTOR, R&R | Body |
| 824 | HIGH MOUNT STOP LIGHT BULB, R&R | Body |
| 844 | SPEAKER (TWEETER), R&R LE | Entertainment |
| 850 | BLOWER UNIT, R&R | Heater & A/C |
| 918 | MAIN FUSE BLOCK, R&R | Electronics |
| 991 | KEYLESS UNIT/TRANSMITTER, | Electronics |
| 993 | WEATHERSTRIP, R&R | Body |

Section 3: Comparison with Other Methodologies

To illustrate some of the benefits of the predictive analytics techniques disclosed herein, comparisons with other methodologies will be provided by way of example.

Figure 124A:
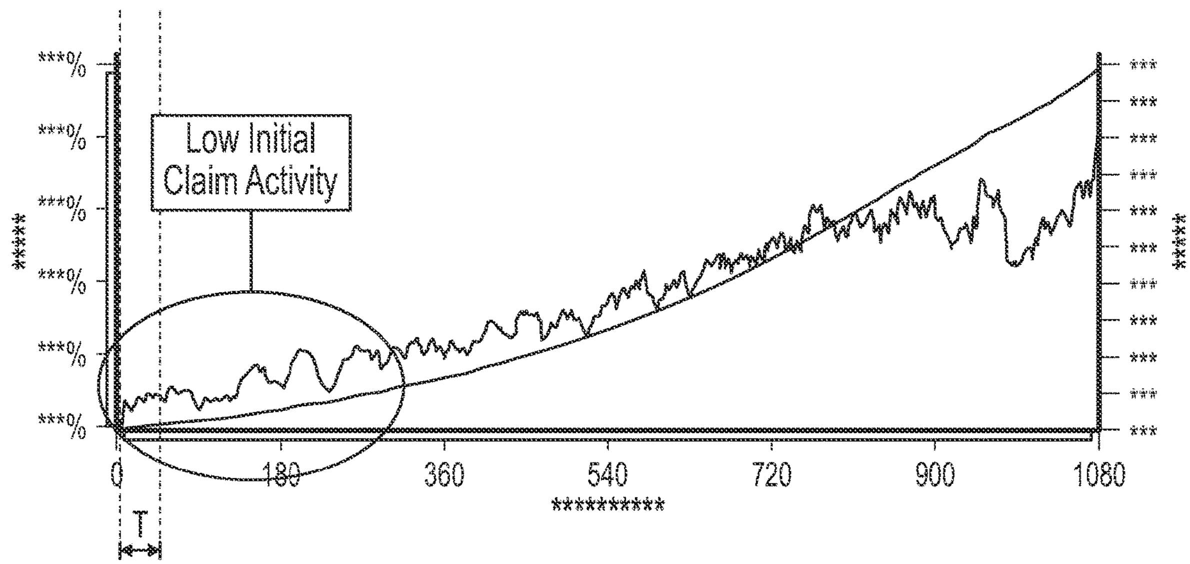
FIGS. 124A and 124B show graphs to demonstrate how the predictive methods described herein compare with Weibull predictions in terms of accuracy.
Figure 124B:
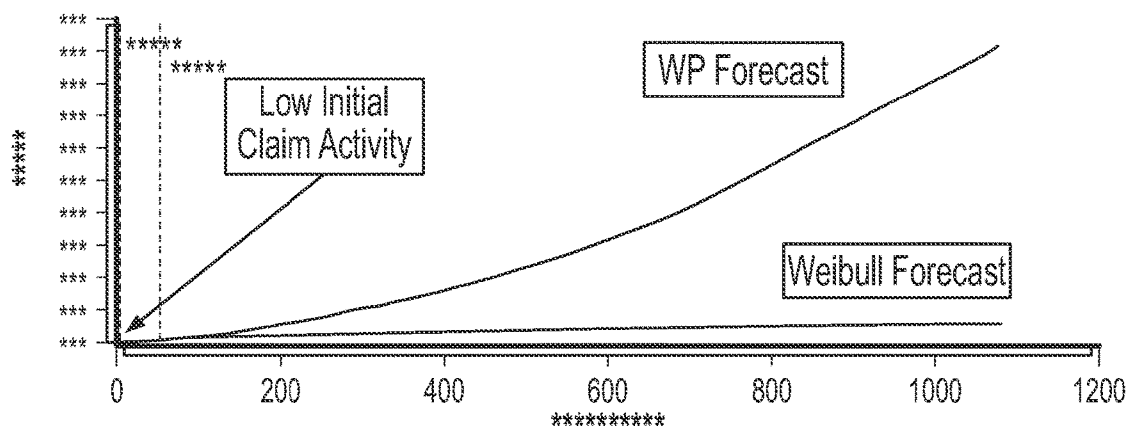

Comparison to Weibull:

With reference to FIGS. 124A and 124B, this disclosure recognizes that many components have their majority of claim activity towards the end of warranty. By way of example, the graph of FIG. 124A plots cumulative claims (the smoother, monotonically increasing curve) and daily claims (more jagged curve) as a function of days in service, over a period of 1000 days, for a particular labour operation corresponding to a particular vehicle component. As can be seen, the number of claims per day generally increases with vehicle age (which is also reflected in the increasing gradient of the cumulative curve), there being a relatively small number of claims per day occurring for young vehicles and a relatively large number for older vehicles. This low initial claim activity prevents early issue detection using current analytics.

Existing parametric forecasting tools like Weibull also fail to forecast this behaviour when only a limited dataset for relatively young vehicles is available, as illustrated in FIG. 124B. As is known in the art, Weibull analysis is a well-known parametric model for prediction that is generally favoured by many working in the field and is perceived as something of a "go-to" tool for any predictive analysis.

FIG. 124B shows two plots, respectively labelled WP Forecast, which is computed using the methods taught herein, and Weibull Forecast, which is computed by applying a Weibull parametric analysis to the same data, based on a population of relatively young vehicles with relatively low maturity, corresponding to the subset of the data of FIG. 124A within the interval labelled T, which in turn corresponds to the age of the oldest vehicle in the population on which the forecasts are based. As can be seen, the Weibull Forecast determined on this limited subset of data fails to predict the significant increase in claims (repair) activity with days in service that is evident in the actual data of FIG. 124A, whereas the WP Forecast predicts this accurately from the limited dataset.

Figure 125:
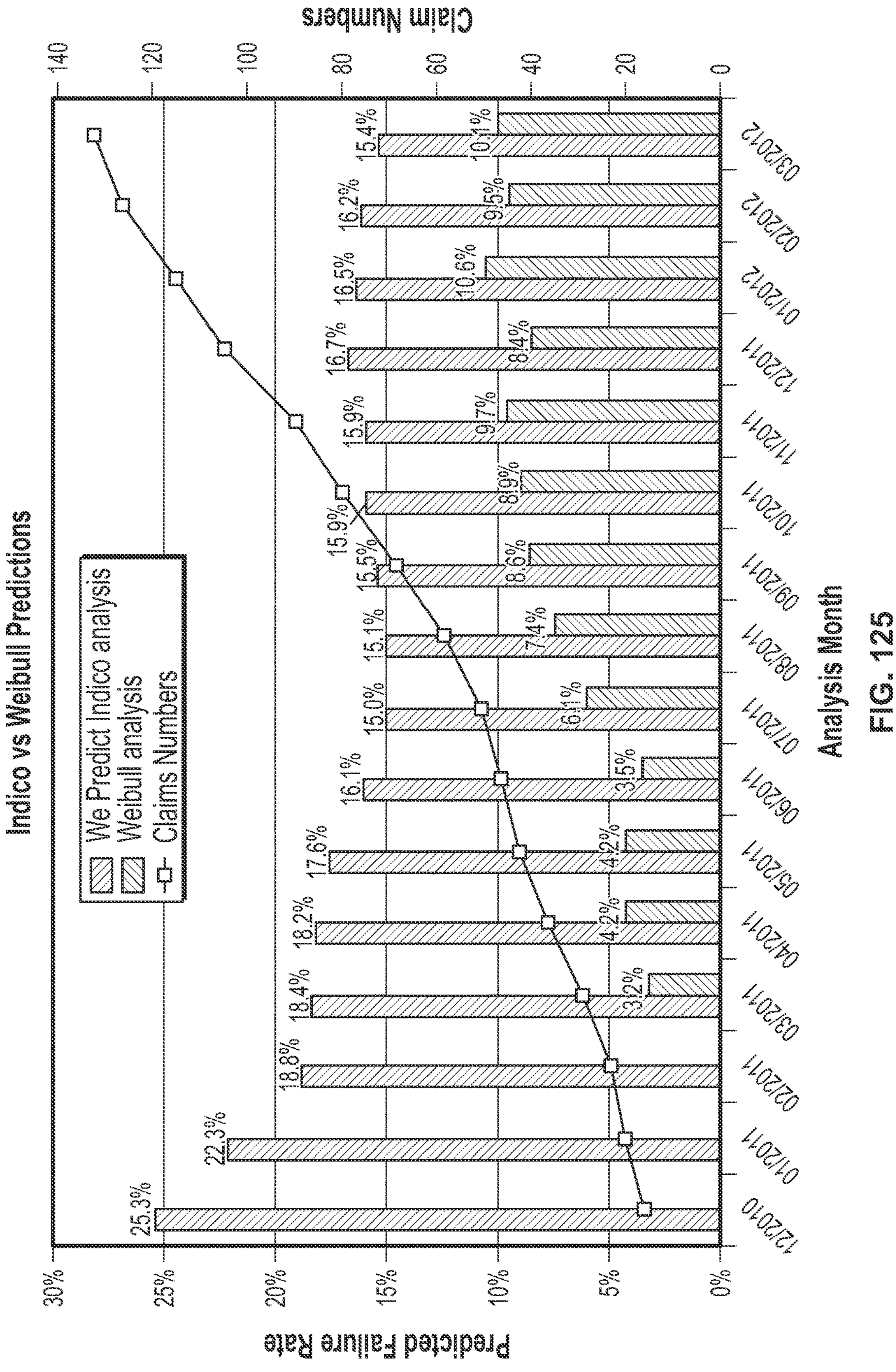
FIG. 125 shows a graph to illustrate how the predictive methods described herein compare with Weibull predictions in terms stability over time.

To further illustrate this improvement, FIG. 125 shows the results of Indico analysis (left-hand bars of the bar chart) compared with the Weibull analysis (right-hand bars of the bar chart). The number of received claims used in the analysis is also shown. The Weibull analysis only starts in March 2011 and predicts a failure rate of 3.2%. At this point the Indico predictions have stabilised and show 18.4%. The Weibull predictions then increase month on month before becoming stable in approximately January 2012 (a previous analysis of this data set indicates the Weibull technique under predicts by about 25%, as it cannot deal easily with 0 day claims). It is clear that the Indico analysis produces a stable reliable prediction at least 10 months earlier than the Weibull method.

Figure 126:
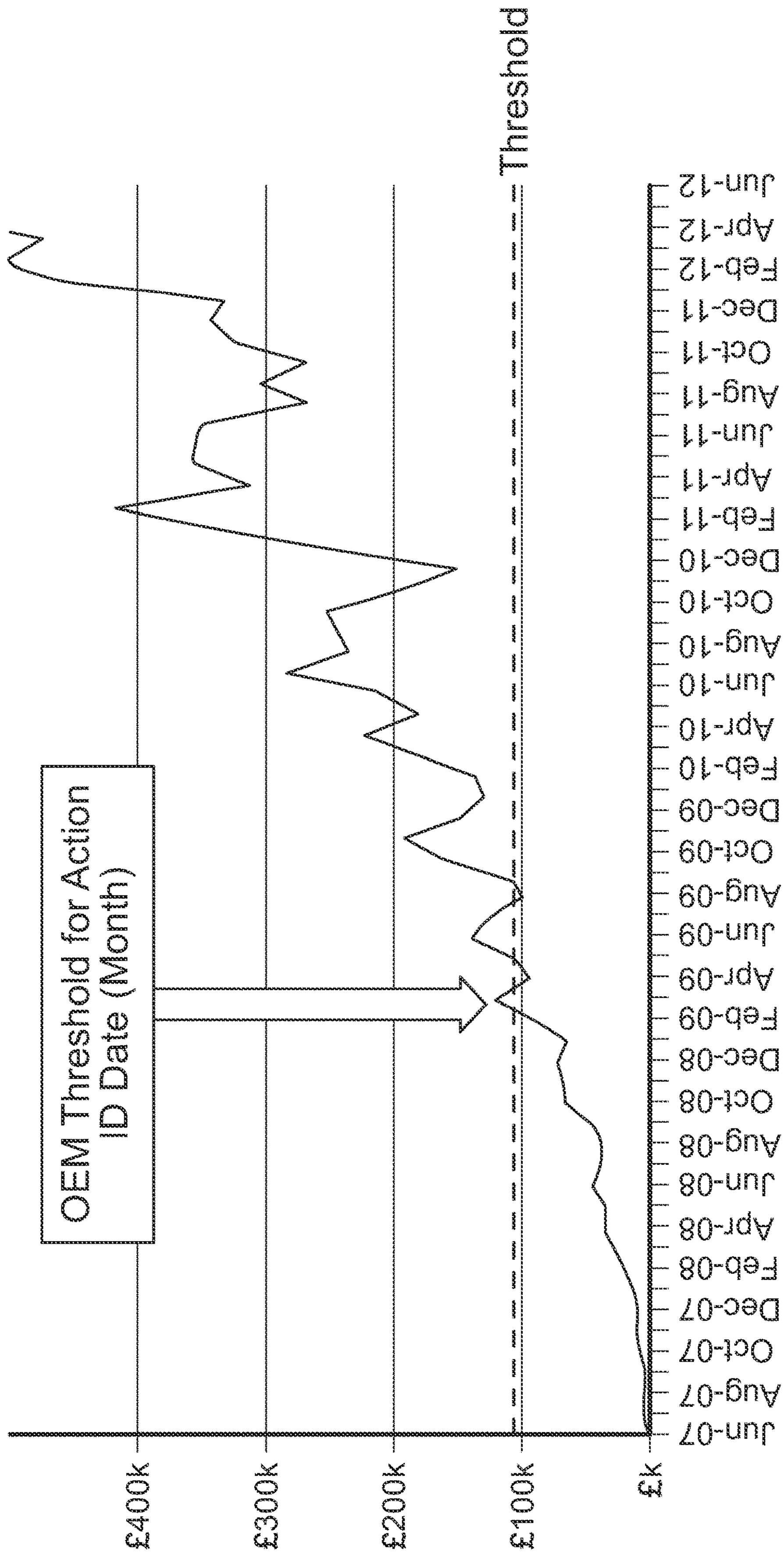
FIG. 126 is a graph to illustrate the principles of issue detection based on simple thresholding.

Comparison with Monthly Cost-Based Approach:

With reference to FIG. 126, the present methods also perform significantly better compared with the simple monthly-cost based approach described briefly above, in which issues are flagged when the total monthly spend or frequency for a given labour operation/vehicle component exceeds a predetermined threshold. By way of example, FIG. 125 shows a graph of monthly spend for a particular labour operation with a predetermined threshold (e.g. at £100,000). It is only when the total cost for that operation for a particular month reaches the threshold that the potential issue is flagged and investigates, which in this example is nearly three years from when the first of the vehicles in question entered active service. In this example, the vertical axis corresponds to monthly spend in units of £100 k. It is necessary with this approach to use sufficiently high thresholds to prevent statistically insignificant events from skewing the results unduly, but this in turn significantly limits the capacity for early issue detection.

Figure 127A:
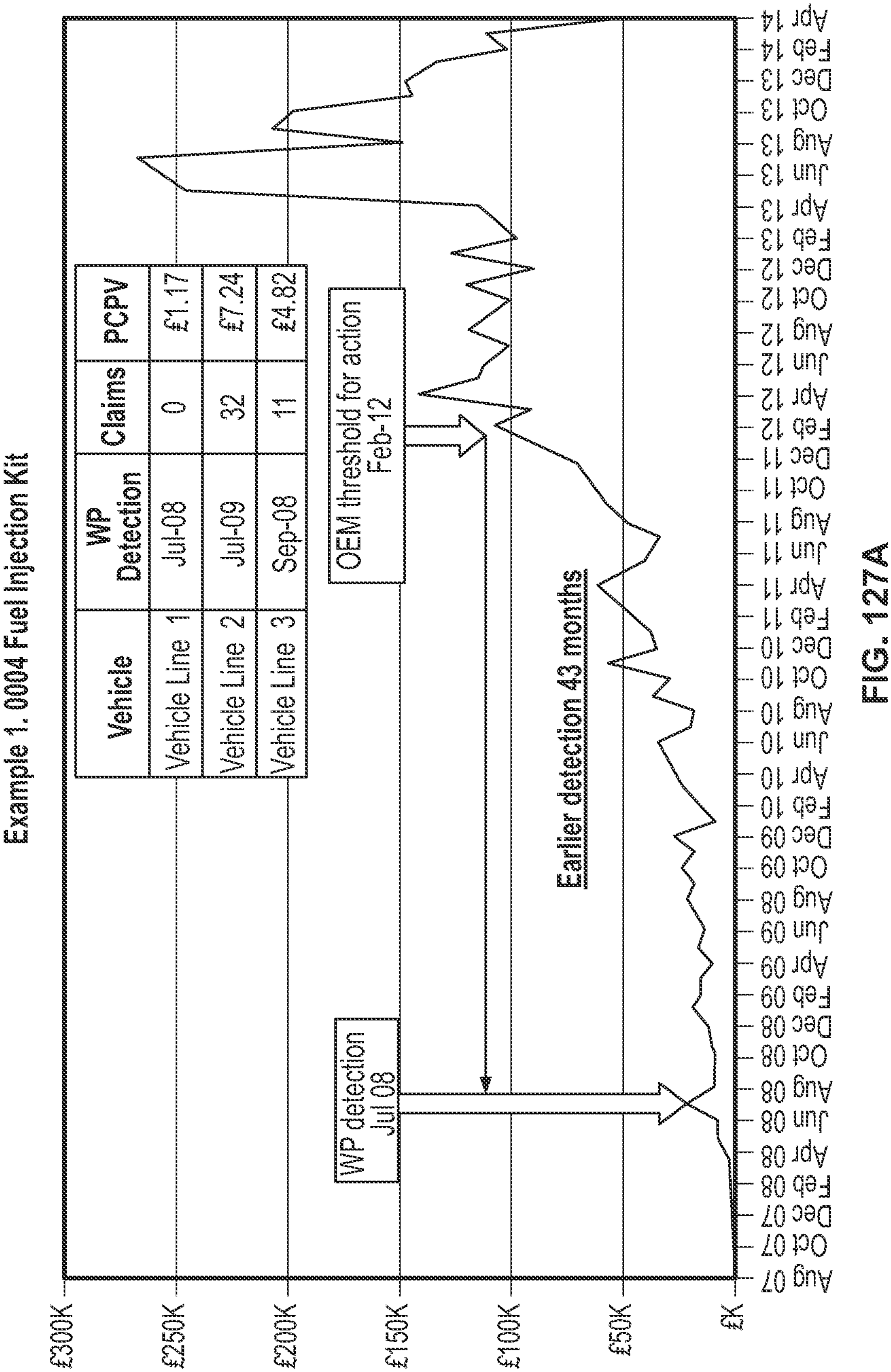
FIGS. 127A and 127B show graphs to illustrate two examples in which the predictive methods described herein are able to detect specific issues significantly earlier than simple thresholding.
Figure 127B:
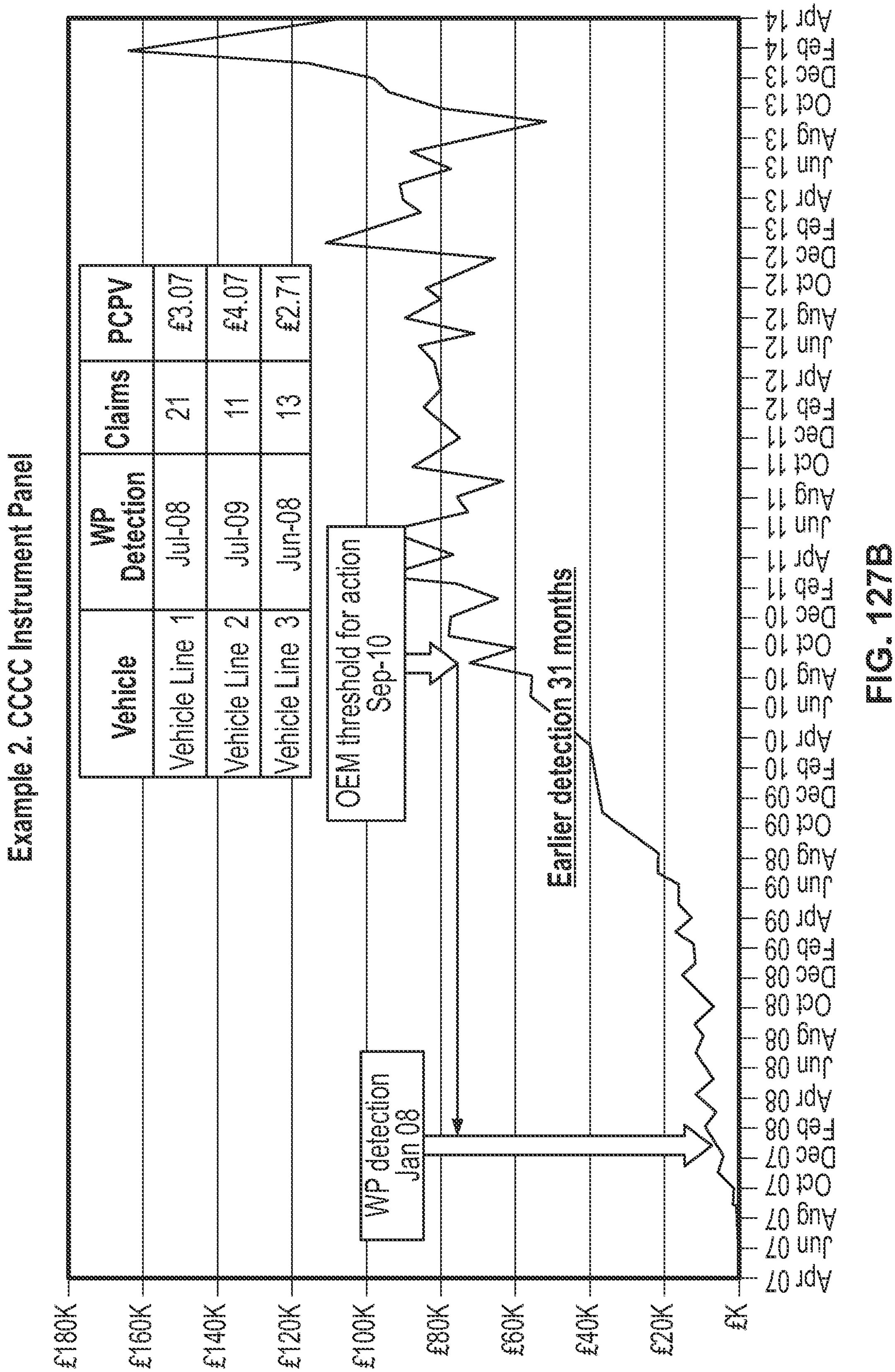

For comparison, FIGS. 127A and 127B show cost per month (on the y-axis) for two different vehicle components—fuel injector kit and CCCC instrument panel respectively. In these cases, the point in time at which it is possible to detect an issue using the non-parametric forecasting methods of this disclosure is, respectively, 43 months and 31 months earlier than it is with the simple thresholding method with a suitably chosen threshold.

Indico Stability

Figure 128:
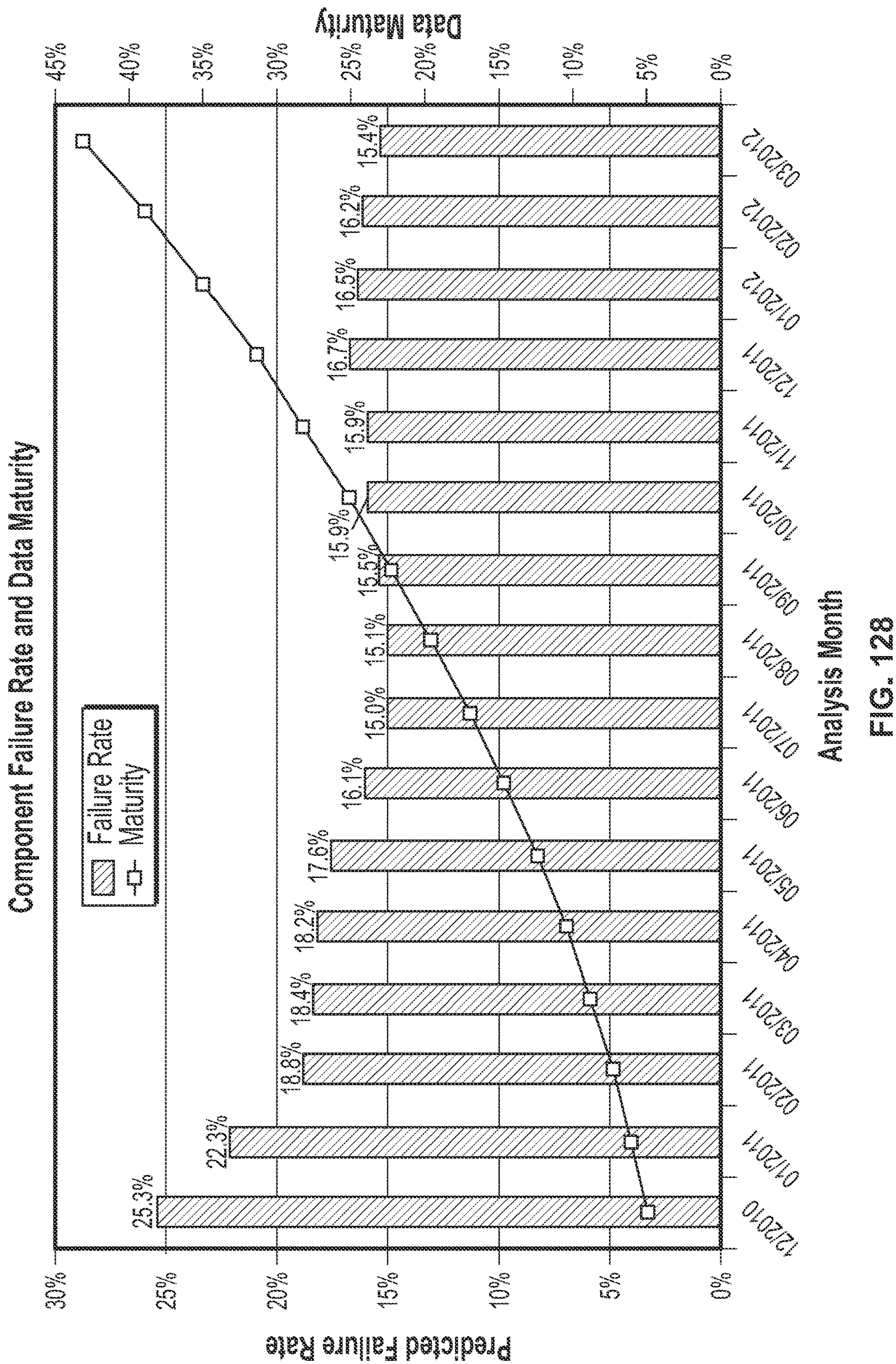
FIG. 128 shows a graph to illustrate how predictions made according to the methods described herein stabilize over time.

FIG. 128 shows a graph of the results of an Indico analysis run retrospectively on data between March 2012 and December 2010. The predicted failure rate at the end of warranty was calculated for each re-run. These failure rates are plotted against the re-run date and are compared to the data maturity in FIG. 128.

The first re-run in December 2010 produced a predicted failure rate of 25.3%. This analysis was run where the data set was only 4.9% mature. This prediction would be treated with caution due to the low maturity.

Subsequent predictions produced a reduction to 18.8% in February 2011. From this point onwards the predicted values remains very consistent varying between only 18.8% and 15.0% up to March 2012.

This analysis shows that from February 2011 even with a relatively low maturity (<10%) a reliable prediction was produced. The small variation in predicted numbers is quite normal and reduces as the maturity increases.

Section 4: System Overview

Further details of the Indico user interface will now be described.

Figure 3:
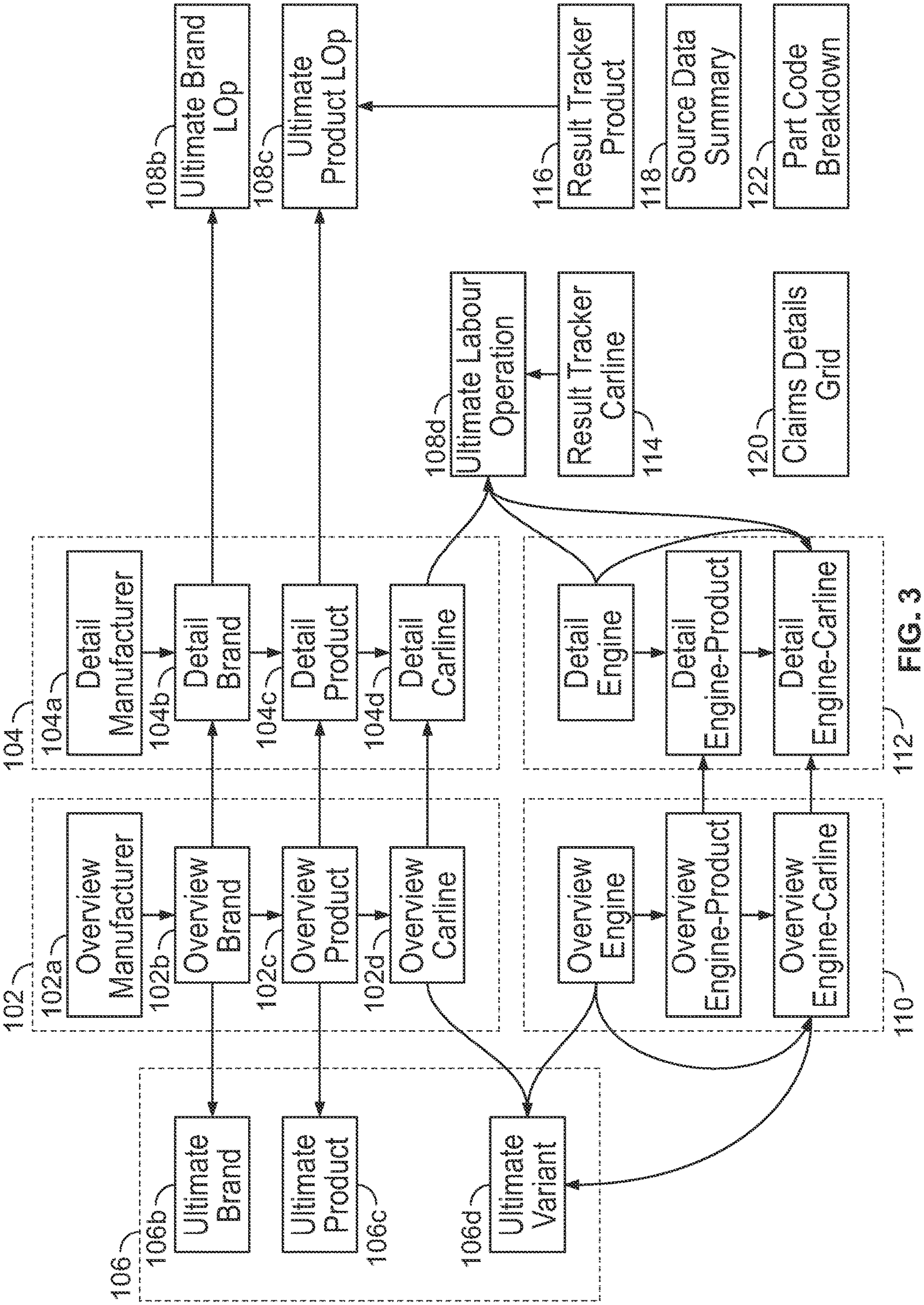
FIG. 3 shows a page structure according to which a user interface is rendered.
Figure 4:
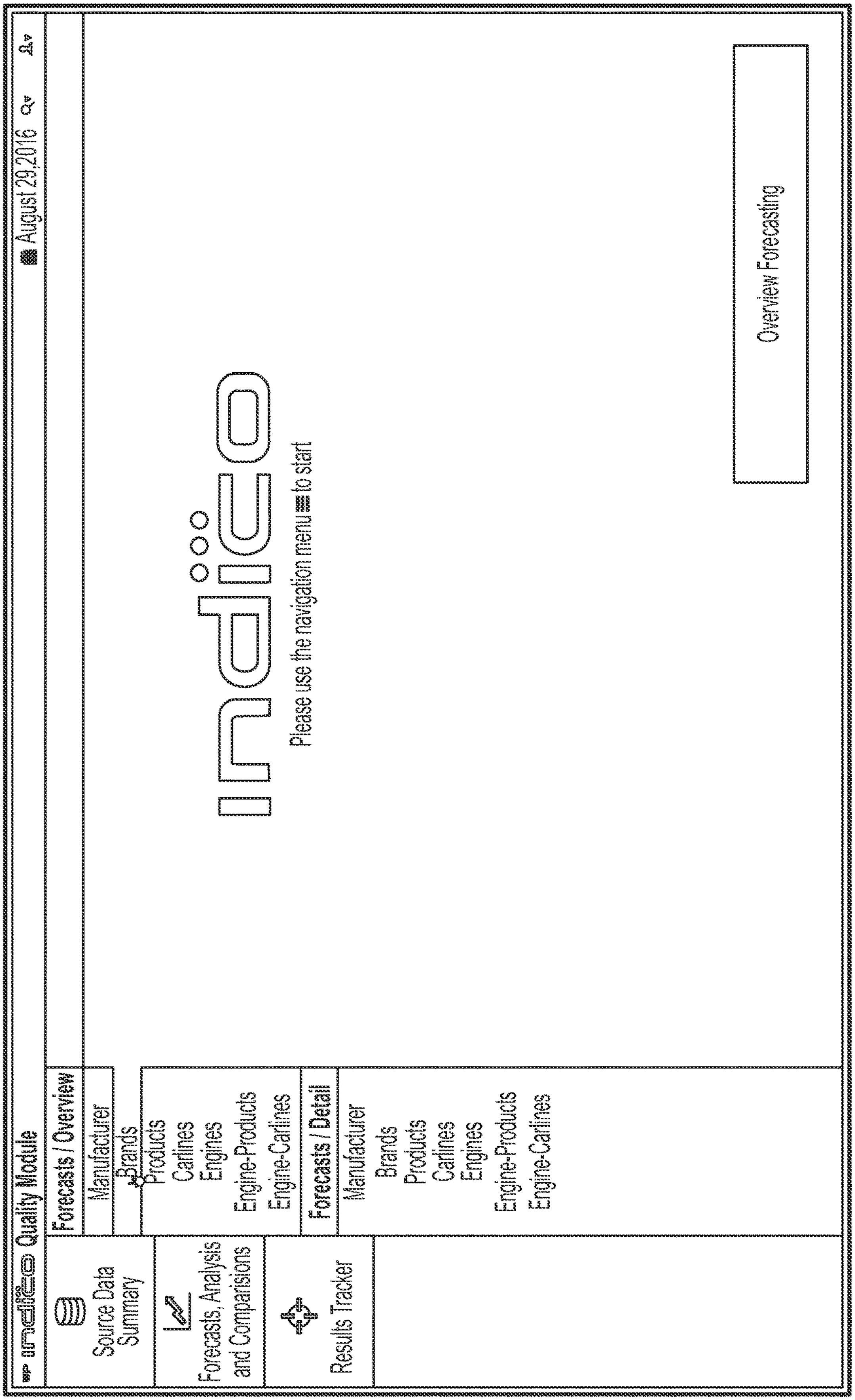

FIG. 3 shows a schematic overview of a network of pages provided by the user interface of the Indico system. Blocks in FIG. 3 represent individual pages, and the arrows between blocks indicate navigational relationships between the pages. In particular, an arrow from the block representing one page to the block representing another page represents the fact that it is possible to navigate directly from that page to that other page. This navigation is effected by way of a navigation element displayed on each page and referred to as a "charm" below.

Overview pages 102 and detailed pages 104 are provided according to the inter-page hierarchy set out in the above. As indicated, it is possible to navigate directly from the brand, product and carline overview pages to the detailed page at the corresponding level of the hierarchy, so as to switch from results across all labour operations to results for any specific one of the available labour operations.

The overview manufacturer, brand, product and carline pages 102*a*, 102*b*, 102*c* and 102*d* are provided in accordance with the above. Likewise detailed manufacturer, brand, product and carline pages 104*a*, 104*b*, 104*c* and 104*d* are also provided in accordance with the above. From the overview brand, product and carline pages 102*b*, 102*c*, 102*d* it is possible to navigate directly to the corresponding detailed page 104*b*, 104*c*, 104*d* at the same level of the hierarchy. For both the overview pages 102 and the detailed pages 104, it is possible to navigate to the overview or detailed page respectively at the next level down in the hierarchy. From the overview brand page 102*b* and the overview product page 102*c* it is possible to navigate to an ultimate brand page 106*b* and an ultimate product page 106*c* respectively in accordance with the above. From the overview carline page 102*d* it is possible to navigate directly to a corresponding ultimate variant page 106*d* in accordance with the above. The ultimate brand, product and variant pages 106 are also overview pages in the sense that they are not specific to a particular labour operation. By contrast, it is possible to navigate directly from the detailed brand, product and carline pages 104*b*, 104*c*, 104*d* to an ultimate brand labour operation page 108*b*, an ultimate product labour operation page 108*c* and an ultimate labour operation page 108*d* respectively, for a specific labour operation.

The ultimate brand and ultimate product pages 106*b*, 106*c* provide aggregate predictions that are not specific to individual labour operations. The ultimate variant page 106*d* provides predictions that are also not labour operation specific. The ultimate brand labour operation page 108*b* and ultimate product labour operation page 108*c* provide aggregate predictions that are specific to a particular labour operation. The ultimate labour operation page 108*d* provides predictions that are also labour operation specific.

Overview engine, engine-product and engine-carline pages 110 are also provided, as are detailed engine, engine-product and engine-carline pages 112. The inter page hierarchies for these pages are shown by the arrows in FIG. 1, and as shown these also provide another route to the ultimate variant page 106*d* and the ultimate labour operation page 108*d*. Result tracker carline and result track product pages 114, 116 are also provided in accordance with the above. A source data summary 118, claims details grid 120 and part code breakdown page 122 can also be provided in accordance with the above.

In more detail, FIG. 3 illustrates how each of the report pages are connected within the system. There are two main tracks: (1) Forecasting—Overview corresponding to elements 102 and 110, and (2) Forecasting—Detail corresponding to elements 104 and 112 which a user can explore in order to analyses and identify top issues across different levels of focus. Each focus level forms part of systematic hierarchy designed to find issues intuitively from an engineering point-of-view.

The arrows between each report page in FIG. 3 shows the navigation relationship between each report. The navigation allows a user to quickly trace an issue to a specific problem/affected area. In general, the lower down the hierarchy you are, the more specific the report will be.

Alternatively, a user may also navigate to an Ultimate Report 106/108*b-d* from any page to find detailed information about the forecast, production information, as well as other supporting analyses to help understand a selected issue.

The other areas displayed on the sitemap are the Result Tracker pages 114, 116, which are used for showing how the relative ranks of forecasts have changed over the preceding 24 months. A stand-alone Source Data Summary page 118 is also provided.

Finally, there are the two data grids which are available for every forecast within the system, a Claims Details Grid 120 and a Part Code Breakdown 112, which can be requested by the user on any of the other pages.

The content of the various pages will now be described. Various visual representations are described below having visual elements representing one of the metrics (C/CPU/D/DPU) for a given entity in a given hierarchy (manufacturer, brand, product, carline, engine, engine-carline etc.). Unless otherwise indicated, for any of these the user can at any time switch between any of the metrics (C/CPU/D/DPU) and the visual representations will adapt dynamically to represent the newly-selected metric.

5: Source Data Summary

This area of the system provides users with a summary of the data that has been used to generate the forecasted results within the system.

5.1 Carlines Page

Filter: The data shown on this page can be filtered by the user. The fields which can be filtered are:

Single Select

Carline

Navigation: There are no navigation targets from this page.

5.1.1 Sales and Claims by Model Year

Figures 46, 47A:
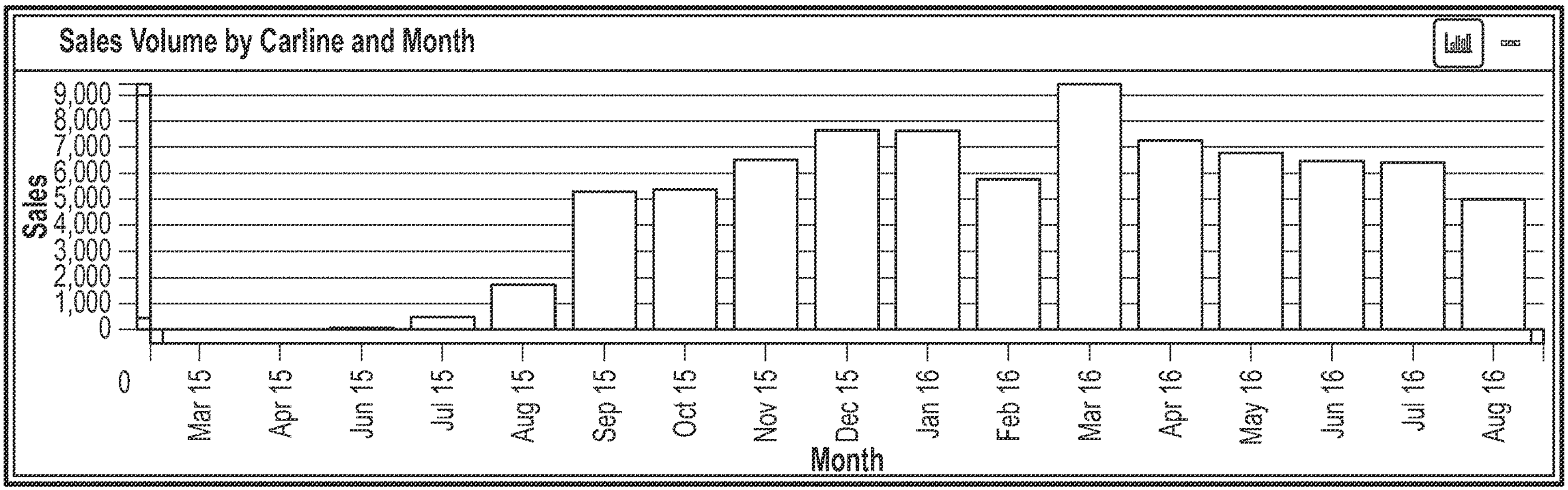

The sales and claim counts by Model Year for the chosen Carline are shown in a data grid, as illustrated in FIG. 46.

5.1.2 Sales Volume by Month

The sales counts by month for the chosen Carline are shown in a column chart, as illustrated in FIG. 47A.

5.1.3 Claims Volume by Month

Figure 47B:
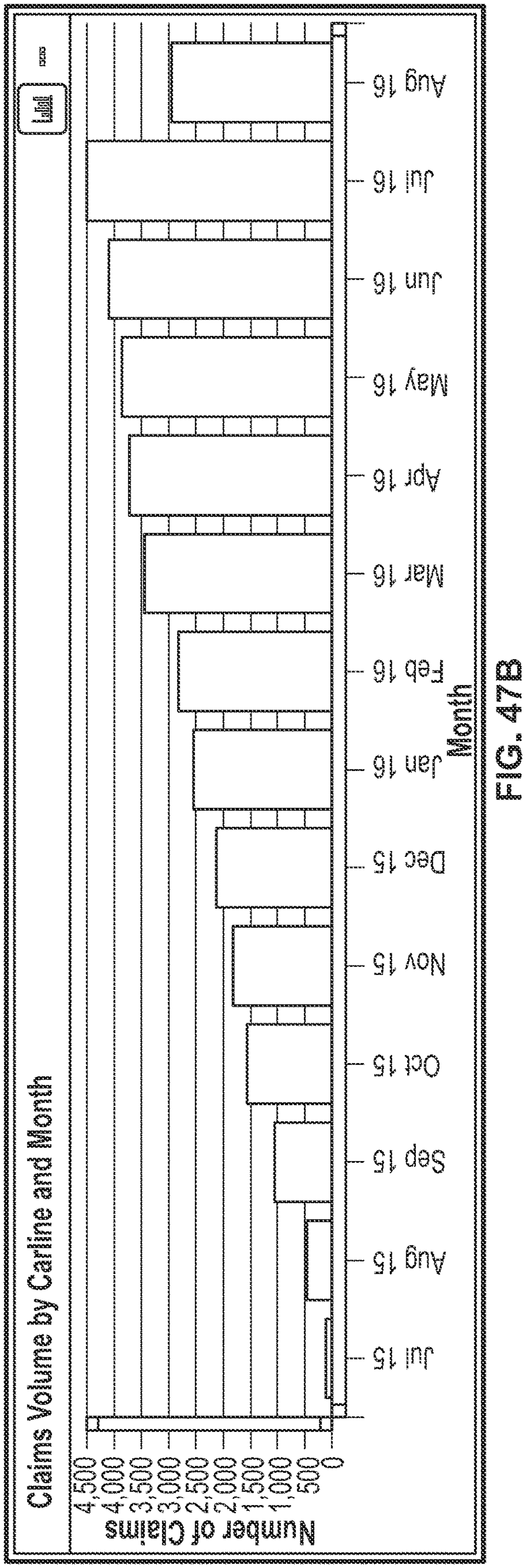

The claim counts by month for the chosen Carline are shown in a column chart, as illustrated in FIG. 47B.

Section 6: Forecasting—Overview

This reporting track contains seven pages which display forecasts at each level within the following hierarchies:

Manufacturer→Brand→Product→Carline

Engine→Engine-Product→Engine-Carline

This can be extended to other hierarchies, such as any of those defined above.

6.1 Manufacturer Page

This page shows forecasts at a Manufacturer level.

Filter: The data shown on this page can be filtered by the user. The fields which can be filtered are:

Single Select

Model Year[1]

Projection Length

[1] The Model Year filter is not applied to the Model Year Development.

Navigation: The user can navigate to either the Brands Overview (see 6.2) or the Manufacturer Detail (see 7.1).

The selected Model Year and Projection Months are passed as parameters.

Reporting Objects: This page contains a single reporting object which displays Model Year forecasts for the Manufacturer.

6.1.1 Model Year Development

This shows a comparison of the forecast for the Manufacturer across each Model Year.

Figure 48:
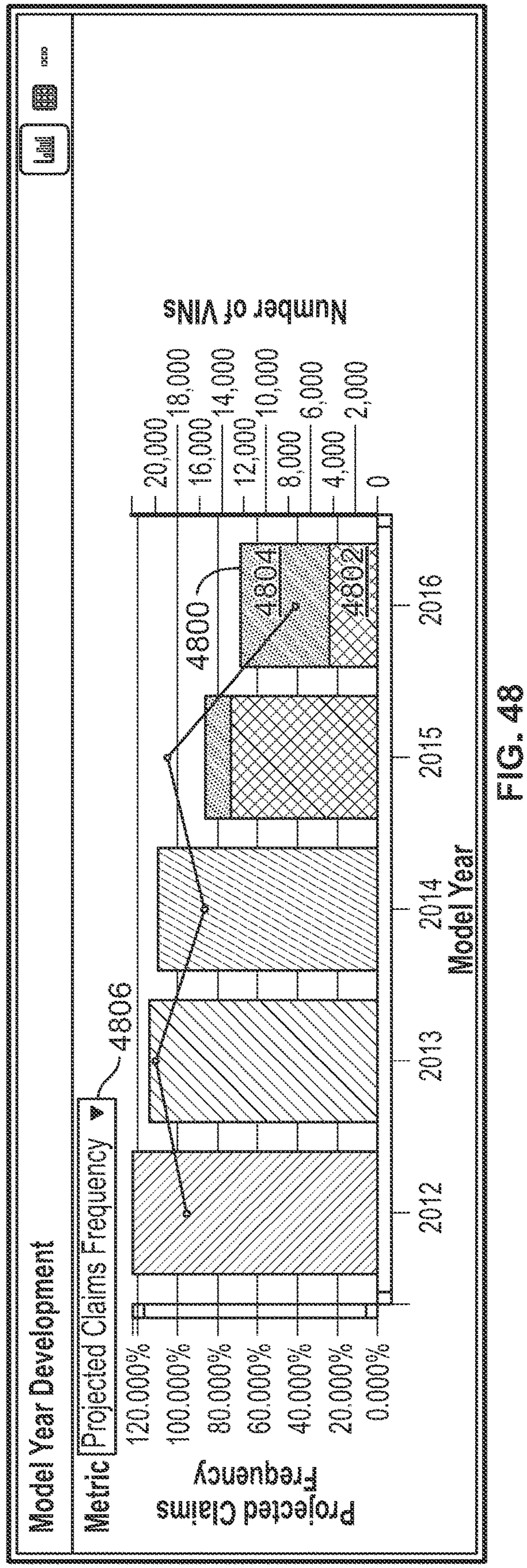

This is presented within a stacked column chart showing the relationship between current and forecasted performance for each Model Year, as illustrated in FIG. 48.

In FIG. 48, each prediction is displayed as a visual representation in the form of a column of a column chart, by year in this example. The stacked column for Model Year 2016 is labelled 4800, and has two visually distinct portions 4802, 4804. The first portion 4002 represents a historical component of the metric in question (C/CPU/D/DPU) for that year (i.e. number of cost of labor operations already preformed or incurred) and the second portion 4804 represents the remaining future component (i.e. predicted number or cost of repair predicted operations yet to be performed/incurred), such that the whole stacked column 4800 corresponds to the combination of historical and future labor operations. As is evident, the ratio of future to historical values is greater for younger vehicles, approaching or reaching zero for older models, as expected. In FIG. 48, the selected metric is projected claims frequency but any of the other metrics can be presented in the same way. A selectable-element 4086, in the form of a dropdown menu, is provided which the user can use to switch between metrics.

6.2 Brands Page

This page shows whole Brand forecasts.

Filter: The data shown on this page can be filtered by the user. The fields which can be filtered are:

| Multi Select: | Single Select: |
|---|---|
| Brand | Model Year[2]<br>Projection Length |

Navigation: The user can navigate to either the Products Overview (see 6.3), the Ultimate Brand Report (see section 10) or the Brands Detail (see 7.2).

The selected Brand, Model Year and Projection Months are passed as parameters.

Reporting Objects: This page contains three reporting objects which display a comparison of Brand forecasts against each other for the chosen Model Year and Projection Length.

6.2.1 Projections Node Tree

Figure 49:
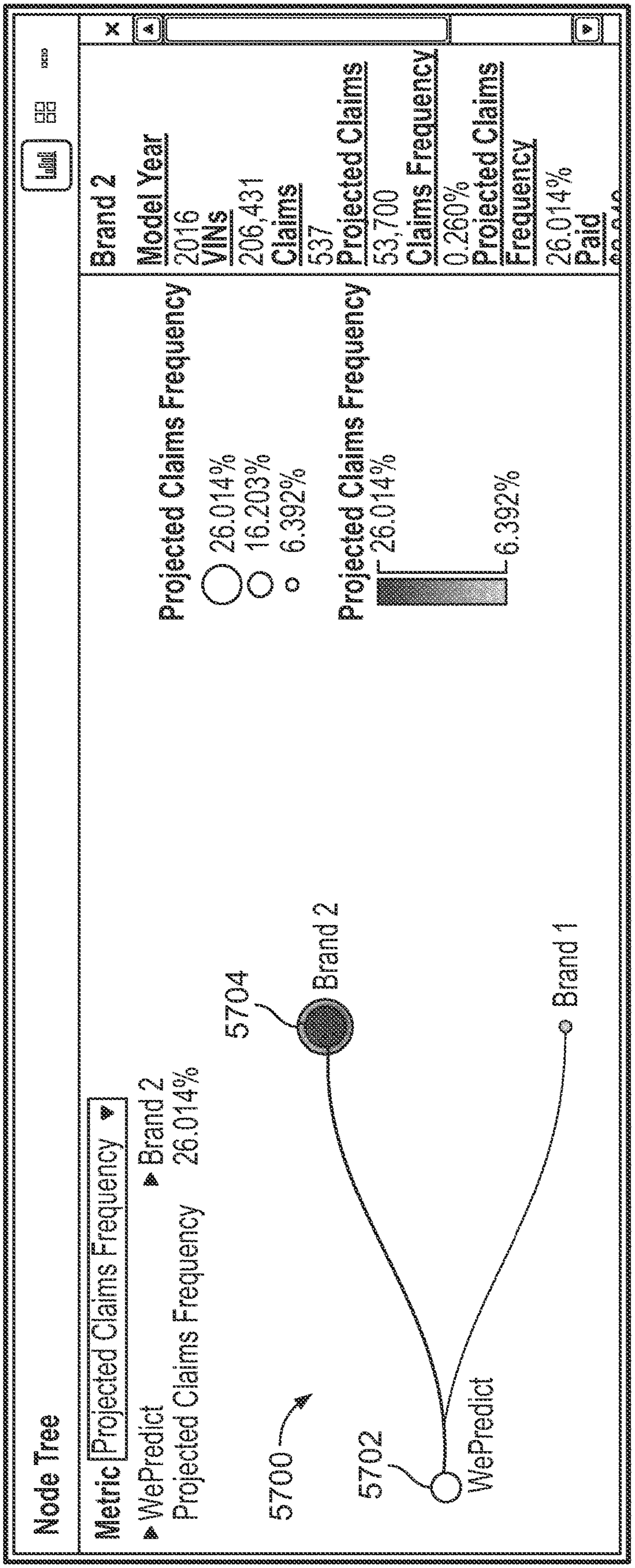

This shows a comparison of the forecast on all Brands and is presented within a Node tree 5700, as illustrated in FIG. 49. The structure of the node tree 5700 is described in further detail below with reference to FIG. 57, and further examples are given in section 17. The node tree 5700 in FIG. 49 is shown in a first state, representing only the manufacturer-brand part of the inter-page manufacturer-brand-product-carline hierarchy, to reflect the point in the inter-page hierarch at which the current page (brand page) sits.

Figure 50:
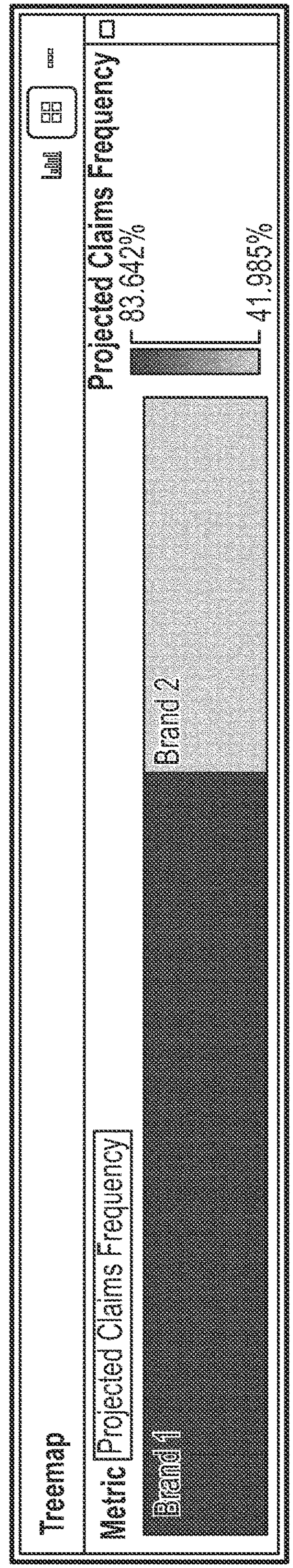

Toggled behind the Node Tree is also a Treemap comparing the Brands against each other, as illustrated in FIG. 50. That is, the user can switch between the node tree and the tree map via the UI.

In both node trees and tree maps, each predicted value in question is represented by a visual representation having a size (i.e. occupying an area of the display) that depends on the value it represents (C/CPU/D/DPU). In particular, the size of each visual representation increases as a function of the value itself.

6.2.2 Projections Pareto Grid (Dynamic Grid)

Figures 51, 52:
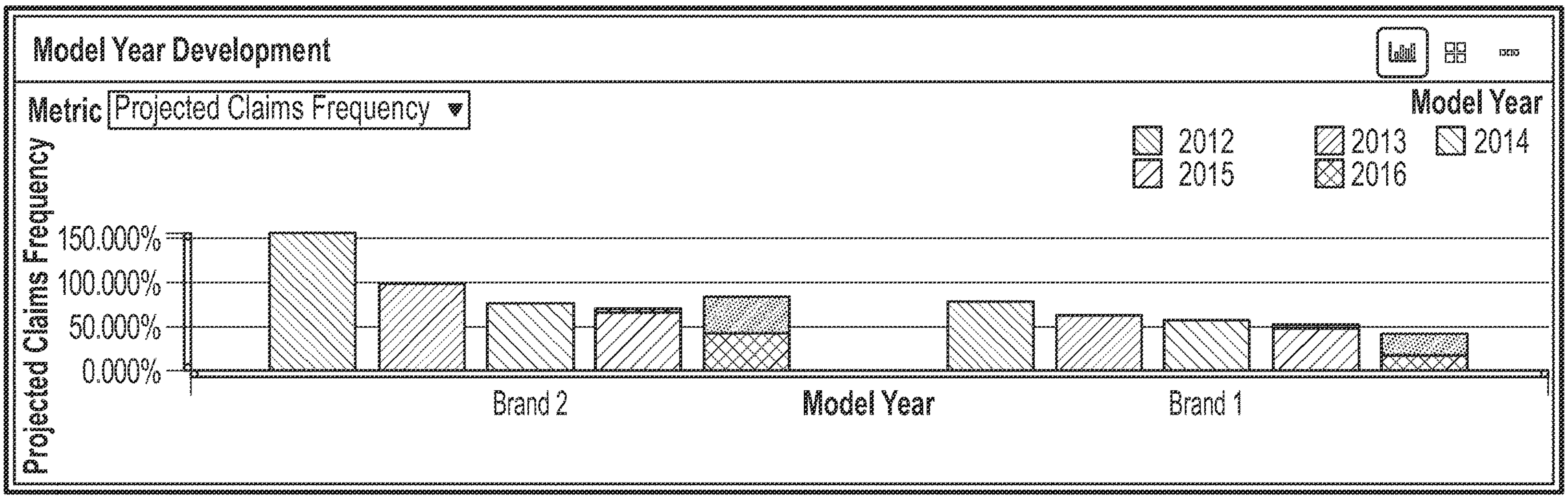

The Brand forecasts are also shown within a dynamic data grid, as illustrated in FIG. 51. Examples of Dynamic grids are described later in section 17.

6.2.3 Grouped Model Year Development

This shows the development of the Brand forecasts across Model Years.

The data is shown in a grouped stacked column chart, showing the relationship between current and forecasted performance for each Model Year, as illustrated in FIG. 52.

6.3 Products Page

This page shows whole Product forecasts.

Filter: The data shown on this page can be filtered by the user. The fields which can be filtered are:

| Multi Select | Single Select |
|---|---|
| Brand<br>Product | Model Year[2]<br>Projection Length |

Navigation: The user can navigate to either the Canines Overview (see 6.4) the Ultimate Product Report (see section 11) or the Products Detail (see 7.3).

The selected Product, Model Year and Projection Months are passed as parameters.

Reporting Objects: This page contains three reporting objects which display a comparison of Product forecasts against each other for the chosen Model Year and Projection Length.

6.3.1 Projections Node Tree

Figure 53:
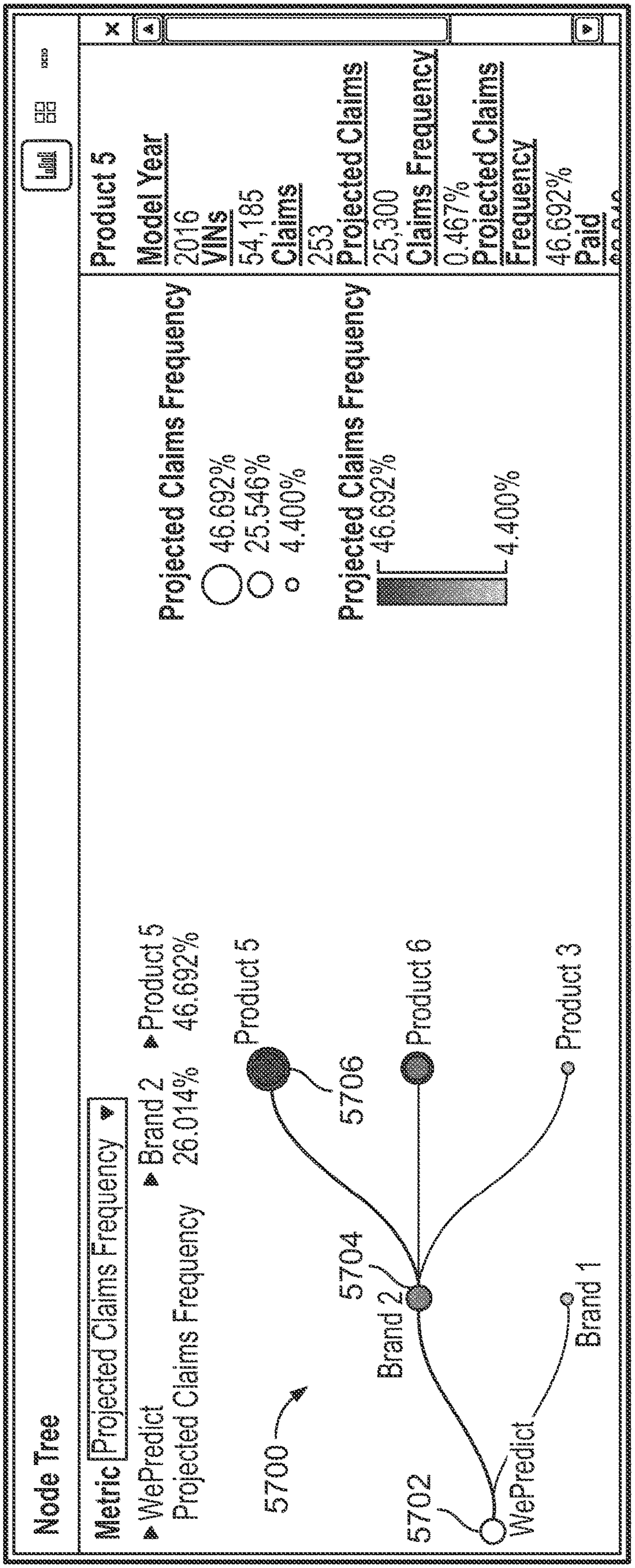

This shows a comparison of the forecast on all Products nested beneath all of the Brands and is presented within the Node Tree 5700, as illustrated in FIG. 53. The node tree 5700 in FIG. 53 is shown in a second state, representing only the manufacturer-brand-product part of the manufacturer-brand-product-carline hierarchy.

Figure 54:
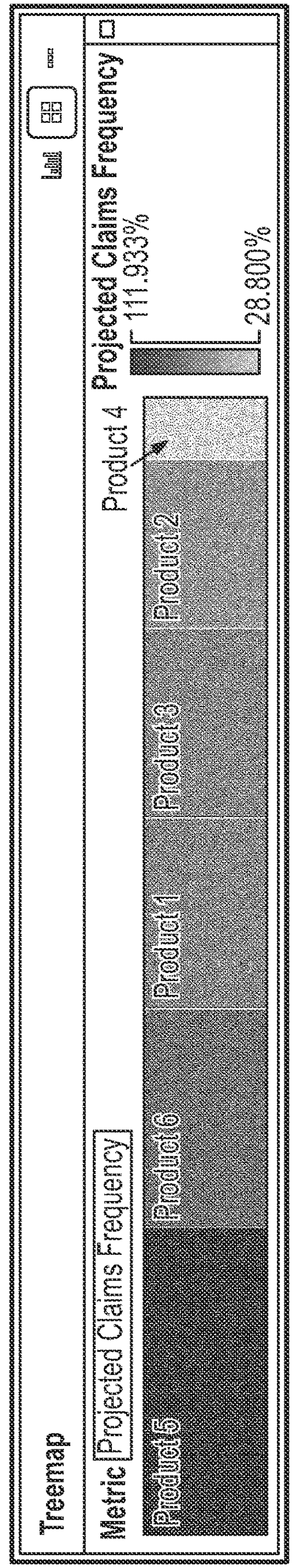

Toggled behind the Node Tree is also a Treemap comparing Products against each other independent of the Brands, as illustrated in FIG. 54.

6.3.2 Projections Pareto Grid

Figures 55, 56:
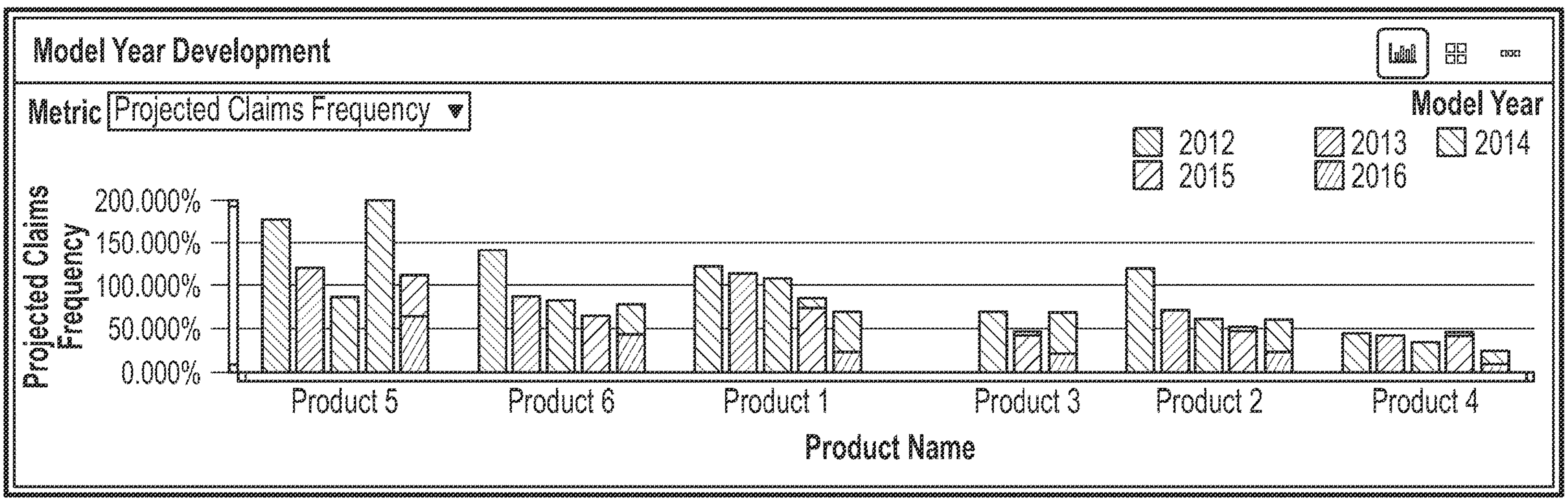

The Product forecasts are also shown within a data grid, as illustrated in FIG. 55.

6.3.3 Grouped Model Year Development

This shows the development of the Product forecasts across Model Years.

The data is shown in a grouped stacked column chart, showing the relationship between current and forecasted performance for each Model Year, as illustrated in FIG. 56.

6.4 Carlines Page

This page shows whole Carline forecasts.

Filter: The data shown on this page can be filtered by the user. The fields which can be filtered are:

| Multi Select | Single Select |
|---|---|
| Brand<br>Product<br>Carline | Model Year[3]<br>Projection Length |

Navigation: The user can navigate to either the Ultimate Variant Report (see section 9) or the Carlines Detail (see 7.4).

The selected Carline, Model Year and Projection Months are passed as parameters.

Reporting Objects: This page contains three reporting objects which display a comparison of Carline forecasts against each other for the chosen Model Year and Projection Length.

6.4.1 Projections Node Tree

Figure 57:
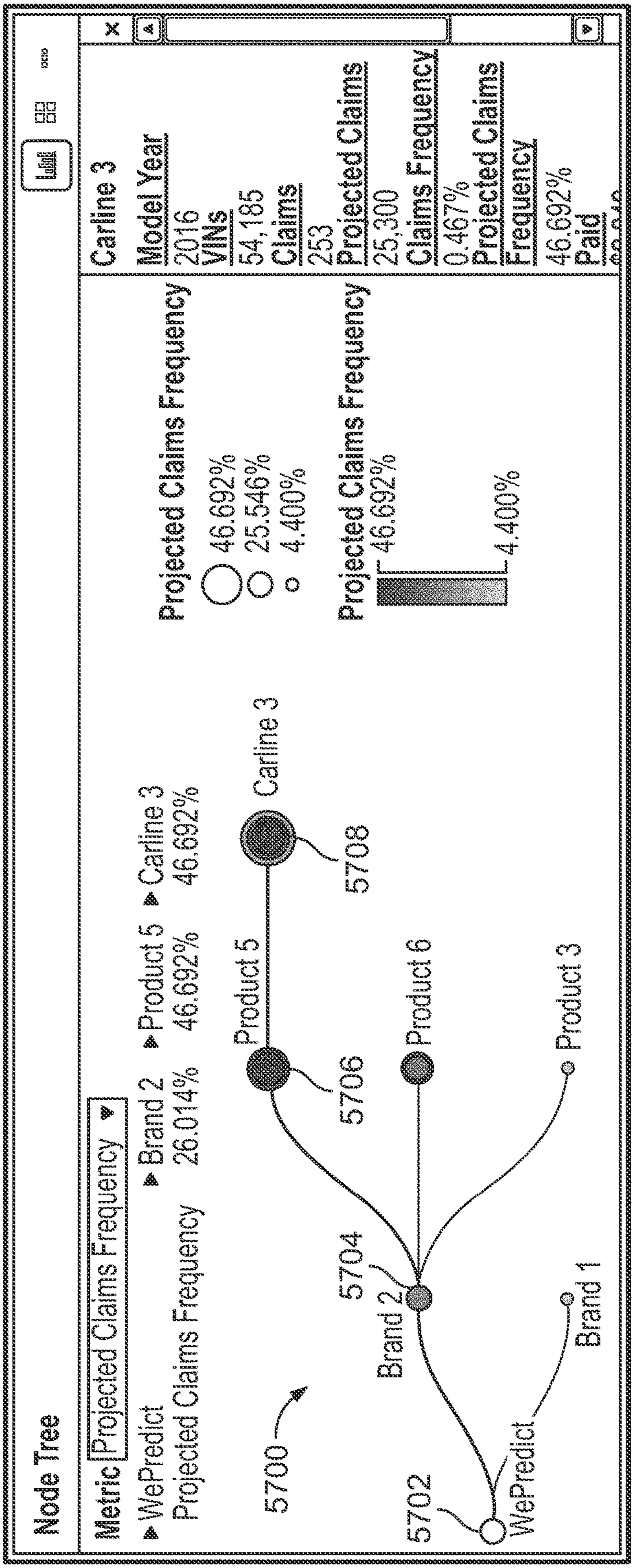

This shows a comparison of the forecast on all Carlines nested beneath all of the Brands and Products and is presented within a Node Tree 5700, as illustrated in FIG. 57.

On the Carlines page, node tree 5700 has one or more nodes for every level of the Manufacturer→Brand→Product→Carline hierarchy, arranged hierarchically. That is, each child node of a manufacture node 5702 is a brand node 5704 representing a particular brand of that manufacturer; each child node of a brand node 5704 is a product node 5706 representing a product within that brand; and each child node of a product node 5706 is a carline node 5708 representing a particular carline within that product. As noted, the size of each node varies as a function of the metric (C, CPU, D, DPU) for the entity in the hierarchy that it corresponds to (manufacturer, brand, product, carline). For pages higher up the hierarchy, the node tree only extends to that point in the hierarchy, as can be seen in FIGS. 53 and 49. The description also pertains equally to other inter-page hierarchies, including those described below with reference to FIGS. 61, 65, 69, 81 and 97.

Figure 58:
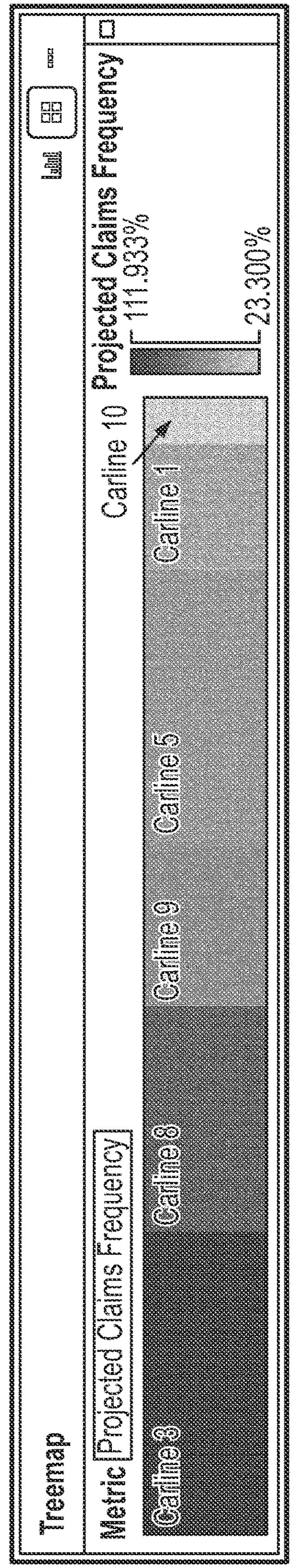

Toggled behind the Node Tree is also a Treemap comparing the Carlines against each other independent of the Brand and Product hierarchy, as illustrated in FIG. 58.

6.4.2 Projections Pareto Grid

Figures 59, 60:
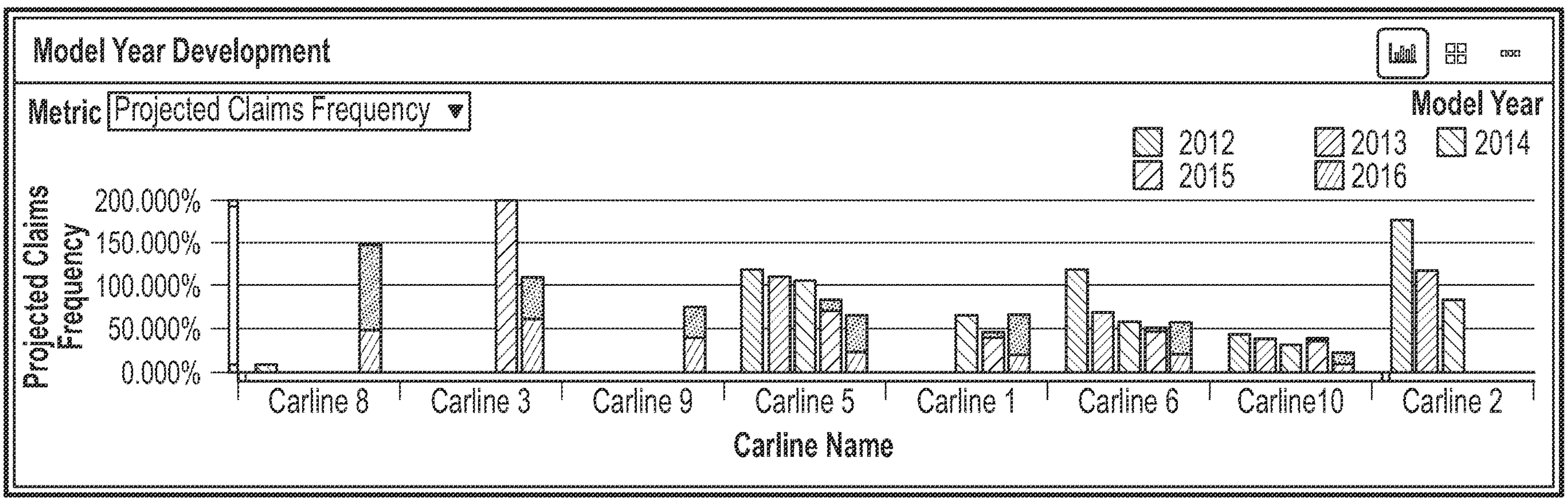

The Carline forecasts are also shown within a data grid, as illustrated in FIG. 59.

6.4.3 Grouped Model Year Development

This shows the development of the Carline forecasts across Model Years.

The data is shown in a grouped stacked column chart, showing the relationship between current and forecasted performance for each Model Year, as illustrated in FIG. 60.

6.5 Engines Page

This page shows whole Engine forecasts.

Filter: The data shown on this page can be filtered by the user. The fields which can be filtered are:

| Multi Select | Single Select |
|---|---|
| Engine | Model Year[4]<br>Projection Length |

Navigation: The user can navigate to either the Engine-Products Overview (see 6.6), the Engine-Carlines Overview (see 6.7), the Ultimate Variant Report (see section 9) or the Engines Detail (see 7.5).

The selected Engine, Model Year and Projection Months are passed as parameters.

Reporting Objects: This page contains three reporting objects which display a comparison of Engine forecasts against each other for the chosen Model Year and Projection Length.

6.5.1 Projections Node Tree

Figure 61:
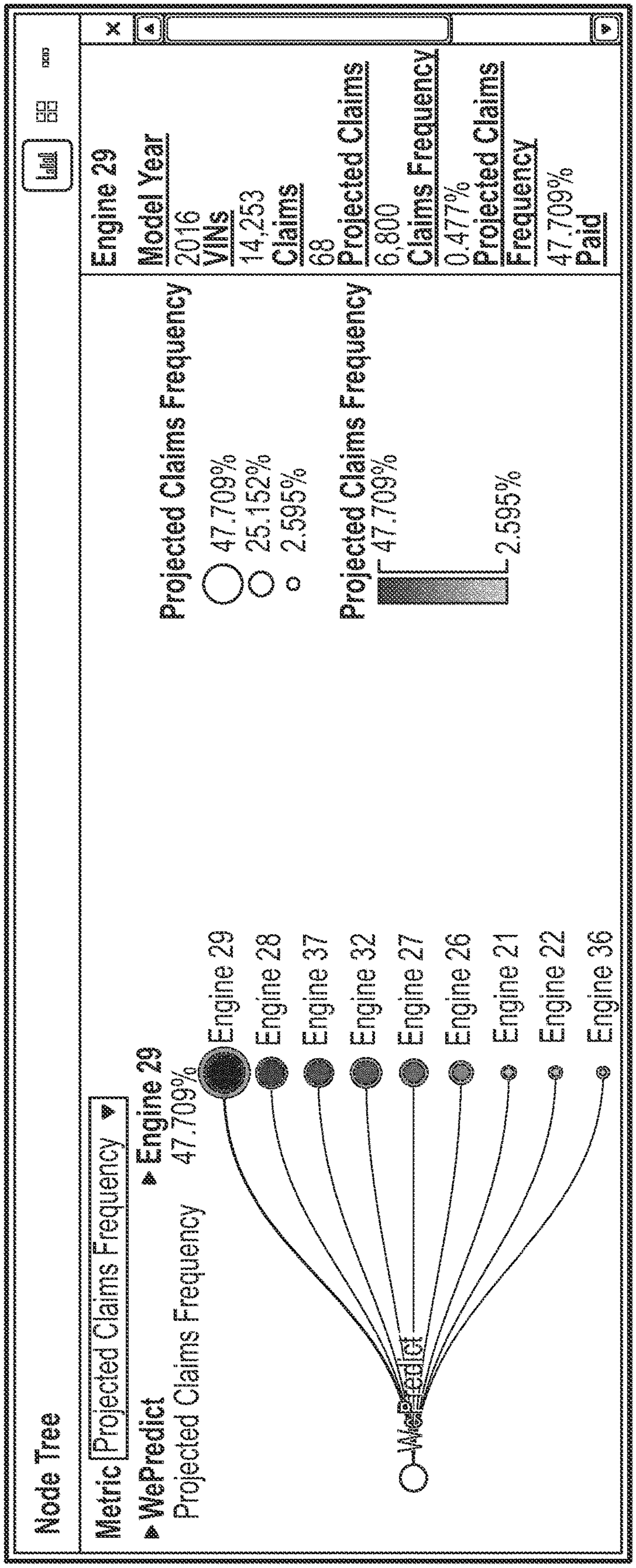

This shows a comparison of the forecast on all Engines and is presented within a Node Tree, as illustrated in FIG. 61.

Figure 62:
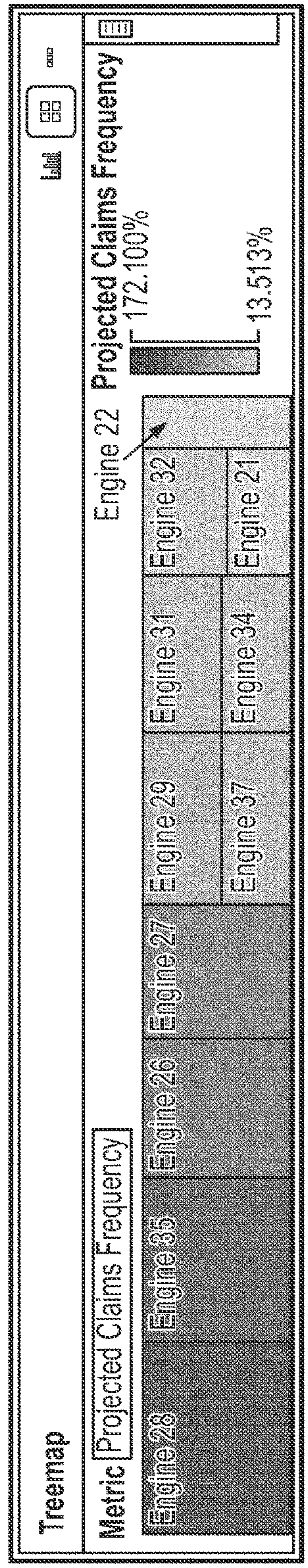

Toggled behind the Node Tree is also a Treemap comparing Engines against each other, as illustrated in FIG. 62.

6.5.2 Projections Pareto Grid

Figures 63, 64:
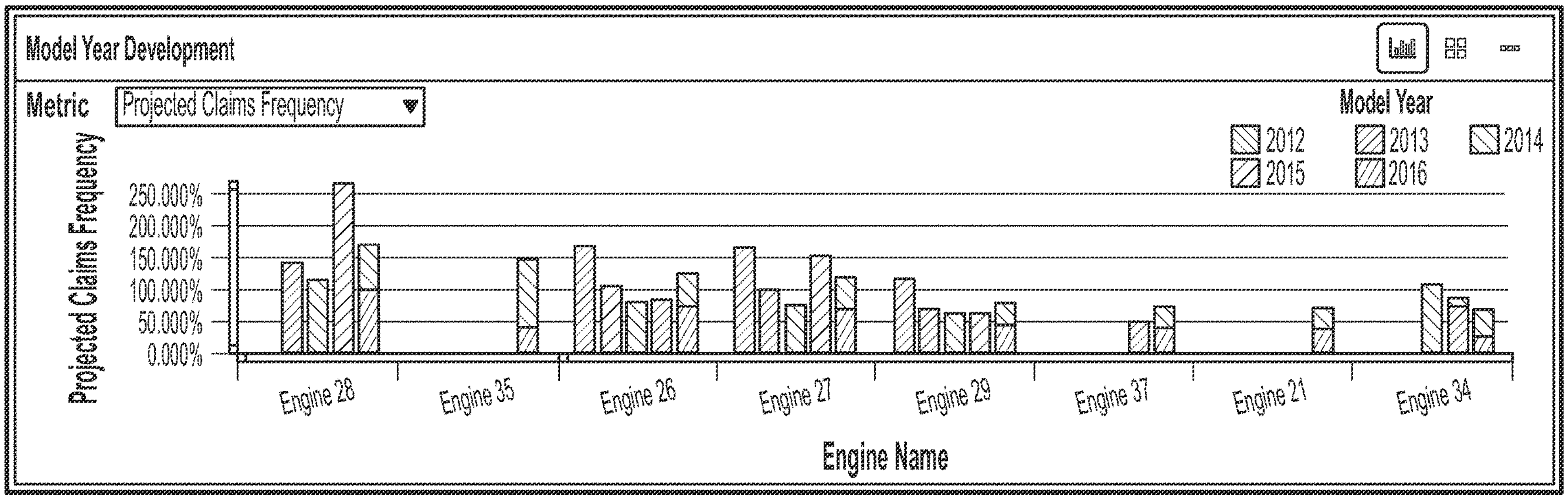

The Engine forecasts are also shown within a data grid, as illustrated in FIG. 63.

6.5.3 Grouped Model Year Development

This shows the development of the Engine forecasts across Model Years.

The data is shown in a grouped stacked column chart, showing the relationship between current and forecasted performance for each Model Year, as illustrated in FIG. 64.

6.6 Engine-Products Page

This page shows whole Engine-Product forecasts.

Filter: The data shown on this page can be filtered by the user. The fields which can be filtered are:

| Multi Select | Single Select |
|---|---|
| Engine<br>Brand<br>Product | Model Year[5]<br>Projection Length |

Navigation: The user can navigate to either the Engine-Carlines Overview (see 6.7) or the Engine-Products Detail (see 7.6).

The selected Engine, Product, Model Year and Projection Months are passed as parameters.

Reporting Objects: This page contains three reporting objects which display a comparison of Engine-Product forecasts against each other for the chosen Model Year and Projection Length.

6.6.1 Projections Node Tree

Figure 65:
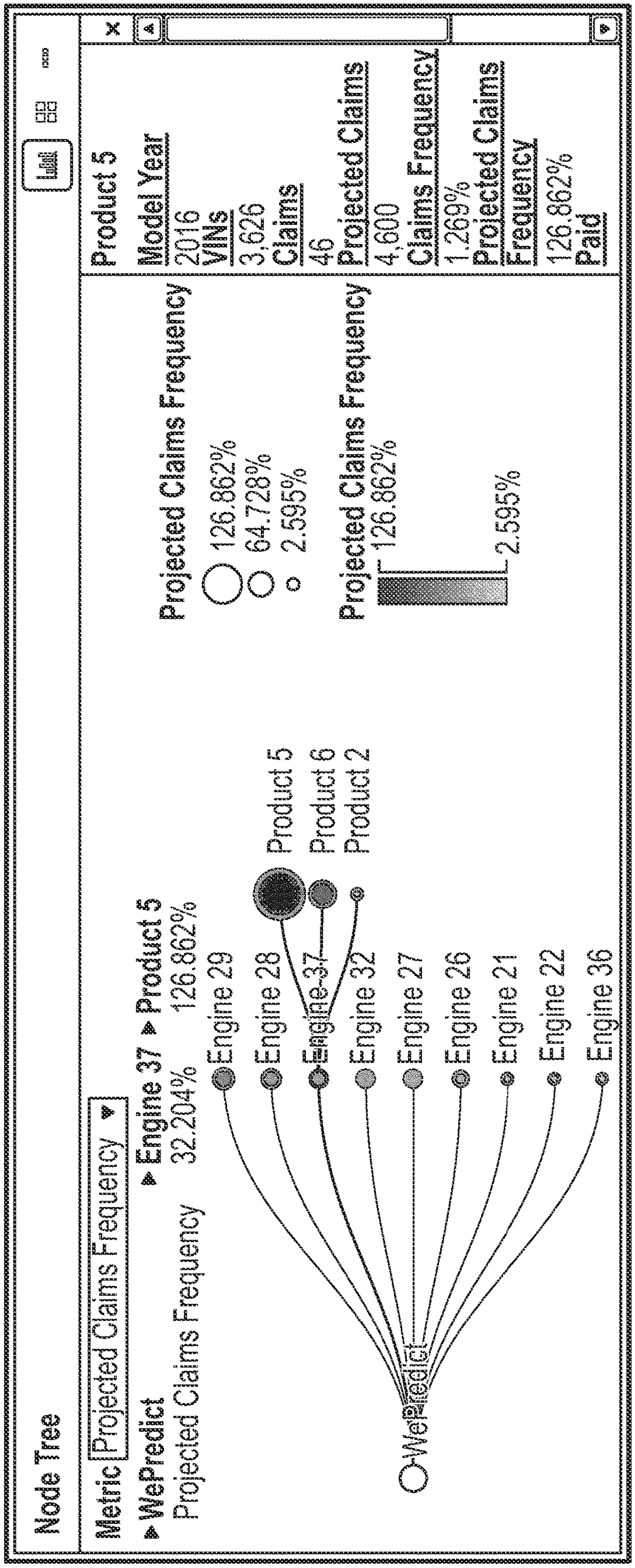

This shows a comparison of the forecast on all Products nested beneath each Engine they have fitted to them and is presented within a Node Tree, as illustrated in FIG. 65.

Figure 69:
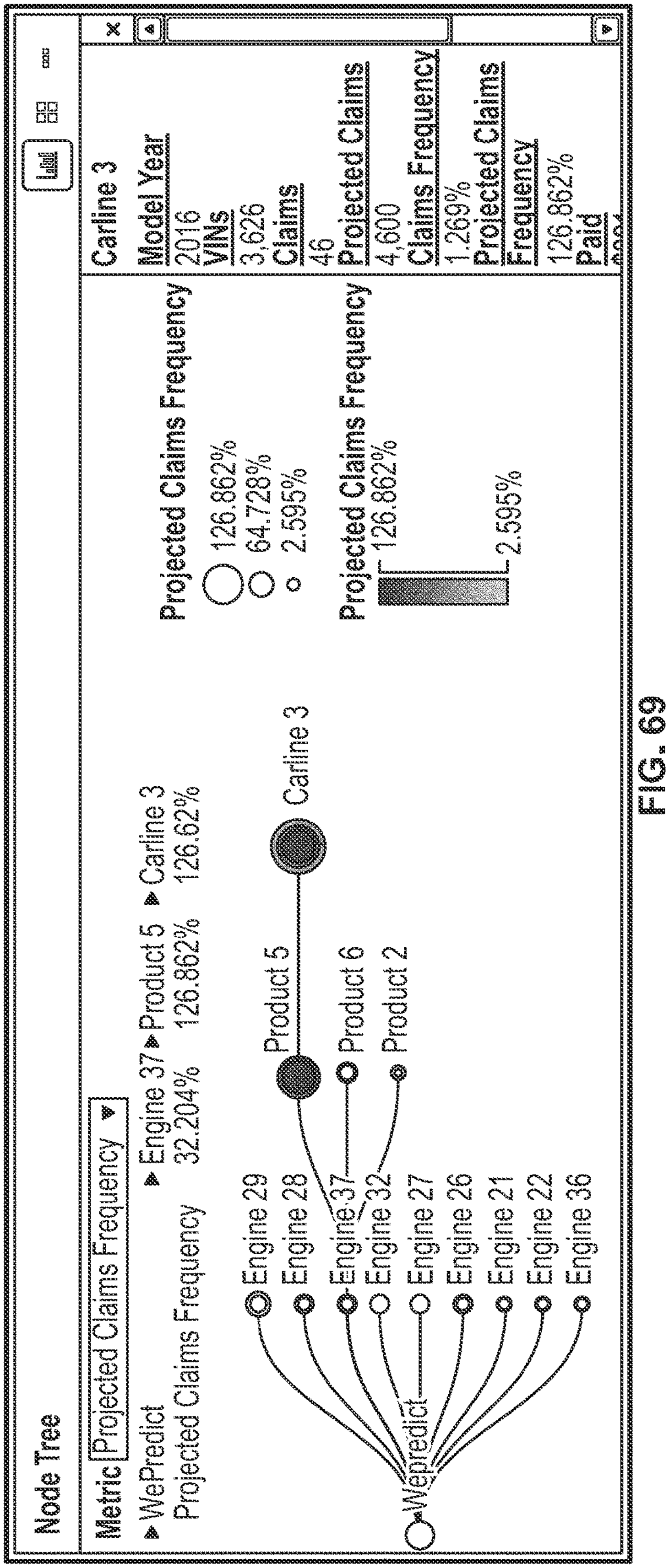

The node tree of FIG. 69 corresponds

Figure 66:
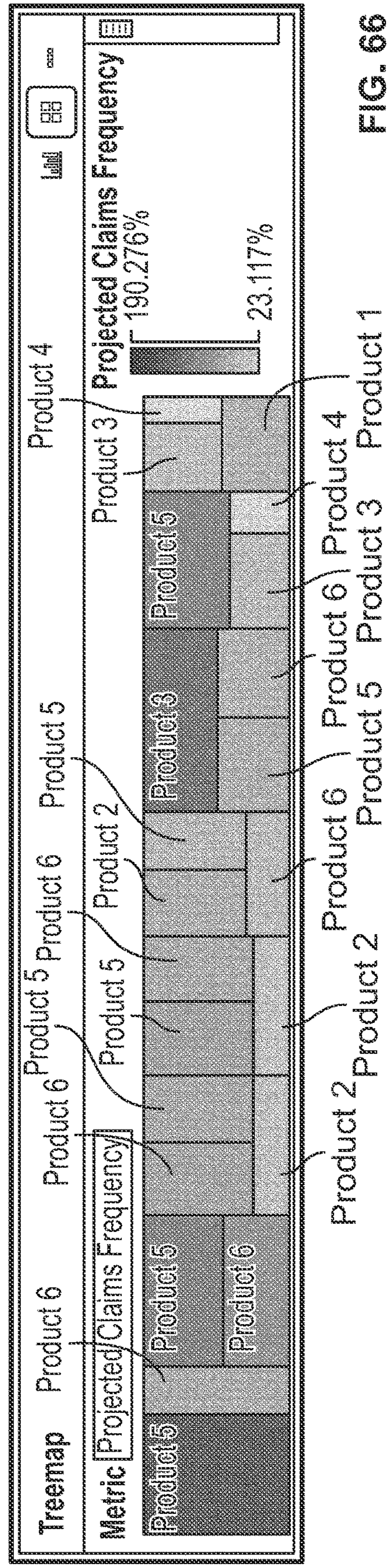

Toggled behind the Node Tree is also a Treemap comparing the Products against each other, grouped within Engines, as illustrated in FIG. 66.

6.6.2 Projections Pareto Grid

Figures 67, 68:
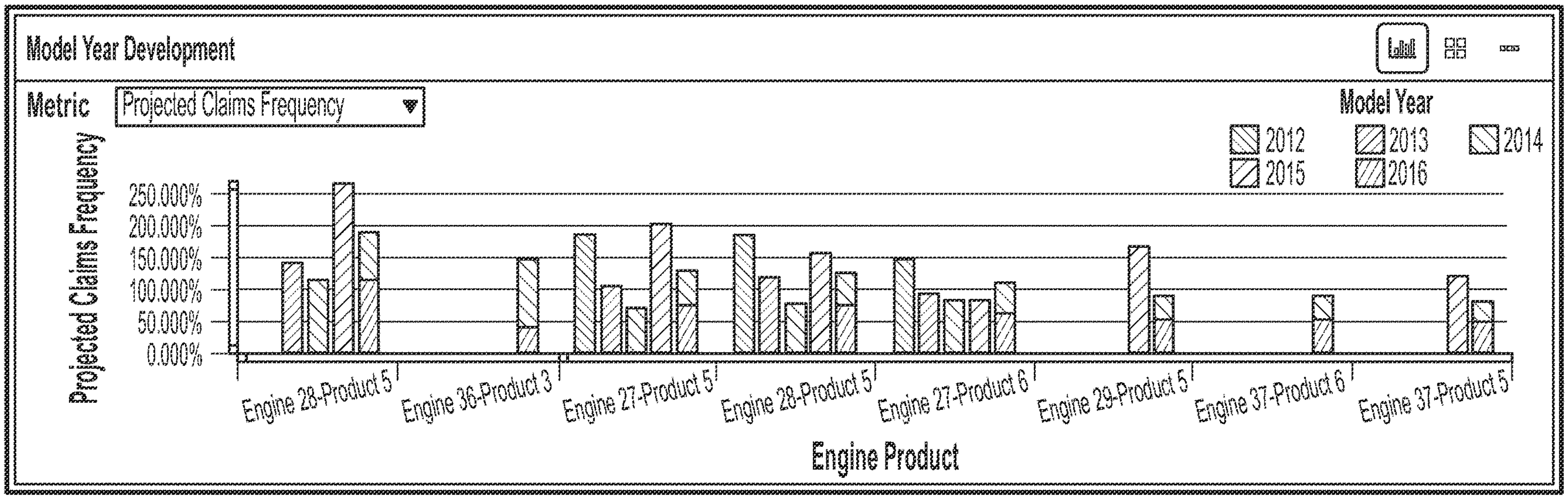

The Engine-Product forecasts are also shown within a data grid, as illustrated in FIG. 67.

6.6.3 Grouped Model Year Development

This shows the development of the Engine-Product forecasts across Model Years.

The data is shown in a grouped stacked column chart, showing the relationship between current and forecasted performance for each Model Year, as illustrated in FIG. 68.

6.7 Engine-Carlines Page

This page shows whole Engine-Carline forecasts.

Filter: The data shown on this page can be filtered by the user. The fields which can be filtered are:

| Multi Select | Single Select |
|---|---|
| Engine<br>Brand<br>Product<br>Carline | Model Year[6]<br>Projection Length |

Navigation: The user can navigate to either the Ultimate Variant Report (see section 9) or the Engine-Carlines Detail (see 7.7).

The selected Engine, Carline, Model Year and Projection Months are passed as parameters.

Reporting Objects: This page contains three reporting objects which display a comparison of Engine-Carline forecasts against each other for the chosen Model Year and Projection Length.

6.7.1 Projections Node Tree

This shows a comparison of the forecast on all Carlines nested beneath each Engine they have fitted to them and the Product they sit within. This is presented within a Node Tree, as illustrated in FIG. 69.

Figure 70:
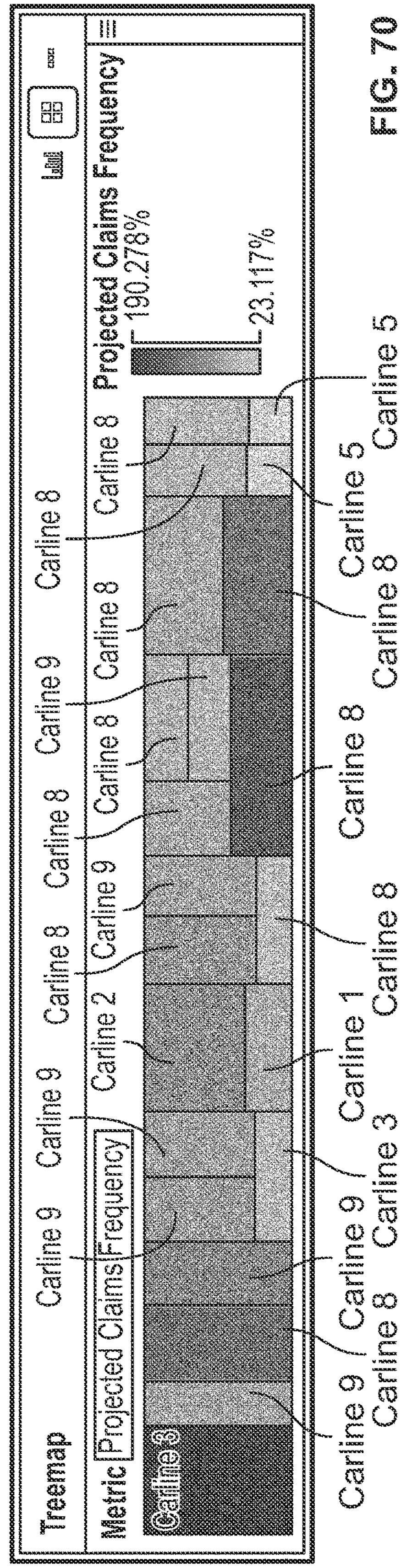

Toggled behind the Node Tree is also a Treemap comparing the Carlines against each other, grouped within Engines, as illustrated in FIG. 70.

6.7.2 Projections Pareto Grid

Figures 71, 72:
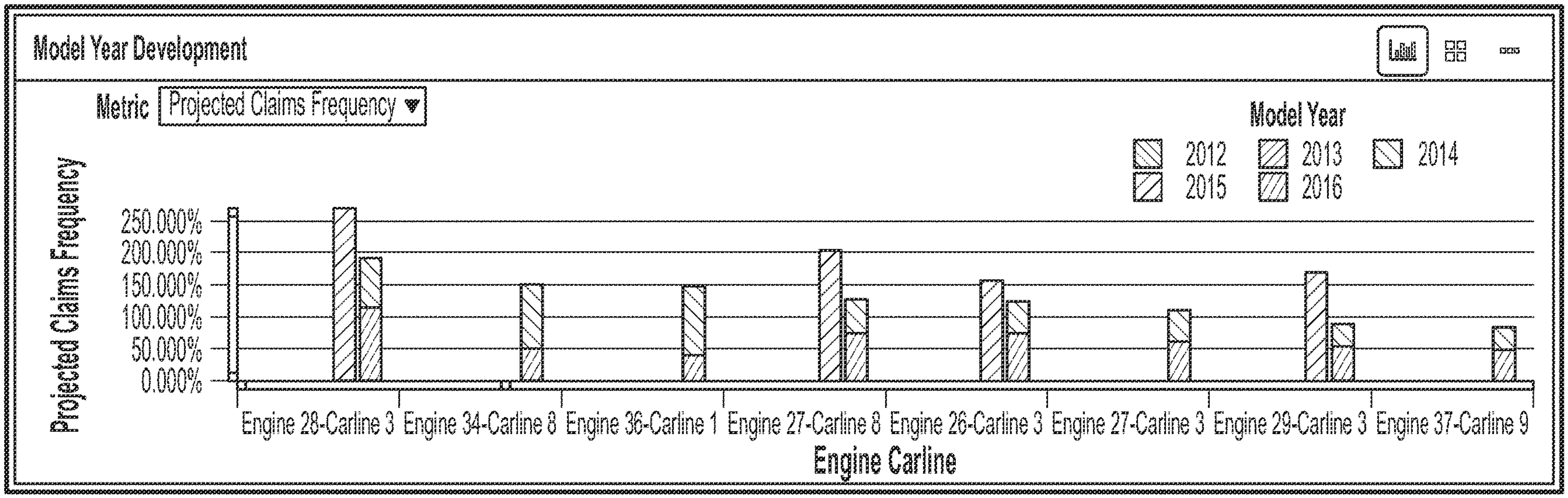

The Engine-Carline forecasts are also shown within a data grid, as illustrated in FIG. 71.

6.7.3 Grouped Model Year Development

This shows the development of the Engine-Carline forecasts across Model Years.

The data is shown in a grouped stacked column chart, showing the relationship between current and forecasted performance for each Model Year, as illustrated in FIG. 72.

Section 7: Forecasting—Detail

This reporting track contains seven pages which display forecasts at a Labour Operation level.

Each page shows Labour Operation forecasts at a single aggregation level from the following hierarchies:

Manufacturer→Brand→Product→Carline

Engine→Engine-Product→Engine-Carline 7.1 Manufacturer Page

This page shows Labour Operation forecasts at a Manufacturer level.

Filter: The data shown on this page can be filtered by the user. The fields which can be filtered are:

| Multi Select | Single Select |
|---|---|
| Category<br>Labour Operation | Model Year[7]<br>Projection Length[8] |

Navigation: The user can navigate to the Brands Detail Report once they have selected a forecast.

The user can navigate to the Products Detail Report once they have selected a forecast.

The selected Labour Operation, Model Year and Projection Months are passed as parameters.

Reporting Objects: There are two parts to the page, the first contains the Manufacturer Labour Operation forecasts and the second shows context around the selected forecast.

When the user selects a forecast in the first part, the objects within the second part load data based on the users' selection.

The Projections Pareto Grid shows the forecasts and the Model Year Development and Stacked/Selected TIS objects show the context.

7.1.1 Projections Pareto Grid

The Manufacturer Labour Operation forecasts are shown in a data grid, as illustrated in FIG. 73.

7.1.2 Model Year Development

This shows a comparison of the forecast on the selected Manufacturer Labour Operation across each Model Year.

This is presented within a stacked column chart showing the relationship between current and forecasted performance for each Model Year, as illustrated in FIG. 48.

7.1.3 Stacked/Selected TIS

This shows Production Month, Time in Service (TIS) performance for the selected Labour Operation.

The data is displayed in two different ways, each of which has its own chart.

Figure 74:
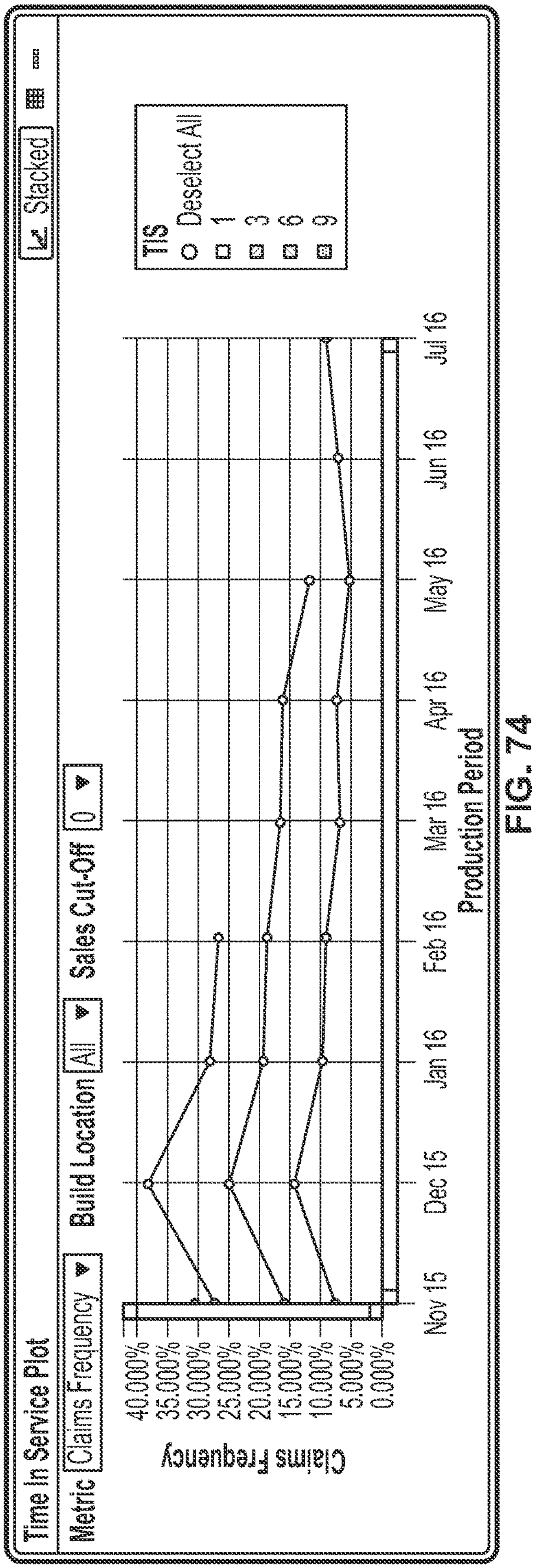

The Stacked TIS chart shows the performance of each TIS period for the selected Manufacturer Labour Operation, as illustrated in FIG. 74.

Figure 75:
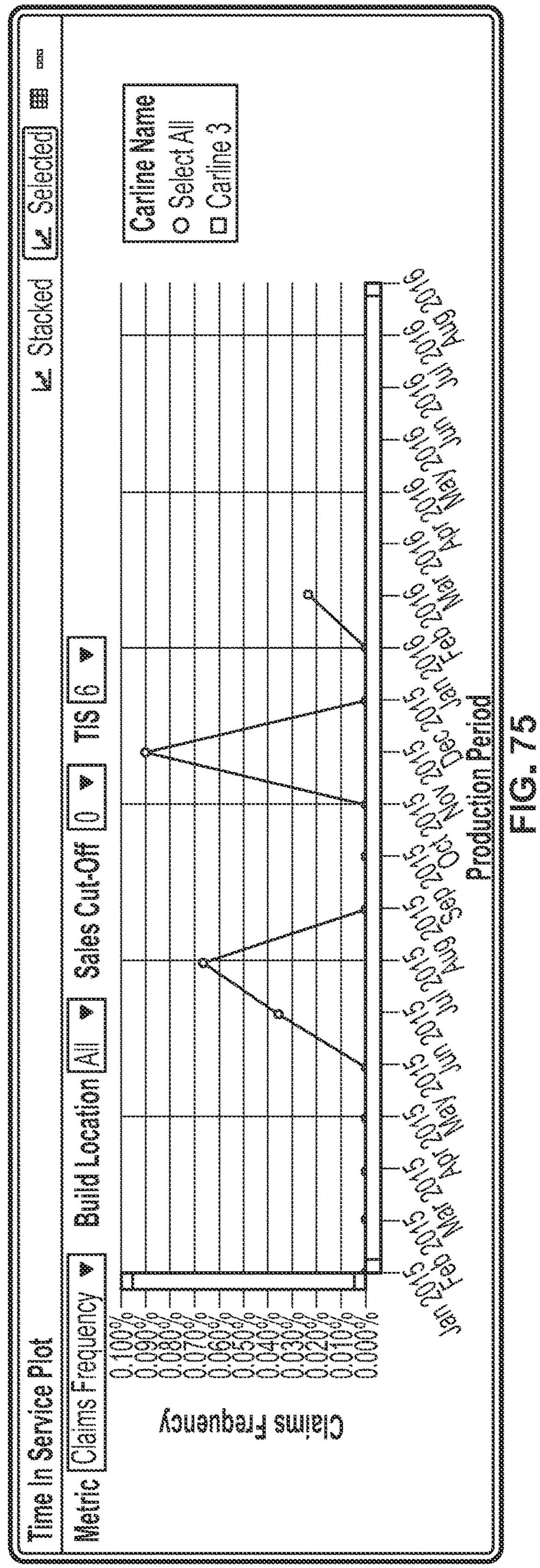

The Selected TIS chart shows the Manufacturer performance on the selected Labour Operation for a single selected TIS period, as illustrated in FIG. 75.

7.2 Brands Page

This page shows Labour Operation forecasts at a Brand level.

Filter: The data shown on this page can be filtered by the user. The fields which can be filtered are:

| Multi Select | Single Select |
|---|---|
| Brand<br>Category<br>Labour Operation | Model Year[9]<br>Projection Length[10] |

Navigation The user can navigate to the Ultimate Brand Report once they have selected a forecast.

The user can navigate to the Products Detail once they have selected a forecast.

The selected Brand, Labour Operation, Model Year and Projection Months are passed as parameters.

Reporting Objects: There are two parts to the page, the first contains the Brand Labour Operation forecasts and the second shows context around the selected forecast.

When the user selects a forecast in the first part, the objects within the second part load data based on the users' selection.

The Projections Pareto Grid shows the forecasts and the Projections Node Tree, Model Year Development and the Stacked/Selected TIS objects show the context.

7.2.1 Projections Pareto Grid

The Brand Labour Operation forecasts are shown in a data grid, as illustrated in FIG. 76.

7.2.2 Projections Node Tree

This shows comparisons of the forecast on the same Labour Operation across all other Brands is presented within a Node Tree, as illustrated in FIG. 49.

7.2.3 Model Year Development

This shows a comparison of the forecast on the selected Brand Labour Operation across each Model Year.

This is presented within a stacked column chart showing the relationship between current and forecasted performance for each Model Year, as illustrated in FIG. 48.

7.2.4 Stacked/Selected TIS

This shows Production Month, Time in Service (TIS) performance for the selected Labour Operation.

The data is displayed in two different ways, each of which has its own chart.

The Stacked TIS chart shows the performance of each TIS period for the selected Brand and Labour Operation, as illustrated in FIG. 74.

Figure 77:
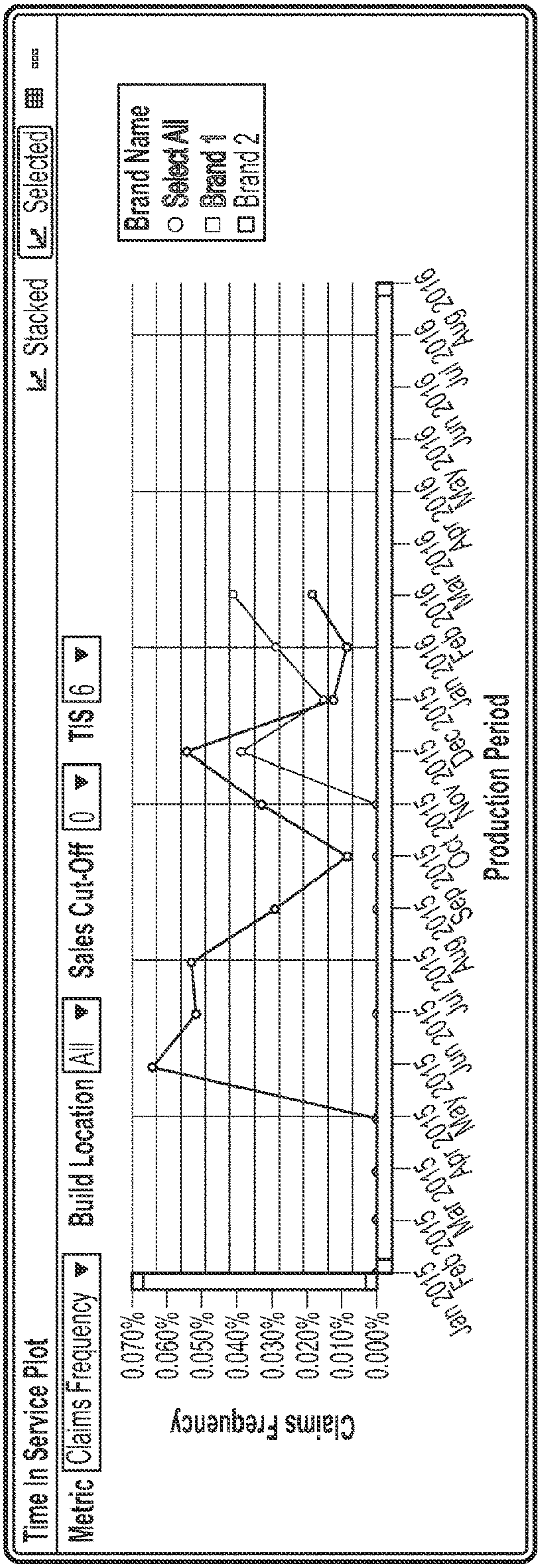

The Selected TIS chart shows a comparison of all Brands on the selected Labour Operation for a single selected TIS period, as illustrated in FIG. 77.

7.3 Products Page

This page shows Labour Operation forecasts at a Product level.

Filter: The data shown on this page can be filtered by the user. The fields which can be filtered are:

| Multi Select | Single Select |
|---|---|
| Brand<br>Product<br>Category<br>Labour Operation | Model Year[11]<br>Projection Length[12] |

Navigation: The user can navigate to the Ultimate Product Report (see section 11) once they have selected a forecast.

The user can navigate to the Carlines Detail (see 7.4) once they have selected a forecast.

The selected Product, Labour Operation, Model Year and Projection Months are passed as parameters.

Reporting Objects: There are two parts to the page, the first contains the Product Labour Operation forecasts and the second shows context around the selected forecast.

When the user selects a forecast in the first part, the objects within the second part load data based on the users' selection.

The Projections Pareto Grid shows the forecasts and the Projections Node Tree, Model Year Development and the Stacked/Selected TIS objects show the context.

7.3.1 Projections Pareto Grid

The Product Labour Operation forecasts are shown in a data grid, as illustrated in FIG. 78.

7.3.2 Projections Node Tree

This shows comparisons of the forecast on the same Labour Operation across all other Brands and Products is presented within a Node Tree, as illustrated in FIG. 53.

7.3.3 Model Year Development

This shows a comparison of the forecast on the selected Product Labour Operation across each Model Year.

This is presented within a stacked column chart showing the relationship between current and forecasted performance for each Model Year, as illustrated in FIG. 48.

7.3.4 Stacked/Selected TIS

This shows Production Month, Time in Service (TIS) performance for the selected Labour Operation.

The data is displayed in two different ways, each of which has its own chart.

The Stacked TIS chart shows the performance of each TIS period for the selected Product and Labour Operation, as illustrated in FIG. 74.

Figure 79:
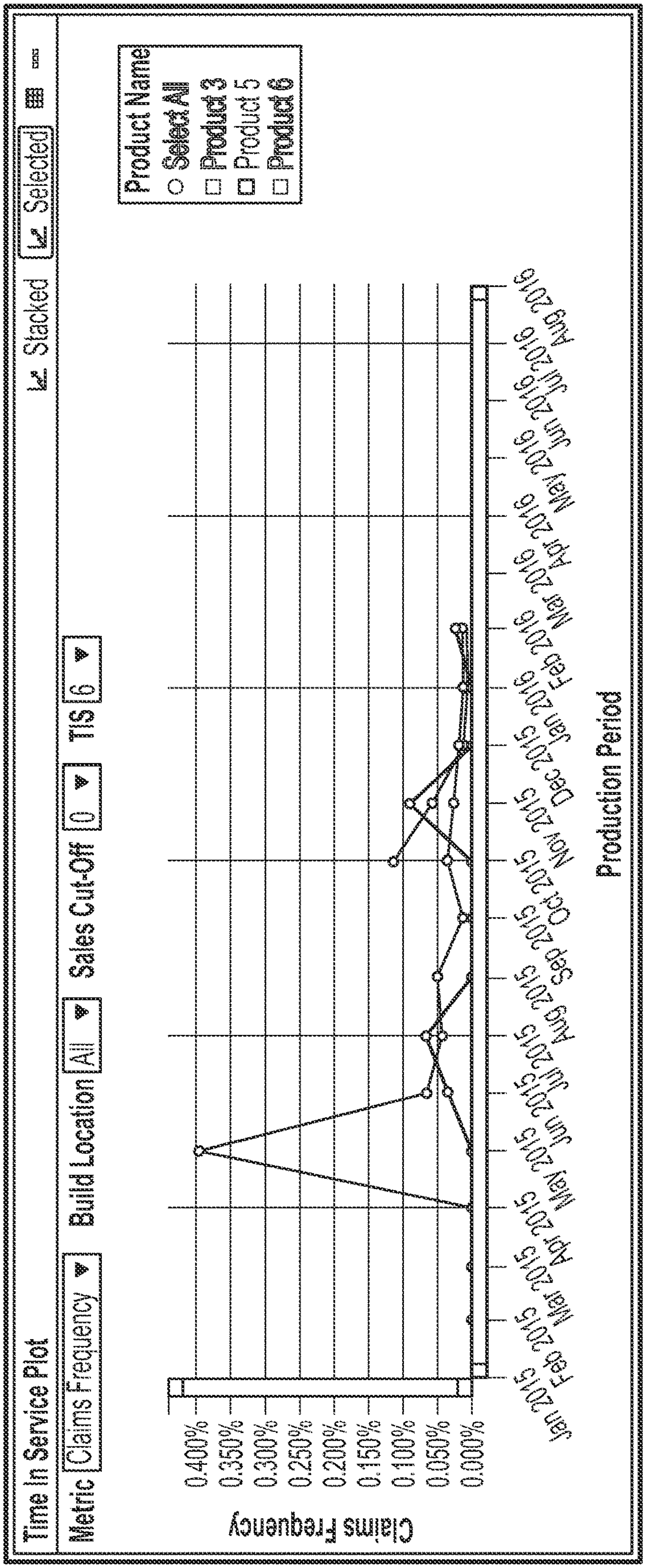

The Selected TIS chart shows a comparison of all Products on the selected Labour Operation for a single selected TIS period, as illustrated in FIG. 79.

7.4 Carlines Page

This page shows Labour Operation forecasts at a Carline level.

Filter: The data shown on this page can be filtered by the user. The fields which can be filtered are:

| Multi Select | Single Select |
|---|---|
| Brand<br>Product<br>Carline<br>Category<br>Labour Operation | Model Year[13]<br>Projection Length[14] |

Navigation: The user can navigate to the Ultimate Labour Operation Report once they have selected a forecast.

The selected Carline, Labour Operation, Model Year and Projection Months are passed as parameters.

Reporting Objects: There are two parts to the page, the first contains the Carline Labour Operation forecasts and the second shows context around the selected forecast.

When the user selects a forecast in the first part, the objects within the second part load data based on the users' selection.

The Projections Pareto Grid shows the forecasts and the Projections Node Tree, Model Year Development, Projections Node Tree (Engine/Transmission) and the Stacked/Selected TIS objects show the context.

7.4.1 Projections Pareto Grid

The Carline Labour Operation forecasts are shown in a data grid, as illustrated in FIG. 80.

7.4.2 Projections Node Tree

This shows comparisons of the forecast on the same Labour Operation across all other Brands, Products and Carlines and is presented within a Node Tree, as illustrated in FIG. 57.

7.4.3 Model Year Development

This shows a comparison of the forecast on the selected Carline Labour Operation across each Model Year.

This is presented within a stacked column chart showing the relationship between current and forecasted performance for each Model Year, as illustrated in FIG. 48.

7.4.4 Projections Node Tree (Engine/Transmission)

This shows comparisons of forecast on the selected Carline Labour Operation with forecasts on different combinations and permutations of Engines and Transmissions fitted to that Carline.

Figure 81:
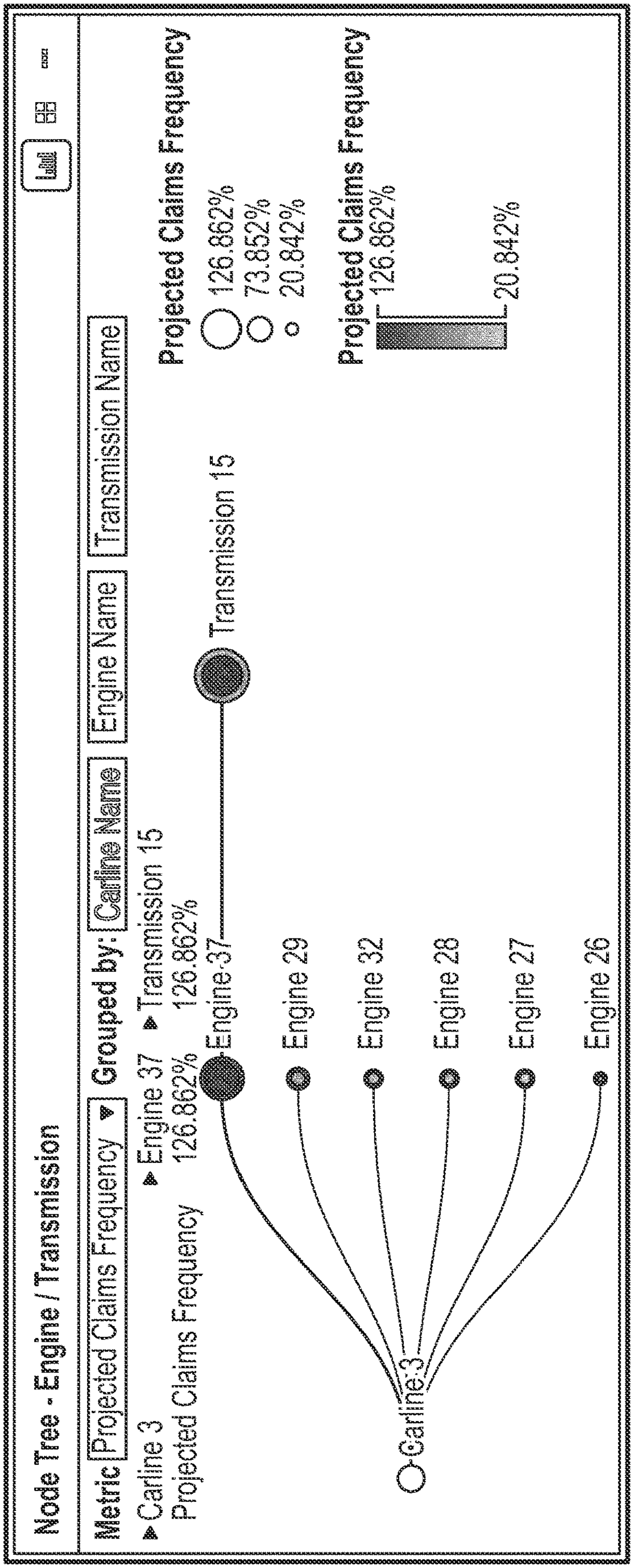

This is presented within a second Node Tree, as illustrated in FIG. 81.

7.4.5 Stacked/Selected TIS

This shows Production Month, Time in Service (TIS) performance for the selected Labour Operation.

The data is displayed in two different ways, each of which has its own chart.

The Stacked TIS chart shows the performance of each TIS period for the selected Carline and Labour Operation, as illustrated in FIG. 74.

Figure 82:
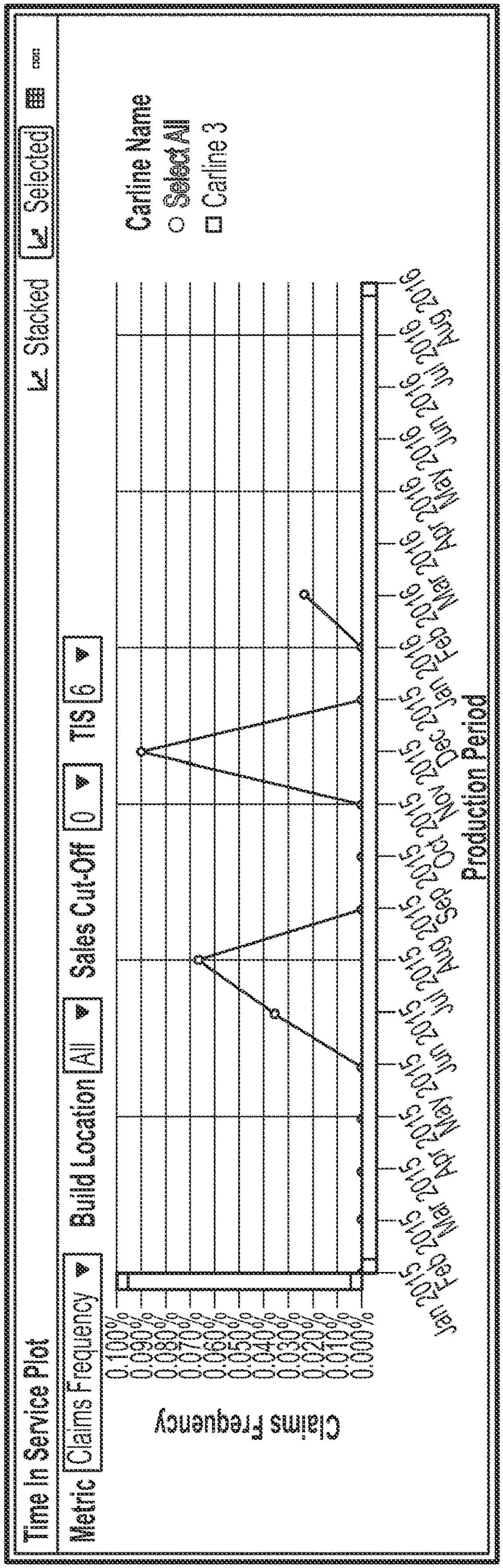

The Selected TIS chart shows a comparison of all Carlines on the selected Labour Operation for a single selected TIS period, as illustrated in FIG. 82.

7.5 Engines Page

This page shows Labour Operation forecasts at an Engine level.

Filter: The data shown on this page can be filtered by the user. The fields which can be filtered are:

| Multi Select | Single Select |
|---|---|
| Engine<br>Category<br>Labour Operation | Model Year[15]<br>Projection Length[16] |

Navigation: The user can navigate to the Ultimate Labour Operation Report once they have selected a forecast.

The user can navigate to the Engine-Product Detail Report once they have selected a forecast.

The user can navigate to the Engine-Carline Detail Report once they have selected a forecast.

The selected Engine, Labour Operation, Model Year and Projection Months are passed as parameters.

Reporting Objects: There are two parts to the page, the first contains the Engine Labour Operation forecasts and the second shows context around the selected forecast.

When the user selects a forecast in the first part, the objects within the second part load data based on the users' selection.

The Projections Pareto Grid shows the forecasts and the Projections Node Tree, Model Year Development and the Stacked/Selected TIS objects show the context.

7.5.1 Projections Pareto Grid

The Engine Labour Operation forecasts are shown in a data grid, as illustrated in FIG. 83.

7.5.2 Projections Node Tree

This shows comparisons of the forecast on the same Labour Operation across all other Engines is presented within a Node Tree, as illustrated in FIG. 61.

7.5.3 Model Year Development

This shows a comparison of the forecast on the selected Engine Labour Operation across each Model Year.

This is presented within a stacked column chart showing the relationship between current and forecasted performance for each Model Year, as illustrated in FIG. 48.

7.5.4 Stacked/Selected TIS

This shows Production Month, Time in Service (TIS) performance for the selected Labour Operation.

The data is displayed in two different ways, each of which has its own chart.

The Stacked TIS chart shows the performance of each TIS period for the selected Engine and Labour Operation, as illustrated in FIG. 74.

Figure 84:
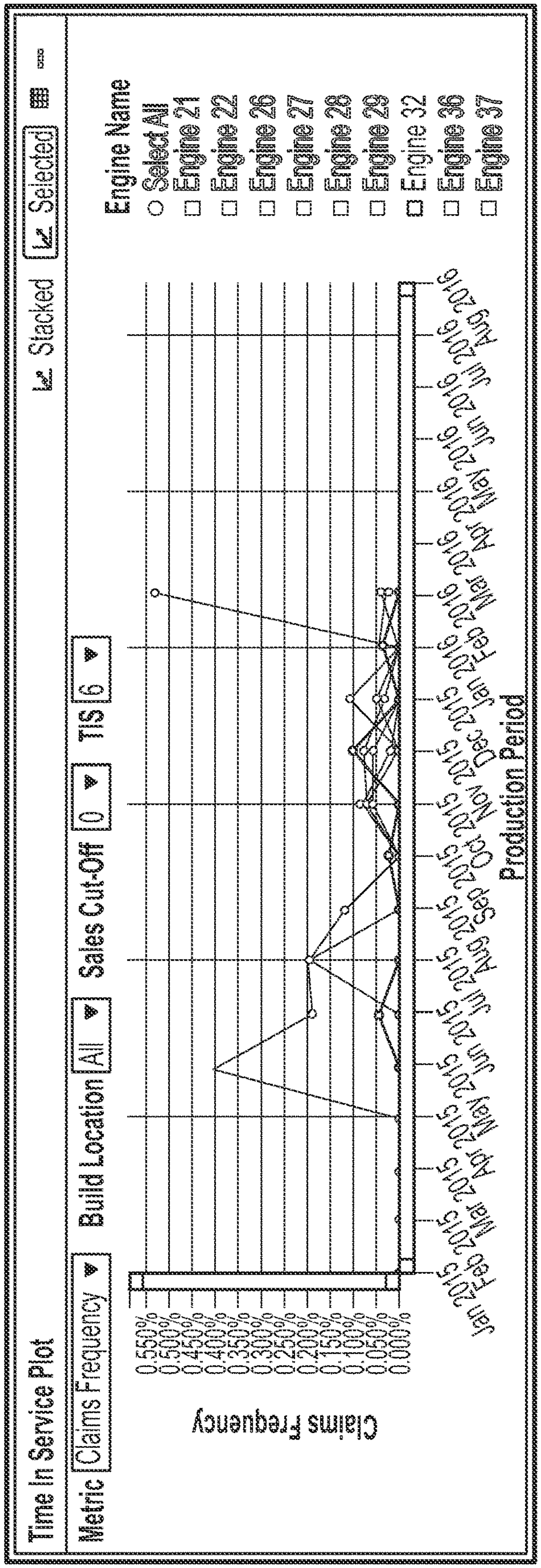

The Selected TIS chart shows a comparison of all Engines on the selected Labour Operation for a single selected TIS period, as illustrated in FIG. 84.

7.6 Engine-Products Page

This page shows Labour Operation forecasts at an Engine-Product level.

Filter: The data shown on this page can be filtered by the user. The fields which can be filtered are:

| Multi Select | Single Select |
|---|---|
| Engine<br>Brand<br>Product<br>Category<br>Labour Operation | Model Year[17]<br>Projection Length[18] |

Navigation: The user can navigate to the Engine-Carline Detail Report once they have selected a forecast.

The selected Engine, Product, Labour Operation, Model Year and Projection Months are passed as parameters.

Reporting Objects: There are two parts to the page, the first contains the Engine-Product Labour Operation forecasts and the second shows context around the selected forecast.

When the user selects a forecast in the first part, the objects within the second part load data based on the users' selection.

The Projections Pareto Grid shows the forecasts and the Projections Node Tree, Model Year Development and the Stacked/Selected TIS objects show the context.

7.6.1 Projections Pareto Grid

The Engine-Product Labour Operation forecasts are shown in a data grid, as illustrated in FIG. 85.

7.6.2 Projections Node Tree

This shows comparisons of the forecast on the same Labour Operation across all other Engines and Products and is presented within a Node Tree, as illustrated in FIG. 65.

7.6.3 Model Year Development

This shows a comparison of the forecast on the selected Engine-Product Labour Operation across each Model Year.

This is presented within a stacked column chart showing the relationship between current and forecasted performance for each Model Year, as illustrated in FIG. 48.

7.6.4 Stacked/Selected TIS

This shows Production Month, Time in Service (TIS) performance for the selected Labour Operation.

The data is displayed in two different ways, each of which has its own chart.

The Stacked TIS chart shows the performance of each TIS period for the selected Engine-Product and Labour Operation, as illustrated in FIG. 74.

Figure 86:
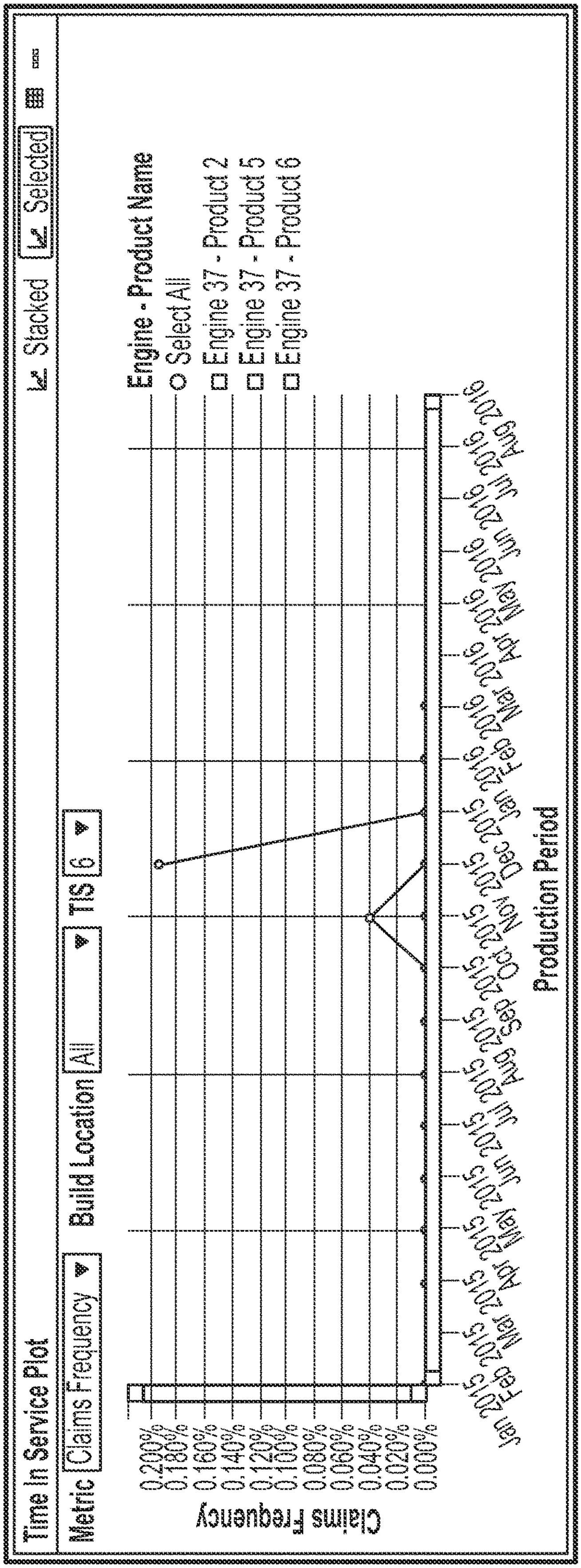

The Selected TIS chart shows a comparison of all Engine-Products on the selected Labour Operation for a single selected TIS period, as illustrated in FIG. 86.

7.7 Engine-Carlines Page

This page shows Labour Operation forecasts at an Engine-Carline level.

Filter: The data shown on this page can be filtered by the user. The fields which can be filtered are:

| Multi Select | Single Select |
|---|---|
| Engine<br>Brand<br>Product<br>Carline<br>Category Labour<br>Operation | Model Year[19]<br>Projection Length[20] |

Navigation: The user can navigate to the Ultimate Labour Operation Report once they have selected a forecast.

The selected Engine, Carline, Labour Operation, Model Year and Projection Months are passed as parameters.

Reporting Objects: There are two parts to the page, the first contains the Engine-Carline Labour Operation forecasts and the second shows context around the selected forecast.

When the user selects a forecast in the first part, the objects within the second part load data based on the users' selection.

The Projections Pareto Grid shows the forecasts and the Projections Node Tree, Model Year Development and the Stacked/Selected TIS objects show the context.

7.7.1 Projections Pareto Grid

The Engine-Carline Labour Operation forecasts are shown in a data grid, as illustrated in FIG. 87.

7.7.2 Projections Node Tree

This shows comparisons of the forecast on the same Labour Operation across all other Engines, Products and Carlines and is presented within a Node Tree, as illustrated in FIG. 69.

7.7.3 Model Year Development

This shows a comparison of the forecast on the selected Engine-Carline Labour Operation across each Model Year.

This is presented within a stacked column chart showing the relationship between current and forecasted performance for each Model Year, as illustrated in FIG. 48.

7.7.4 Stacked/Selected TIS

This shows Production Month, Time in Service (TIS) performance for the selected Labour Operation.

The data is displayed in two different ways, each of which has its own chart.

The Stacked TIS chart shows the performance of each TIS period for the selected Engine-Carline and Labour Operation, as illustrated in FIG. 74.

Figure 88:
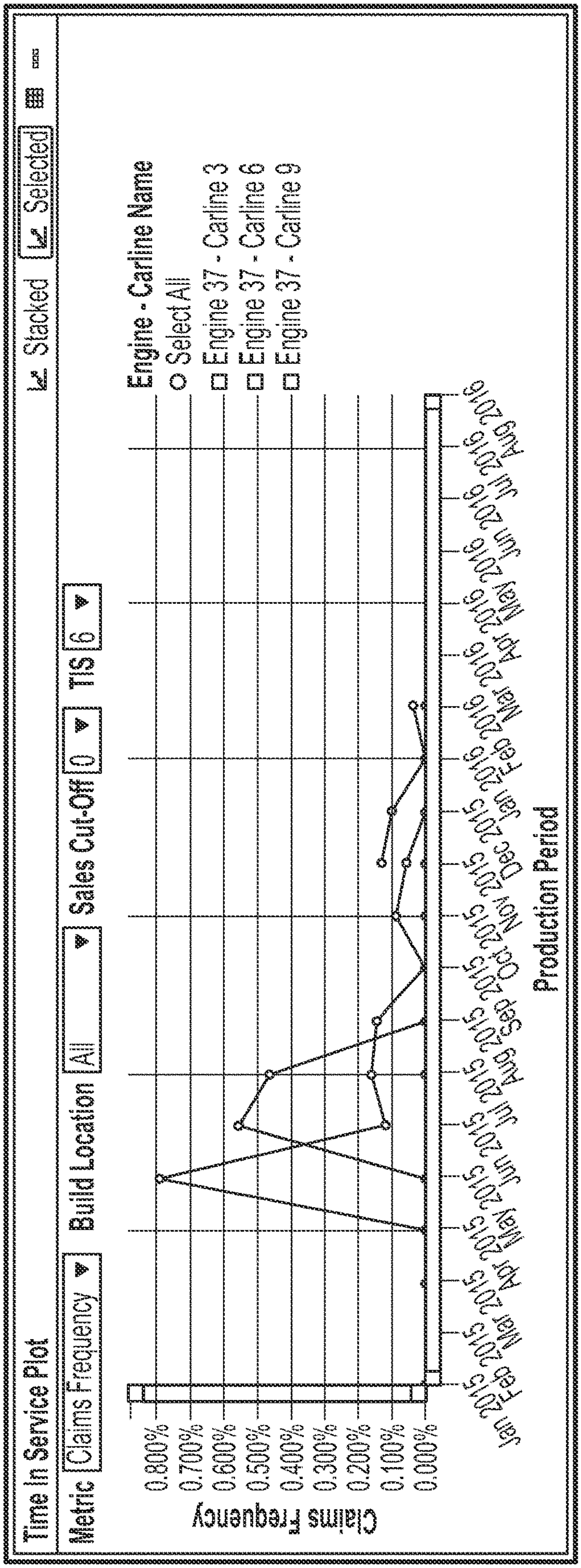

The Selected TIS chart shows a comparison of all Engine-Carlines on the selected Labour Operation for a single selected TIS period, as illustrated in FIG. 88.

Section 8: Results Tracker

This reporting track contains two pages which display the development of the relative ranks, over time, of forecasts at a Labour Operation level.

Each page shows the development of the relative ranks at a single aggregation level from the following hierarchy:

Product→Carline 8.1 Products Page

This page shows the development of relative ranks, over time, of Labour Operation forecasts at a Product level.

Filter: The data shown on this page can be filtered by the user. The fields which can be filtered follows:

Single Select

Product

Model Year[21]

Projection Length[22]

[21] The Model Year filter is not applied to the Stacked/Selected TIS, Historic Projections Development or the Model Year Development.

[22] The Project Length filter is not applied to the Stacked/Selected TIS.

Navigation: The user can navigate to the Ultimate Product Labour Operation Report (see section 14) once they have selected a forecast.

The selected Product, Labour Operation, Model Year and Projection Months are passed as parameters.

Reporting Objects: There are two parts to the page, the first contains the Product Labour Operation forecasts rank development and the second shows context around the selected forecast.

When the user selects a forecast in the first part, the objects within the second part load data based on the users' selection.

The Projections Pareto Grid shows the forecasts and the Stacked/Select TIS, Historic Projections Development and Model Year Development objects show the context.

8.1.1 Projections Pareto Grid

The Product Labour Operation forecast ranks development are shown in a data grid, detailing the current rank, the highest rank in history and the change to the rank from intermediate points in time during the last 24 months. This data grid is illustrated in FIG. 89.

8.1.2 Stacked/Selected TIS

This shows Production Month, Time in Service (TIS) performance for the selected Labour Operation.

The data is displayed in two different ways, each of which has its own chart.

The Stacked TIS chart shows the performance of each TIS period for the selected Product Labour Operation, as illustrated in FIG. 74.

Figure 90:
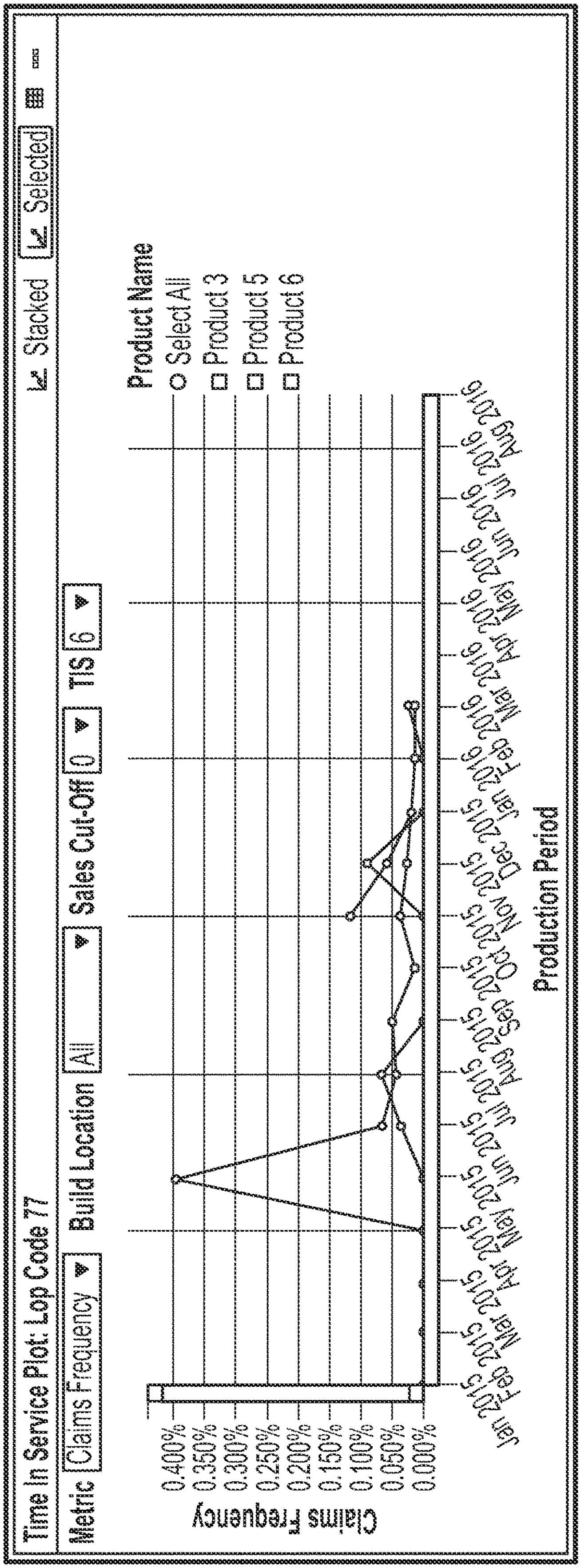

The Selected TIS chart shows a comparison of all Products on the selected Labour Operation for a single selected TIS period, as illustrated in FIG. 90.

8.1.3 Historic Projections Development

This shows a comparison of how the forecast on the selected Labour Operation has developed over time for each Model Year.

Figure 91:
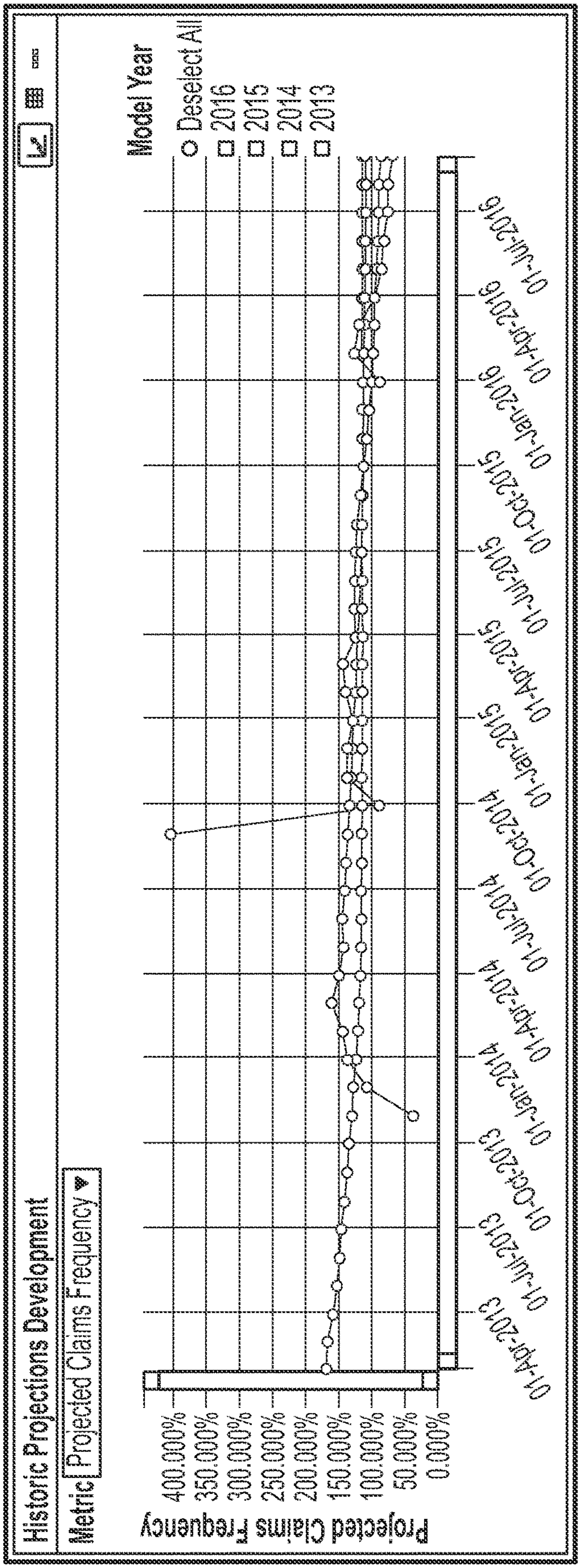

The data is displayed in a multi-series line chart, with a separate line series for each Model Year, as illustrated in FIG. 91.

8.1.4 Model Year Development

This shows a comparison of the forecast on the selected Product Labour Operation across each Model Year.

This is presented within a stacked column chart showing the relationship between current and forecasted performance for each Model Year, as illustrated in FIG. 48.

8.2 Carlines Page

This page shows the development of relative ranks, over time, of Labour Operation forecasts at a Carline level.

Filter: The data shown on this page can be filtered by the user. The fields which can be filtered follows:

Single Select

Carline

Model Year[23]

Projection Length[24]

[23] The Model Year filter is not applied to the Stacked/Selected TIS, Historic Projections Development or the Model Year Development.

[24] The Projection Length filter is not applied to the Stacked/Selected TIS.

Navigation: The user can navigate to the Ultimate Labour Operation Report (see section 12) once they have selected a forecast.

The selected Carline, Labour Operation, Model Year and Projection Months are passed as parameters.

Reporting Objects: There are two parts to the page, the first contains the Car-line Labour Operation forecasts rank development and the second shows context around the selected forecast.

When the user selects a forecast in the first part, the objects within the second part load data based on the users' selection.

The Projections Pareto Grid shows the forecasts and the Stacked/Select TIS, Historic Projections Development and Model Year Development objects show the context.

8.2.1 Projections Pareto Grid

The Carline Labour Operation forecast ranks development are shown in a data grid, detailing the current rank, the highest rank in history and the change to the rank from intermediate points in time during the last 24 months. This data grid is illustrated in FIG. 92.

8.2.2 Stacked/Selected TIS

This shows Production Month, Time in Service (TIS) performance for the selected Labour Operation.

The data is displayed in two different ways, each of which has its own chart.

The Stacked TIS chart shows the performance of each TIS period for the selected Carline Labour Operation, as illustrated in FIG. 74.

Figure 93:
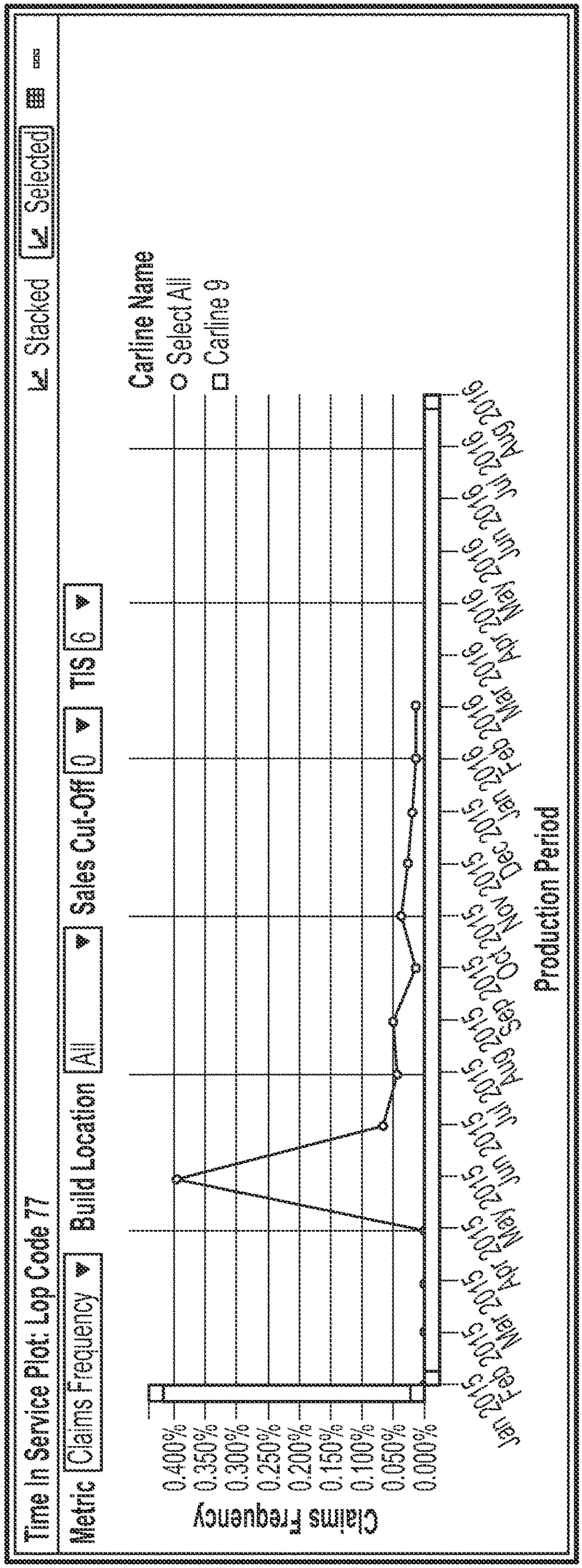

The Selected TIS chart shows a comparison of all Carlines on the selected Labour Operation for a single selected TIS period, as illustrated in FIG. 93.

8.2.3 Historic Projections Development

This shows a comparison of how the forecast on the selected Labour Operation has developed over time for each Model Year.

The data is displayed in a multi-series line chart, with a separate line series for each Model Year, as illustrated in FIG. 91.

8.2.4 Model Year Development

This shows a comparison of the forecast on the selected Carline Labour Operation across each Model Year.

This is presented within a stacked column chart showing the relationship between current and forecasted performance for each Model Year, as illustrated in FIG. 48.

Section 9: Ultimate Variant Report

This report contains three pages which display in-depth information supporting a forecast at a chosen combination of All Regions/Single Region/Carline/Engine/Transmission for a single Model Year, single Projection Length.

Each of the pages within the report is accessed through tabs at the top of the report.

9.1 Forecast Tab

This page shows forecasts for All Regions/Single Region/Carline/Engine/Transmission, Model Year and Projection Months.

Filter: The data shown on this page can be filtered by the user. The fields which can be filtered are:

Single Select
Region
Carline
Engine
Transmission
Model Year[25]
Projection Length

[25] The Model Year filter is not applied to the Model Year Development or the Historic Projections Development.

Each of the Region, Carline, Engine and Transmission filters have an "All" item, appended at the top of their list.

The "All" item is the default value, but, at least one Carline/Engine/Transmission must have a selection which is not the "All" item.

Navigation: There are no navigation targets from this page.

Reporting Objects: This page contains three reporting objects each showing information supporting the forecast. The objects are Model Year Development, Historic Projections Development and Labour Operation Projections.

9.1.1 Model Year Development

This shows a comparison of the forecast on the selected Labour Operation across each Model Year.

This is presented within a stacked column chart showing the relationship between current and forecasted performance for each Model Year, as illustrated in FIG. 48.

9.1.2 Historic Projections Development

This shows a comparison of how the selected forecast has developed over time for each Model Year.

The data is displayed in a multi-series line chart, with a separate line series for each Model Year, as illustrated in FIG. 91.

9.1.3 Labour Operation Projections

This shows the 200 most severe Labour Operations for the filtered Region, Carline, Engine, Transmission, Model Year and Projection Length.

The development of the forecast across Model Years for each Labour Operation is also displayed. The most severe forecasts for the selected Model Year are displayed first.

Figure 94:
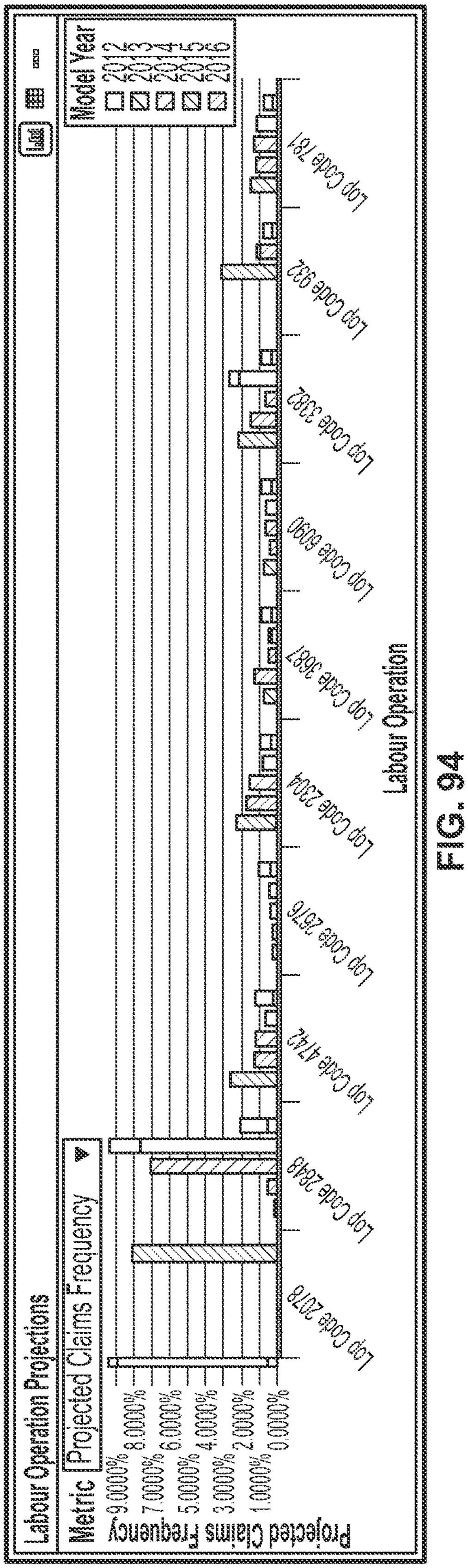

This data is shown in a grouped stacked column chart, showing the relationship between current and forecasted performance for each Model Year, as illustrated in FIG. 94.

9.2 Production Tab

This page shows forecasts for All Regions/Single Region/Carline/Engine/Transmission, Model Year and Projection Months.

Filter: The data shown on this page can be filtered by the user. The fields which can be filtered are:

Single Select
Region
Carline
Engine
Transmission
Model Year[26]
Projection Length[27]

[26] The Model Year filter is not applied to the TIS Model Year Comparison or the Stacked TIS.

[27] The Projection Length filter is not applied to the TIS Model Year Comparison, the Stacked TIS or the Claim Paid by Week.

Each of the Region, Carline, Engine and Transmission filters have an "All" item, appended at the top of their list.

The "All" item is the default value, but, at least one Carline/Engine/Transmission must have a selection which is not the "All" item.

Navigation: There are no navigation targets from this page.

Report Objects: This page contains three reporting objects each showing information around the production data supporting the forecast. The objects are the TIS Model Year Comparison, Stacked TIS and the Claims Paid.

9.2.1 TIS Model Year Comparison

This shows, for each Model Year, the development of Time in Service (TIS) performance for the selected forecast.

Figure 95:
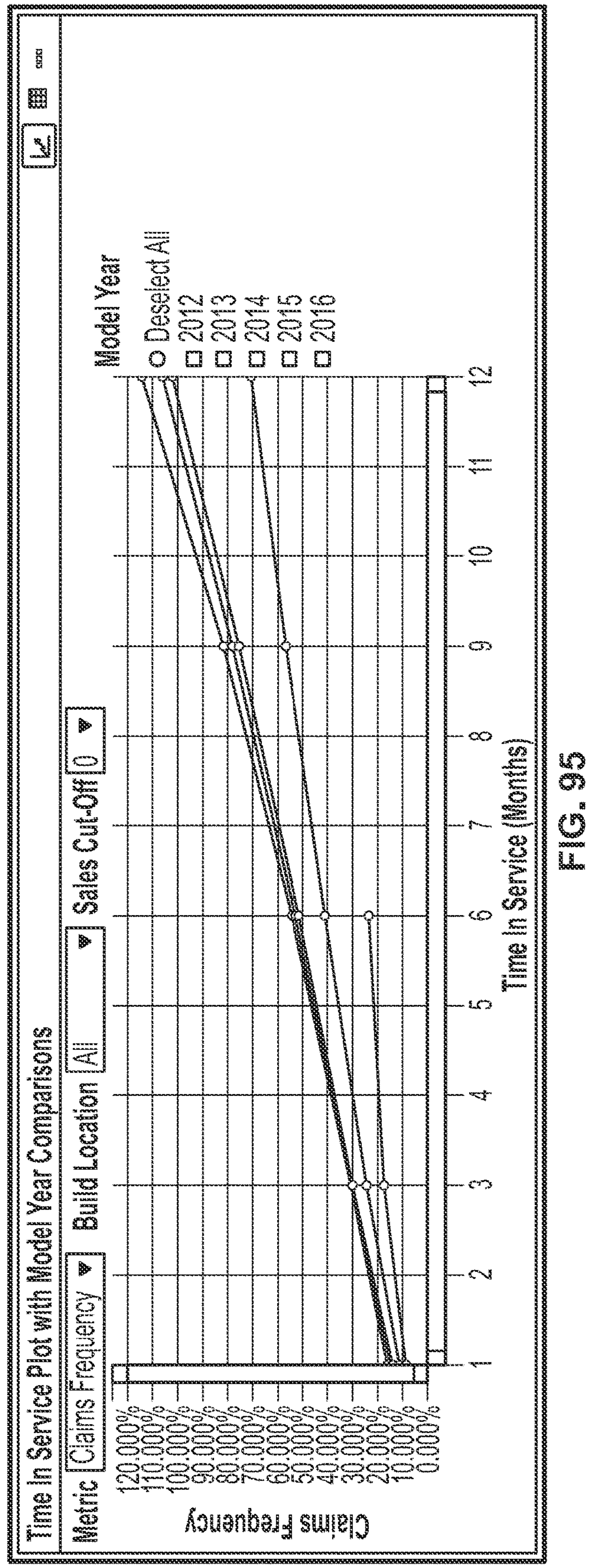

The data is shown in a multi-series line chart, with a series for each Model Year, as illustrated in FIG. 95.

9.2.2 Stacked TIS

This shows Production Month, Time in Service (TIS) performance for the selected Carline/Engine/Transmission combination.

The Stacked TIS chart shows the performance of each TIS period for the selected Carline/Engine/Transmission combination, as illustrated in FIG. 74.

9.2.3 Claims Paid by Week

This shows claims counts and paid amounts by calendar week for the selected Carline/Engine/Transmission combination and Model Year.

Figure 96:
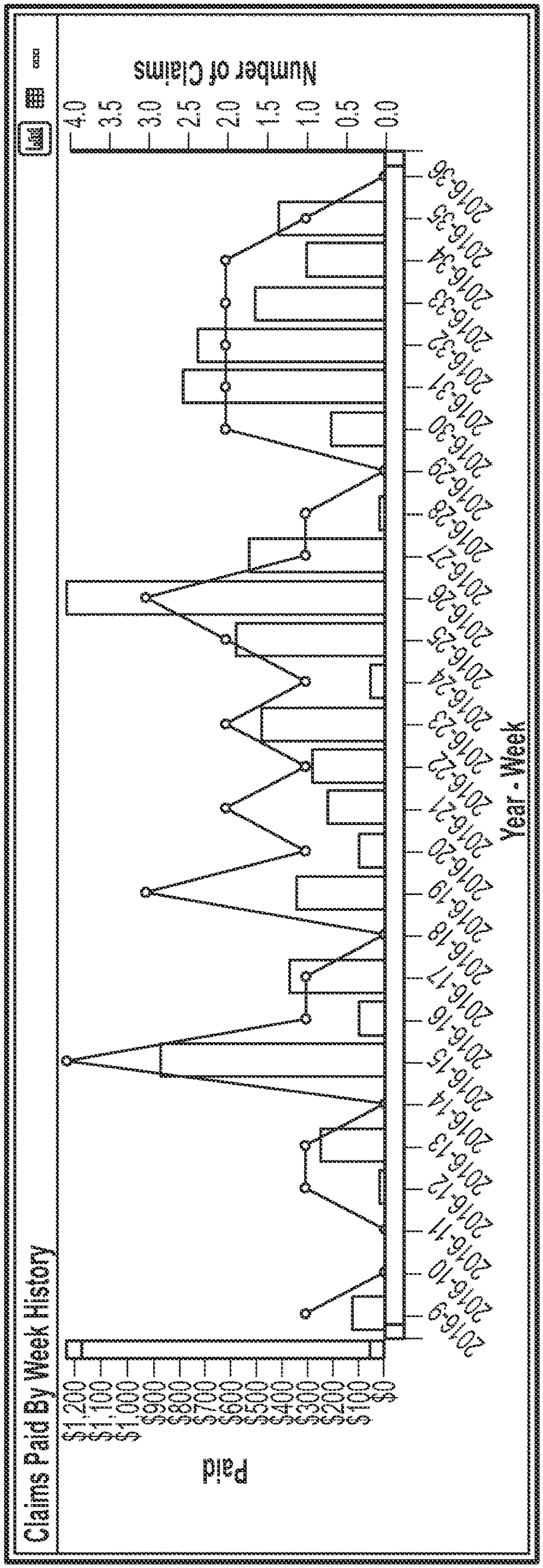

The data is shown in a column chart for the paid amounts with a line series for the claims count, as illustrated in FIG. 96.

9.3 Comparison Tab

This page shows forecasts for All Regions/Single Region/Carline/Engine/Transmission, Model Year and Projection Months.

Filter: The data shown on this page can be filtered by the user. The fields which can be filtered are:

Single Select
Region
Carline
Engine
Transmission

Model Year[28]

Projection Length[29]

[28] The Model Year filter is not applied to the Grouped Model Year Development or the Selected TIS.

[29] The Projection Length filter is not applied to the Selected TIS.

Each of the Region, Carline, Engine and Transmission filters have an "All" item, appended at the top of their list.

The "All" item is the default value, but, at least one Carline/Engine/Trans-mission must have a selection which is not the "All" item.

Navigation: There are no navigation targets from this page.

Report Objects: This page contains three reporting objects each showing information comparing the selected Carline/Engine/Transmission forecast with other forecasts at the same level of aggregation.

The objects are Projections Node Tree, Grouped Model Year Development and the Selected TIS.

9.3.1 Projections Node Tree

The shows comparisons of the forecast on the selected Carline/Engine/Transmission.

Figure 97:
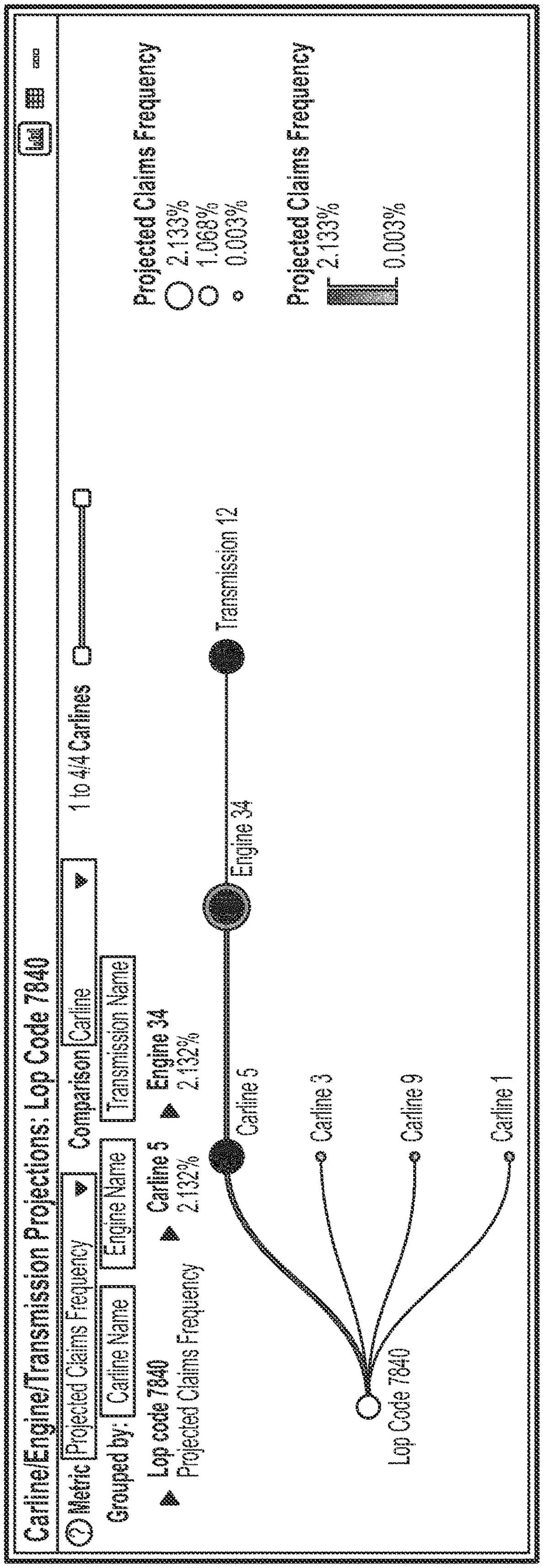

This is presented within a dynamically grouped Node Tree, allowing the user to change the order of the levels in the Carline/Engine/Transmission hierarchy, as illustrated in FIG. 97.

9.3.2 Grouped Model Year Development

This shows the development of the forecast, across Model Years, of all Carlines, Engines or Transmissions, depending on which the user selects.

Figure 98:
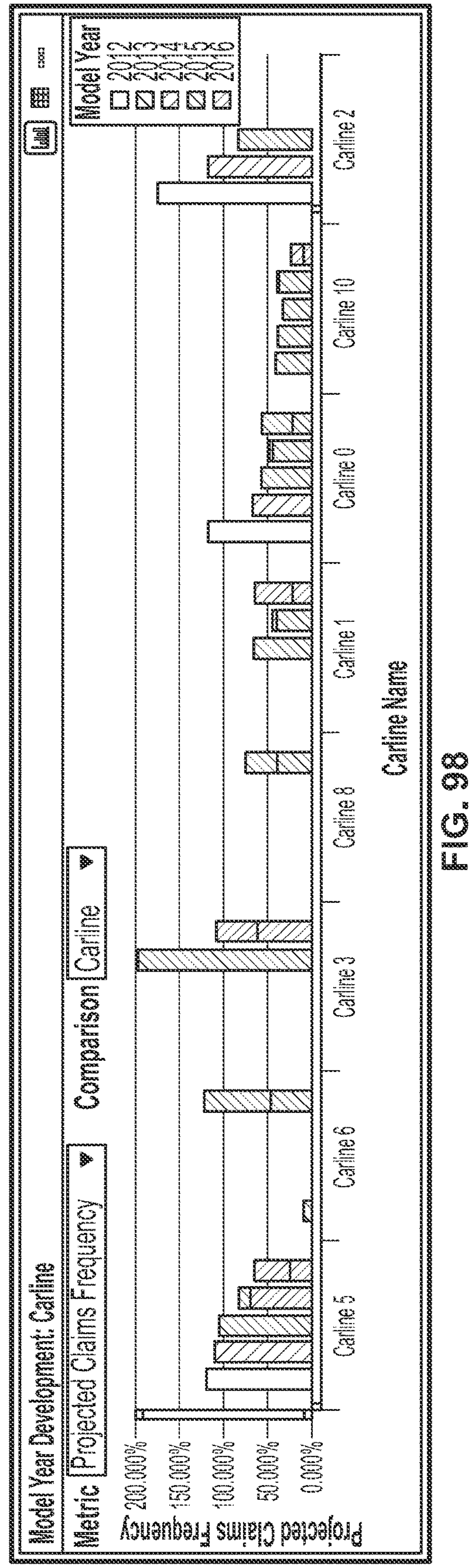

This data is shown in a grouped stacked column chart, showing the relationship between current and forecasted performance for each Model Year, as illustrated in FIG. 98.

9.3.3 Selected TIS

This shows Production Month, Time in Service (TIS) performance compared across either Carlines, Engines or Transmissions, as selected by the user.

Figure 99:
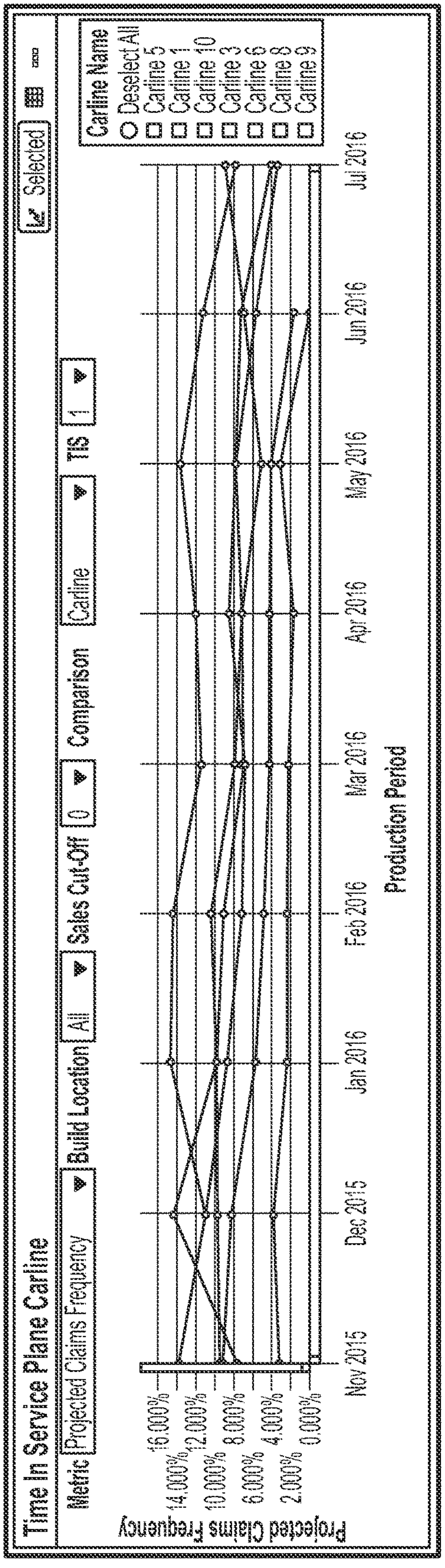

The data is shown in a multi-series line chart, with a separate line series for each Carline, Engine or Transmission, for a selected TIS value. This is illustrated in FIG. 99.

Section 10 Ultimate Brand Report

This report contains three pages which display in-depth information supporting a forecast at a chosen Brand for a single Model Year, single Projection Length and an optional Region.

Each of the pages within the report is accessed through tabs at the top of the report.

10.1 Forecast Tab

This page shows forecasts for a given whole Region (optional), Brand, Model Year and Projection Months.

Filter: The data shown on this page can be filtered by the user. The fields which can be filtered are:

Single Select

Region

Brand

Model

Year[30]

Projection Length

[30] The Model Year filter is not applied to the Model Year Development or the Historic Projects Development.

The Region filter has an "All" item, appended at the top of the list. The "All" item is the default value for Region.

Navigation: There are no navigation targets from this page.

Reporting Objects: This page contains three reporting objects each showing information supporting the forecast. The objects are Model Year Development, Historic Projections Development and Labour Operation Projections.

10.1.1 Model Year Development

This shows a comparison of the forecast on the selected Brand across each Model Year.

This is presented within a stacked column chart showing the relationship between current and forecasted performance for each Model Year, as illustrated in FIG. 48.

10.1.2 Historic Projections Development

This shows a comparison of how the selected forecast has developed over time for each Model Year.

The data is displayed in a multi-series line chart, with a separate line series for each Model Year, as illustrated in FIG. 91.

10.1.3 Labour Operation Projections

This shows the 200 most severe Labour Operations for the filtered Region, Brand, Model Year and Projection Length.

The development of the forecast across Model Years for each Labour Operation is also displayed. The most severe forecasts for the selected Model Year are displayed first.

Figure 100:
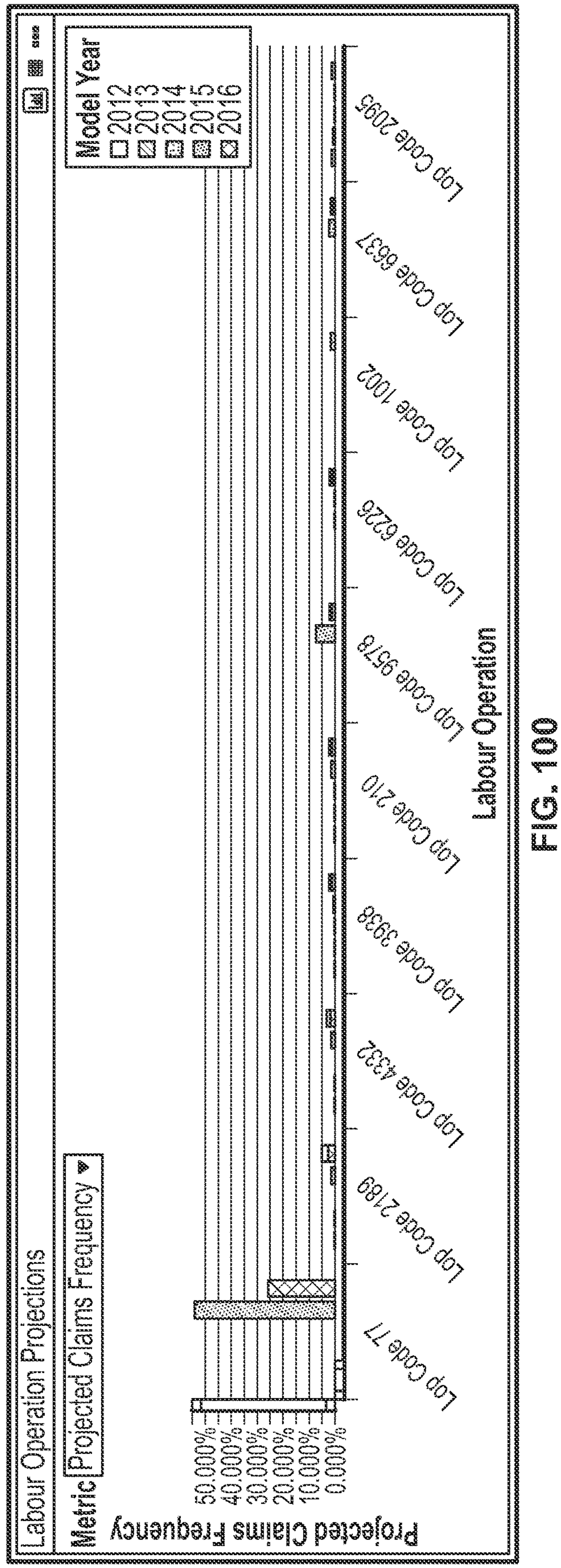

This data is shown in a grouped stacked column chart, showing the relationship between current and forecasted performance for each Model Year, as illustrated in FIG. 100.

10.2 Production Tab

This page shows forecasts for a given whole Region (optional), Brand, Model Year and Projection Months.

Filter: The data shown on this page can be filtered by the user. The fields which can be filtered are:

Single Select

Region

Brand

Model Year[31]

Projection Length[32]

[31] The Model Year filter is not applied to the TIS Model Comparison or the Stacked TIS.

[32] The Projection Length filter is not applied to the TIS Model Year Comparison, the Stacked TIS or the Claim Paid by Week.

The Region filter has an "All" item, appended at the top of the list.

The "All" item is the default value for Region.

Navigation: There are no navigation targets from this page.

Report Objects: This page contains three reporting objects each showing information around the Production data supporting the forecast. The objects are the TIS Model Year Comparison, Stacked TIS and the Claims Paid.

10.2.1 TIS Model Year Comparison

This shows, for each Model Year, the development of Time in Service (TIS) performance for the selected forecast.

The data is shown in a multi-series line chart, with a series for each Model Year, as illustrated in FIG. 95.

10.2.2 Stacked TIS

This shows Production Month, Time in Service (TIS) performance for the selected Brand.

The Stacked TIS chart shows the performance of each TIS period for the selected Brand, as illustrated in FIG. 74.

10.2.3 Claims Paid by Week

This shows claims counts and paid amounts by calendar week for the selected Brand and Model Year.

The data is shown in a column chart for the paid amounts with a line series for the claims count, as illustrated in FIG. 96.

10.3 Comparison Tab

This page shows forecasts for a given whole Region (optional), Brand, Model Year and Projection Months.

This page shows forecasts for a given whole Region (optional), Brand, Model Year and Projection Months.

Filter: The data shown on this page can be filtered by the user. The fields which can be filtered are:

Single Select
Region
Brand
Model Year[33]
Projection Length[34]

[33] The Model Year filter is not applied to the Grouped Model Year Development or the Selected TIS.

[34] The Projection Length filter is not applied to the Selection TIS.

The Region filter has an "All" item, appended at the top of the list.

The "All" item is the default value for the Region.

Navigation: There are no navigation targets from this page.

Report Objects: This page contains three reporting objects each showing information comparing the selected Brand forecast with other forecasts at the same level of aggregation.

The objects are Projections Node Tree, Grouped Model Year Development and the Selected TIS.

10.3.1 Projections Node Tree

The shows comparisons of the forecast on the selected Brand.

This is presented within a Node Tree, as illustrated in FIG. 49.

10.3.2 Grouped Model Year Development

This shows the development of the forecast across Model Years of all Brands.

Figure 101:
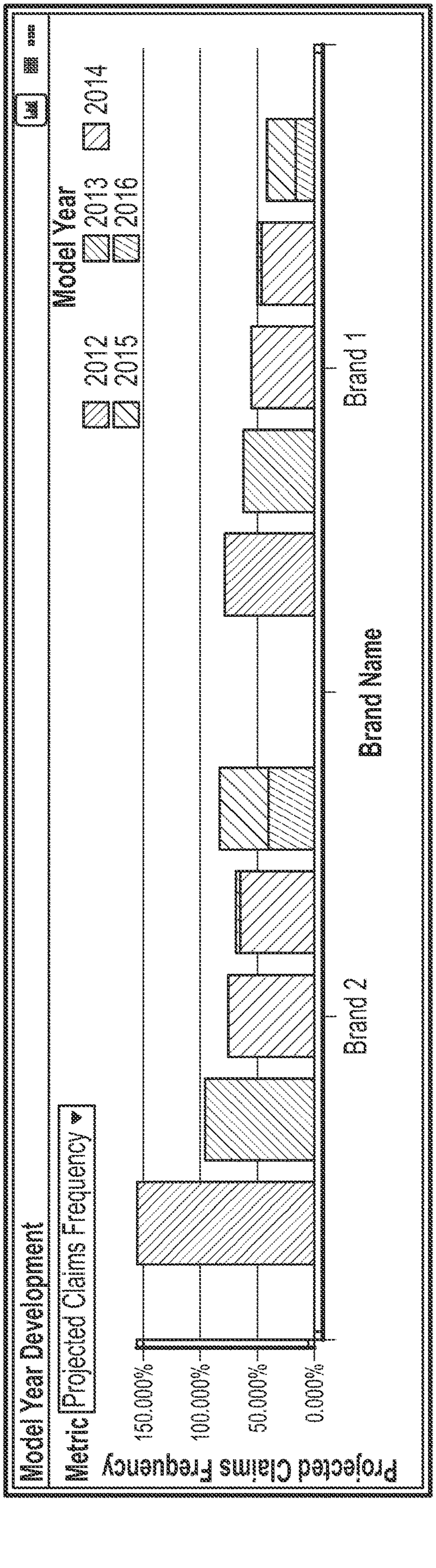

This data is shown in a grouped stacked column chart, showing the relationship between current and forecasted performance for each Model Year, as illustrated in FIG. 101.

10.3.3 Selected TIS

This shows Production Month, Time in Service (TIS) performance compared across Brands.

Figure 102:
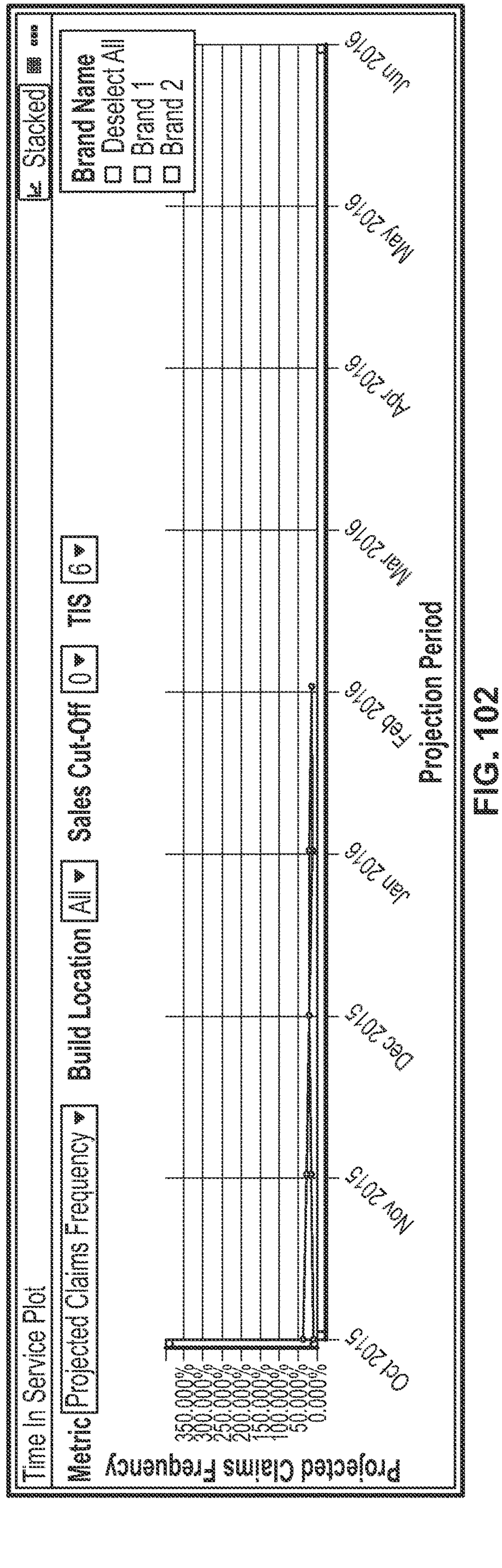

The data is shown in a multi-series line chart, with a separate line series for each Brand, for a selected TIS value. This is illustrated in FIG. 102.

Section 11: Ultimate Product Report

This report contains three pages which display in-depth information supporting a forecast at a chosen Product for a single Model Year, single Projection Length and an optional Region.

Each of the pages within the report is accessed through tabs at the top of the report.

11.1 Forecast Tab

This page shows forecasts for a given whole Region (optional), Product, Model Year and Projection Months.

Filter: The data shown on this page can be filtered by the user. The fields which can be filtered are:

Single Select
Region
Product
Model Year[35]
Projection Length

[35] The Model Year filter is not applied to the Model Year Development or the Historic Projections Development.

The Region filter has an "All" item, appended at the top of the list.

The "All" item is the default value for Region.

Navigation: There are no navigation targets from this page.

Reporting Objects: This page contains three reporting objects each showing information supporting the forecast. The objects are Model Year Development, Historic Projections Development and Labour Operation Projections.

11.1.1 Model Year Development

This shows a comparison of the forecast on the selected Product across each Model Year.

This is presented within a stacked column chart showing the relationship between current and forecasted performance for each Model Year, as illustrated in FIG. 48.

11.1.2 Historic Projections Development

This shows a comparison of how the selected forecast has developed over time for each Model Year.

The data is displayed in a multi-series line chart, with a separate line series for each Model Year, as illustrated in FIG. 91.

11.1.3 Labour Operation Projections

This shows the 200 most severe Labour Operations for the filtered Region, Product, Model Year and Projection Length.

The development of the forecast across Model Years for each Labour Operation is also displayed. The most severe forecasts for the selected Model Year are displayed first.

Figure 103:
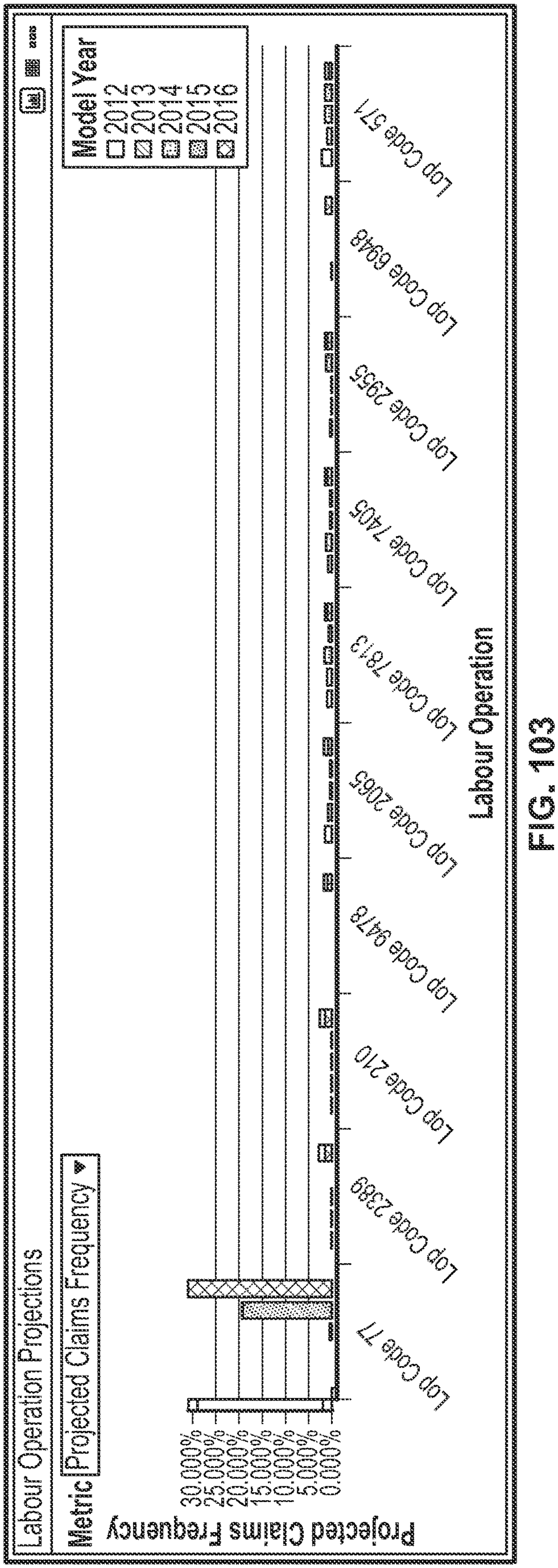

This data is shown in a grouped stacked column chart, showing the relationship between current and forecasted performance for each Model Year, as illustrated in FIG. 103.

11.2 Production Tab

This page shows forecasts for a given whole Region (optional), Product, Model Year and Projection Months.

Filter: The data shown on this page can be filtered by the user. The fields which can be filtered are:

Single Select
Region
Product
Model Year[36]
Projection Length[37]

[36] The Model Year filter is not applied to the TIS Model Year Comparison or the Stacked TIS.

[37] The Projection Length filter is not applied to the TIS Model Year Comparison, the Stacked TIS or the Claim Paid by Week.

The Region filter has an "All" item, appended at the top of the list.

The "All" item is the default value for Region.

Navigation: There are no navigation targets from this page.

Report Objects: This page contains three reporting objects each showing information around the production data supporting the forecast. The objects are the TIS Model Year Comparison, Stacked TIS and the Claims Paid.

11.2.1 TIS Model Year Comparison

This shows, for each Model Year, the development of Time in Service (TIS) performance for the selected forecast.

The data is shown in a multi-series line chart, with a series for each Model Year, as illustrated in FIG. 95.

11.2.2 Stacked TIS

This shows Production Month, Time in Service (TIS) performance for the selected Product.

The Stacked TIS chart shows the performance of each TIS period for the selected Product, as illustrated in FIG. 74.

11.2.3 Claims Paid by Week

This shows claims counts and paid amounts by calendar week for the selected Product and Model Year.

The data is shown in a column chart for the paid amounts with a line series for the claims count, as illustrated in FIG. 96.

11.3 Comparison Tab

This page shows forecasts for a given whole Region (optional), Product, Model Year and Projection Months.

Filter: The data shown on this page can be filtered by the user. The fields which can be filtered are:

Single Select
Region
Product
Model Year[38]
Projection Length[39]

[38] The Model Year filter is not applied to the Grouped Model Year Development or the Selected TIS.

[39] The Projection Length filter is not applied to the Selected TIS.

The Region filter has an "All" item, appended at the top of the list.

The "All" item is the default value for the Region.

Navigation: There are no navigation targets from this page.

Report Objects: This page contains three reporting objects each showing information comparing the selected Product forecast with other forecasts at the same level of aggregation.

The objects are Projections Node Tree, Grouped Model Year Development and the Selected TIS.

11.3.1 Projections Node Tree

The shows comparisons of the forecast on the selected Product.

Figure 104:
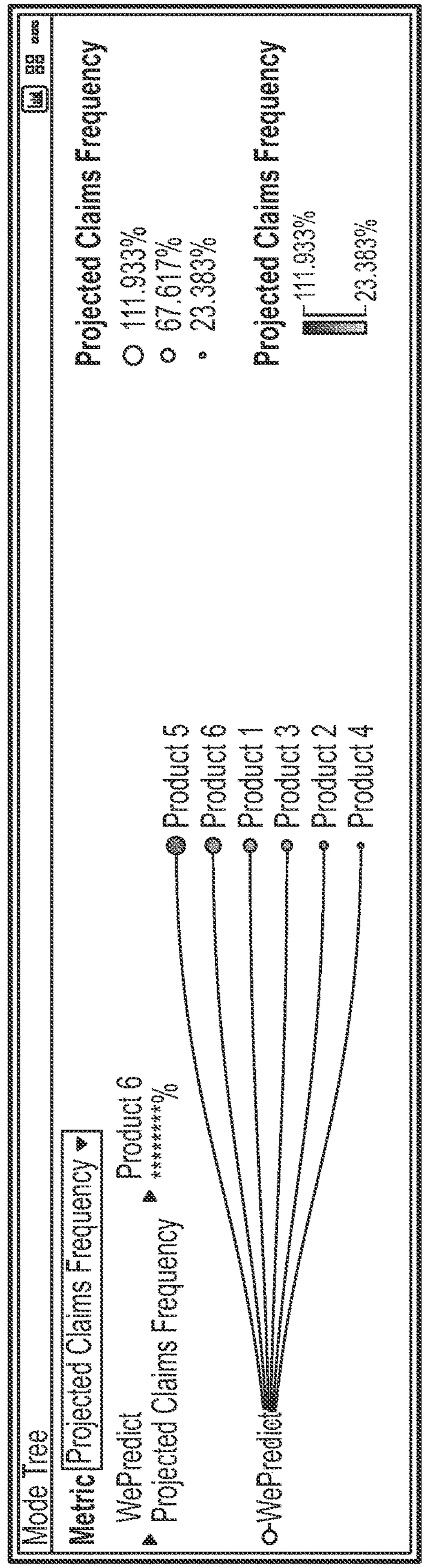

This is presented within a Node Tree, as illustrated in FIG. 104.

11.3.2 Grouped Model Year Development

This shows the development of the forecast across Model Years of all Products.

Figure 105:
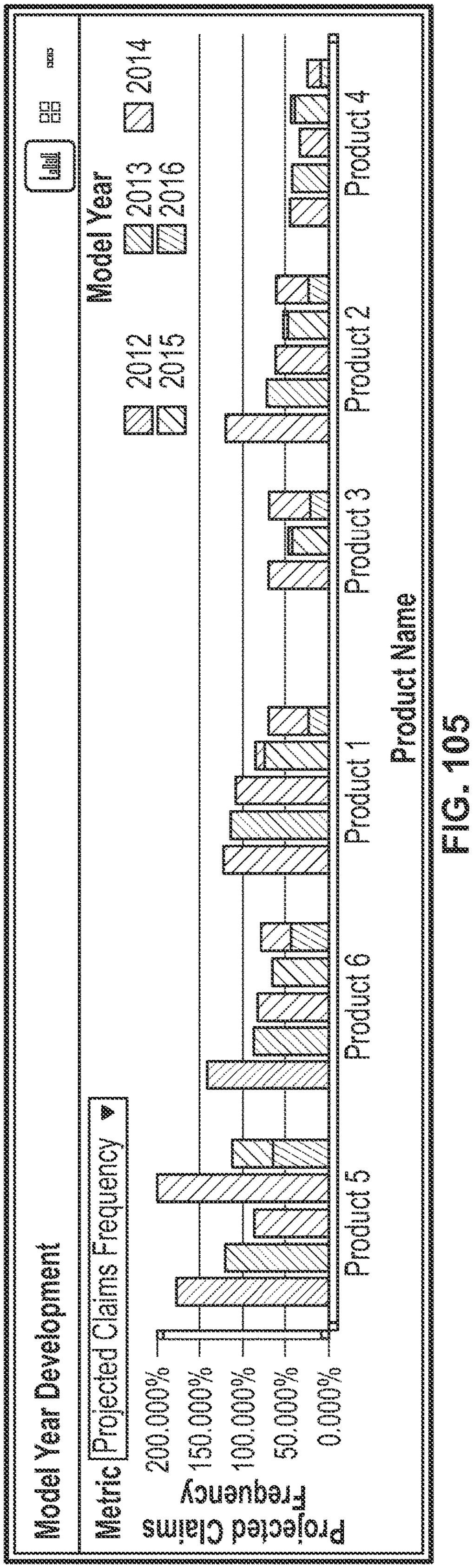

This data is shown in a grouped stacked column chart, showing the relationship between current and forecasted performance for each Model Year, as illustrated in FIG. 105.

11.3.3 Selected TIS

This shows Production Month, Time in Service (TIS) performance compared across Products.

Figure 106:
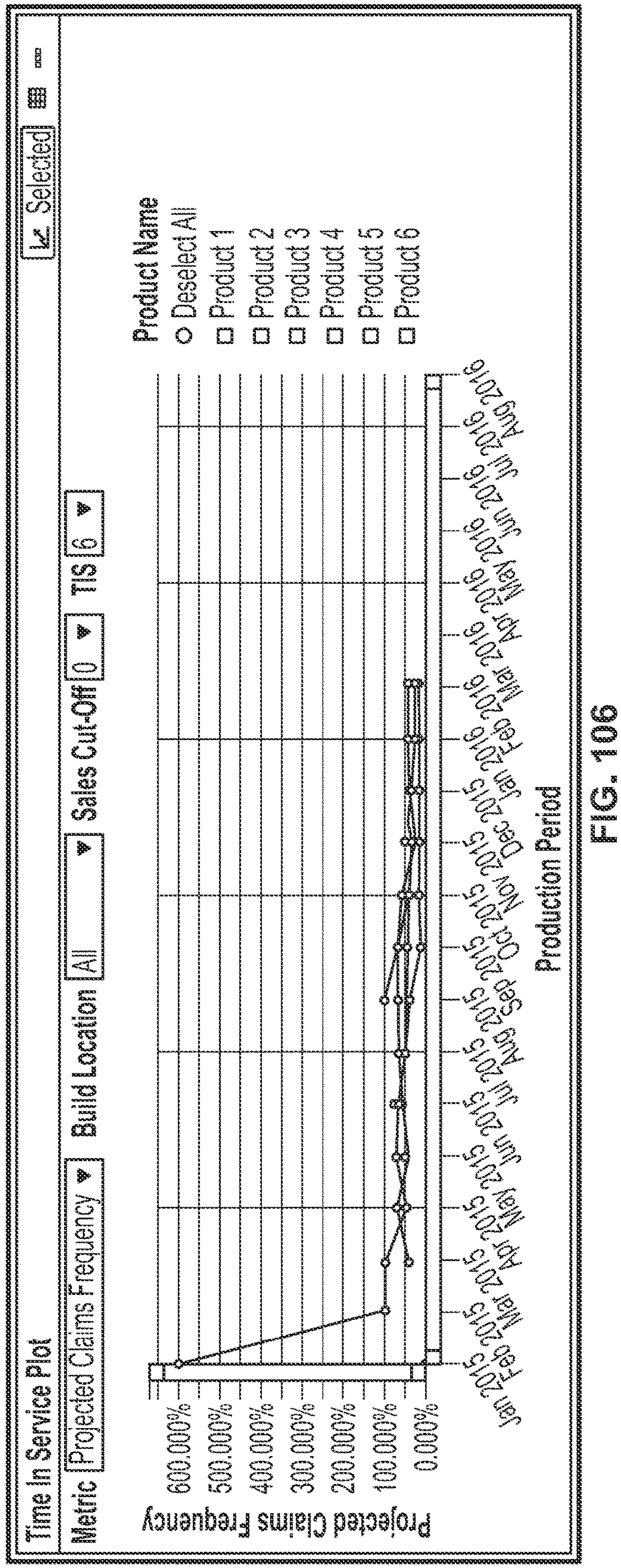

The data is shown in a multi-series line chart, with a separate line series for each Product, for a selected TIS value. This is illustrated in FIG. 106.

Section 12: Ultimate Labour Operation Report

This report contains five pages which display in-depth information supporting a Labour Operation forecast at a chosen combination of Carline/Engine/Trans-mission for a single Model Year, single Projection Length and an optional Region.

Each of the pages within the report is accessed through tabs at the top of the report.

12.1 Forecast Tab

This page shows Labour Operation forecasts for a All Regions/Single Region/Carline/Engine/Transmission, Model Year and Projection Months level.

Filter: The data shown on this page can be filtered by the user. The fields which can be filtered are:

Single Select
Region
Carline
Engine
Transmission
Model Year[40]
Category Labour Operation
Projection Length[41]

[40] The Model Year filter is not applied to the Model Year Development or the Historic Projections Development.

[41] The Projection Length filter is not applied to the Associated Labour Operations.

Each of the Region, Carline, Engine and Transmission filters have an "All" item, appended at the top of their list.

The "All" item is the default value, but, at least one Carline/Engine/Transmission must have a selection which is not the "All" item.

Navigation: There are no navigation targets from this page.

Reporting Objects: This page contains four reporting objects each showing information supporting the forecast. The objects are the Model Year Development, Historic Projections Development, Associated Labour Operations and Mileage Band Claims.

12.1.1 Model Year Development

This shows a comparison of the forecast on the selected Labour Operation across each Model Year.

This is presented within a stacked column chart showing the relationship between current and forecasted performance for each Model Year, as illustrated in FIG. 48.

12.1.2 Historic Projections Development

This shows a comparison of how the forecast on the selected Labour Operation has developed over time for each Model Year.

The data is displayed in a multi-series line chart, with a separate line series for each Model Year, as illustrated in FIG. 91.

12.1.3 Associated Labour Operations

This shows an analysis of which other Labour Operations have been claimed in the 30 days before or after the selected Labour Operation was performed.

Figure 107:
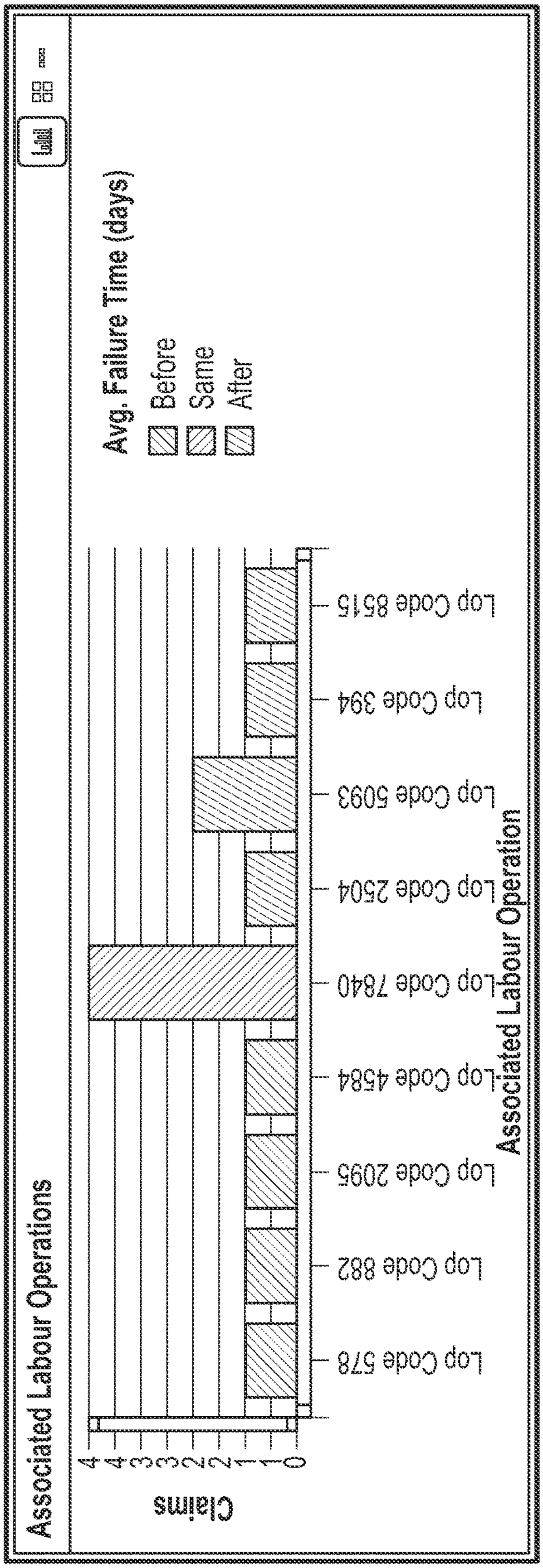

The data is displayed in a column chart with the y-axis showing how many claims have occurred on each Associated Labour Operation in the window and the columns being coloured depending on whether their average time between selected and associated is less than zero, equal or greater than zero. This is illustrated is FIG. 107.

12.1.4 Mileage Band Claims

This shows a basic aggregation of which mileage band claims on the selected Labour Operation have occurred within.

Figure 108:
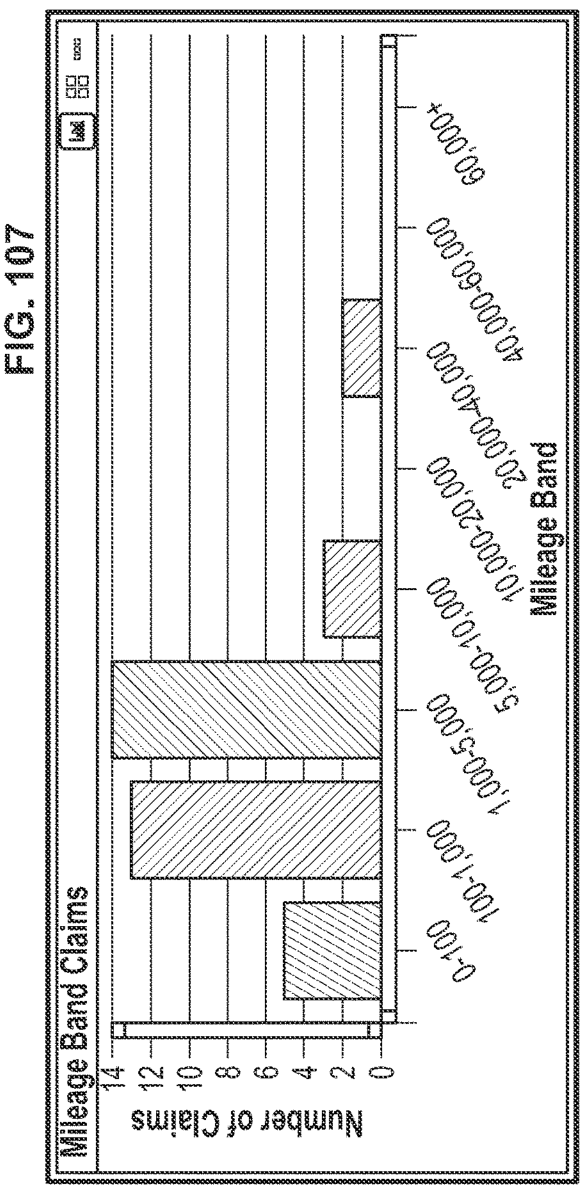

The data is shown in a column chart, with a column for each Mileage Band, as illustrated is FIG. 108.

12.2 Production Tab

This page shows Labour Operation forecasts for a All Regions/Single Region/Carline/Engine/Transmission, Model Year and Projection Months level.

Filter: The data shown on this page can be filtered by the user. The fields which can be filtered are:

Single Select
Region[42]
Carline
Engine
Transmission
Model Year[43]
Category
Labour Operation
Projection Length[44]

[42] The Region filter is not applied to the Stacked TIS.

[43] The Model Year filter is not applied to the TIS Model Year Comparison or the Stacked TIS.

[44] The Projection Length filter is not applied to the TIS Model Year Comparison, Stacked TIS or the Claims Paid by Week.

Each of the Region, Carline, Engine and Transmission filters have an "All" item, appended at the top of their list.

The "All" item is the default value, but, at least one Carline/Engine/Transmission must have a selection which is not the "All" item.

Navigation: There are no navigation targets from this page.

Reporting Objects: This page contains three reporting objects each showing information around the production data supporting the forecast. The objects are the TIS Model Year Comparison, Stacked TIS and the Claims Paid by Week.

12.2.1 TIS Model Year Comparison

This shows, for each Model Year, the development of Time in Service (TIS) performance for the selected Labour Operation.

The data is shown in a multi-series line chart, with a series for each Model Year, as illustrated in FIG. 95.

12.2.2 Stacked TIS

This shows Production Month, Time in Service (TIS) performance for the selected Labour Operation.

The Stacked TIS chart shows the performance of each TIS period for the selected Carline/Engine/Transmission Labour Operation, as illustrated in FIG. 74.

12.2.3 Claims Paid by Week

This shows claims counts and paid amounts by calendar week for the selected Labour Operation.

The data is shown in a column chart for the paid amounts with a line series for the claims count, as illustrated in FIG. 96.

12.3 Comparison Tab

This page shows Labour Operation forecasts for a All Regions/Single Region/Carline/Engine/Transmission, Model Year and Projection Months level.

Filter: The data shown on this page can be filtered by the user. The fields which can be filtered are:

Single Select:

Region[45]

Carline Engine Transmission

Model Year[46]

Category

Labour Operation

Projection Length[47]

[45] The Region filter is not applied to the Selected TIS.

[46] The Model Year filter is not applied to the Grouped Model Year Development or the Selected TIS.

[47] The Projection Length filter is not applied to the Selected TIS.

Each of the Region, Carline, Engine and Transmission filters have an "All" item, appended at the top of their list.

The "All" item is the default value, but, at least one Carline/Engine/Trans-mission must have a selection which is not the "All" item.

Navigation: There are no navigation targets from this page.

Reporting Objects: The page contains four reporting objects each showing information comparing the selected forecast with other Labour Operation forecasts at the same level of aggregation.

The objects are Projections Node Tree, Grouped Model Year Development, Selected TIS and Part Code Breakdown.

12.3.1 Projections Node Tree

This shows comparisons of forecast on the selected Labour Operation with forecasts on different combinations and permutations of Carline, Engines and Transmissions.

This is presented within a dynamically grouped Node Tree, allowing the user to change the order of the levels in the Carline/Engine/Transmission hierarchy, as illustrated in FIG. 97.

12.3.2 Grouped Model Year Development

This shows the development of the forecast on the selected Labour Operation across Model Years.

The user can choose whether to view the forecast for the Labour Operation on either Carlines, Engines or Transmissions.

Figure 109:
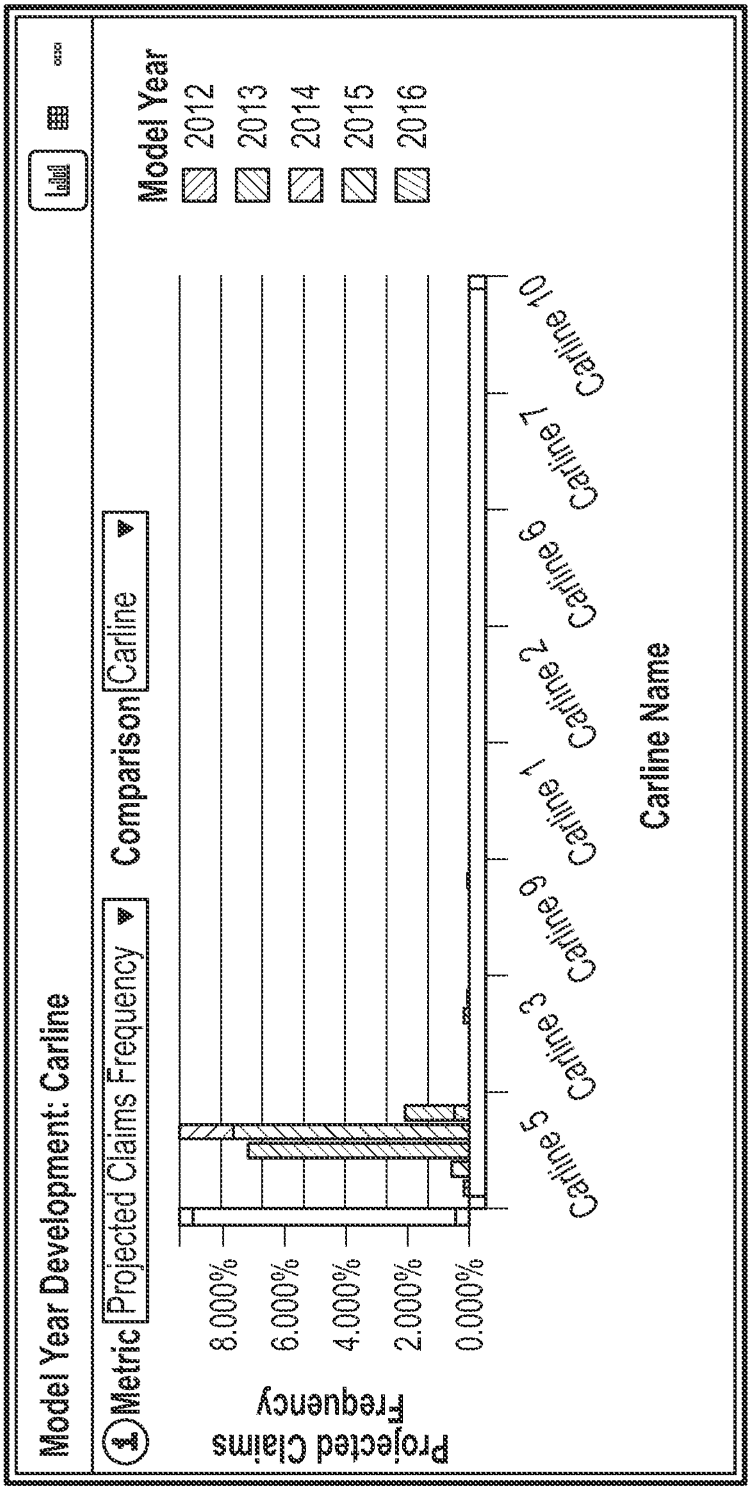

This data is shown in a grouped stacked column chart, showing the relationship between current and forecasted performance for each Model Year, as illustrated in FIG. 109.

12.3.3 Selected TIS

This shows Production Month, Time in Service (TIS) performance for the selected Labour Operation compared across Carlines, Engines or Transmissions, as selected by the user.

Figure 110:
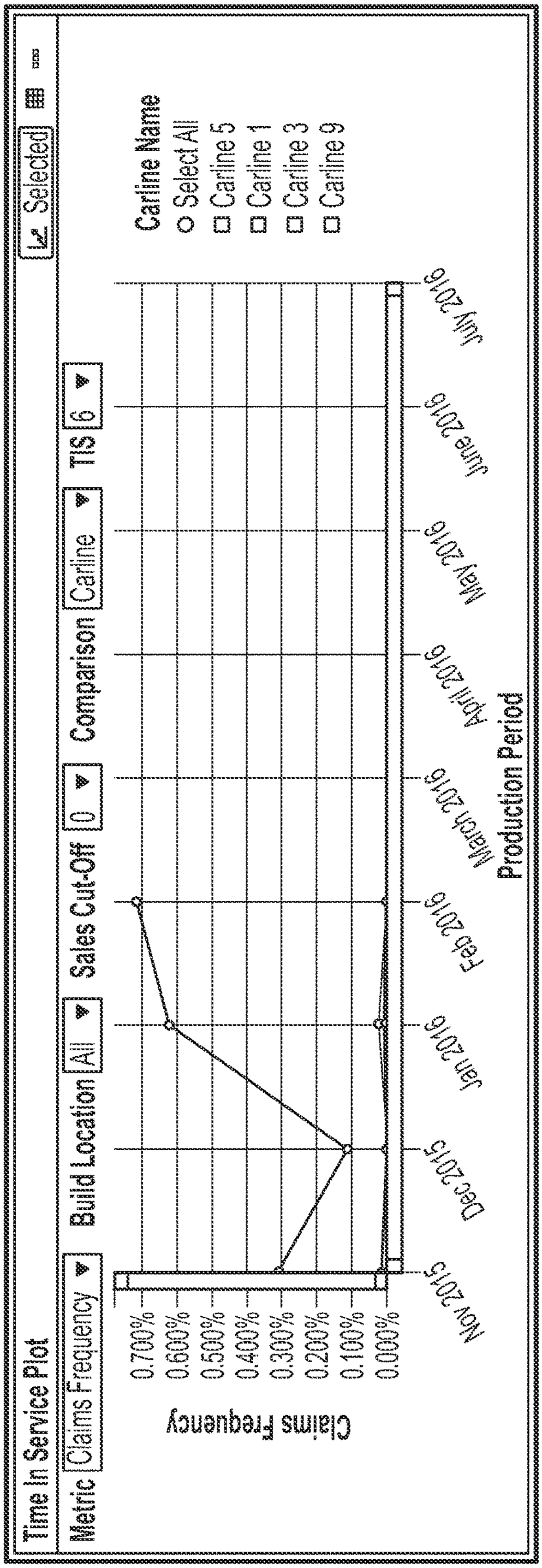

The data is shown in a multi-series line chart, with a separate line series for each Carline, Engine or Transmission, for a selected TIS value. This is illustrated in FIG. 110.

12.3.4 Part Code Breakdown

This shows the distribution of claimed Part Codes for the selected Labour Operation grouped by Carline, Engine or Transmission, as selected by the user.

Figure 111:
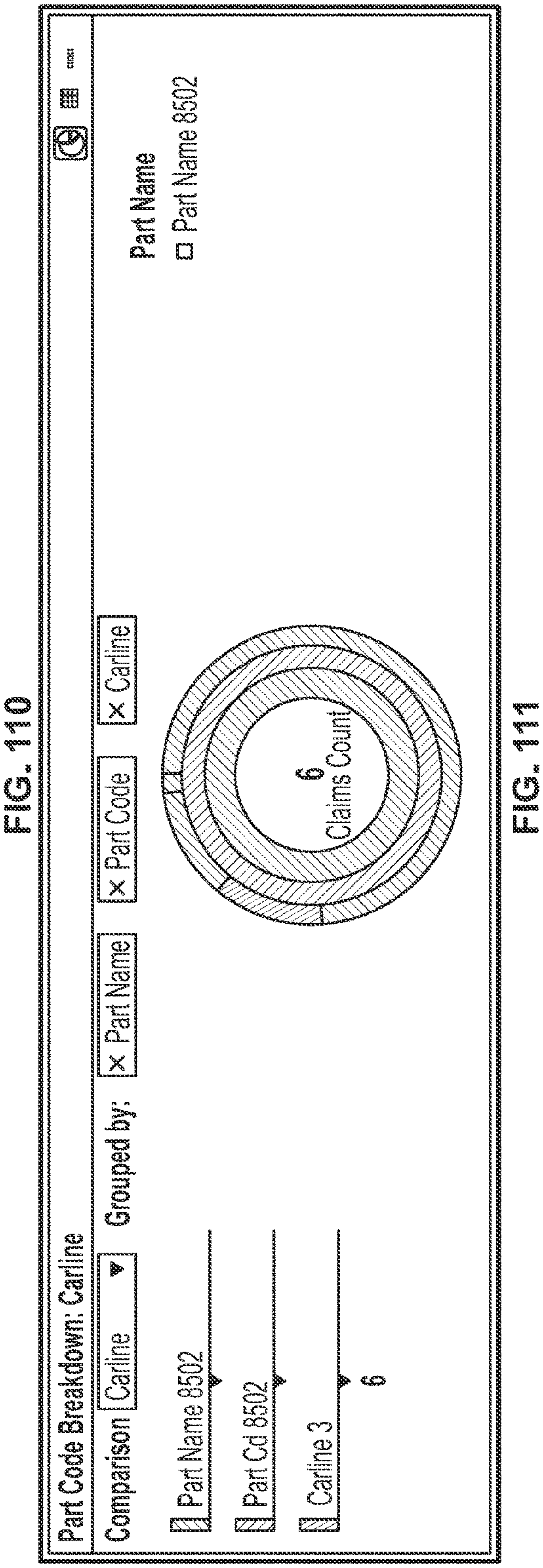

The data is displayed in a multi-level sunburst chart, grouped by Part Name, Part Code and then Carline, Engine or Transmission, as illustrated in FIG. 111.

12.4 Geographic Tab

This page shows Labour Operation forecasts for a All Regions/Single Region/Carline/Engine/Transmission, Model Year and Projection Months level.

Filter: The data shown on this page can be filtered by the user. The fields which can be filtered are:

Single Select

Region[48]

Carline

Engine

Transmission

Model Year

Category

Labour Operation

Projection Length

[48] The Region filter is not applied to the Regional Projections Map or Chart.

Each of the Region, Carline, Engine and Transmission filters have an "All" item, appended at the top of their list.

The "All" item is the default value, but, at least one Carline/Engine/Transmission must have a selection which is not the "All" item.

Navigation: There are no navigation targets from this page.

Reporting Objects: There are two reporting objects on this page showing how the selected Labour Operation forecast differs across the world.

The objects are the Regional Projections Map and the Region Projections chart.

12.4.1 Regional Projections Map

This shows the values of the forecasts on the selected Labour Operation for each Region across the world where it has been carried out.

Figure 112:
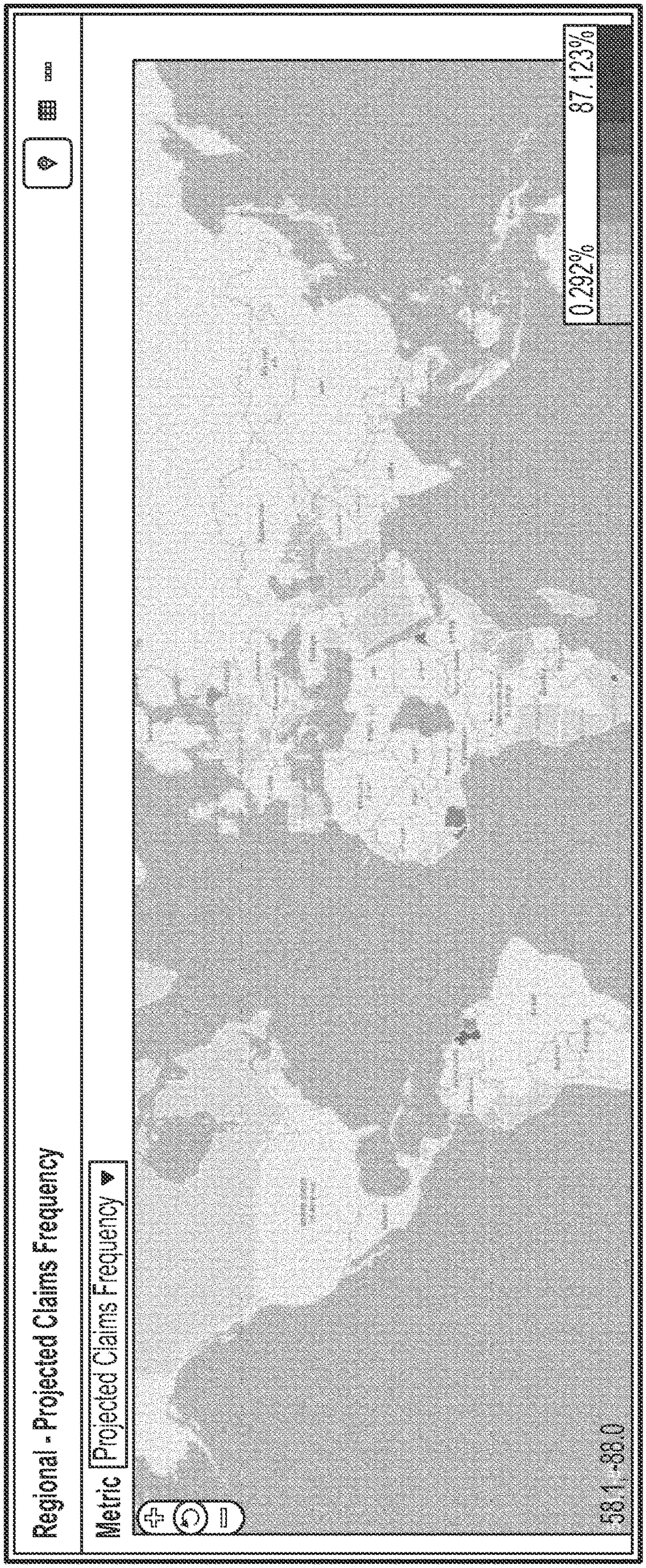

The data is shown within a world map, where each region is colour coded according to the severity of the forecast, as illustrated in FIG. 112.

12.4.2 Regional Projections Chart

Figure 113:
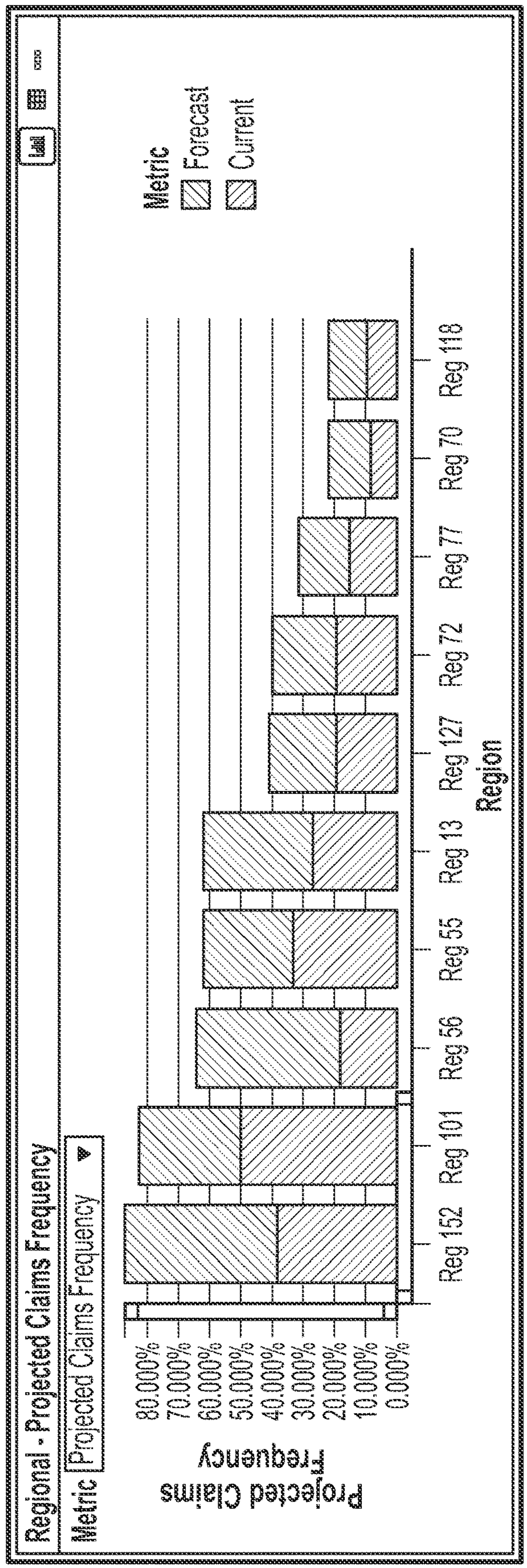

This shows the same data as the Regional Projections Map, but this time, plotted on column chart, with a column for each Region, as illustrated in FIG. 113.

12.5 Dealer Tab

This page shows Labour Operation forecasts for a All Regions/Single Region/Carline/Engine/Transmission, Model Year and Projection Months level.

Filter: The data shown on this page can be filtered by the user. The fields which can be filtered are:

Single Select
Region
Carline
Engine
Transmission
Model Year[49]
Category
Labour Operation
Projection Length[50]

[49] The Model Year filter is not applied to the Highest Costing Dealers.
[50] The Projection Length filter is not applied to the Highest Costing Dealers.

Each of the Region, Carline, Engine and Transmission filters have an "All" item, appended at the top of their list.

The "All" item is the default value, but, at least one Carline/Engine/Trans-mission must have a selection which is not the "All" item.

Navigation: There are no navigation targets from this page.

Reporting Objects: There is one reporting object on this page showing the highest spending Dealers for the selected Labour Operation.

12.5.1 Highest Costing Dealers

This shows a listing of the Dealers who have spent the most on the selected Labour Operation, split out by Model Years.

Figure 114:
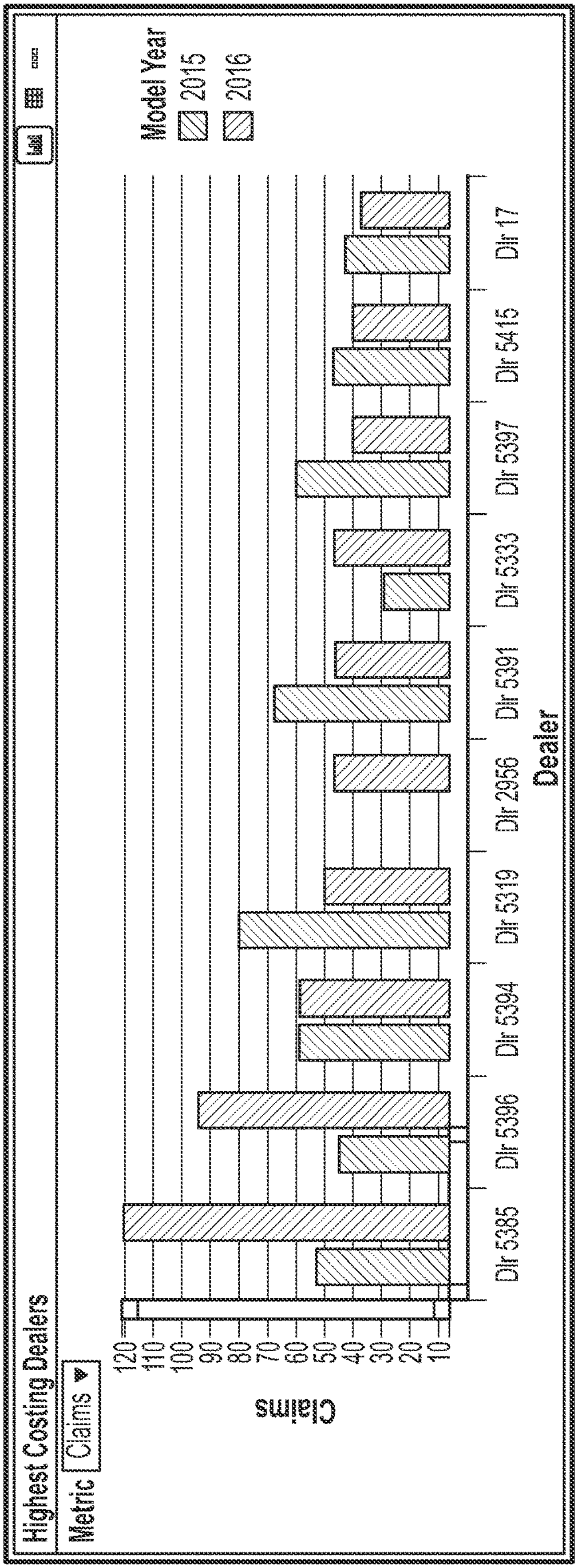

The data is shown in a grouped column chart, with a separate column for each Model Year, as illustrated in FIG. 114.

Section 13: Ultimate Brand Labour Operation Report

This report contains three pages with in-depth information supporting a Brand Labour Operation forecast for a single Model Year, single Projection Length and optional Region.

Each of the pages within the report is accessed through tabs at the top of the report.

13.1 Forecast Tab

This page shows Labour Operation forecasts aggregated to Brand level for a given Region (optional), Model Year and Projection Months.

Filter: The data shown on this page can be filtered by the user. The fields which can be filtered are:

Single Select
Region
Brand
Model Year[51]
Labour Operation
Projection Length

51 The Model Year filter is not applied to the Model Year Development or the Historic Projections Development.

The Region filter has an "All" item, appended at the top of its list, to allow it be optional.

Navigation: There are no navigation targets from this page.

Reporting Objects: This page contains two reporting objects each showing information supporting the forecast. The objects are the Model Year Development and Historic Projections Development.

13.1.1 Model Year Development

This shows a comparison of the forecast on the selected Brand Labour Operation across each Model Year.

This is presented within a stacked column chart showing the relationship between current and forecasted performance for each Model Year, as illustrated in FIG. 48.

13.1.2 Historic Projections Development

This shows a comparison of how the forecast on the selected Brand Labour Operation has developed over time for each Model Year.

The data is displayed in a multi-series line chart, with a separate line series for each Model Year, as illustrated in FIG. 91.

13.2 Production Tab

This page shows Labour Operation forecasts aggregated to Brand level for a given Region (optional), Model Year and Projection Months.

Filter: The data shown on this page can be filtered by the user. The fields which can be filtered are:

Single Select
Region[52]
Brand
Model Year[53]
Labour Operation
Projection Length[54]

[52] The Region filter is not applied to the Stacked TIS.
[33] The Model Year filter is not applied to the TIS Model Year Comparison or the Stacked TIS.
[34] The Projections Length filter is not applied to the TIS Model Year Comparison or the Stacked TIS.

The Region filter has an "All" item, appended at the top of its list, to allow it be optional.

Navigation: There are no navigation targets from this page.

Reporting Objects: This page contains two reporting objects each showing information around the production data supporting the forecast. The objects are the TIS Model Year Comparison and the Stacked TIS.

13.2.1 TIS Model Year Comparison

This shows, for each Model Year, the development of Time in Service (TIS) performance for the selected Brand Labour Operation.

The data is shown in a multi-series line chart, with a series for each Model Year, as illustrated in FIG. 95.

13.2.2 Stacked TIS

This shows Production Month, Time in Service (TIS) performance for the selected Brand Labour Operation.

The Stacked TIS chart shows the performance of each TIS period for the selected Brand Labour Operation, as illustrated in FIG. 74.

13.3 Comparison Tab

This page shows Labour Operation forecasts aggregated to Brand level for a given Region (optional), Model Year and Projection Months.

Filter: The data shown on this page can be filtered by the user. The fields which can be filtered are:

Single Select
Region[55]
Brand[56]
Model Year[57]
Labour Operation
Projection Length[58]

[55] The Region filter is not applied to the Selected TIS.
[56] The Brand filter is not applied to the Grouped Model Year Comparison.
[57] The Model Year filter is not applied to the Grouped Model Year Development or the Selected TIS.
[58] The Projection Length filter is not applied to the Selected TIS.

The Region filter has an "All" item, appended at the top of its list, to allow it be optional.

Navigation: There are no navigation targets from this page.

Reporting Objects: The page contains three reporting objects each showing in-formation comparing the selected forecast with other Brand Labour Operation forecasts.

The objects are Grouped Model Year Development, Selected TIS and Part Code Breakdown.

13.3.1 Grouped Model Year Development

This shows the development of the forecast, for all Brands, of the Labour Operation across Model Years.

Figure 115:
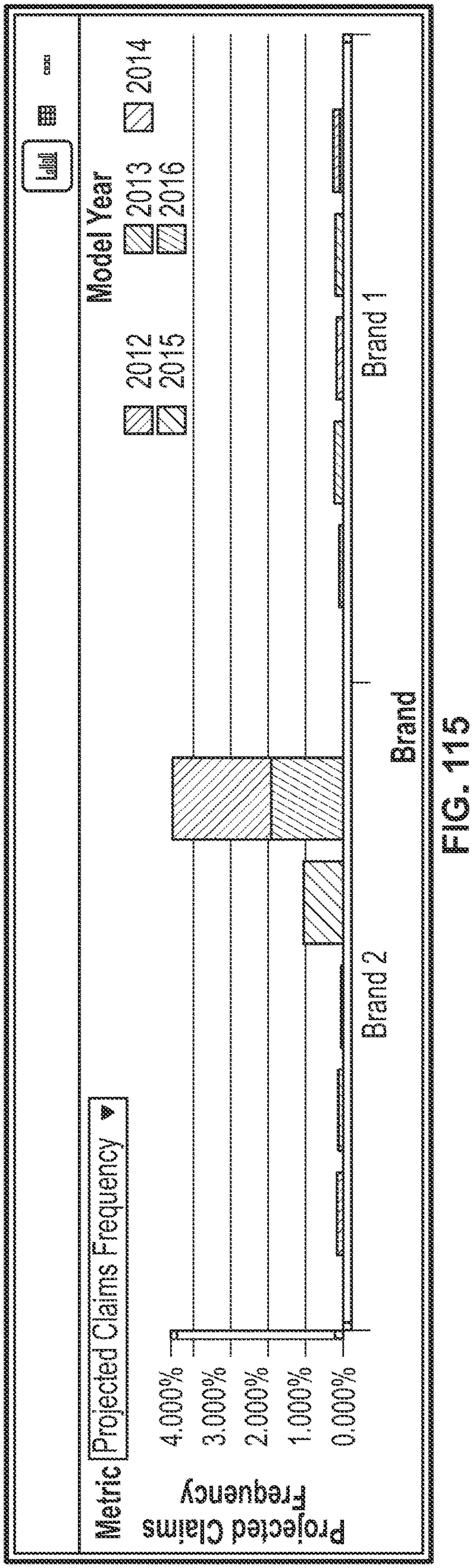

This data is shown in a grouped stacked column chart, showing the relationship between current and forecasted performance for each Model Year, as illustrated in FIG. 115.

13.3.2 Selected TIS

This shows Production Month, Time in Service (TIS) performance for the selected Labour Operation compared across Brands.

Figure 116:
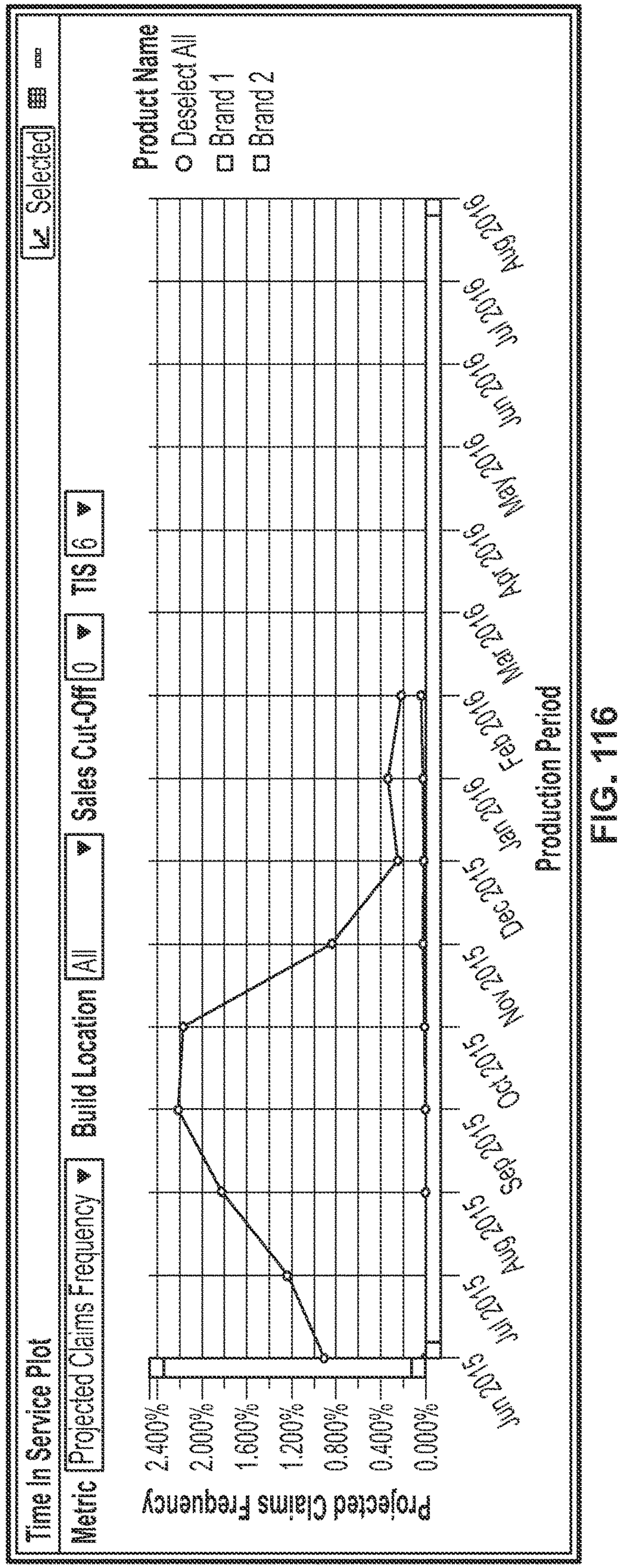

The data is shown in a multi-series line chart, with a separate line series for each Brand, for a selected TIS value. This is illustrated in FIG. 116.

13.3.3 Part Code Breakdown

This shows the distribution of claimed Part Codes for the selected Brand Labour Operation.

Figure 117:
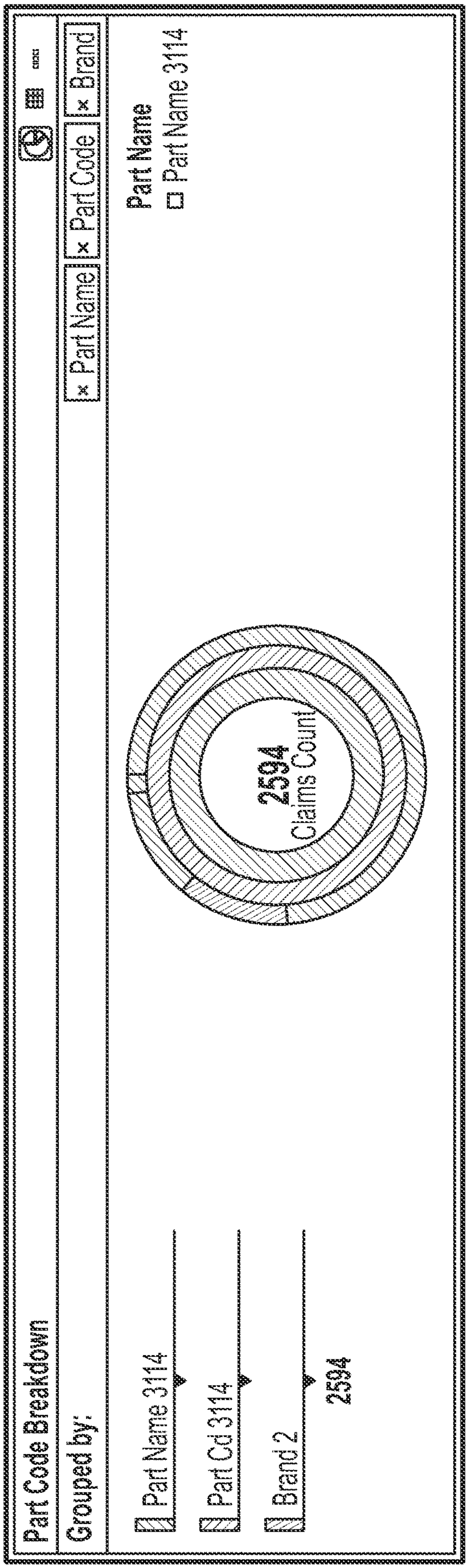

The data is displayed in a multi-level sunburst chart, grouped by Part Name, Part Code and then Brand, as illustrated in FIG. 117.

Section 14: Ultimate Product Labour Operation Report

This report contains three pages with in-depth information supporting a Product Labour Operation forecast for a single Model Year, single Projection Length and optional Region.

Each of the pages within the report is accessed through tabs at the top of the report.

14.1 Forecast Tab

This page shows Labour Operation forecasts aggregated to Product level for a given Region (optional), Model Year and Projection Months.

Filter: The data shown on this page can be filtered by the user. The fields which can be filtered are:

Single Select
Region
Product
Model Year[59]
Labour Operation
Projection Length

[59] The Model Year filter is not applied to the Model Year Development or the Historic Projections Development.

The Region filter has an "All" item, appended at the top of its list, to allow it be optional.

Navigation: There are no navigation targets from this page.

Reporting Objects: This page contains two reporting objects each showing information supporting the forecast. The objects are the Model Year Development and Historic Projections Development.

14.1.1 Model Year Development

This shows a comparison of the forecast on the selected Product Labour Operation across each Model Year.

This is presented within a stacked column chart showing the relationship between current and forecasted performance for each Model Year, as illustrated in FIG. 48.

14.1.2 Historic Projections Development

This shows a comparison of how the forecast on the selected Product Labour Operation has developed over time for each Model Year.

The data is displayed in a multi-series line chart, with a separate line series for each Model Year, as illustrated in FIG. 91.

14.2 Production Tab

This page shows Labour Operation forecasts aggregated to Product level for a given Region (optional), Model Year and Projection Months.

Filter: The data shown on this page can be filtered by the user. The fields which can be filtered are:

Single Select
Region[60]
Product
Model Year[61]
Labour Operation
Projection Length[62]

[60] The region filter is not applied to the Stacked TIS.

[61] The Model Year filter is not applied to the TIS Model Year Comparison or the Stacked TIS.

[62] The Projection Length filter is not applied to the TIS Model Year Comparison or the Stacked TIS.

The Region filter has an "All" item, appended at the top of its list, to allow it be optional.

Navigation: There are no navigation targets from this page.

Reporting Objects: This page contains two reporting objects each showing information around the production data supporting the forecast. The objects are the TIS Model Year Comparison and the Stacked TIS.

14.2.1 TIS Model Year Comparison

This shows, for each Model Year, the development of Time in Service (TIS) performance for the selected Product Labour Operation.

The data is shown in a multi-series line chart, with a series for each Model Year, as illustrated in FIG. 95.

14.2.2 Stacked TIS

This shows Production Month, Time in Service (TIS) performance for the selected Product Labour Operation.

The Stacked TIS chart shows the performance of each TIS period for the selected Product Labour Operation, as illustrated in FIG. 74.

14.3 Comparison Tab

This page shows Labour Operation forecasts aggregated to Product level for a given Region (optional), Model Year and Projection Months.

Filter: The data shown on this page can be filtered by the user. The fields which can be filtered are:

Single Select
Region[63]
Product[64]
Model Year[65]
Labour Operation
Projection Length[66]

[63] The Region filter is not applied to the Selected TIS.

[64] The Product filter is not applied to the Grouped Model Year Comparison.

[65] The Model Year filter is not applied to the Grouped Model Year Development or the Selected TIS.

[66] The Projection Length filter is not applied to the Selected TIS.

The Region filter has an "All" item, appended at the top of its list, to allow it be optional.

Navigation: There are no navigation targets from this page.

Reporting Objects: The page contains three reporting objects each showing in-formation comparing the selected forecast with other Product Labour Operation forecasts.

The objects are Grouped Model Year Development, Selected TIS and Part Code Breakdown.

14.3.1 Grouped Model Year Development

This shows the development of the forecast, for all Products, of the Labour Operation across Model Years.

Figure 118:
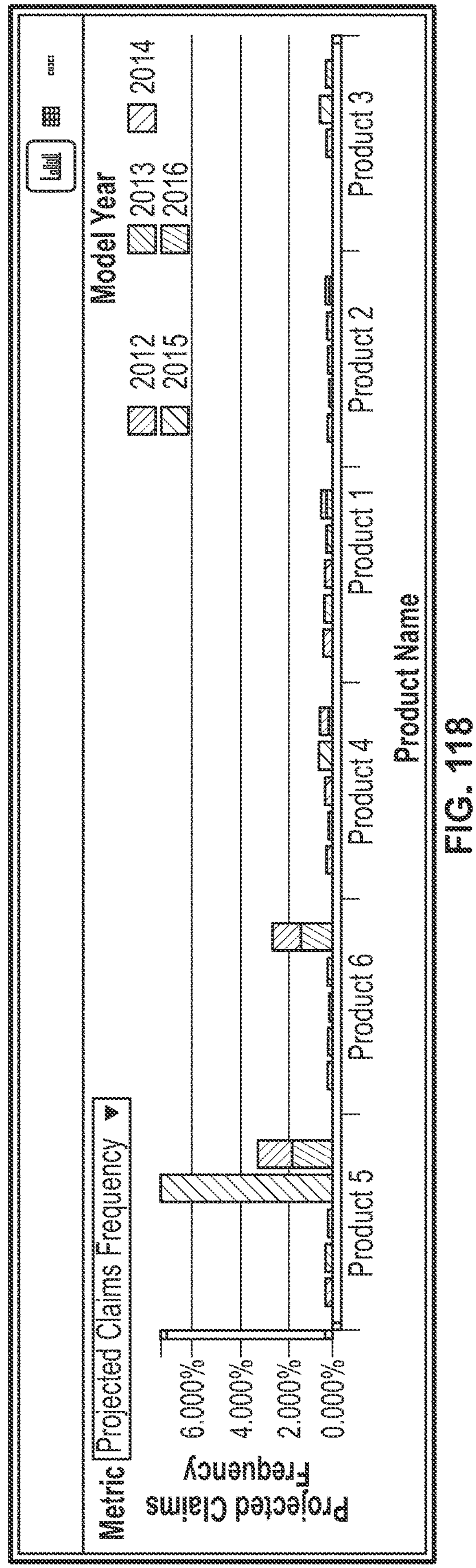

This data is shown in a grouped stacked column chart, showing the relationship between current and forecasted performance for each Model Year, as illustrated in FIG. 118.

This shows Production Month, Time in Service (TIS) performance for the selected Labour Operation compared across Products.

Figure 119:
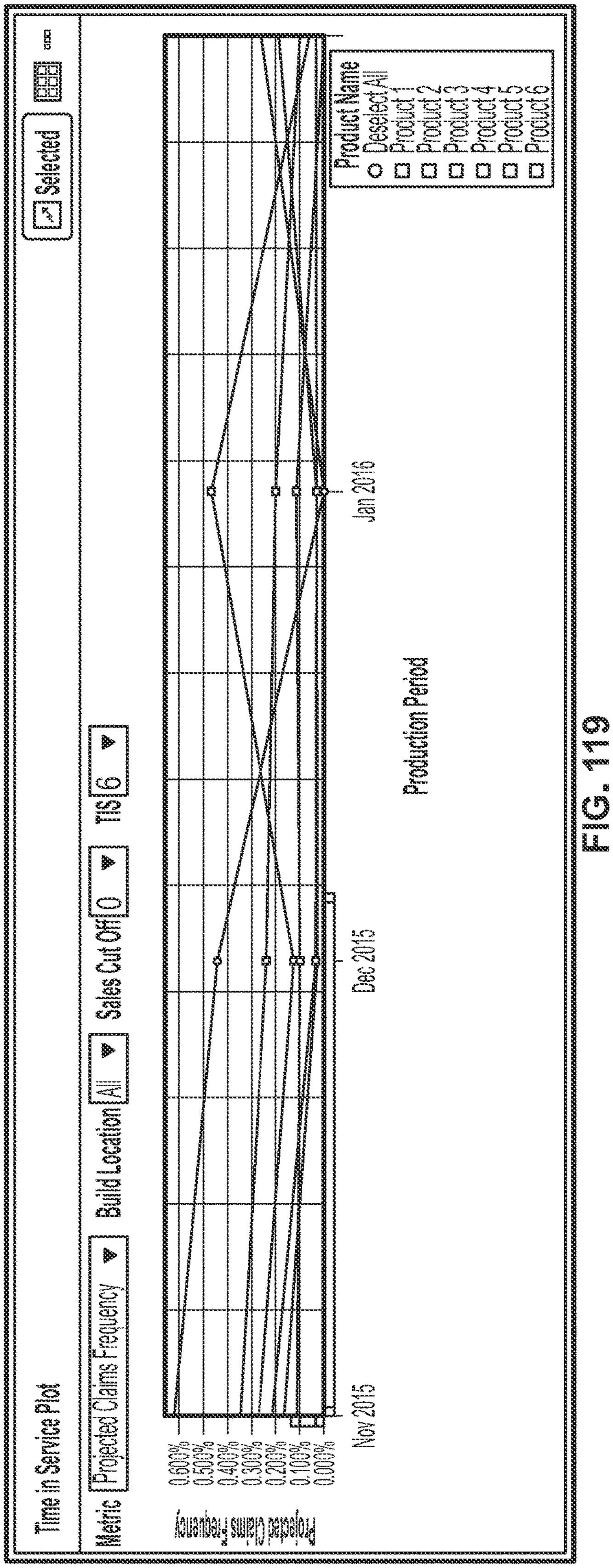

The data is shown in a multi-series line chart, with a separate line series for each Product, for a selected TIS value. This is illustrated in FIG. 119.

14.3.3 Part Code Breakdown

This shows the distribution of claimed Part Codes for the selected Product Labour Operation.

Figure 120:
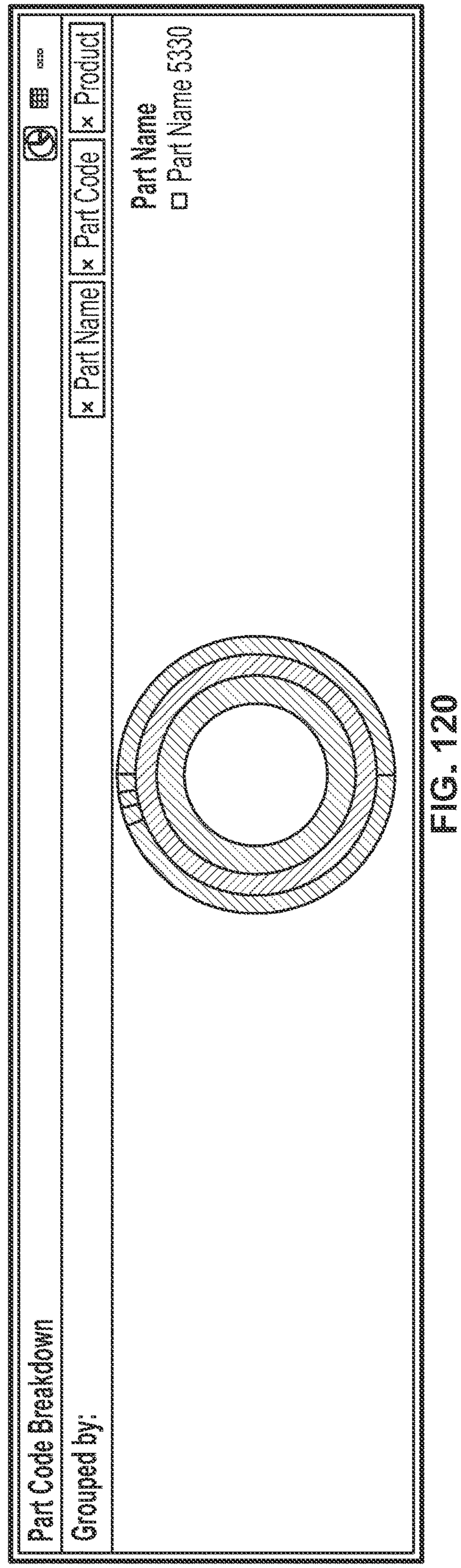

The data is displayed in a multi-level sunburst chart, grouped by Part Name, Part Code and then Product, as illustrated in FIG. 120.

Section 15: Claims Details

This page shows the details of the raw claims records underlying a selected forecast or production month Time In Service (TIS) value.

Filter: The data shown on this page can be filtered by the user. The fields which can be filtered follows:

Single Select
Brand (optional)
Product (optional)
Region (optional)
Carline (optional)
Engine (optional)
Transmission (optional)
Model Year (optional)
Labour Operation (optional)
Category (optional)
Part (optional)
Production Month (optional)
TIS (optional)
Projection Months (optional)
Build Location (optional)
Failure Mode (optional)

Navigation: There are no navigation targets for the user to navigate to from this page.

Reporting Objects: This page contains a single report object showing claims records.

15.0.1 Claims Details Grid

This shows the claims records using two different modes that the user can toggle between.

The first mode is a data grid showing the claims records in their raw format, as illustrated in FIG. 121.

The second mode is a summary of the data rows displayed in the grid. This groups the records into the hierarchy specified by the user, which can contain any field from within the dataset.

Figure 122:
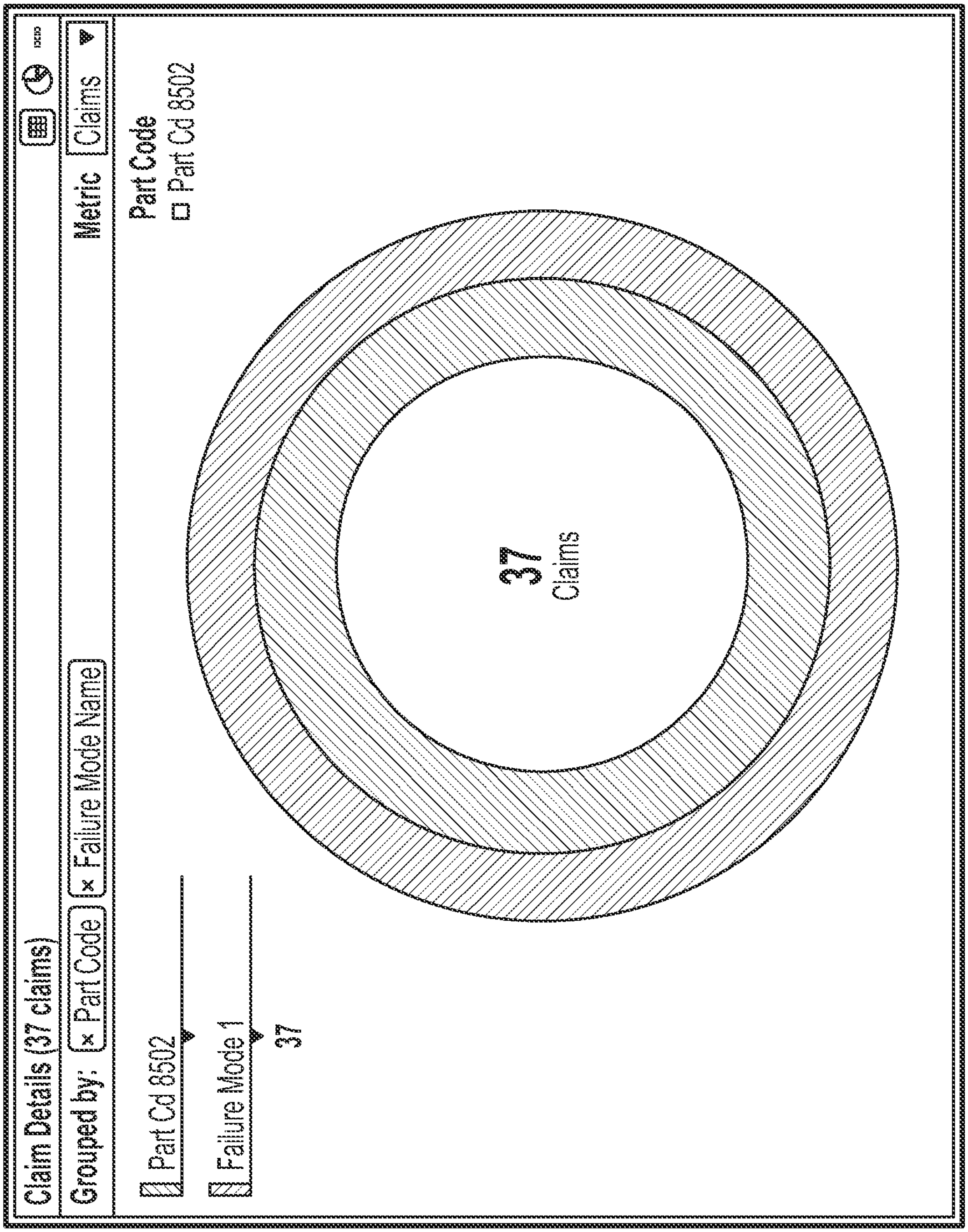

This hierarchy is then used to display a sunburst chart for either the count of claims or the sum of the cost of the claims. This is illustrated in FIG. 122.

Section 16: Part Code Breakdown

This page shows the details of which Part Codes have been claimed under any forecast shown within the system.

Filter: The data shown on this page can be filtered by the user. The fields which can be filtered follows:

Single Select
Brand (optional)
Product (optional)
Region (optional)
Carline (optional)
Engine (optional)
Transmission (optional)
Model Year (optional)
Labour Operation (optional)
Category (optional)
Projection Months (optional)

Navigation: There are no navigation targets for the user to navigate to from this page.

Reporting Objects: This page contains a single report object showing the Part Code claims summary.

16.0.1 Part Code Breakdown Grid

The list of Part Codes claimed for the selected forecast is presented in descending order the number of times the part has been claimed.

This is shown as a data grid, as illustrated in FIG. 123.

Section 17—Example Use-Cases

Example workflows will now be described with reference to the remaining figures.

The example workflows serve to illustrate various aspects of the user interface described in the above in a practical context. In the following, a particular emphasis is placed on navigation between pages, according to the defined hierarchy, to demonstrate how the Indico system allows issues to be identified.

An important aspect of the workflow described below is the fact that the user can start at the manufacture level, and quickly move down the hierarchy to locate problems lower down the hierarchy.

On-screen objects referred to below, such as node trees, dynamic grids etc., are rendered as described in the above. In particular, within each object projections are ordered according to whichever metric is currently selected, to allow problematic areas at the current level of the hierarchy to be seen easily.

The user can then select an element of one of the on-screen object(s) used to render predictions on a particular page, such as a node of a node tree, row or a grid etc. to select a problematic entity (e.g. brand, product, carline) at the next level down in the hierarchy. Using the navigation charm, s/he can (among other things) then navigate to the next page down in the hierarchy for the selected entity or, when in the overview mode, switch to the detailed mode to obtain the corresponding detailed page.

This ability to both move done the hierarchy in a logical fashion, by selecting target entities from the on-screen objects that are used to render the predictions, and also switch across from the overview mode to the detailed mode to chance the focus to individual labour operations, is an extremely powerful tool that is highly intuitive from an engineering perspective.

Figure 5:
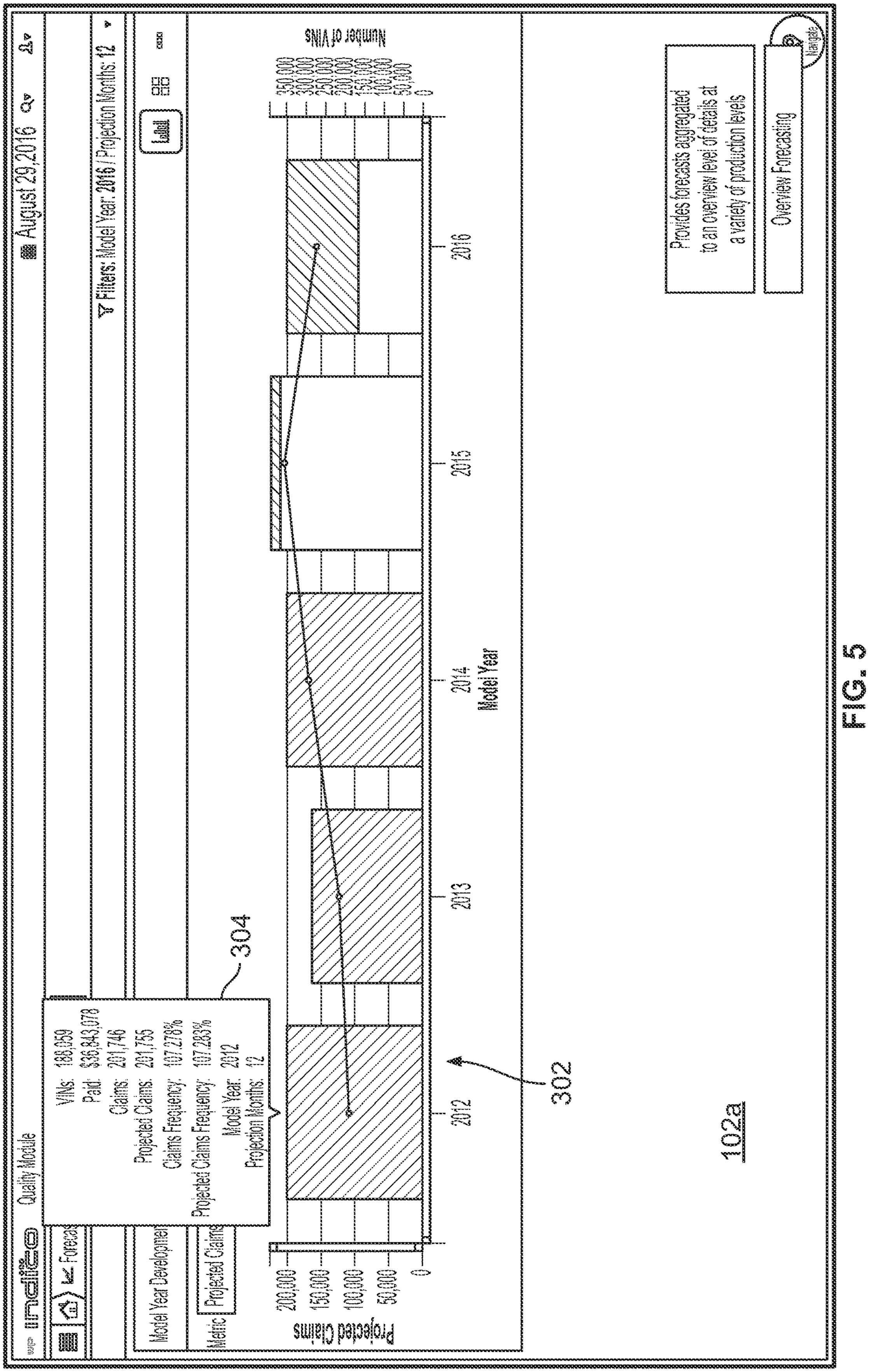
Figure 6:
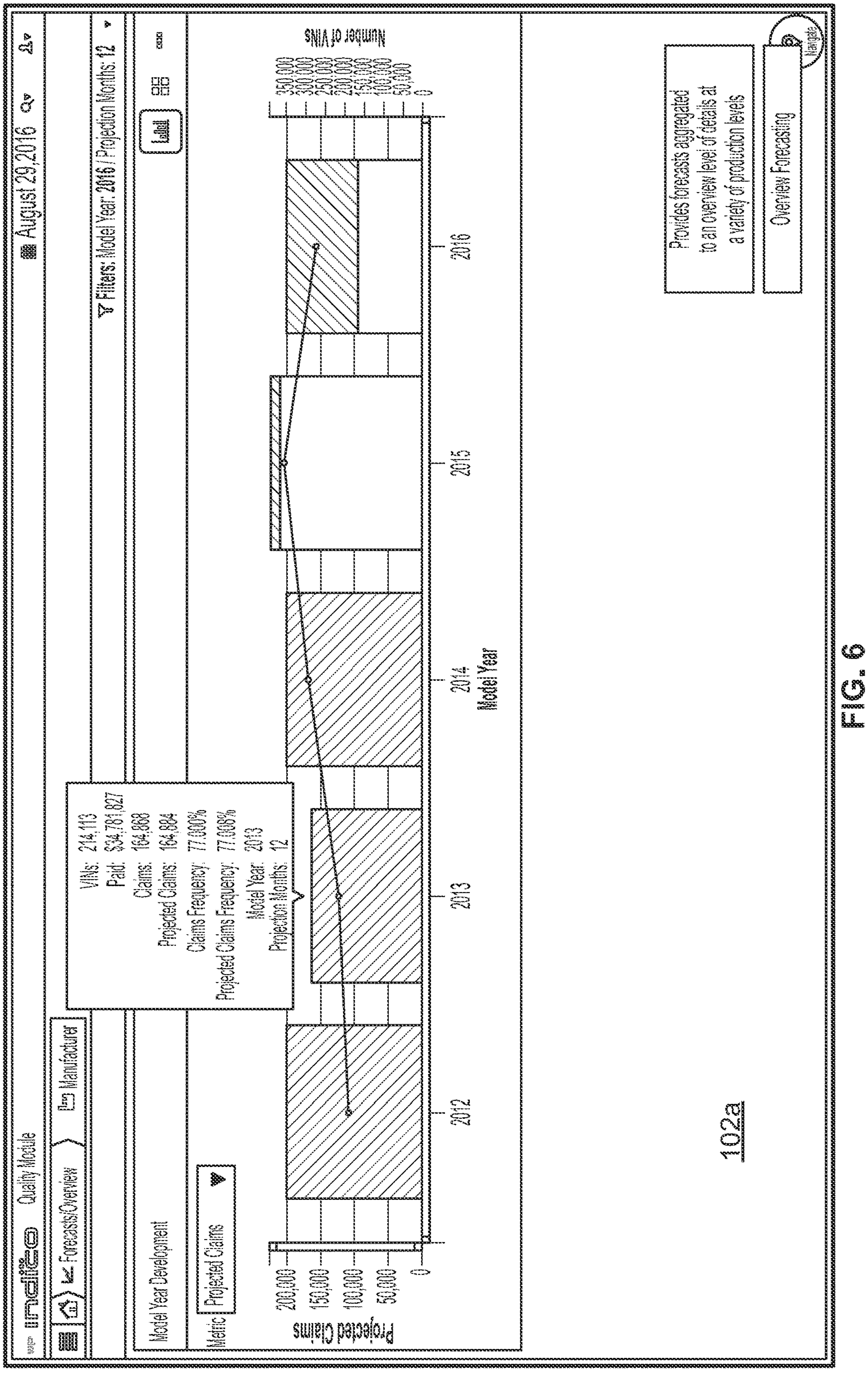
Figure 7:
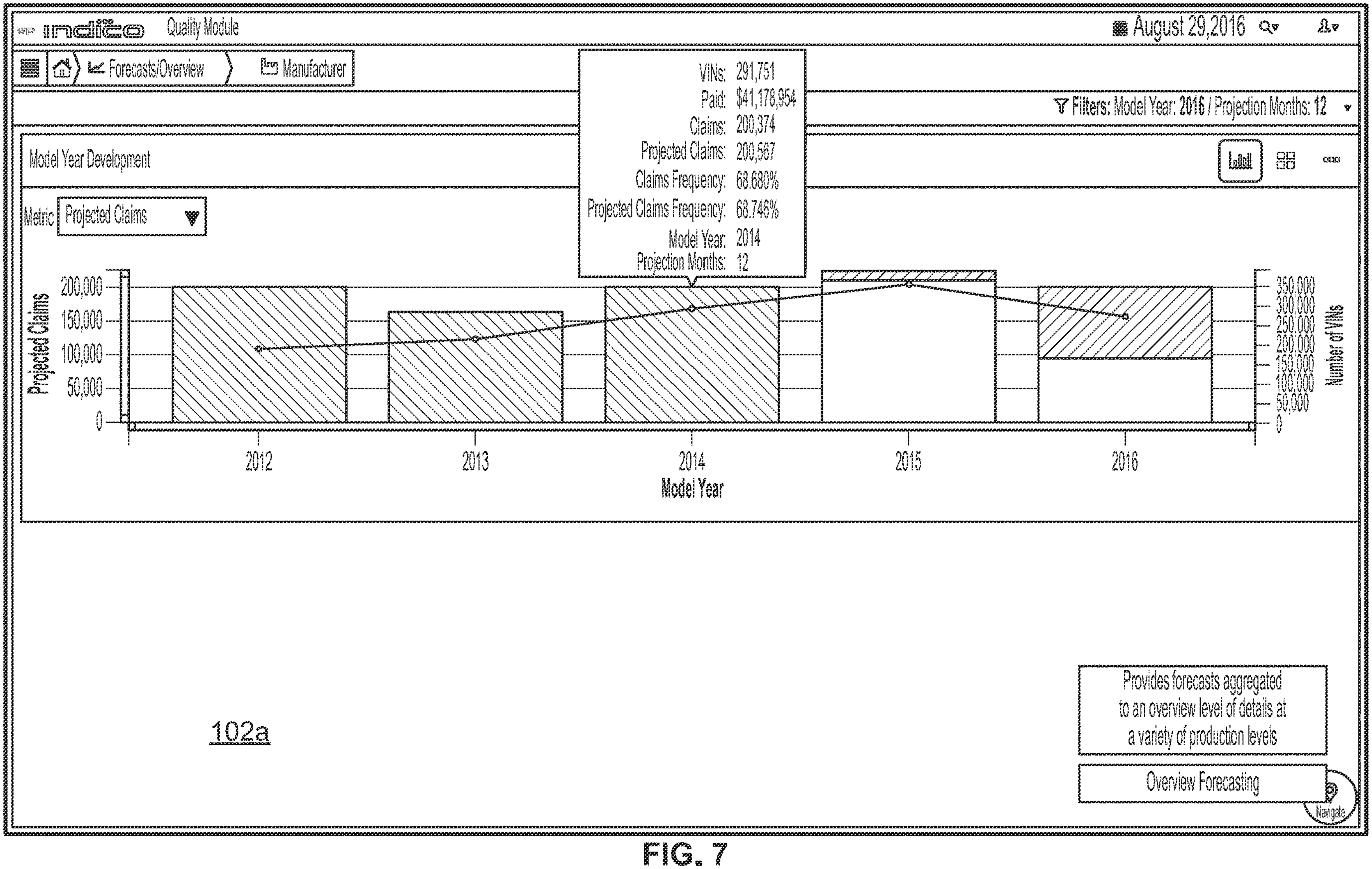
Figure 8:
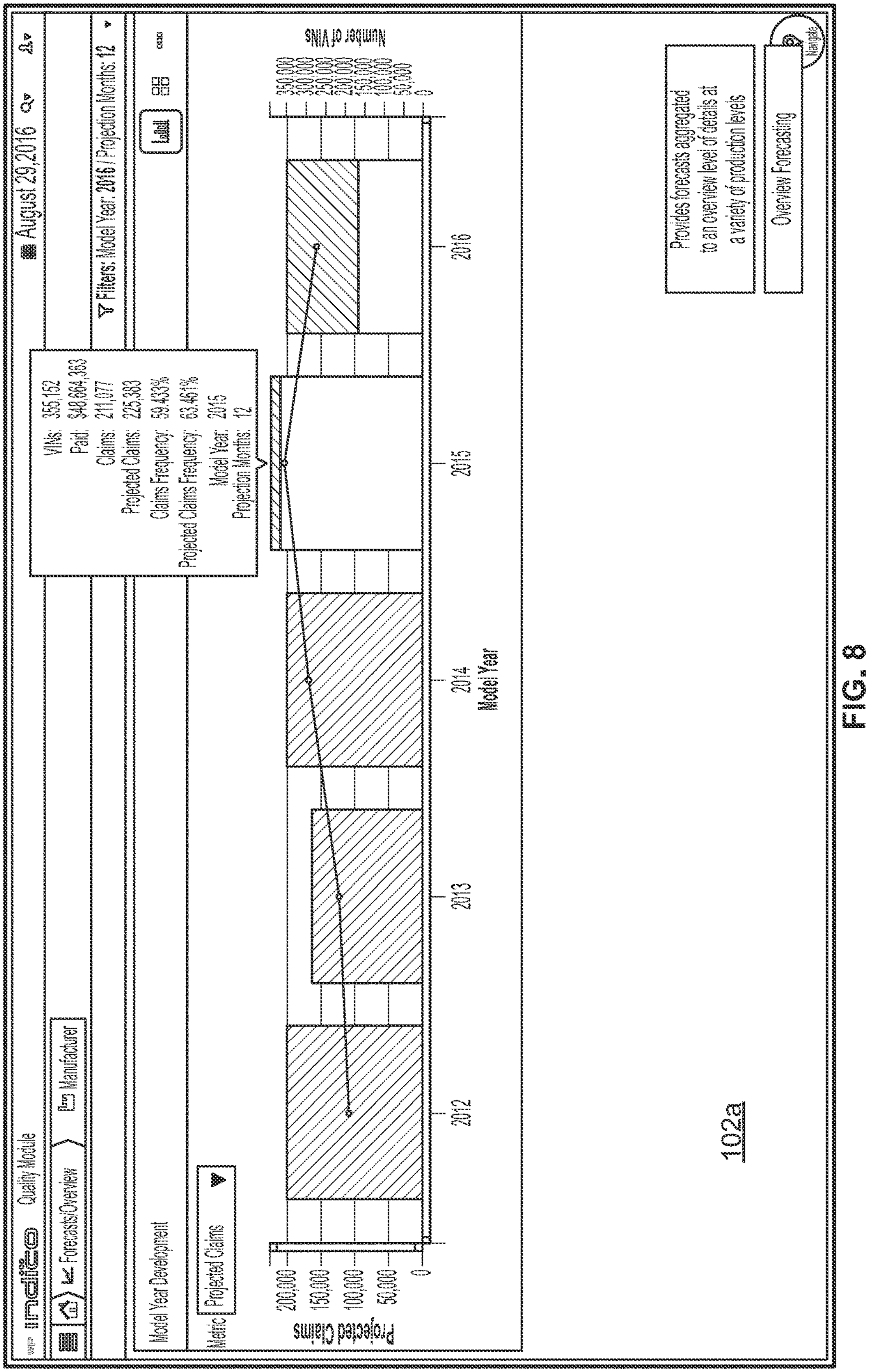
Figure 9:
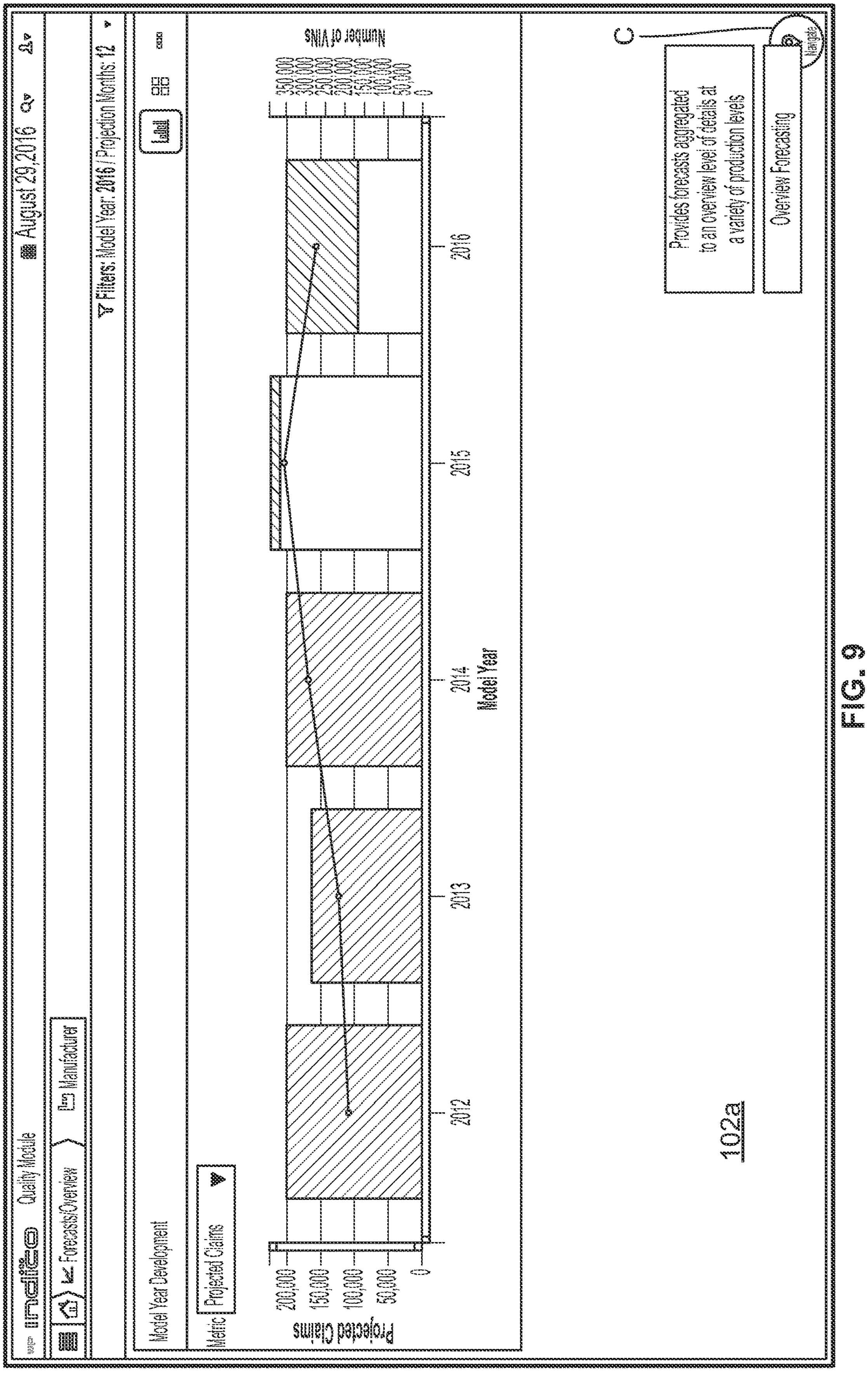

FIG. 5 shows a homepage of the user interface, from which a user can navigate to different pages within the network of pages shown in FIG. 3. In particular, the user can navigate to any one of the overview or detailed pages 102, 104 at any desired level of the hierarchy.

FIGS. 5 to 10 show an example of the overview manufacturer page 102*a* for a particular manufacturer. A column chart 302 is provided to give a breakdown of the projections aggregated at the manufacture level according to model year. By hovering the cursor over an individual column of the column chart, the user can obtain additional information 304 relating to that model year as shown in the figures.

A navigation element C, referred to as a "charm", is displayed on each page in both the overview and detailed modes and at every level of the hierarchy. The charm C is the mechanism by which a user can navigate from the current page directly to another page in accordance with the structure of FIG. 5. By selecting the charm C on the manufacture overview page 102*a*, selectable options 802 and 804 are displayed, which are selectable to navigate to the overview brand page 102*b* and the detailed manufacturer page 104*a* respectively (note the option to navigate directly to the detailed manufacturer page 104*a* from the manufacturer overview page 102*a* is not shown in FIG. 3).

Figure 10:
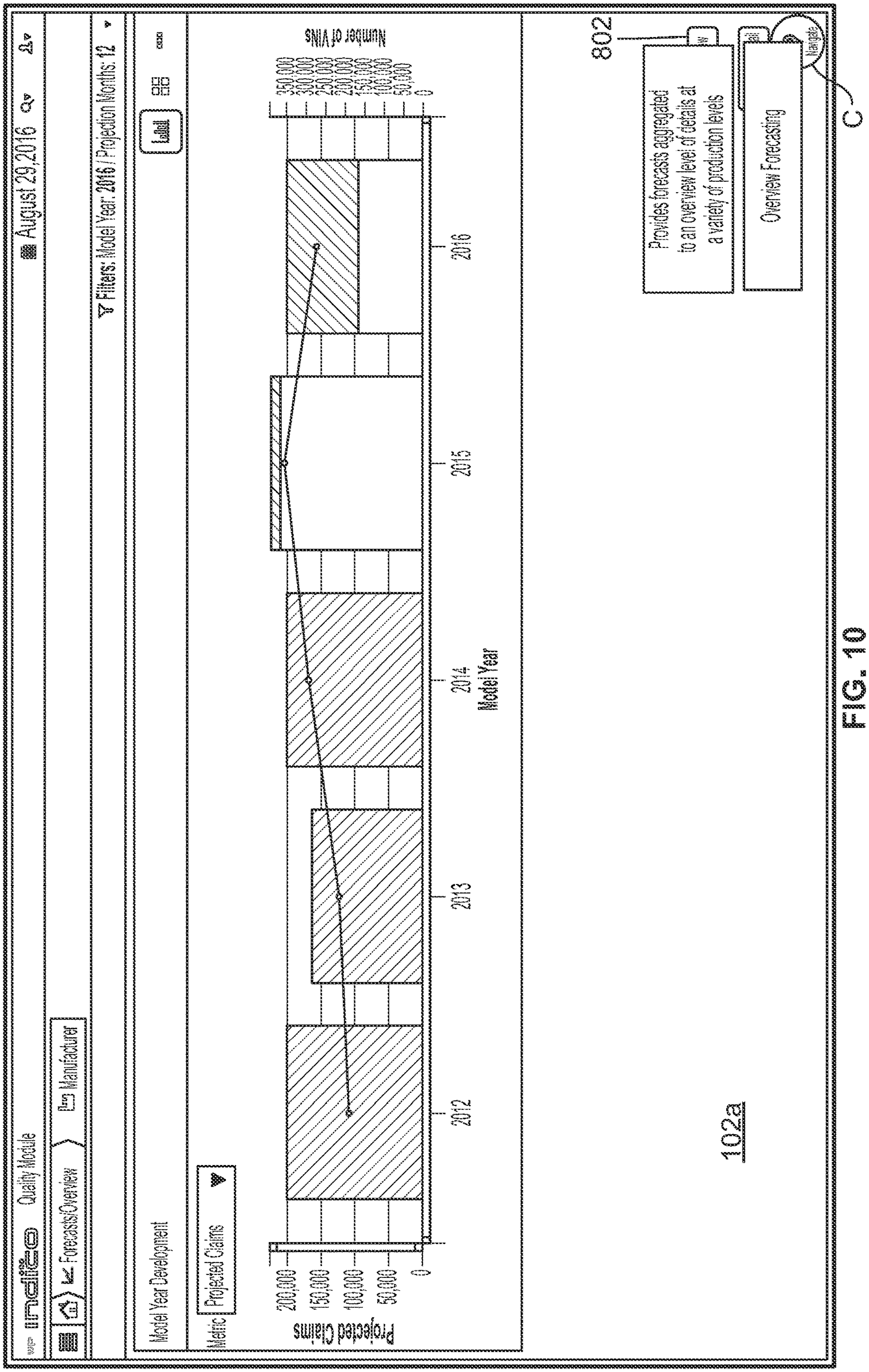
Figure 11:
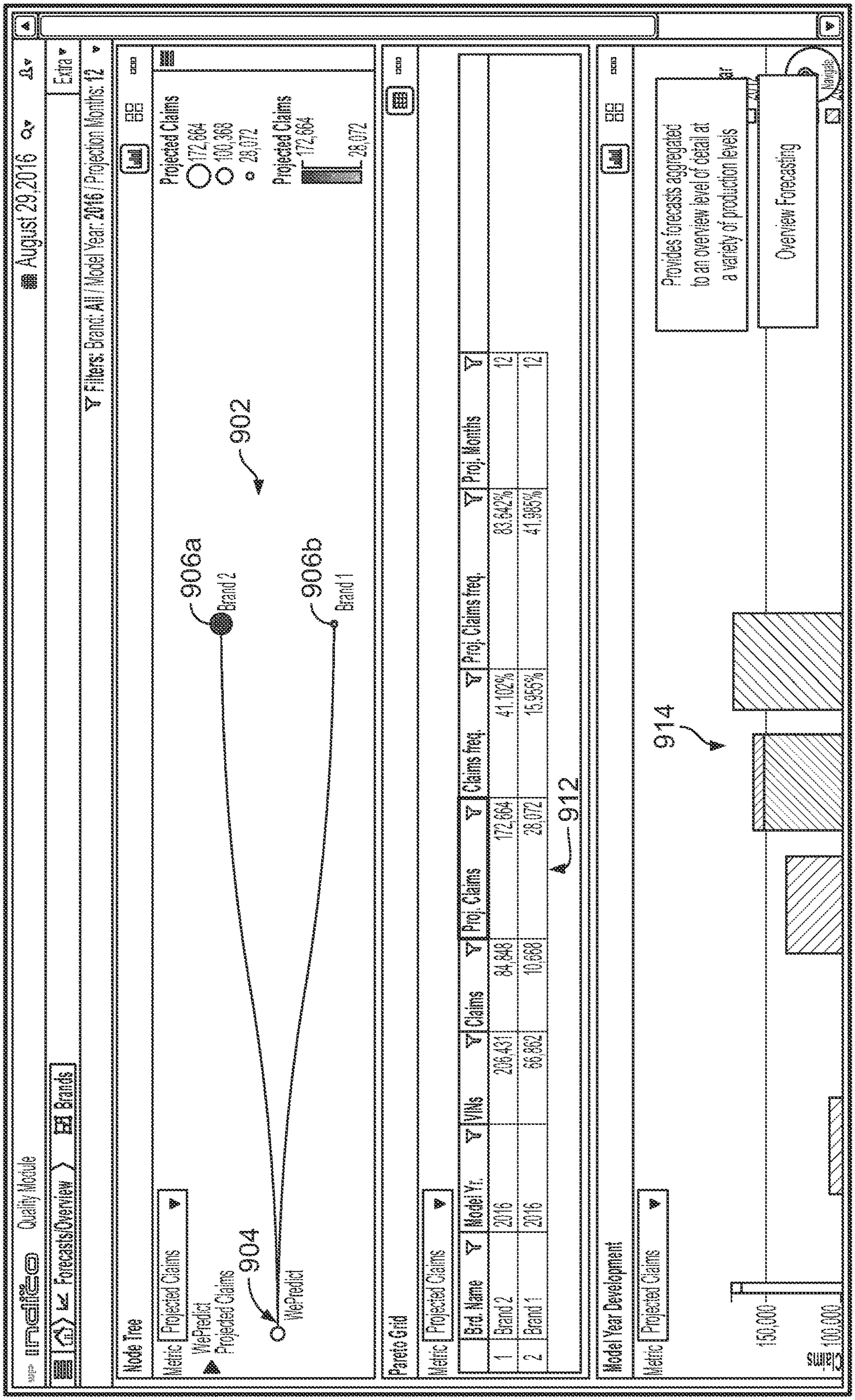
Figure 12:
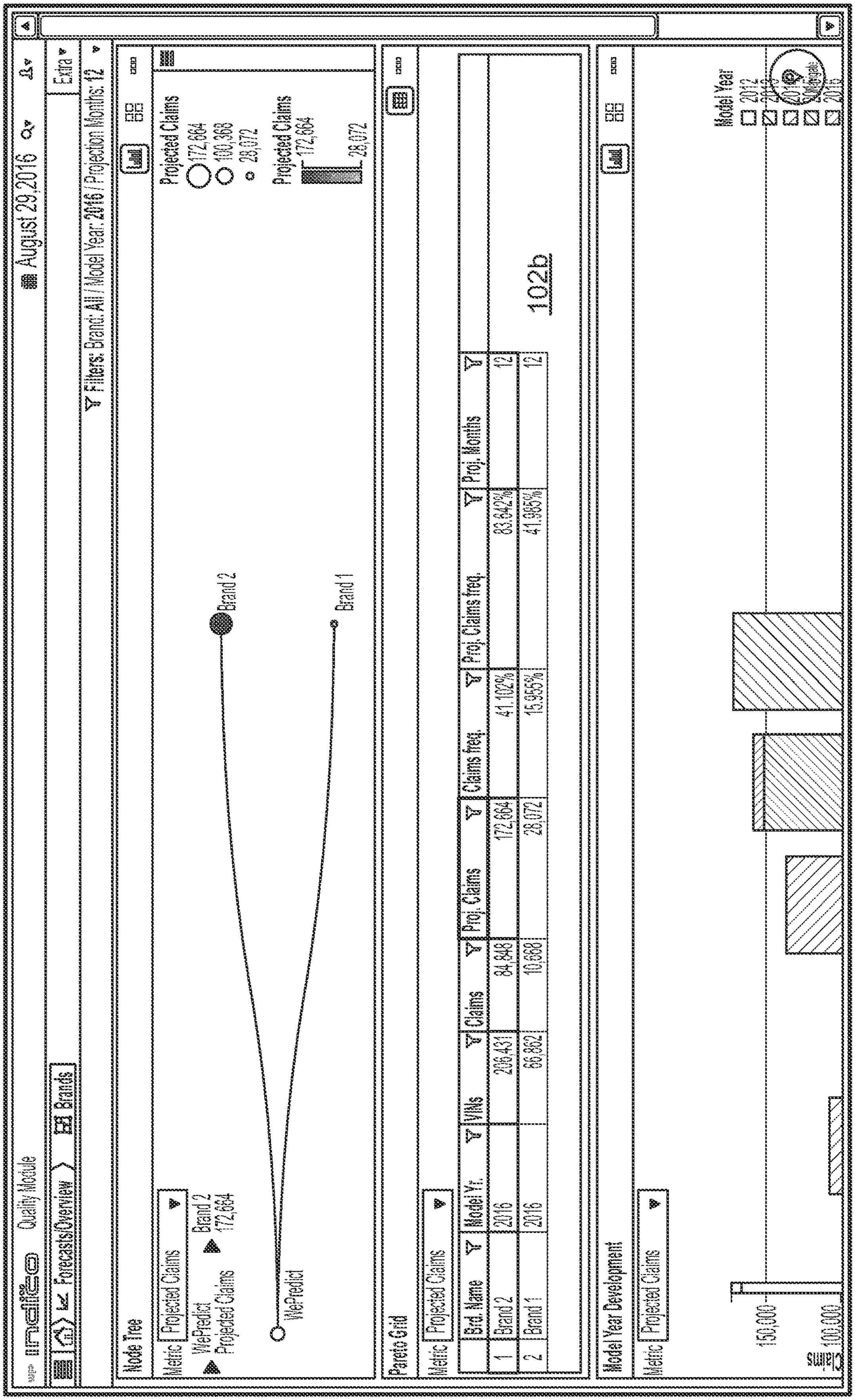
Figure 13:
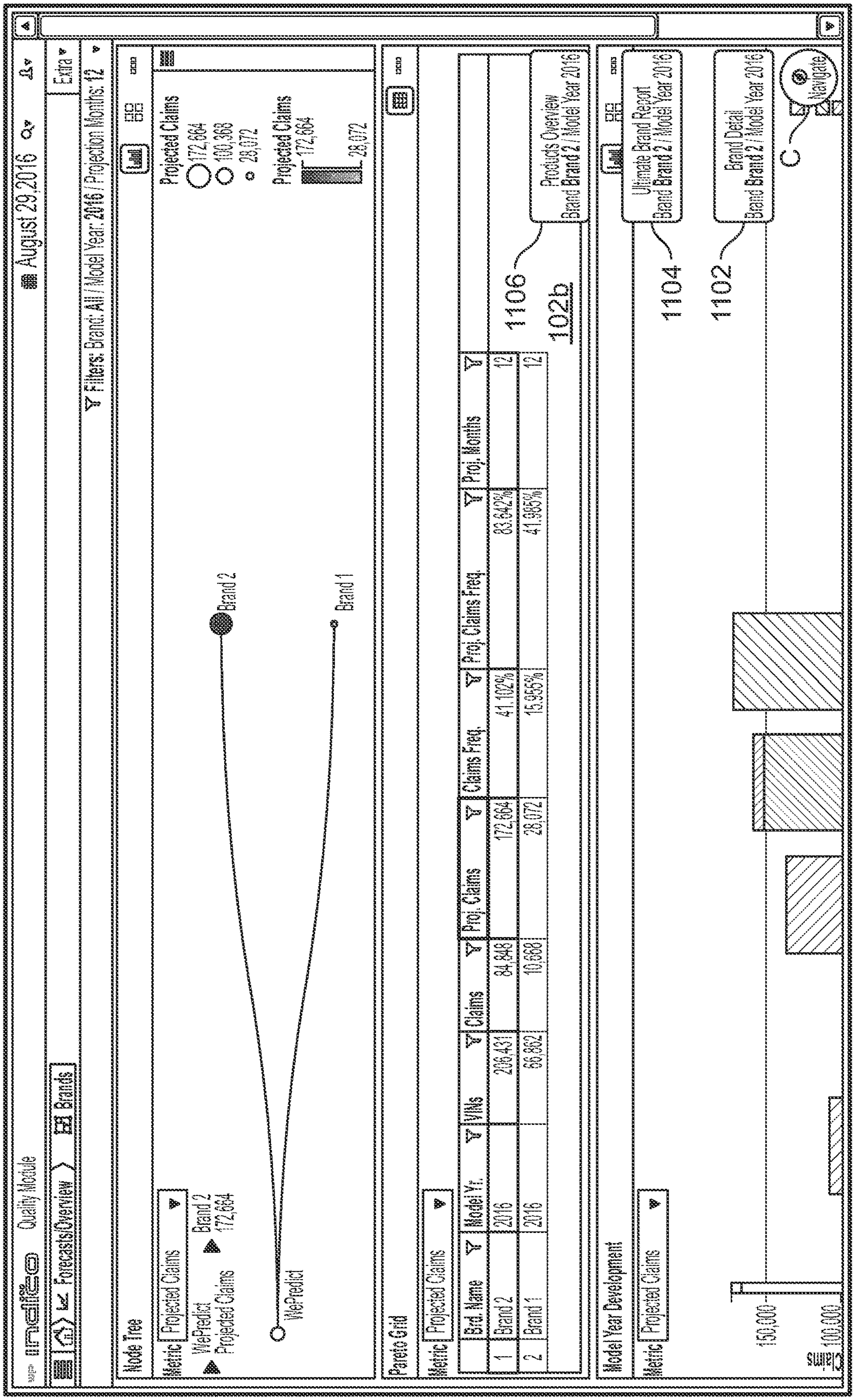
Figure 14:
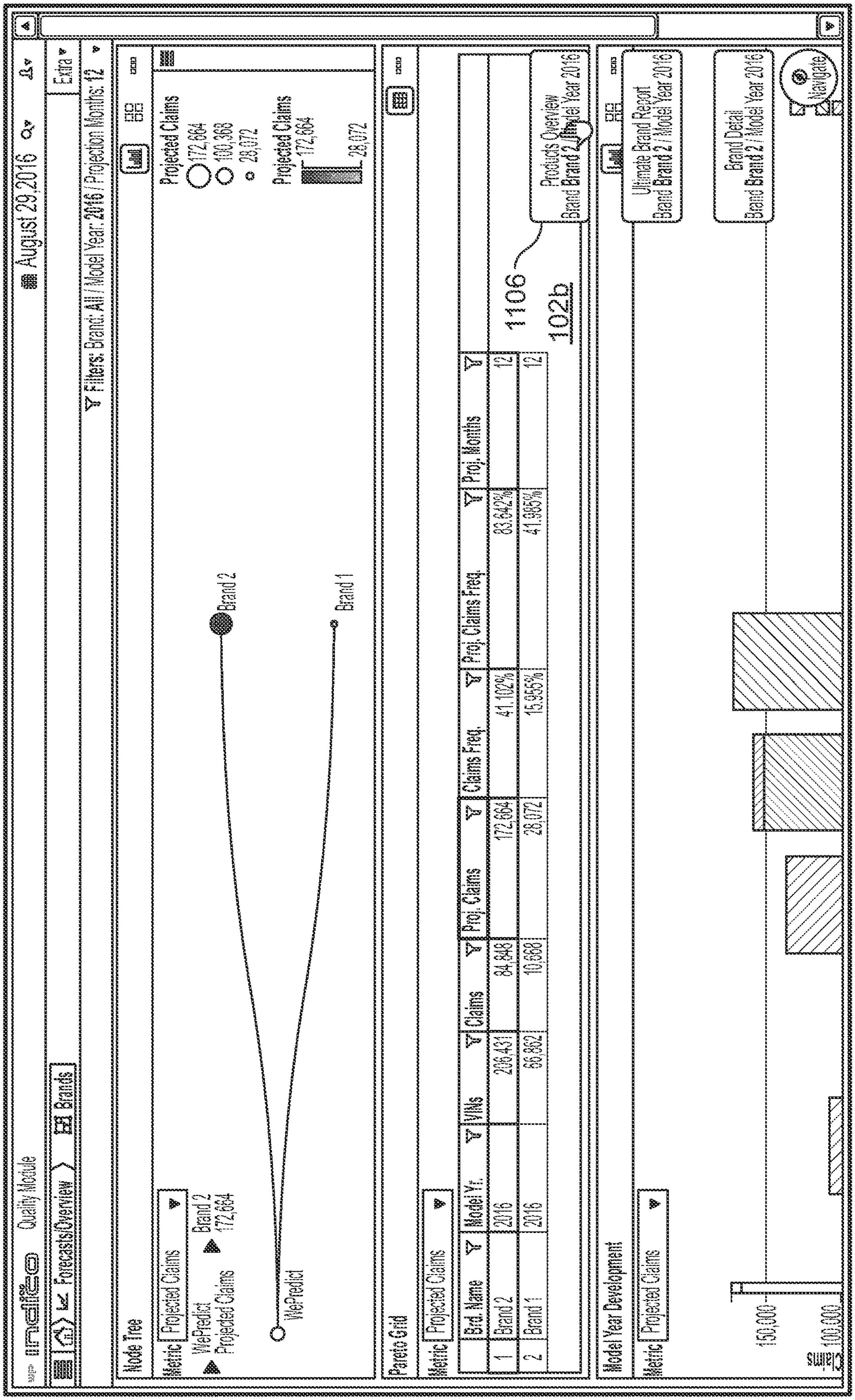

FIG. 11 shows an example of the overview brand page 102*b*, to which the user has navigated by selecting element 802 in FIG. 10. A node tree 902 is displayed for the manufacturer 904 in question down to the brand level only. In this example the node tree has two nodes 906*a*, 906*b* corresponding to two brands for the manufacturer 904. As will be appreciated, this is a simplified example and there may be more brands for a manufacturer in practice. A dynamic grid 912 is also displayed for the brands in question, and a breakdown 914 of the projected claims aggregated at the brand level but broken down according to model year is also displayed (note this is only partially visible in FIGS. 11 to 12 however examples of such column charts are given in the above). As shown in FIGS. 12, 13 and 14, the user can select between individual brands on the brand overview page 102*b* either by selecting the corresponding nodes of the node tree 902 or the corresponding row of the dynamic grid 912. When the user a selects a particular brand in this way, the information on the page 102*b*, and in particular the projected values, are updated so that they correspond to the selected brand.

As shown in FIG. 13, selecting the navigation charm on the overview brand page 102*b* causes selectable options 1102, 1104 and 1106 to be displayed, which are selectable to navigate, respectively, to the corresponding detail brand page 104*b*, ultimate brand report page 106*b* and product overview page 102C at the next level down in the hierarchy. The content of these pages is dependent on whichever one of the brands is selected on the brand overview page 102*b* when one of the options 1102, 1104 and 1106 is selected. So, in the example of FIG. 13, the user has selected “Brand 2” on page 102*b*, and accordingly selecting option 1102, 1104 or 1106 causes the user interface to navigate to the detailed brand page 104*b*, ultimate brand report 106*b* or overview product page 102C for “Brand 2”. If the user has selected a particular model year (2016 in this example) this model year selection will also be maintained when the user navigates via one of the navigation charm options. This allows seamless and intuitive navigation through the network of pages shown in FIG. 3.

Figure 15:
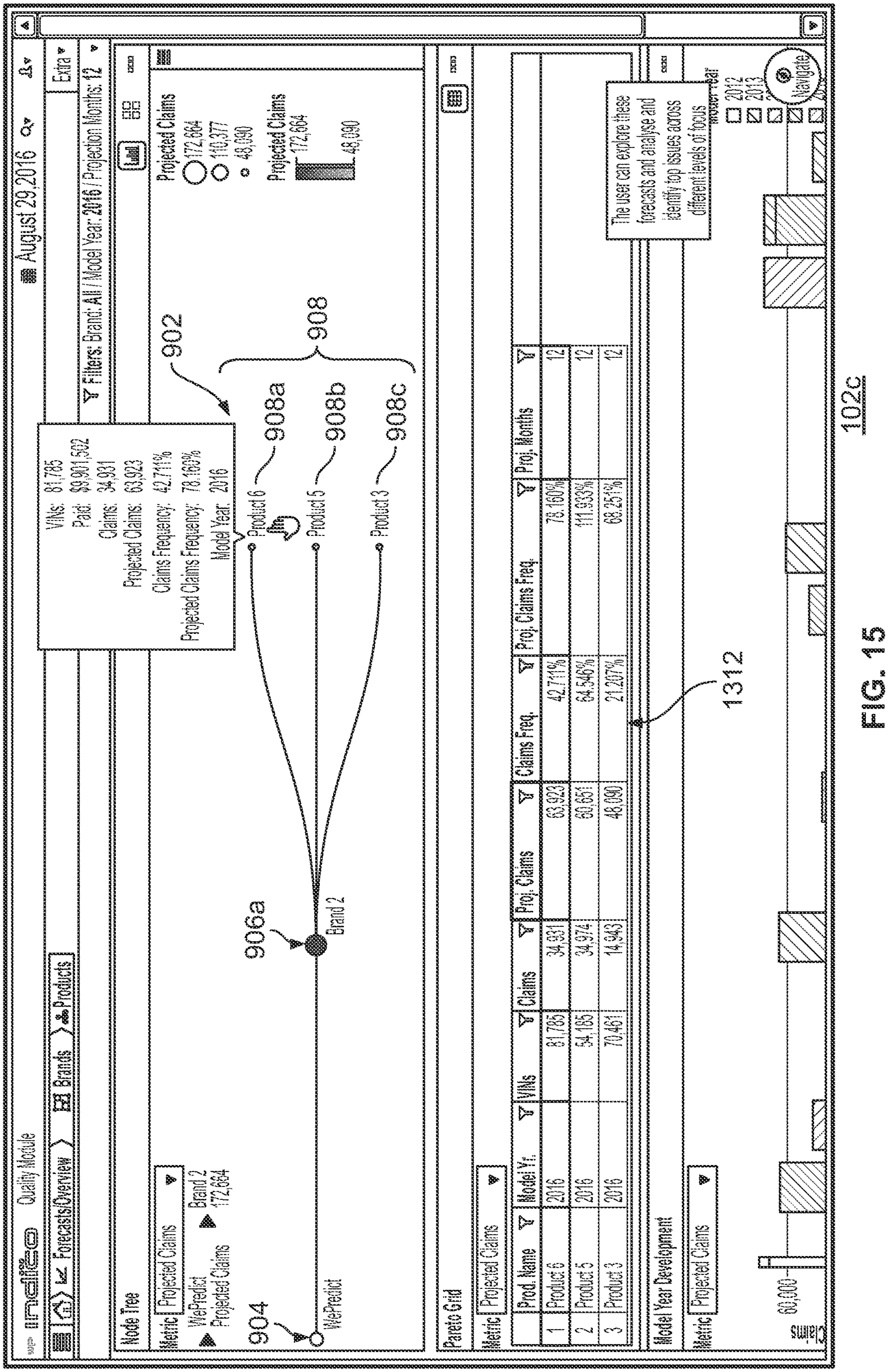

FIG. 14 shows the user selecting the product overview option 1106 on the overview brand page 102*b*, which causes the user interface to navigate to the overview product page 102*c* for the selected brand (“Brand 2”), an example of which is shown in FIG. 15. On the overview product page 102*c*, a modified version of the node tree 902 is displayed. On the product overview page 102*c*, the node tree 902 now extends from the manufacturer level down to the product level. At the brand level, only the node 906*a* for the previously selected “Brand 2” is displayed. At the product level, nodes 908 are displayed for each product within that brand. In this example nodes 908A, 908B and 908C are displayed for three products within that brand but as will be appreciated this is just an example and there can be a different number of products within a brand.

Whereas before, the dynamic grid 912 was rendered on the brand overview page 102*b* at the brand level, on the product overview page 102*c*, a dynamic grid 1312 is displayed rendered at the product level. That is, each column of the dynamic grid 1312 corresponds to one of the products within the selected brand “Brand 2”, and hence to one of the nodes 908 of the node tree 902 at the product level.

Figure 16:
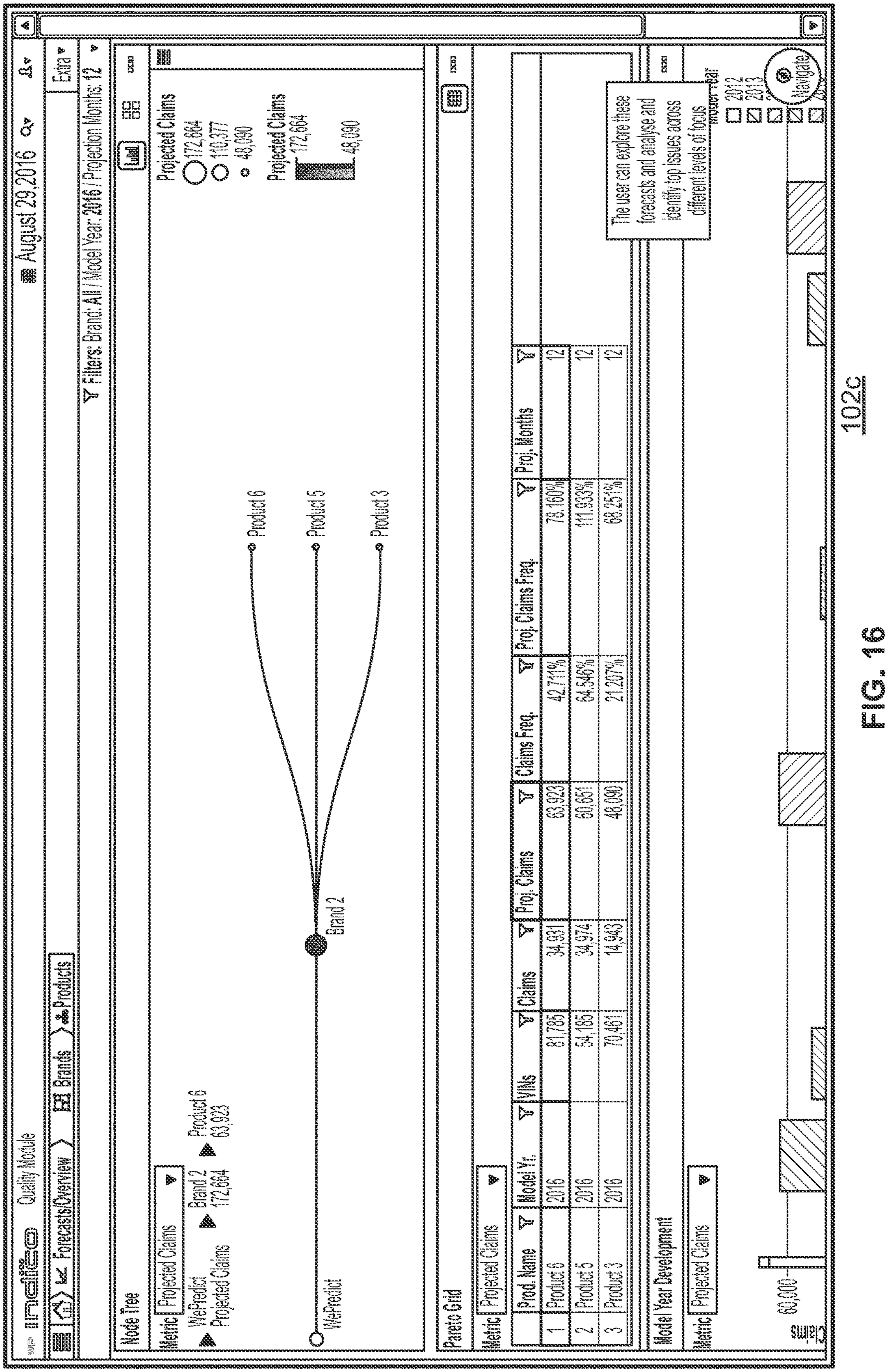
Figure 17:
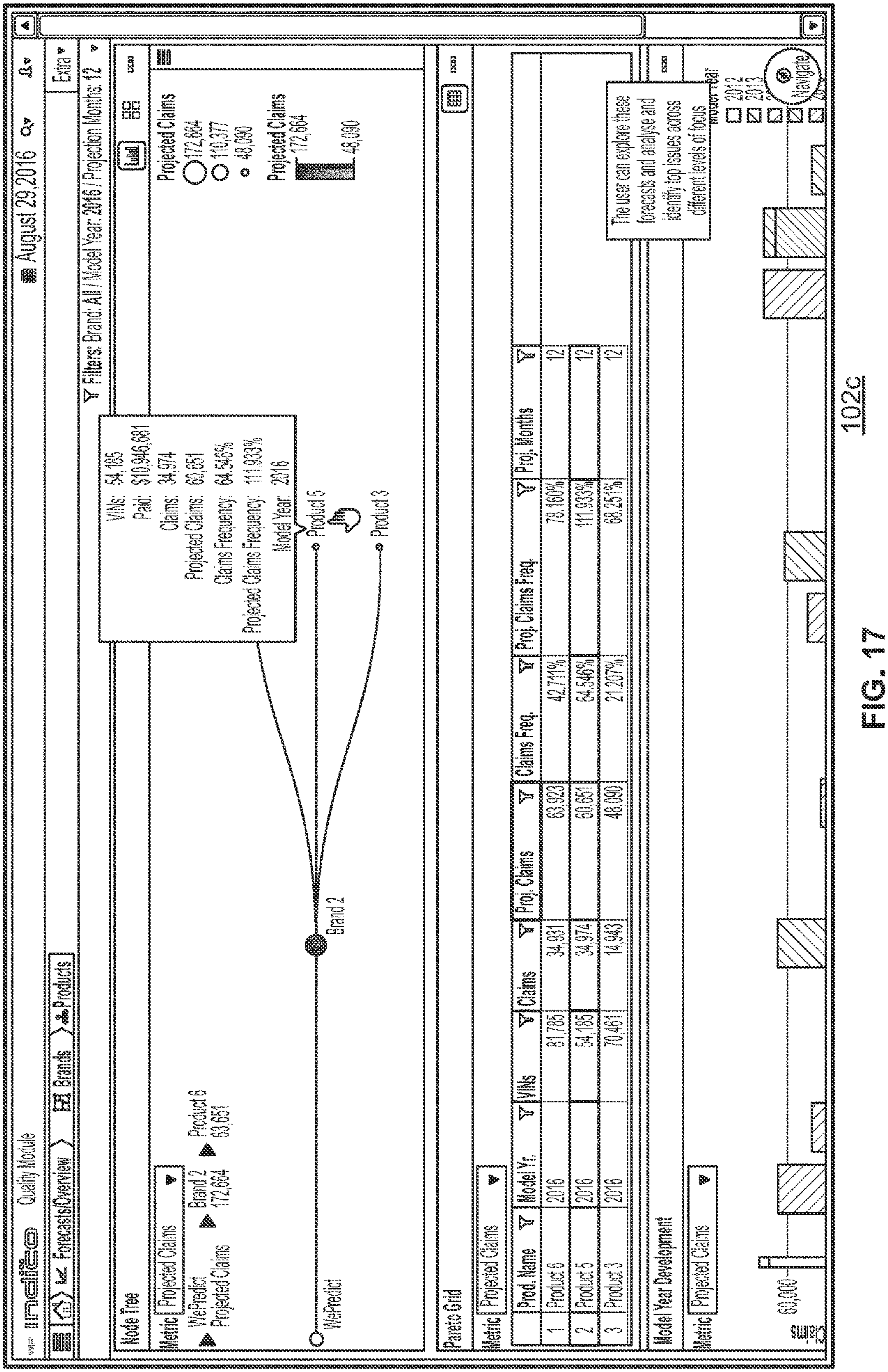
Figure 18:
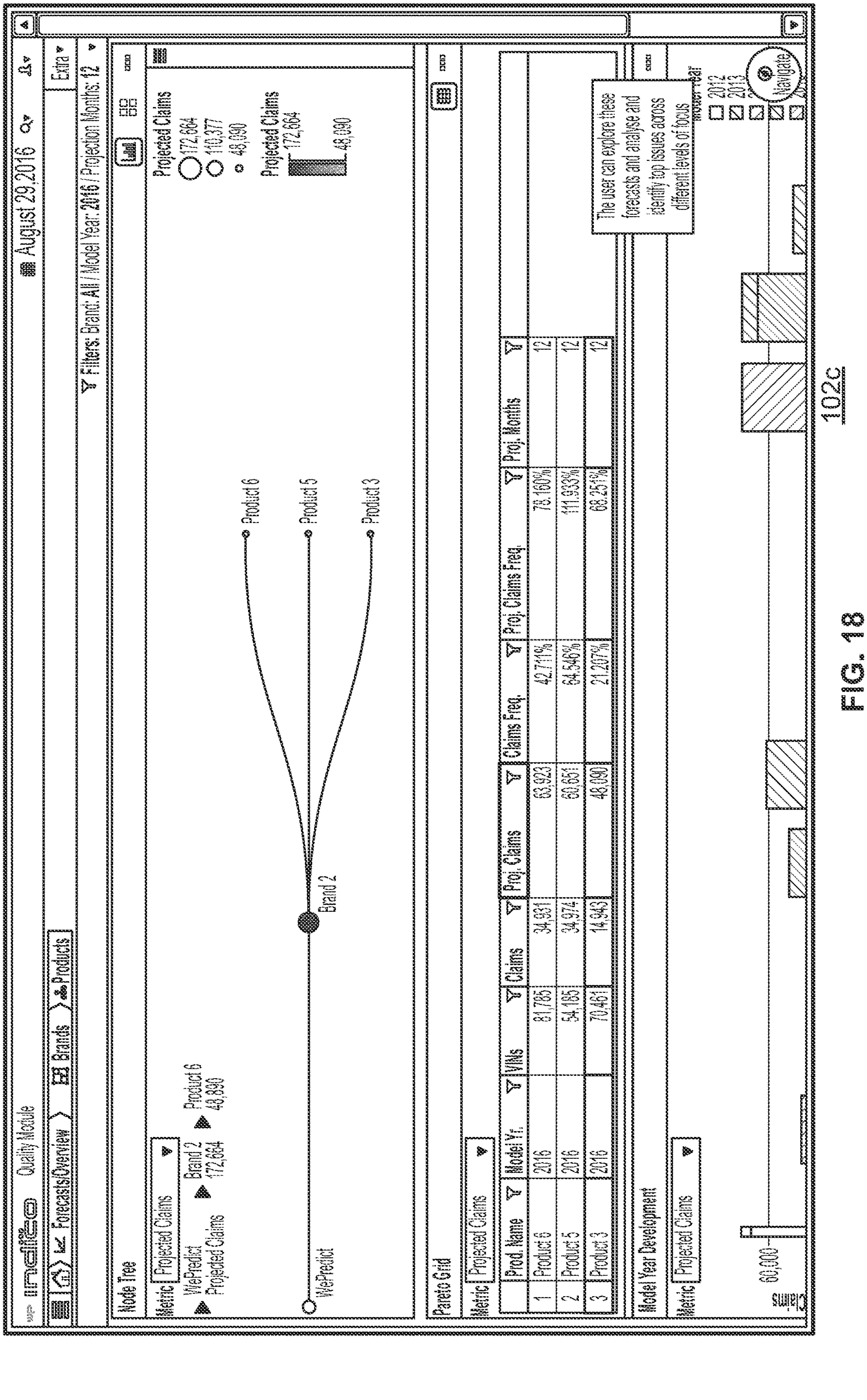
Figure 19:
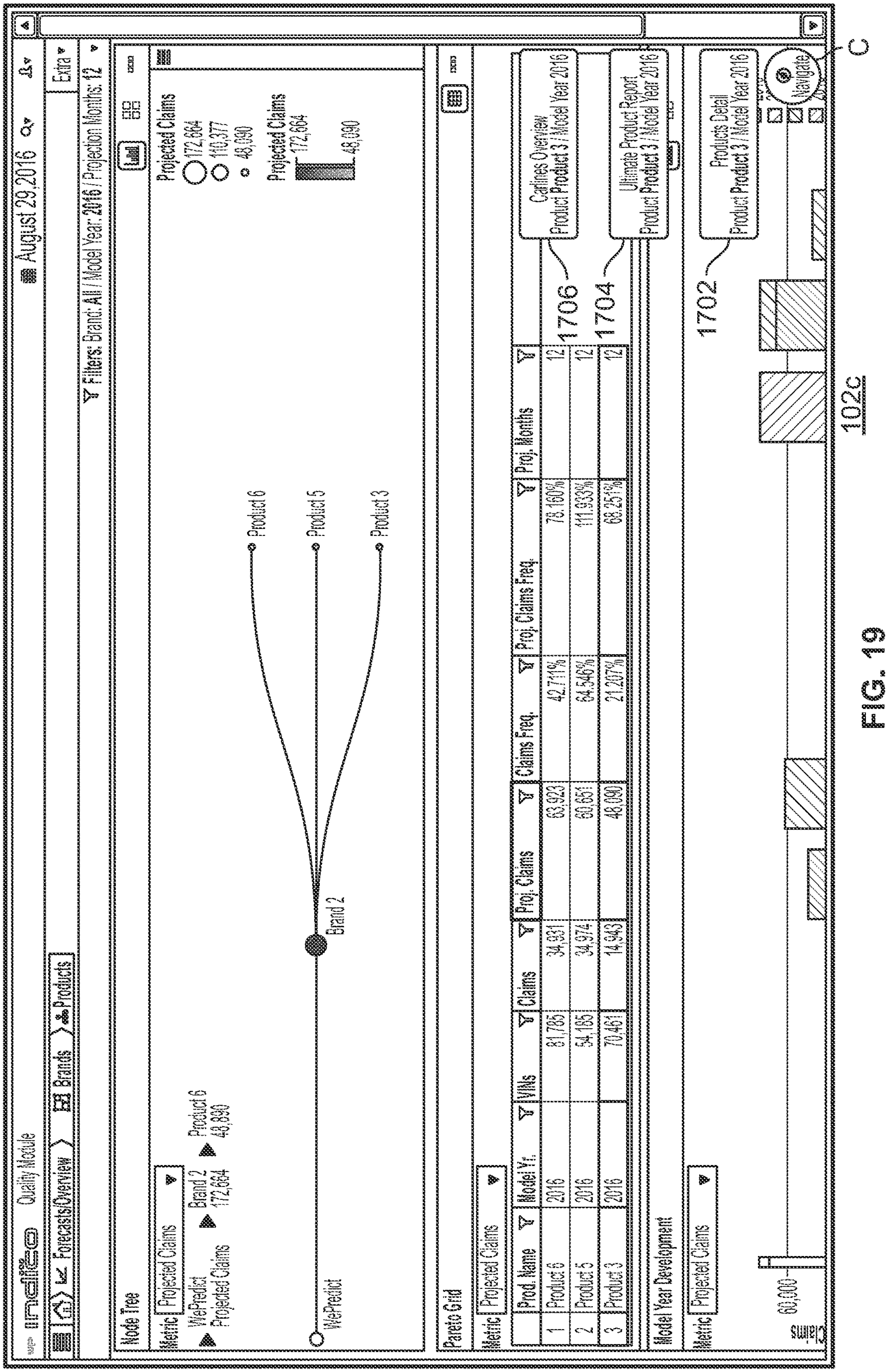
Figure 20:
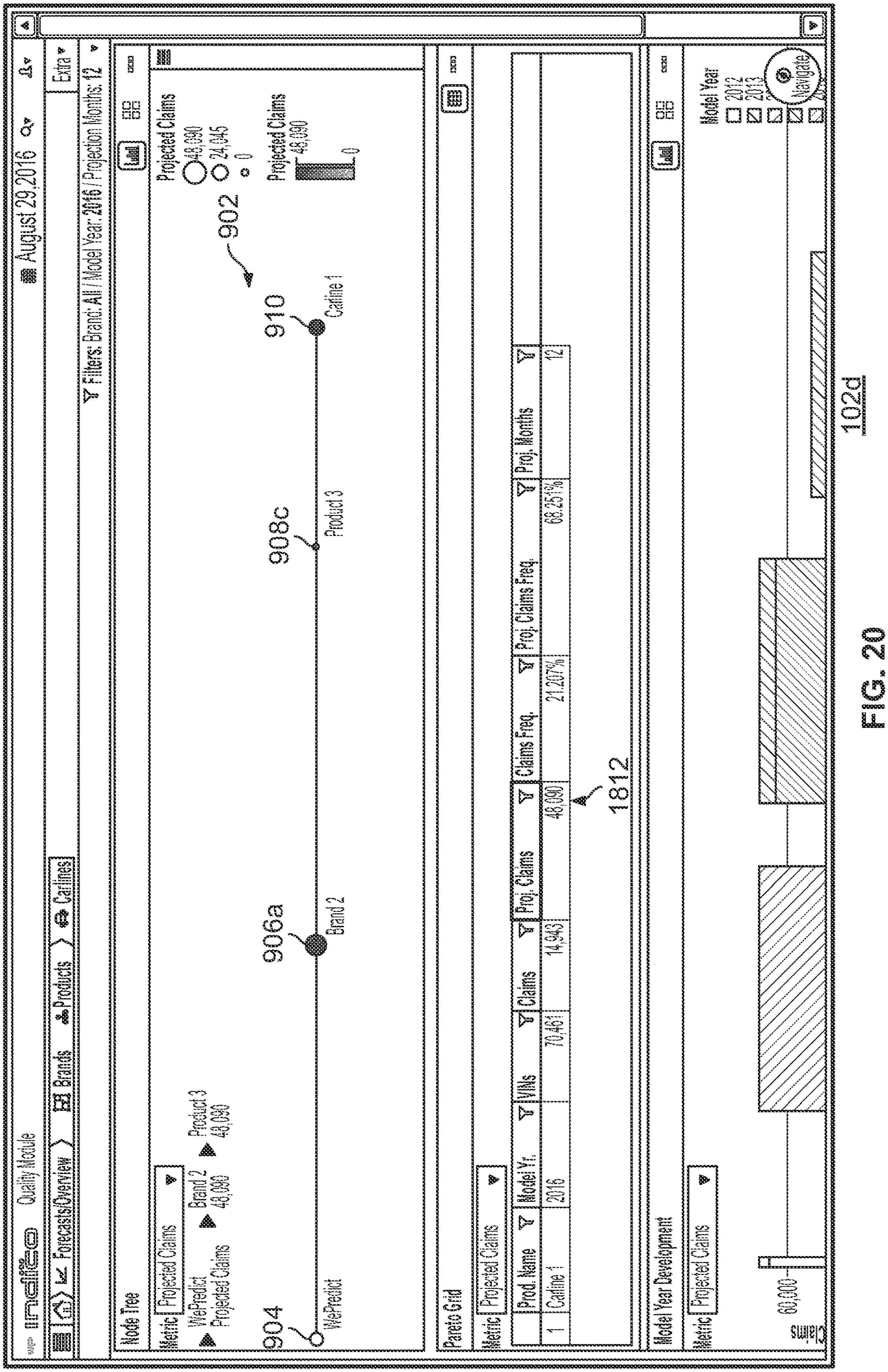

As before, the user can select between different products within the selected brand either by selecting the corresponding one of the nodes 908 of the node tree 902 or by selecting the corresponding one of the rows of the dynamic grids 1312. Examples of this are shown in FIGS. 16 to 18. As before, when a new product is selected, the information, and in particular the claim projections, on the product overview page 102*c* are updated so as to correspond to the selected product. FIG. 19 shows the effect of selecting the navigation charm C on the product overview page 102*c*. In response to selection of the navigation charm C, selectable options 1702, 1704 and 1706 are displayed which are selectable to navigate to the corresponding product detailed page 104*c*, the corresponding ultimate product report 106C, and the corresponding overview carline page 102*d* one level below in the hierarchy respectively. Again, selections on the overview product page 102*c* are honoured, in that each of these pages will correspond to whichever product is currently selected on the overview product page 102*c* (“product 3” in this example) and, where applicable, whichever model year is currently selected. In the example of FIG. 19, the user is shown selecting the carlines overview option 1706, which causes the user interface to navigate to the corresponding overview carline page 102*d*, an example of which is shown in FIG. 20. Although not shown in the Figures, the behaviour of the overview carline page 102*d* is the same as the pages at the higher levels of the hierarchy but at the carline level rather than the brand or product level. Again, the node tree 902 is displayed but this time all the way from the manufacturer level down to the carline level. At the brand and product level, only the nodes 906*a*, 908*c* for the brand selected on the overview brand page 102*b* (“Brand 2”) and the product previously-selected on the overview product page 102*c* (“Product 3”) are shown, and nodes 910 for each carline of that product are shown. In this simple example there is only one carline shown for “Product 3”, but as will be appreciated there may be multiple carlines for a particular product. A dynamic grid 1812 is displayed rendered at the carline level. That is, with projections on individual carlines.

Figure 21:
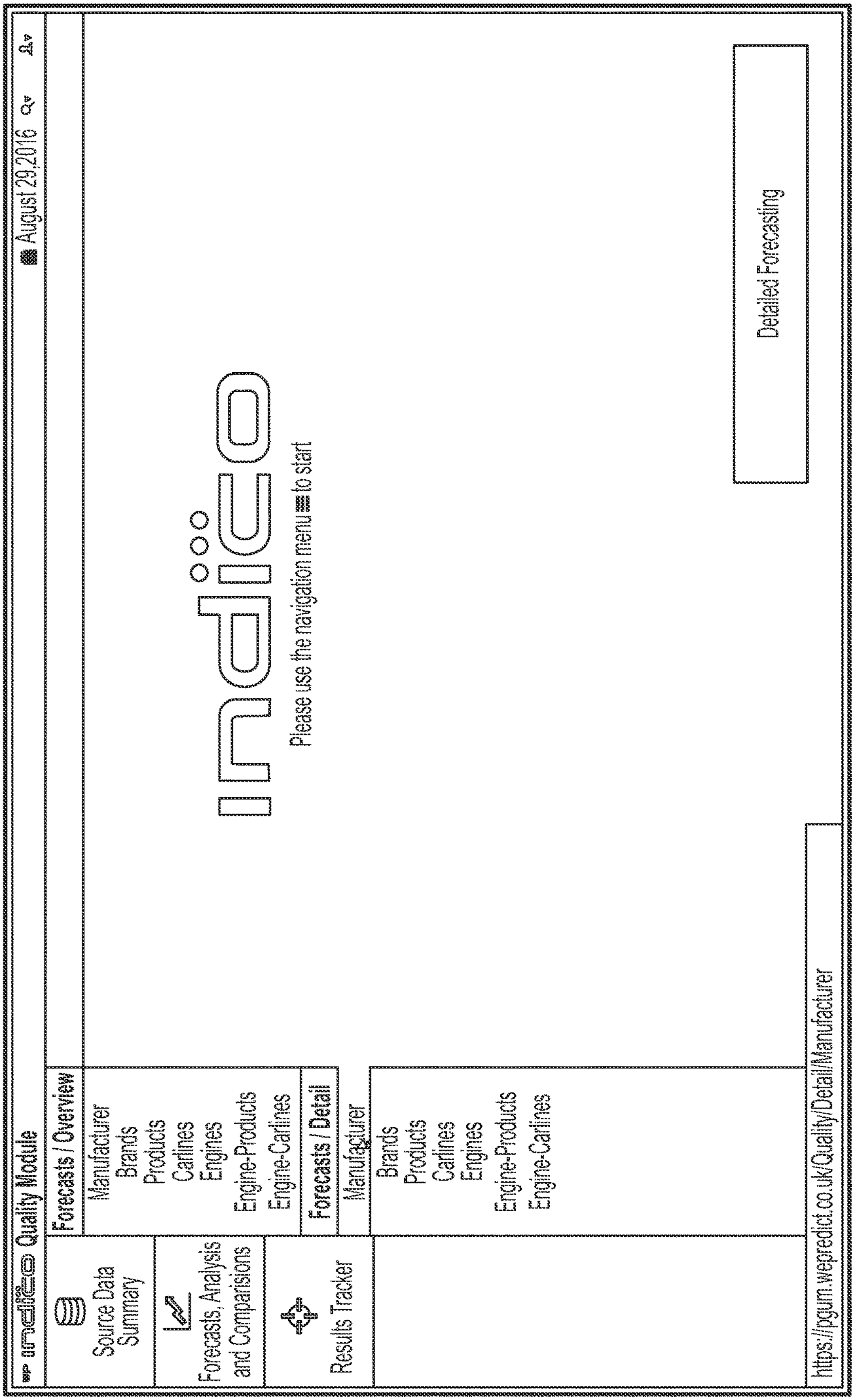
Figure 24:
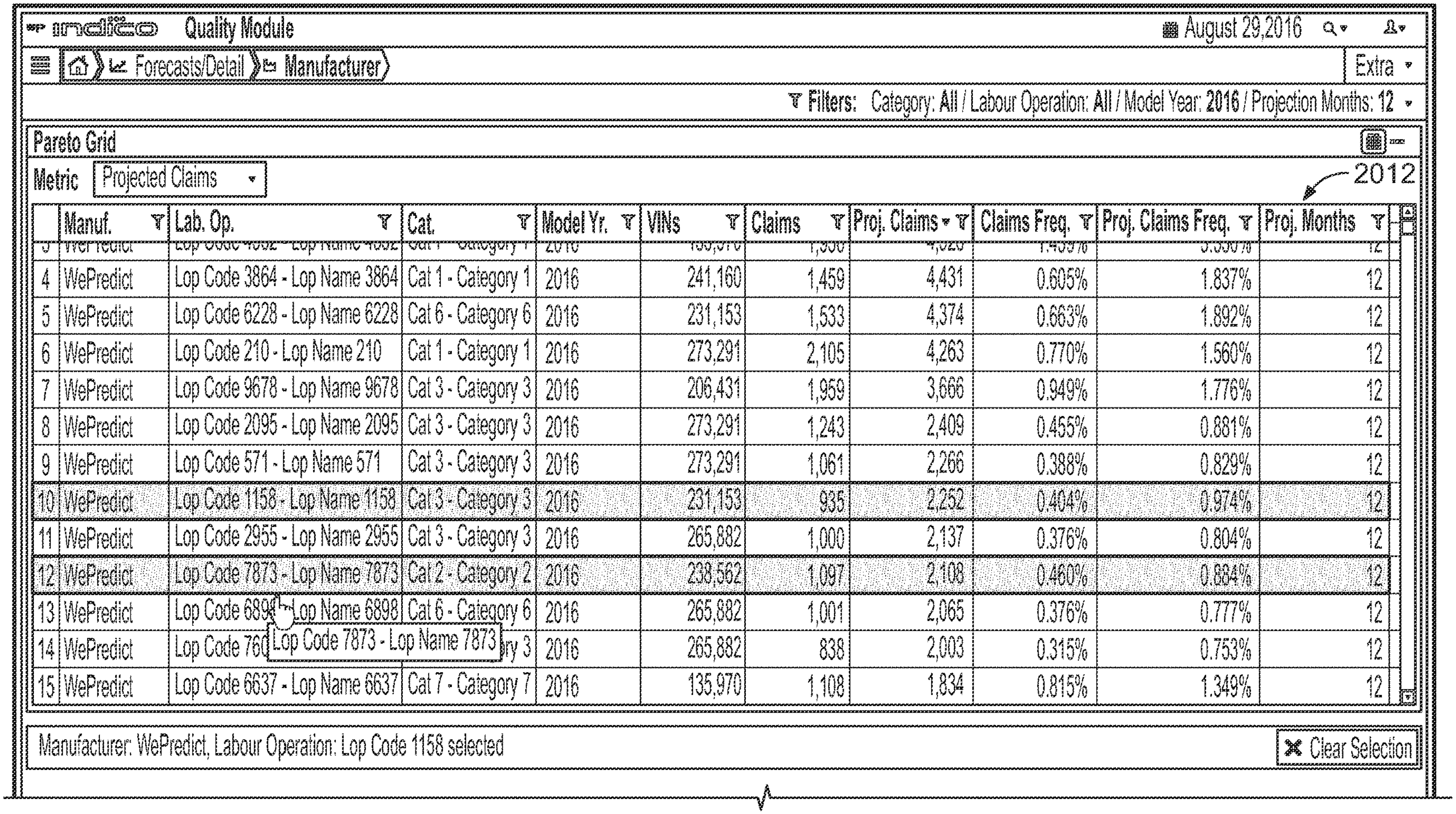
Figure 24:
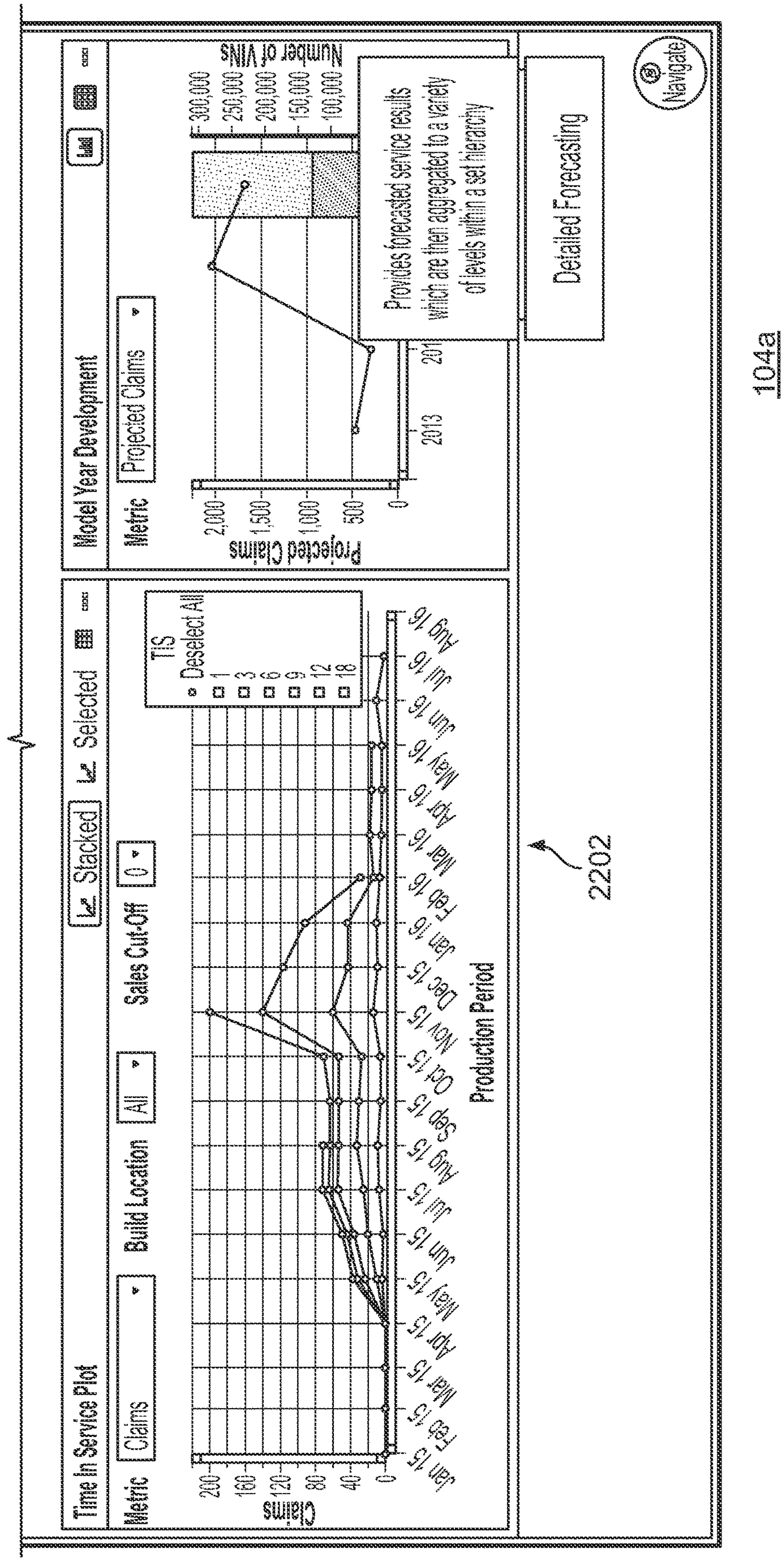

FIG. 21 shows the home screen of FIG. 3, only this time the user is shown selecting the option for the detail manufacturer page 104*a* rather than the overview manufacture page 102*a*. An example of the detail manufacturer page 104*a* for a particular manufacturer is shown in FIG. 22. In this example, a dynamic grid 2012 is displayed which shows predictions aggregated at the manufacturer level but for individual labour operations. That is, each prediction in the grid 2012 corresponds to an individual labour operation but is aggregated across all vehicles for the manufacturer in question. By selecting an element of the grid 2012 corresponding to a particular labour operation, as shown in FIG. 23 for labour operation “LOP name 1158”, information aggregated at the manufacturer level for that specific labour operation is displayed as shown in the example of FIG. 24. In particular FIG. 24 shows a time series of projections, according to production period, for the labour operation and manufacturer in question. A column chart providing a breakdown according to model year 2212 for the manufacturer in question and the specific labour operation is also displayed. This is not visible in FIG. 24 but is visible in FIG. 25. Note both the time series 2202 according to production period and the breakdown 2212 according to model year on the detail manufacturer page 104*a* are both breakdowns of projections that are aggregated at the manufacturer level but for a specific labour operation. As described in the above and shown in the examples below, equivalent time series and column charts are also shown on the detail brand, products and carline pages 104*b*, 104*c* and 104*d* for the labour operation in question but in those cases provide breakdowns of the projections for to a particular brand, a particular product and a particular carline respectively.

Figure 25:
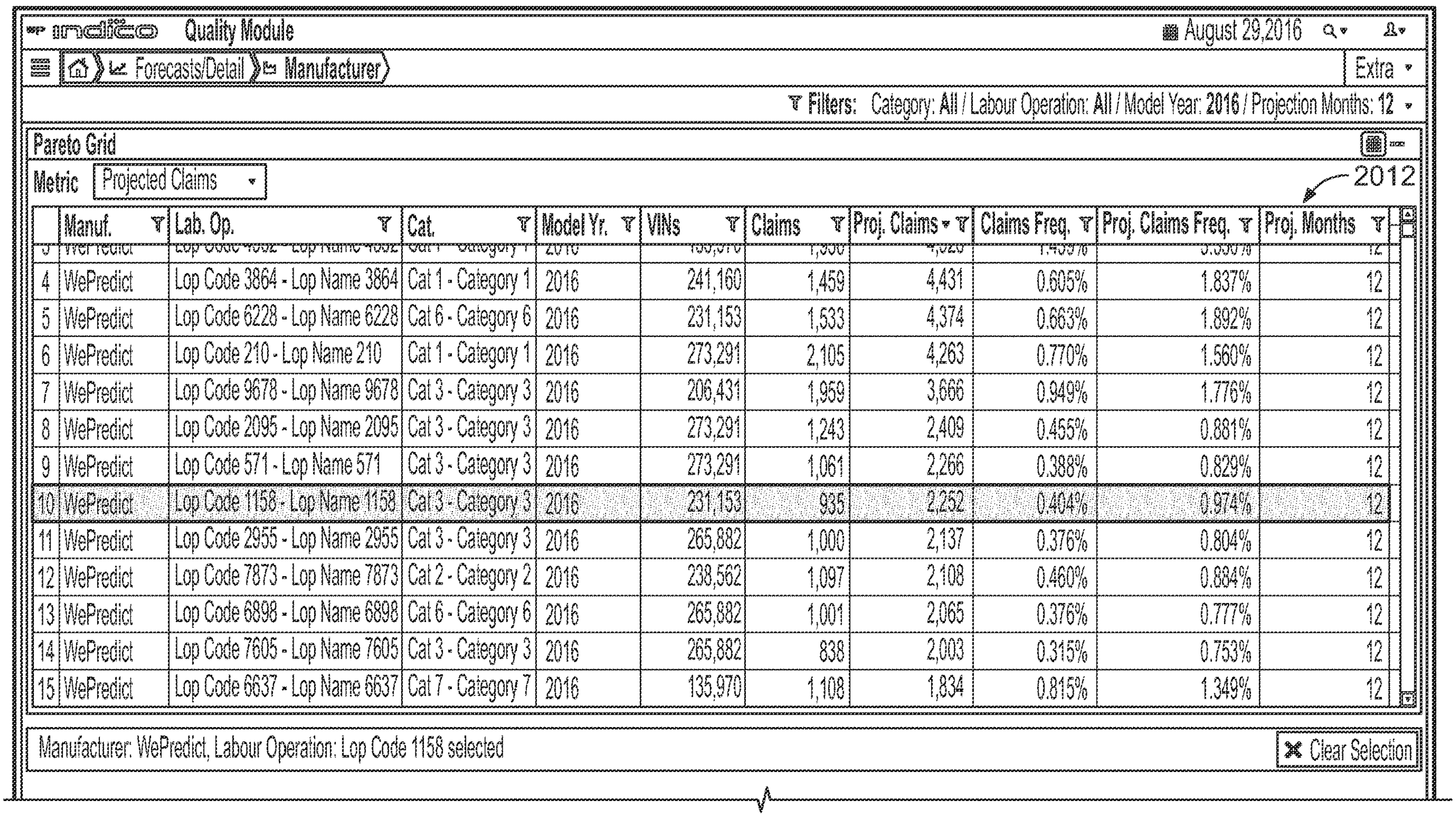
Figure 25:
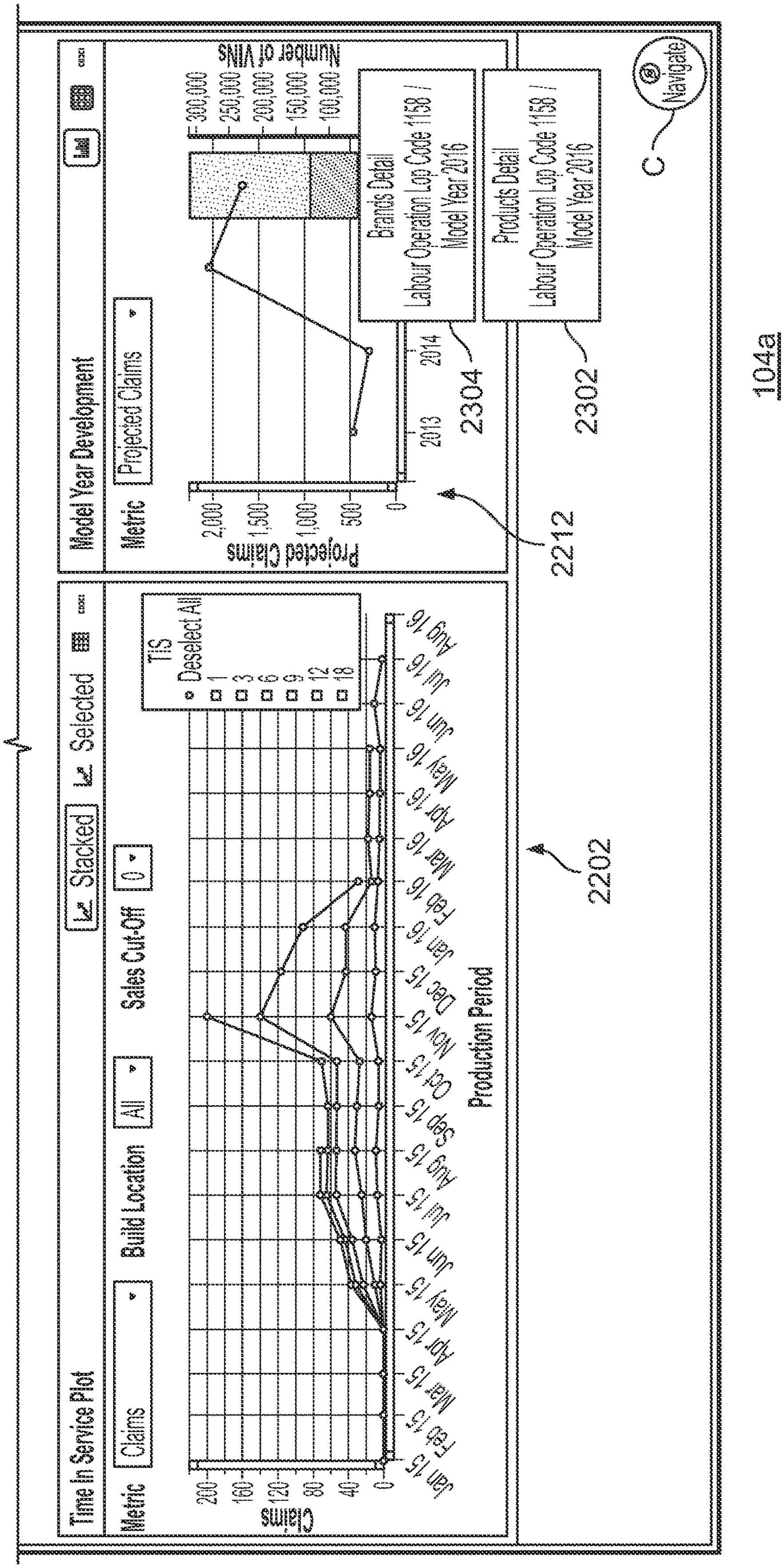

As shown in FIG. 25, selecting the charm navigation C on the detail manufacturer page 104*a* brings up two selectable options 2302 and 2304 to navigate to the detail product page 104*c* and the detail brand page 104*b* for the specific labour operation respectively (note: the option to navigate from the detail manufacturer page 104*a* directly to the detailed product page 104*c* is not shown in FIG. 3).

Figure 26:
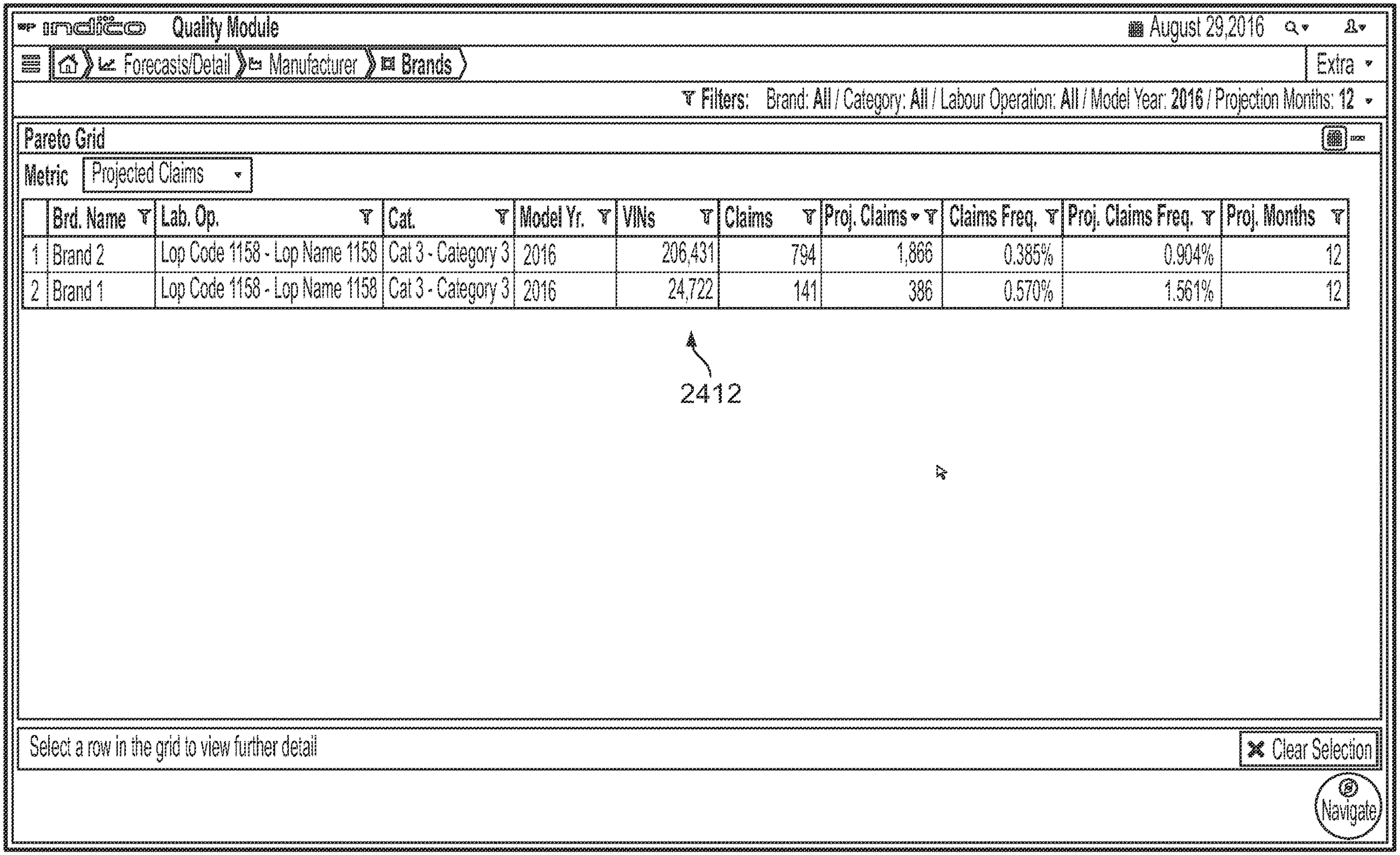
Figure 27:
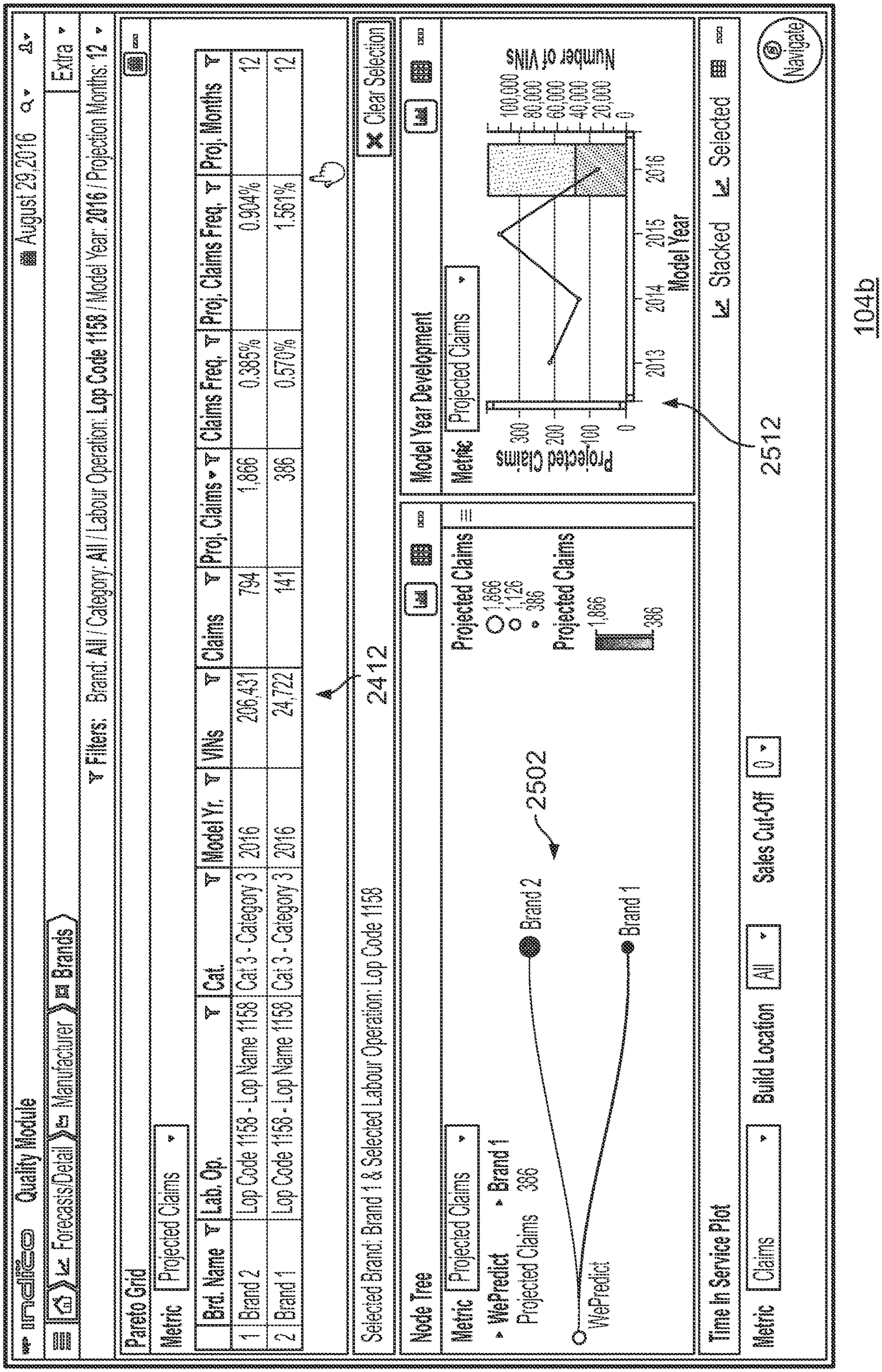
Figure 28:
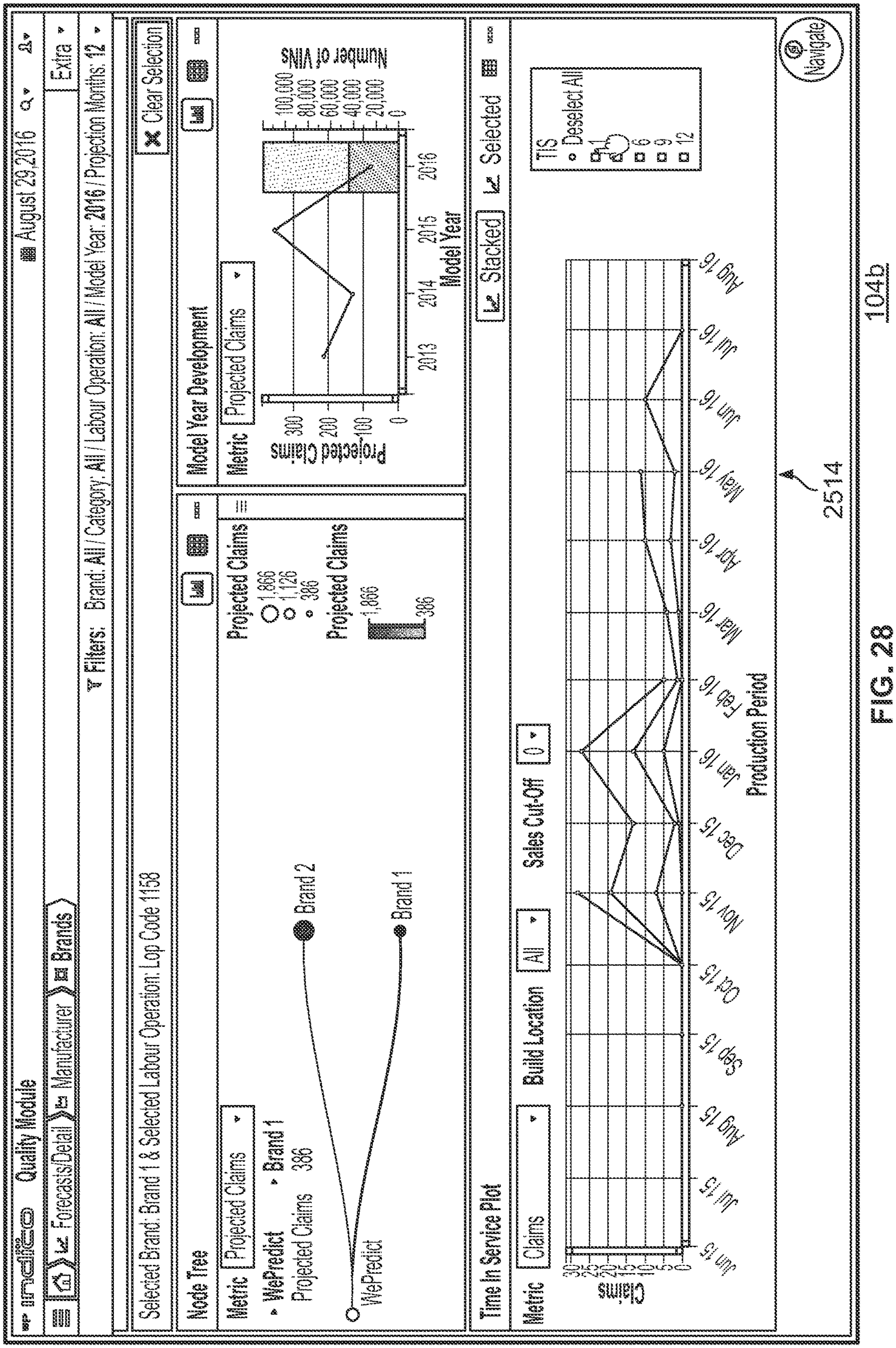

FIG. 26 shows the detail brand page 104*b* in one example, which the user has navigated to by selecting option 2304 in FIG. 25. In this example a dynamic grid 2412 is shown which again provides projections for specific labour operations but aggregated at the brand level. As shown in FIG. 27, when a user selects a row of the dynamic grid 2412 corresponding to a particular brand ("Brand 1" in this example), projected claim information for that brand is displayed in response. As well as the dynamic grid 2412, a node tree 2502 is also provided which is not shown in FIG. 26 but is shown in FIG. 27. The user can select between different brands either from the dynamic grid 2412 or from the node tree 2502. A column chart 2512 providing a breakdown of the projections according to model year and a time series 2514 providing a breakdown according to production periods (see FIG. 28) are also displayed. These correspond to the column chart 2212 and time series 2202 of FIG. 25 however on the detail brand page 104*b* the projections rendered on these charts are aggregated at the brand level rather than the manufacturer level.

Figure 29:
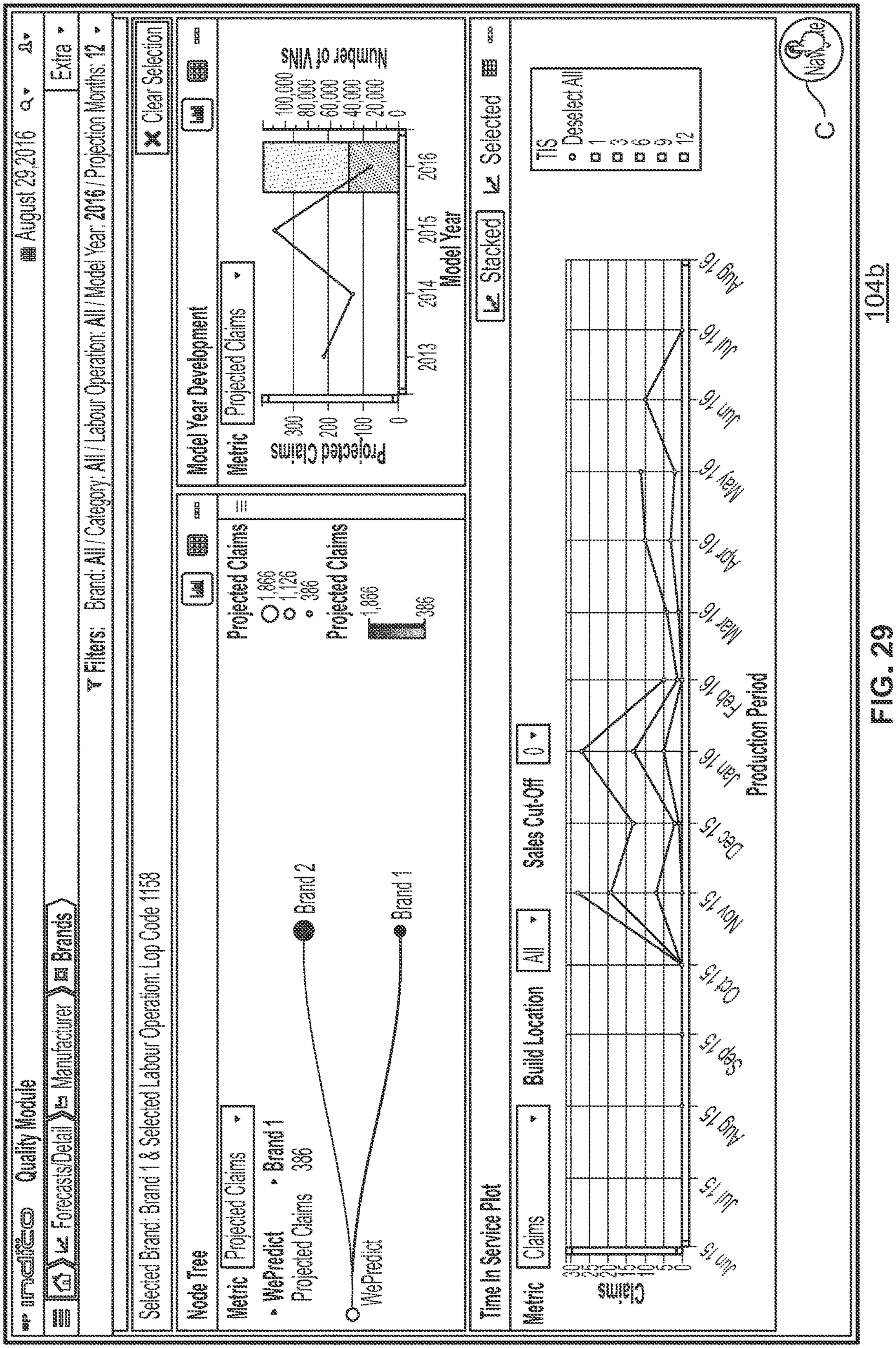
Figure 30:
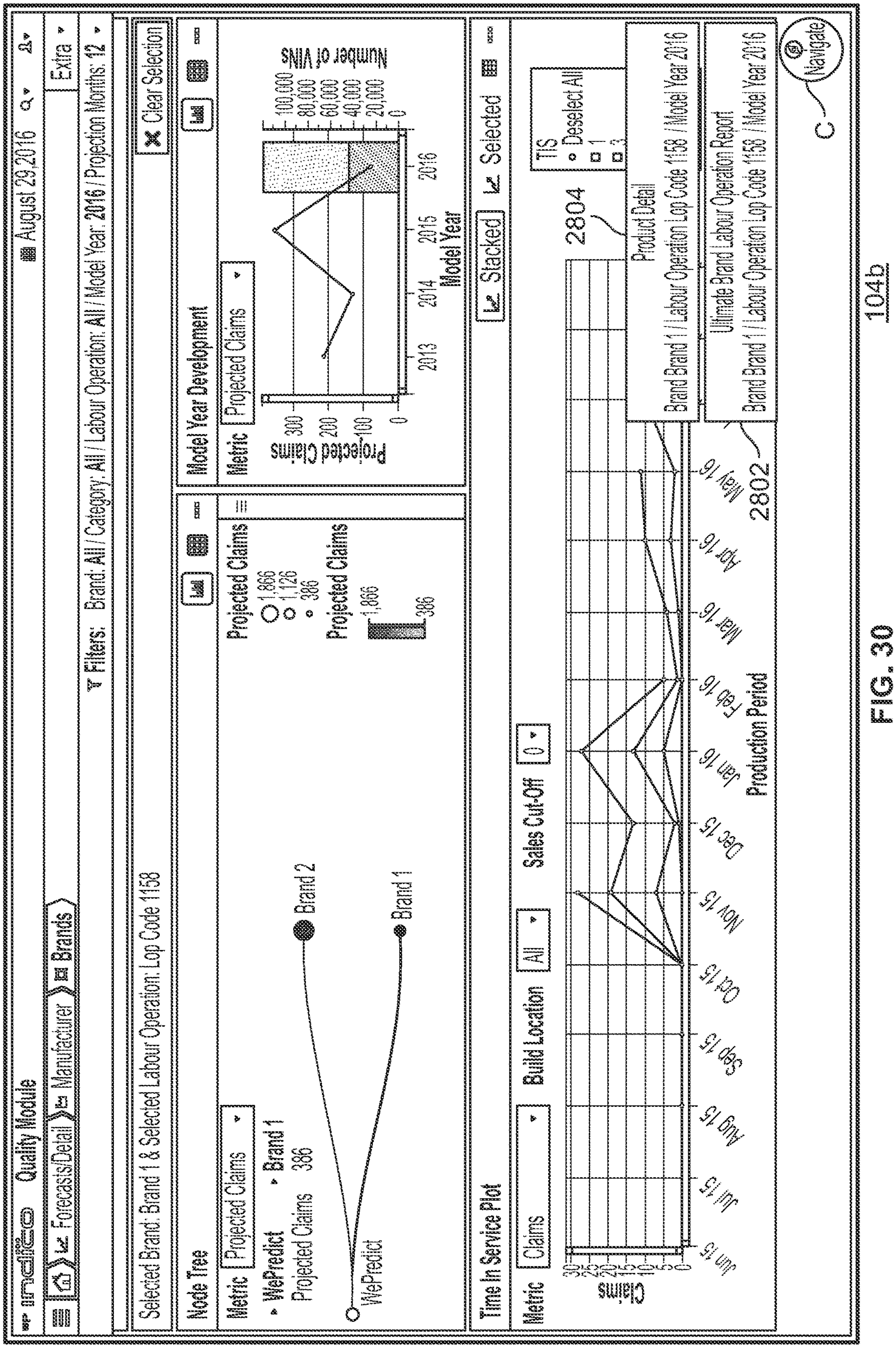

FIGS. 29 and 30 show how selection of the charm navigation on the detail manufacturer page 104*a* causes options 2802 and 2804 to be displayed, which are selectable to navigate, respectively, to the corresponding ultimate brand labour operation report 108*b* and the corresponding detail product page 104*c* at the next level down in the hierarchy.

Figure 31:
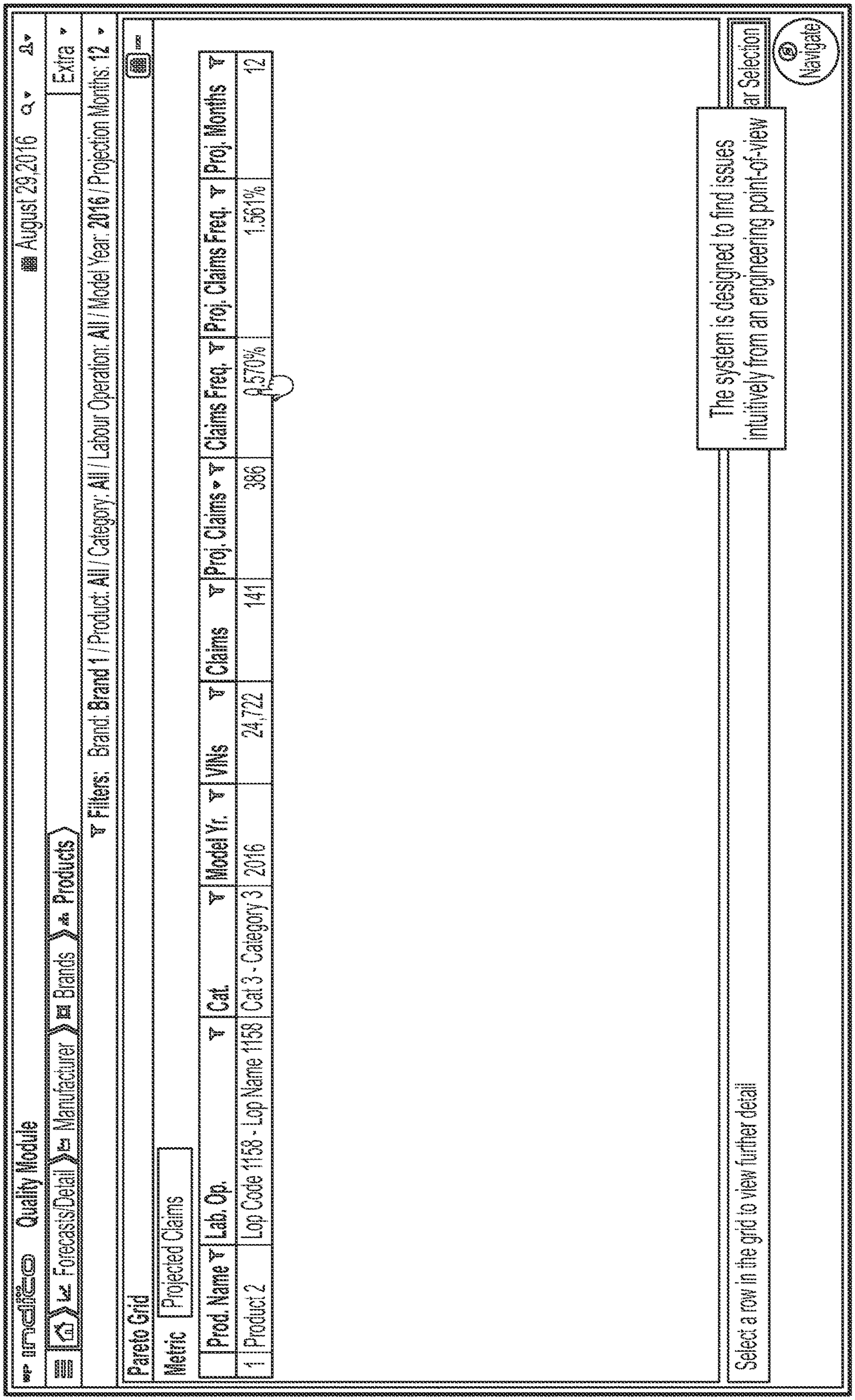
Figure 32:
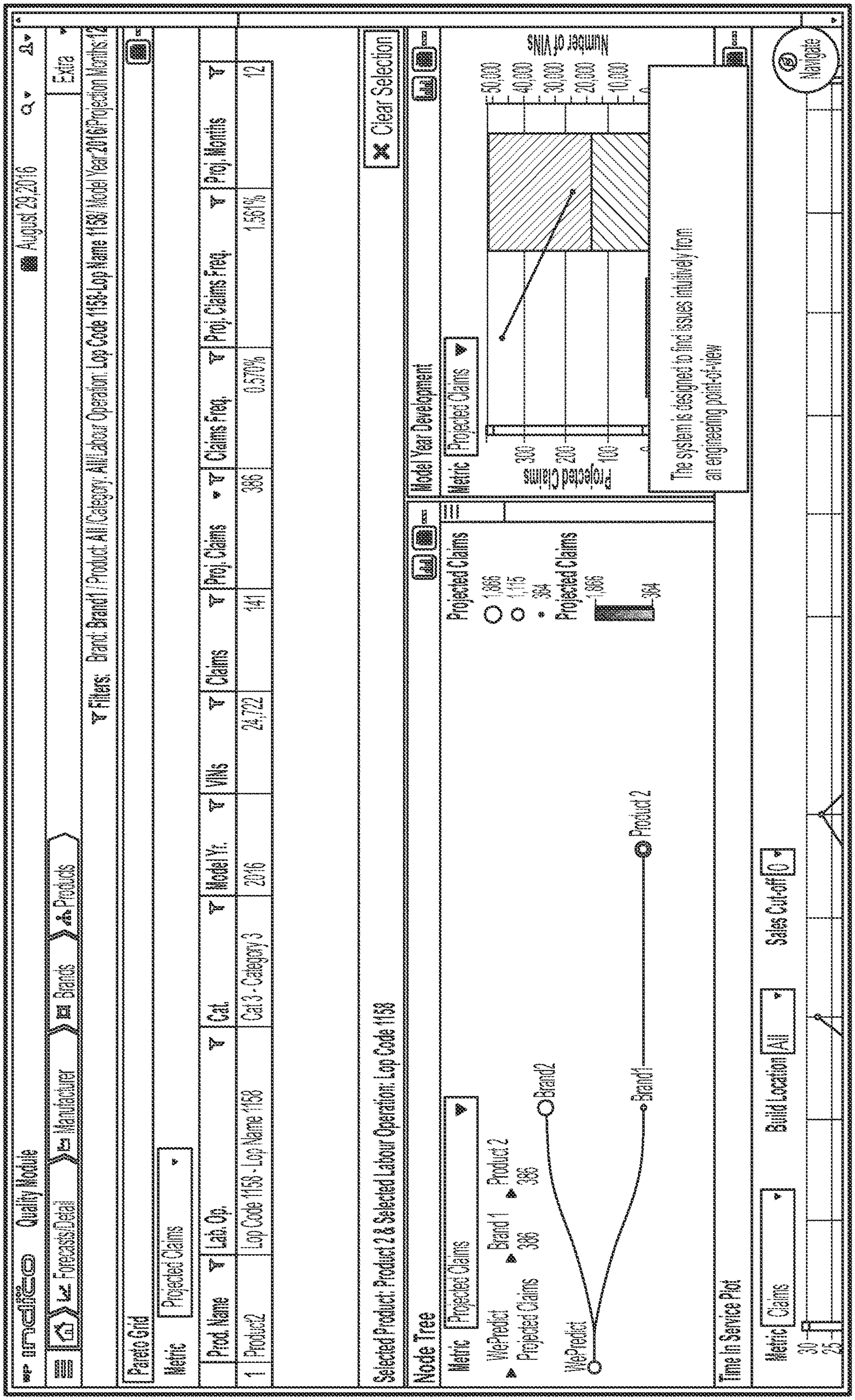
Figure 33:
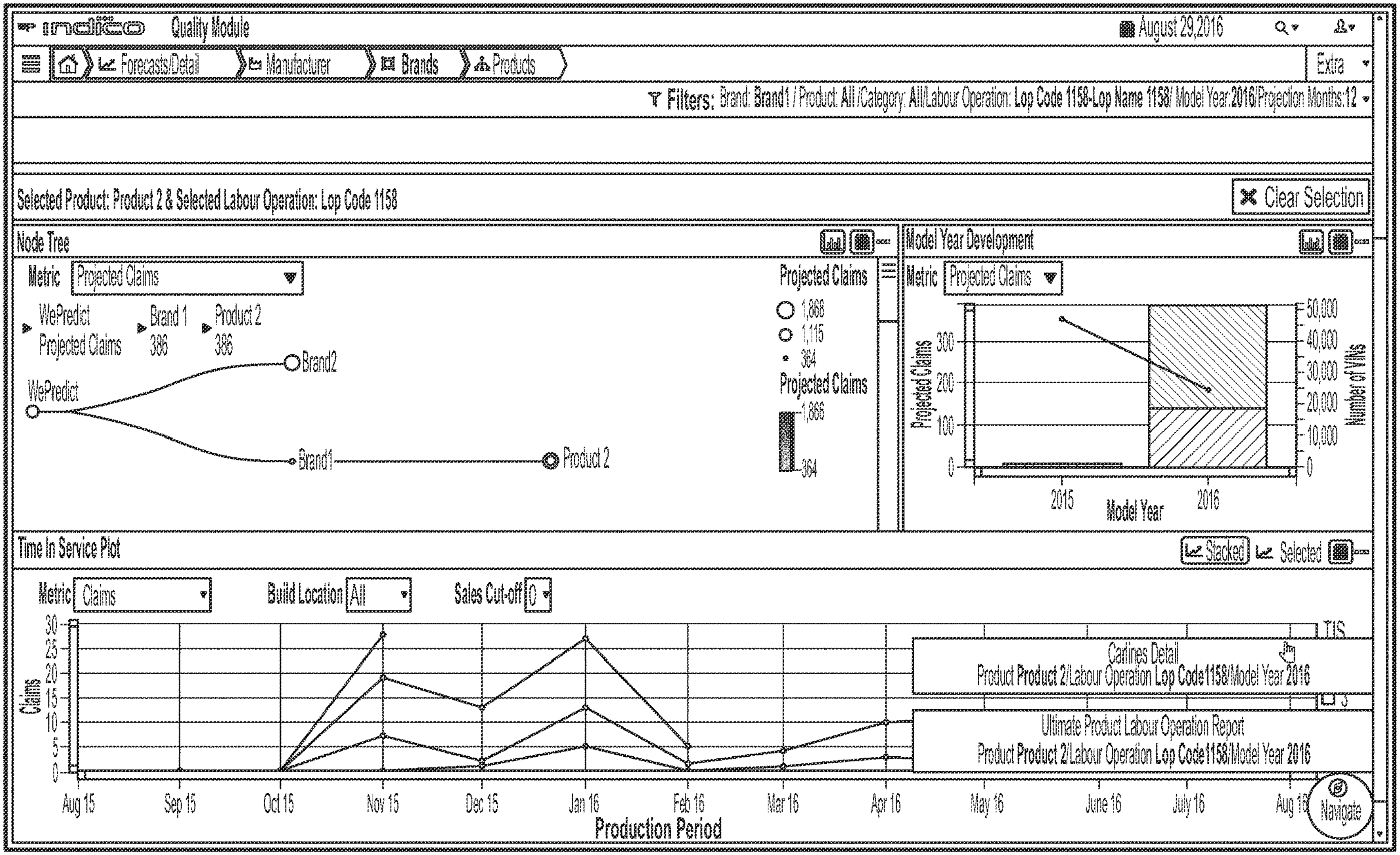
Figure 34:
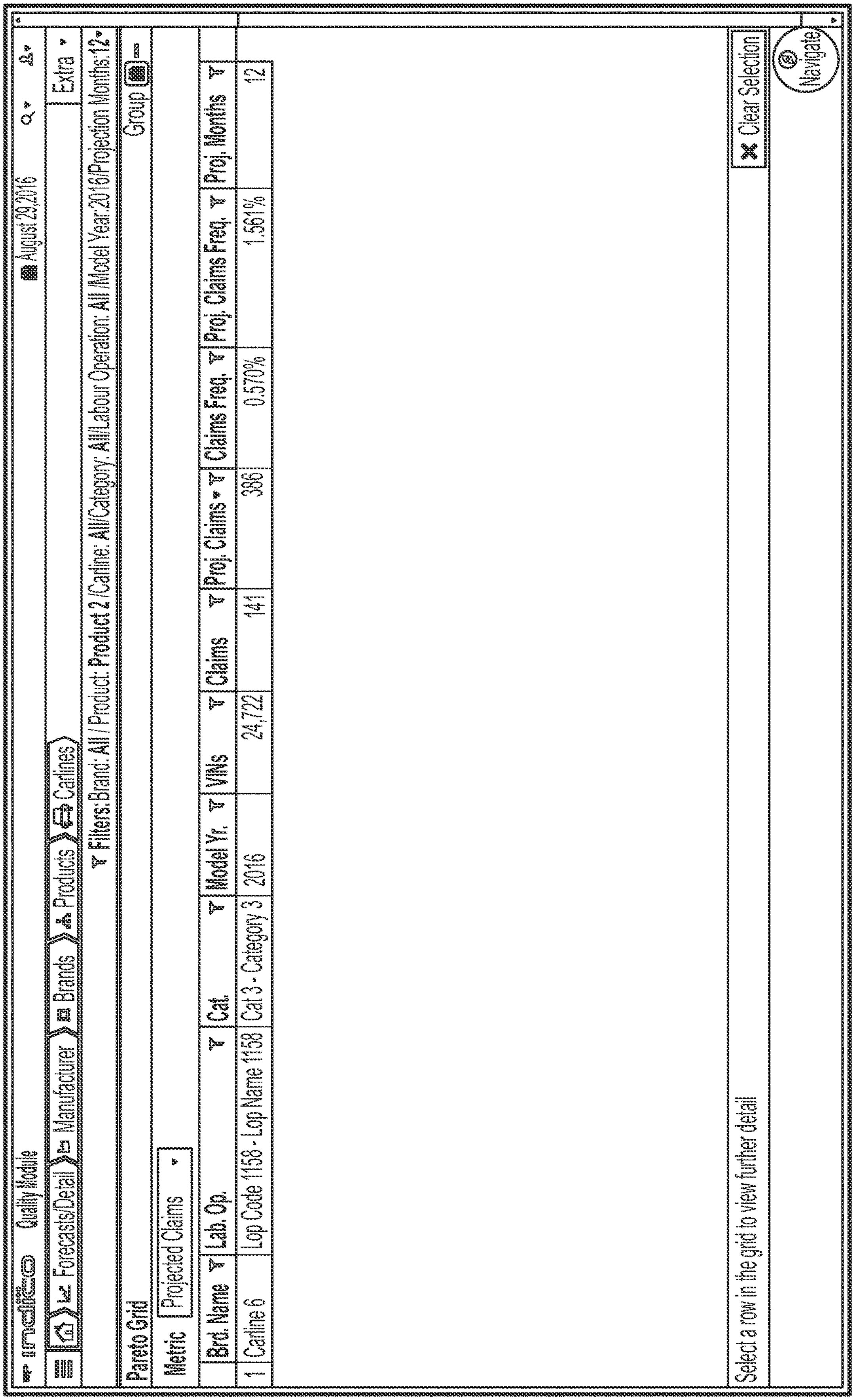
Figure 35:
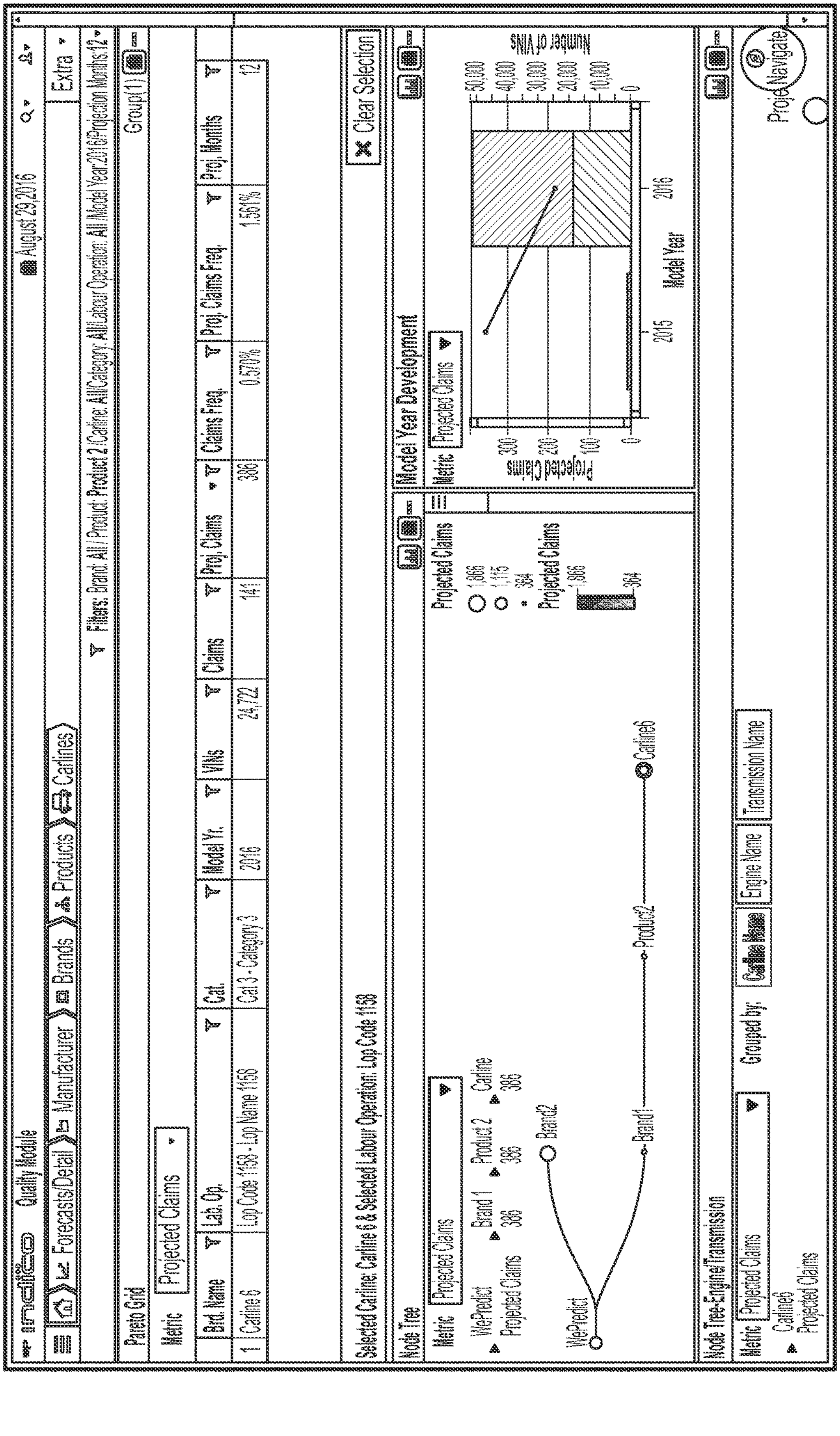
Figure 36:
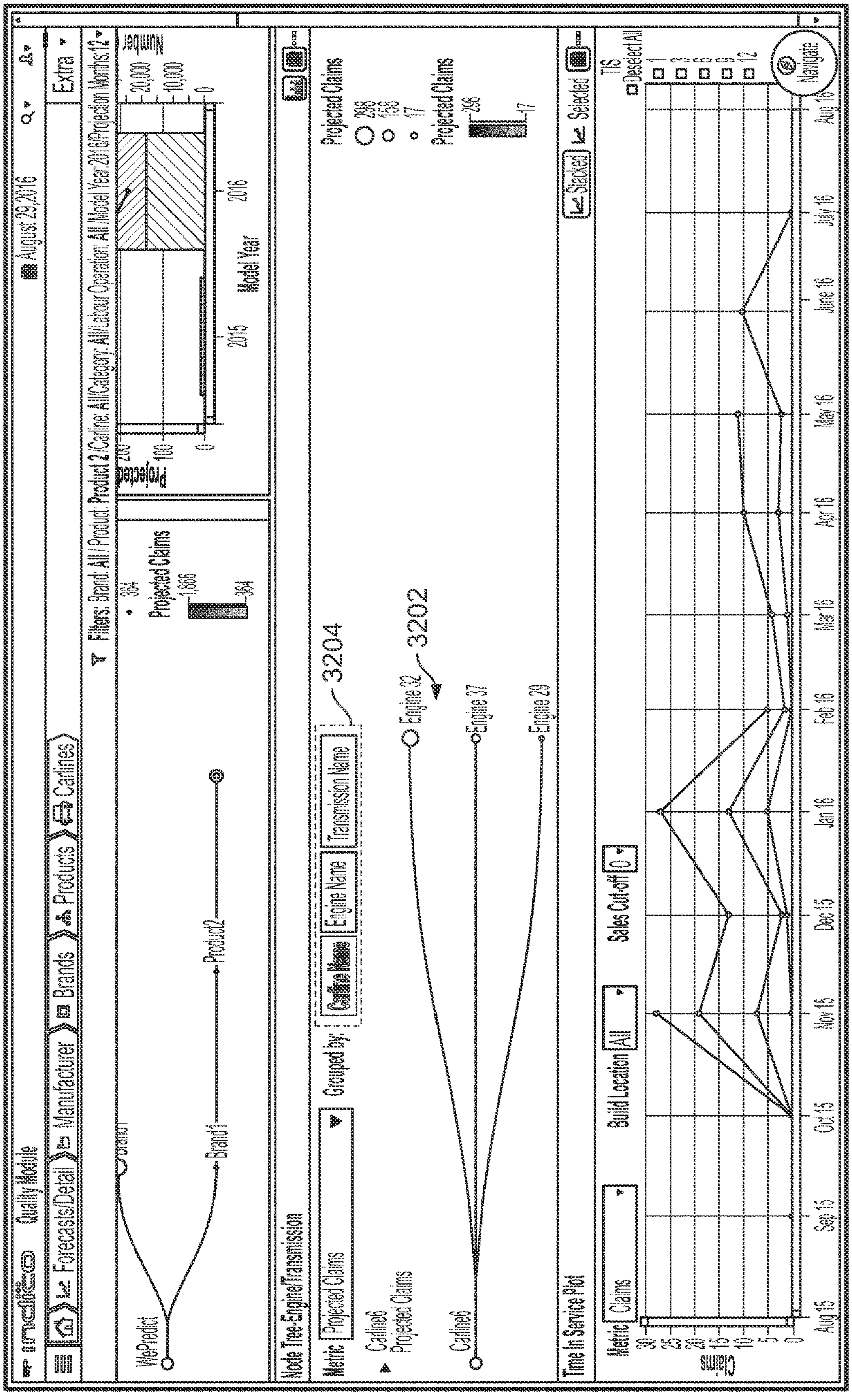
Figure 37:
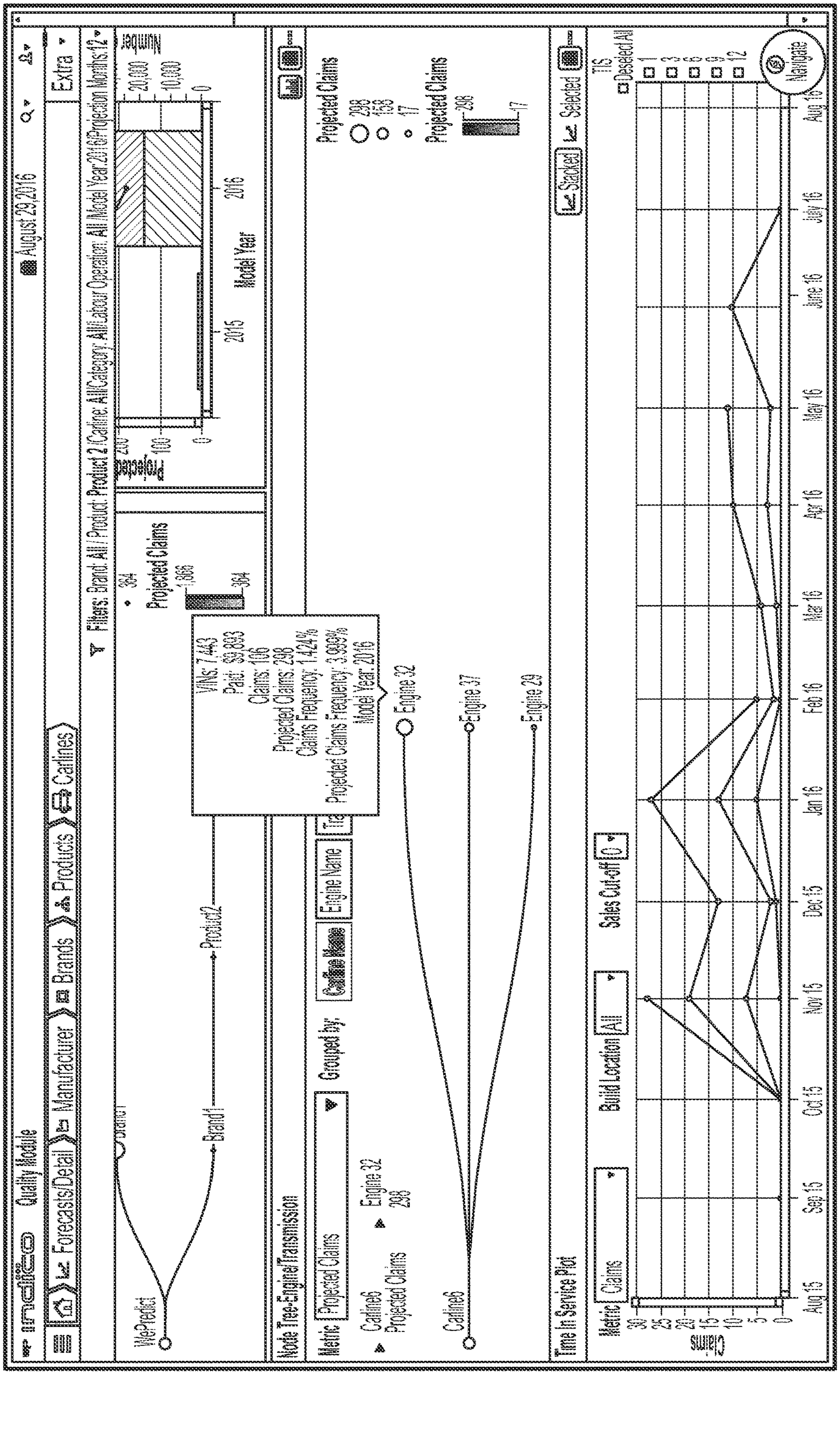
Figure 38:
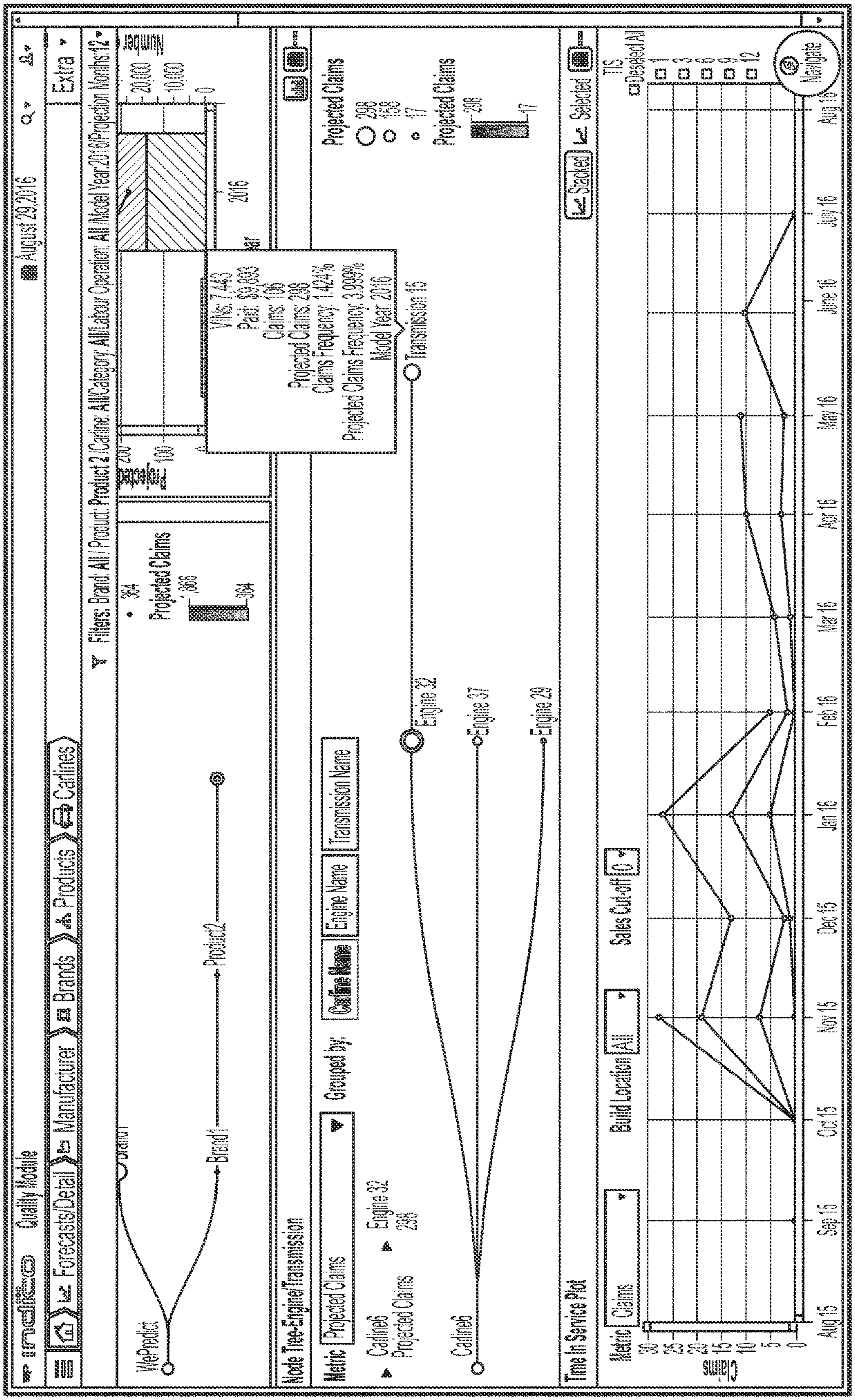

FIGS. 31 to 33 show the detail product page 104*c* in one example and FIGS. 32 to 36 show the detail carline page 104*d* in one example. These are rendered in an equivalent manner to the detail manufacturer and detail brand pages 104*a*, 104*b*, with corresponding on-screen objects, however the projections displayed on the detail product page 104*c* are aggregated at the product level and the projections on the detail carline page 104*d* are at the carline level. As can be seen clearly in the figures, the navigational relationships between these pages are realised in exactly the same way in accordance with the structure shown in FIG. 3. FIGS. 36 to 38 show an additional on-screen object provided on the carline detail page 104*d*, namely a second node tree to provide a breakdown according to engine and transmission. As described in the above, the hierarchy according to which this node tree is rendered can be changed by the user, in this example by rearranging node tree rendering elements 3204 shown in FIG. 36. For example by switching the "engine name" and "transmission name" elements, the user can change the hierarchy of the second node tree 3202.

Using FIG. 38 as an example, filtering options F are displayed, from which the user can select in order to change the filtering setting for the current page. When the user changes the filtering section, for example by changing one or more of the brand, product, carline, category labour operation, model year or forecasting winnow ("projection months"), the page is updated dynamically according to the new settings. The mechanism for implementing this is described extensively in the above. Note that filtering options F are shown on every detailed page 104 and every overview page 102 (although more filtering options will of course be available lower down the hierarchy). The user's filter sections are maintained as the user navigates between pages. That is filter selections made on one page are maintained when the user switches to another page.

Figure 39:
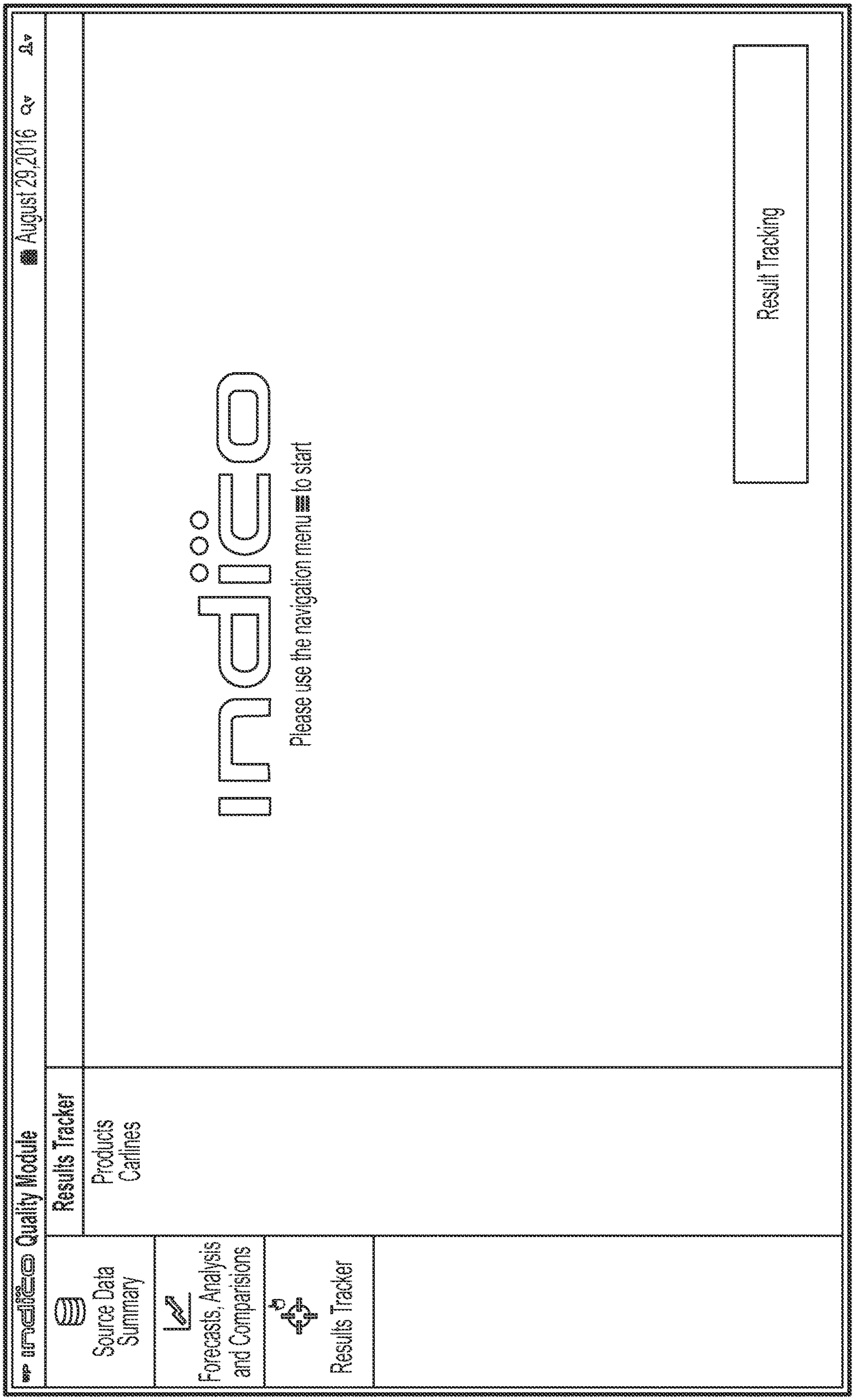
Figure 40:
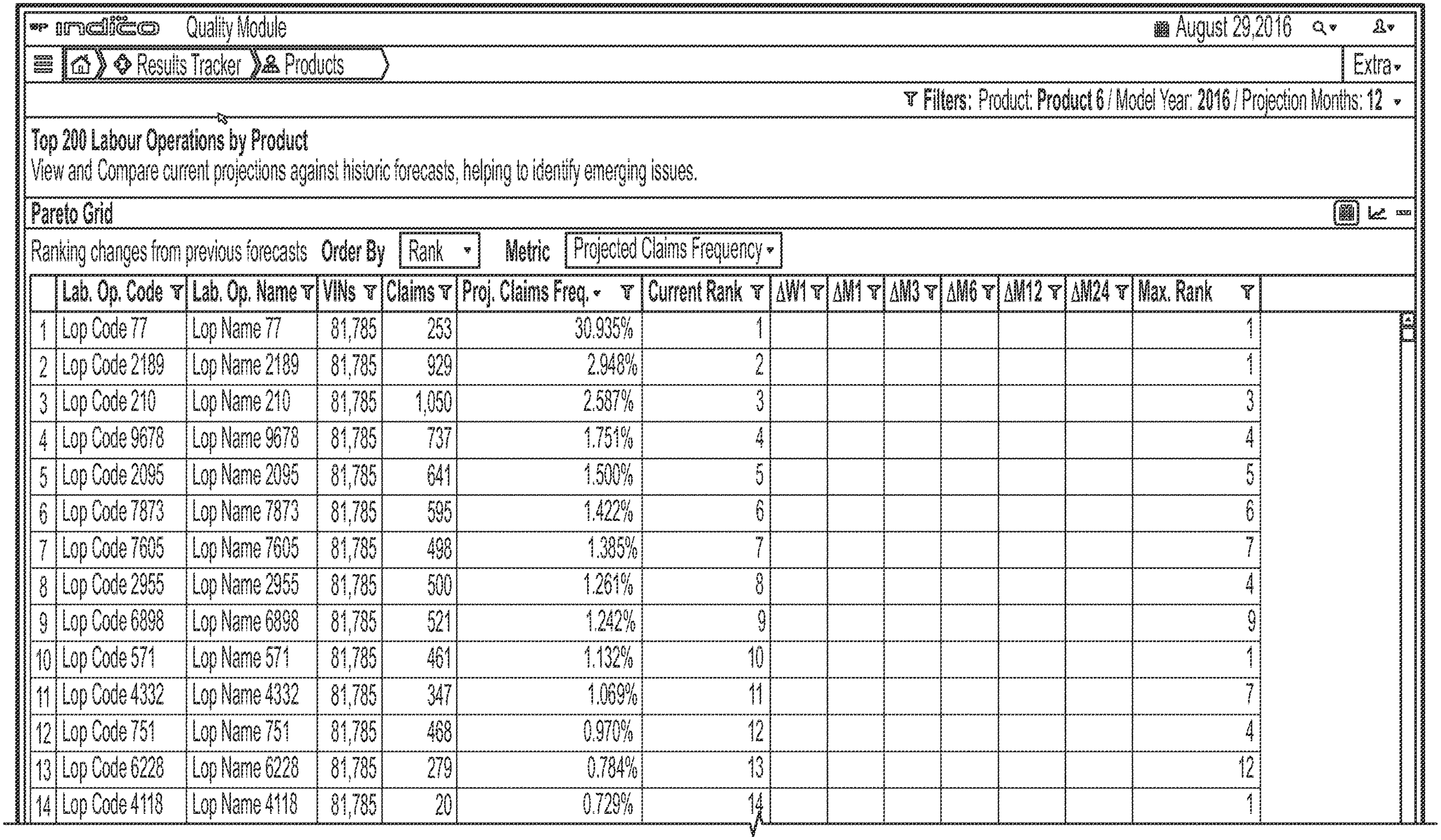
Figure 41:
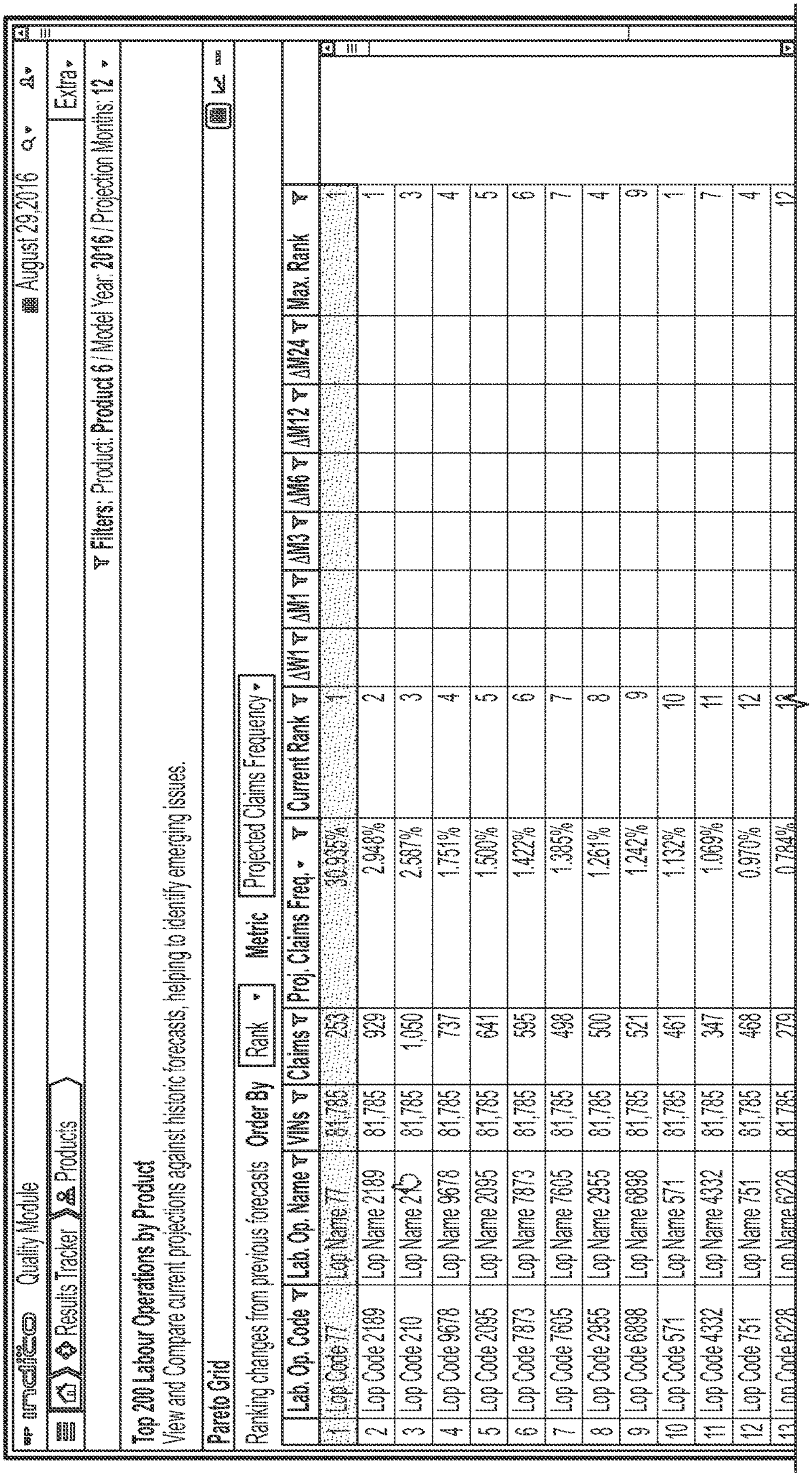
Figure 41:
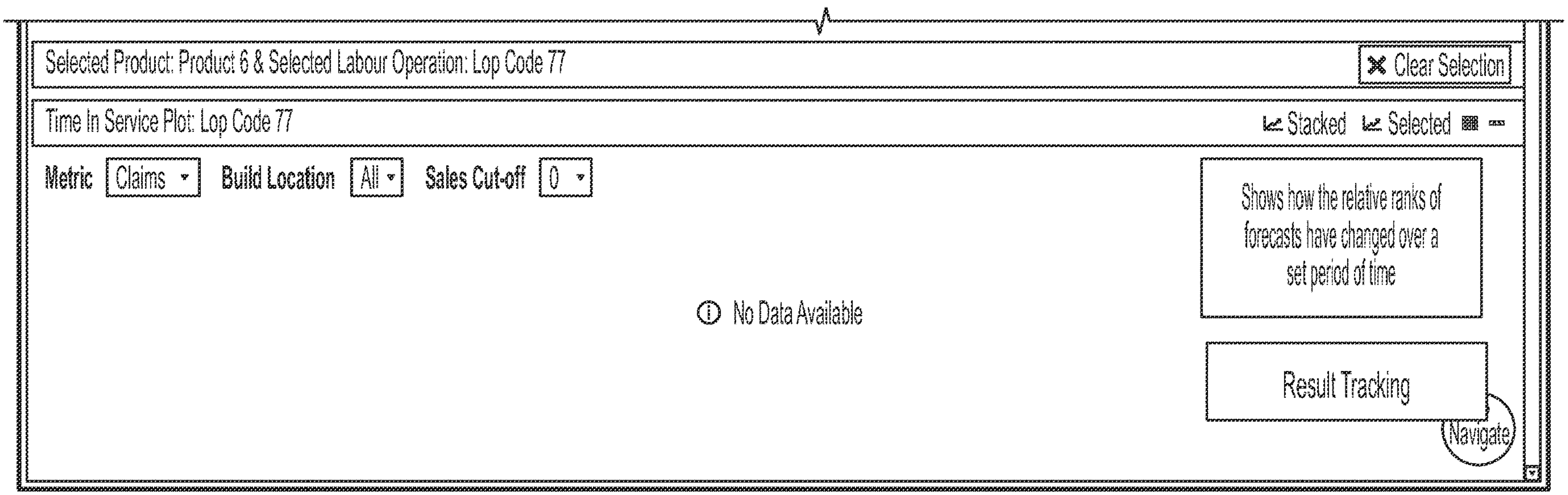
Figure 42:
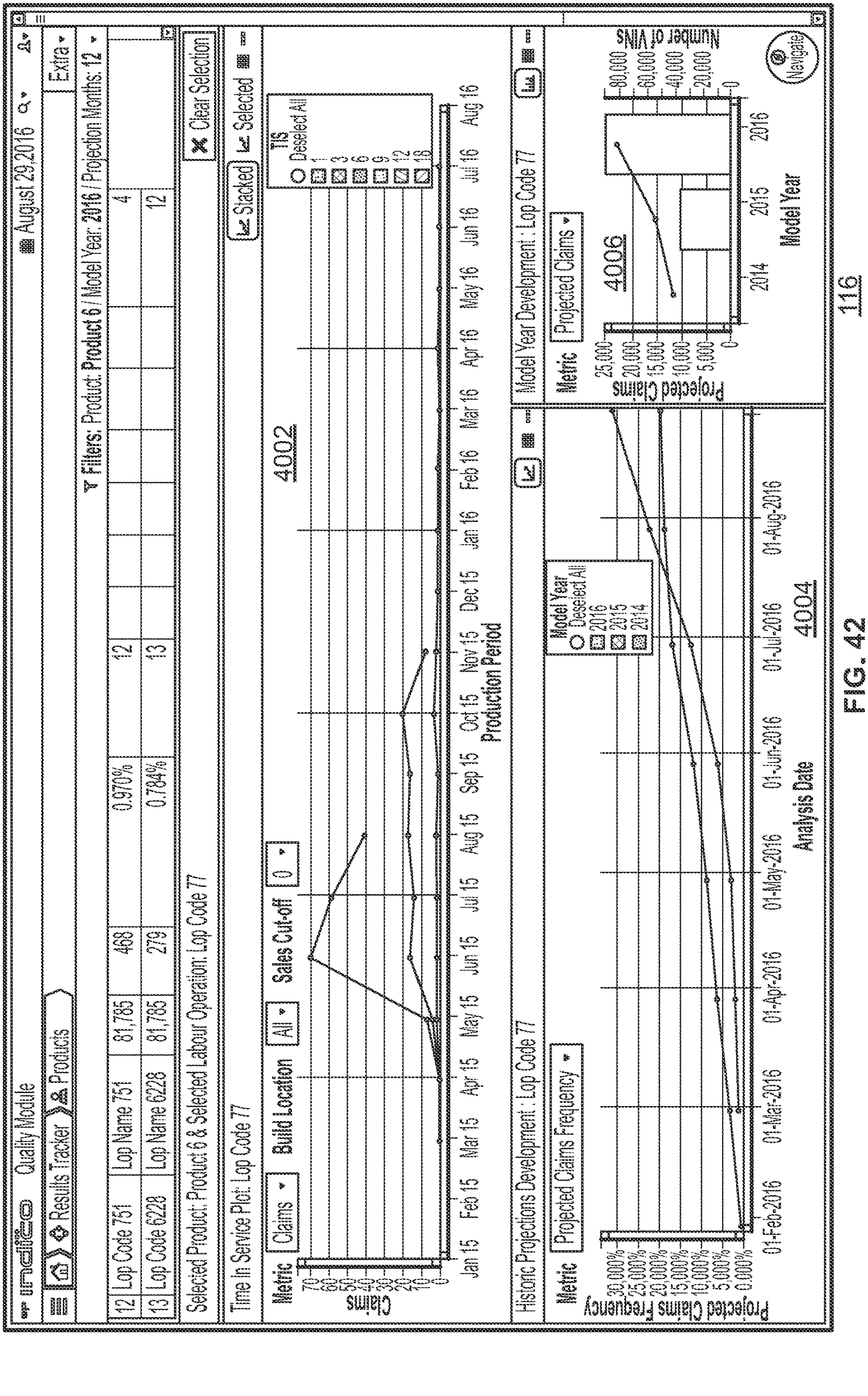
Figure 43:
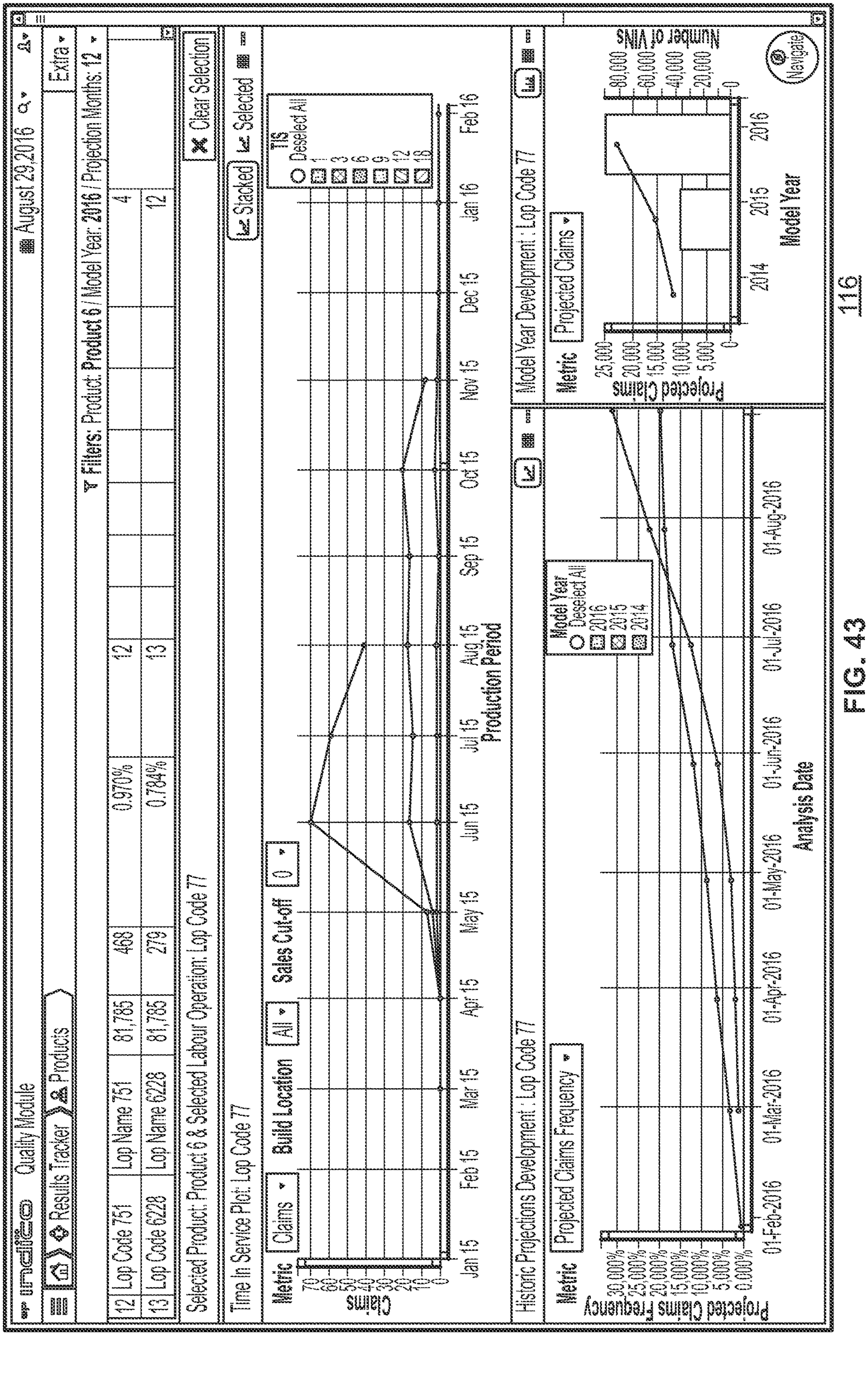
Figure 44:
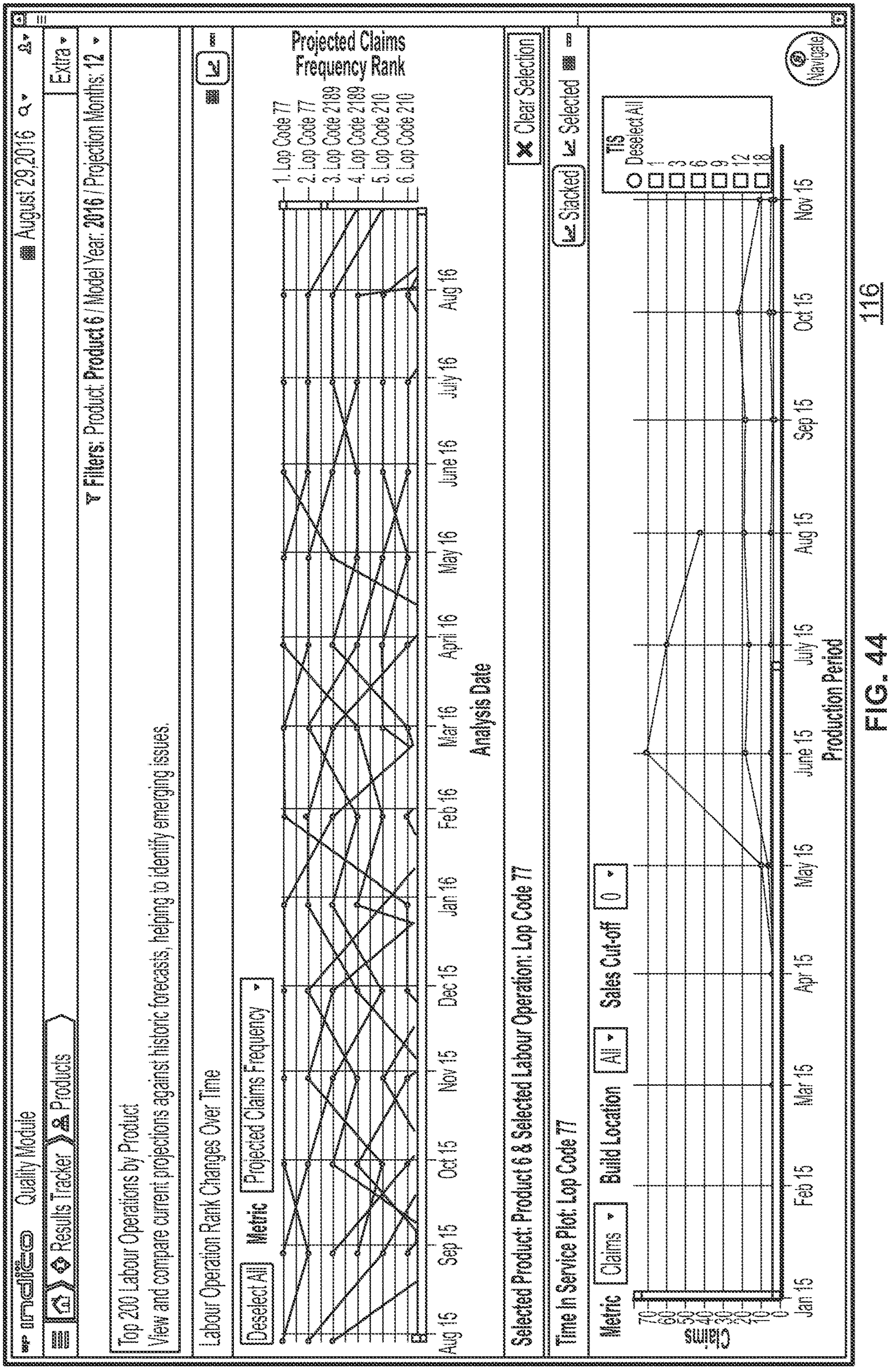
Figure 45:
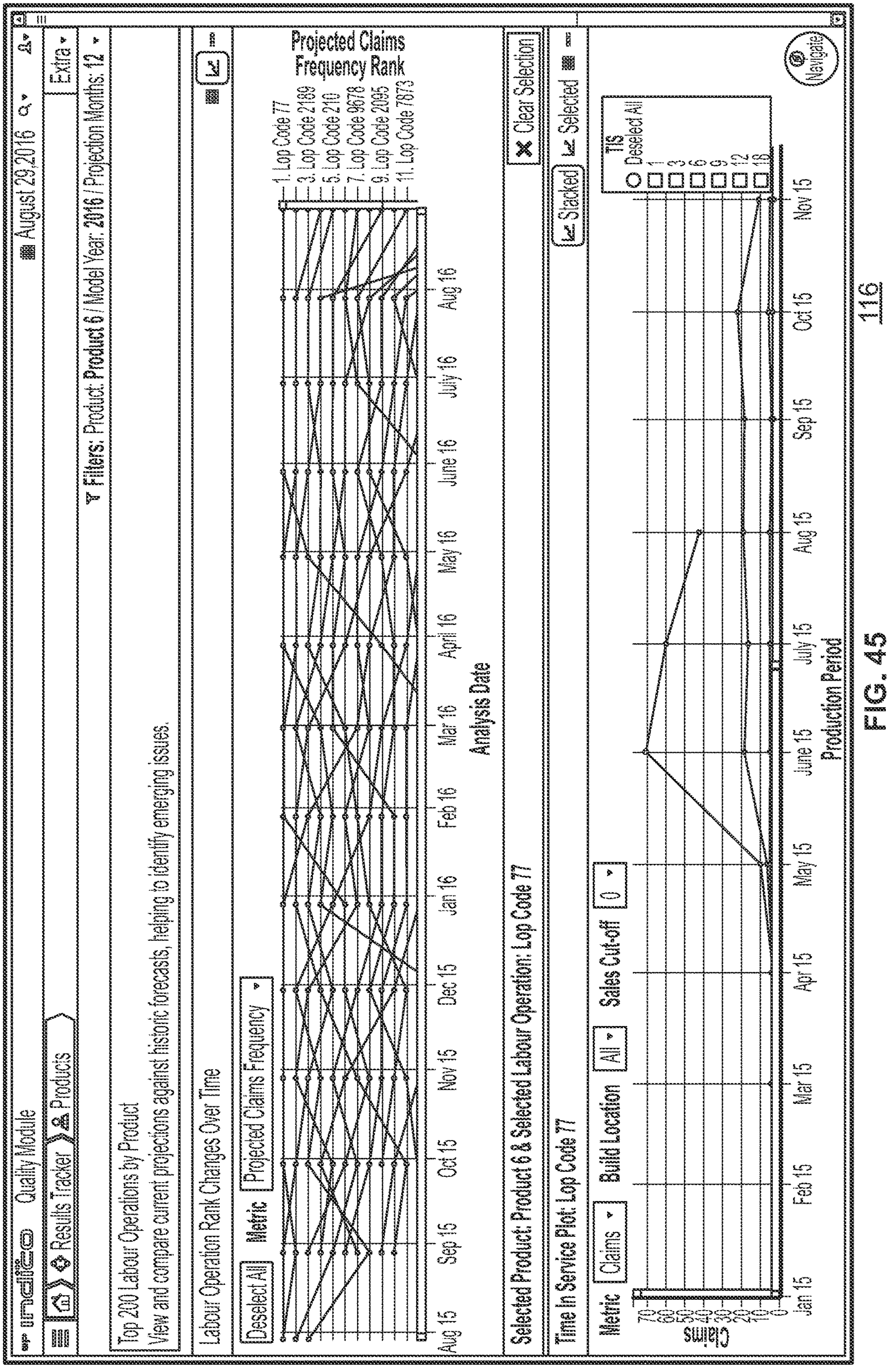

FIG. 39 shows the home screen of FIG. 3, only this time the user is navigating to one of the results tracker pages 114, 116 (example results tracker product pages 116 are shown in FIGS. 40 to 45). The results tracking is described extensively above, in the "Results Tracker" section. Suffice it to say that results tracking pages 114, 116 allow projections over time to be ranked relative to each other, for an individual labour operation, at the carline and product levels respectively.

To allow this, as shown in FIGS. 42 to 45, a time in service plot 4002, a projected claims frequency plot 4004 and model year development chart 4006 are provided. There figures show the product results tracker page 116, with results thus aggregated at the product level. These objects are populated as described above. Although not shown, equivalent objects can be displayed on the carline tracker page 114, at the carline level.

Other Machines

Although the technology has been described in the content of vehicles, it can also be applied to other machines. What is material in the context of the described technology is that there exists a window after a machine enters active service (i.e. when it becomes available for use by a user) in which a machine manufacturer is responsible for repairs to the machine, such that a comprehensive set of repair data is available from which predictions can be made, which predictions can in turn be used to make engineering decisions about later machines. Accordingly, all description herein pertaining to vehicles applies equally to other types of machine.

Although specific embodiments of the inventions have been described, variants of the described embodiments will be apparent. The scope is not defined by the described embodiments but only by the accompanying claims.

We claim:

1. A method of predicting machine repair operations or machine component faults for a pre-defined variant of a machine variant class, the method comprising, at a processing stage:

selecting, by a predictive algorithm executed at the processing stage, a set of machine repair records for use in making a prediction, each of the machine repair records being a record of a machine repair performed after the machine entered active service, each of which comprises or indicates a historical machine age or usage value, and records a repair operation or machine component fault, wherein the predictive algorithm uses the selected set of machine repair records to predict a number of, or resource value for, repair operations or machine component faults for a set of machine records, each of the machine records being a record of a machine entering active service, based on: a number of machines recorded in the set of machine records being of the pre-defined variant, and a current age or usage of each of the recorded machines; and determining a profile for the set of machine repair records based on a number of, or resource value for, repair operations or machine component faults recorded in the set of machine repair records for different historical machine age or usage values, the profile being used to make the prediction, wherein the step of determining the profile comprises: determining a total number of, or resource value for, repair operations/machine component faults recorded in the filtered set of machine repair records, each resource or count value being calculated as a proportion of the total, wherein an earnings value is calculated for each of the historical machine age or usage values of the profile based on the corresponding resource or count value of the profile and the number of machines recorded in the set of machine records whose current age or usage matches that historical machine age or usage value of the profile.

2. A method according to claim 1, wherein the machine is a vehicle, the machine repair records are vehicle repair records, the machine repair is a vehicle repair, the historical machine age or usage value is a historical vehicle age or usage value, the machine component fault is a vehicle component fault and the machine records are vehicle records.

3. A method according to claim 1, wherein the set of machine repair records is selected by filtering a larger set of available machine repair records based on a particular type of repair operation or a particular type of machine component, such that each repair record of the selected set relates to the particular type of repair operation/machine component, the predicted number or resource value being a predicted number of or resource value for repair operations/machine component faults of the particular type.

4. A method according to claim 1, wherein the set of machine repair records is selected by filtering a larger set of available machine repair records based on a particular machine attribute or set of machine attributes, such that each repair record of the selected set relates to the particular (set of) machine attribute(s), wherein each of the machine records in the set of machine records relates to a machine having the particular (set of) machine attribute(s) or a similar (set of) machine attribute(s), the predicted number or resource value being a predicted number of or resource value for repair operations/machine component faults for machines having the particular machine attribute.

5. A method according to claim 1, wherein the profile comprises, for each of a set of historical machine age or usage values, a corresponding resource or count value calculated from the set of repair records.

6. A method according to claim 5, wherein the resource or count value is a cumulative value calculated as sum of the number of, or resource values for, repair operations/machine component faults recorded in the set of machine repair records up to that historical machine age or usage value.

7. A method according to claim 5, wherein the prediction is made by performing a non-parametric analysis based on the number of machines recorded in the set of machine records, the current age or usage of each of the machines, and the resource or count values of the profile.

8. A method according to claim 1, wherein the earnings value for each of the historical machine age or usage values of the profile is calculated by multiplying the corresponding resource or count value of the profile with the number of machines recorded in the set of machine records whose current age or usage matches that historical machine age or usage value of the profile.

9. A method according to claim 1, comprising determining a total number of machines recorded in the set of machine records and calculating a maturity value for the set of machine records from the earnings values, wherein the maturity value is calculated by calculating a total earnings value from the earnings values as a proportion of the total number of machines.

10. A method according to claim 1, comprising:

identifying one or more existing machine repair records corresponding to the set of machine records; and determining a number of, or resource value for, repair operations or machine component faults recorded in the existing machine repair records.

11. A method according to claim 10, wherein a predicted number of, or resource values for, repair operations or machine component faults for the set of machine records is computed from the number of, or resource value for, repair operations or machine component faults determined for the existing machine repair records based on the number of machines recorded in the set of machine records and the current age or usage of each of the machines.

12. A method according to claim 11, wherein the profile is used to compute the predicted number.

13. A method according to claim 8, wherein the method further comprises identifying one or more existing machine repair records corresponding to the set of machine records; and determining a number of, or resource value for, repair operations or machine component faults recorded in the existing machine repair records;

wherein the predicted number of, or resource value for, repair operations or machine component faults for the set of machine records is determined based on the maturity value calculated for the set of machine records and the number of, or resource value for, repair operations/machine component faults recorded in the existing machine repair records.

14. A method according to claim 13, wherein the predicted number or resource value is determined by dividing, by the maturity, the number of resource value for repair operations/machine component faults recorded in the existing machine repair records.

15. A method according to claim 1, wherein the predictive algorithm implements the following steps for each of a plurality of repair operation or machine component types:

selecting a respective set of machine repair records relating to that type of repair operation/machine component; and using the respective set of machine repair records to predict, for the set of machine records, a number of, or resource value for, repair operations or machine component faults of that type based on the number of recorded machines and their current age or usage.

16. A system for predicting machine repair operations or machine component faults for a pre-defined variant of a machine variant class, the system comprising:

electronic storage configured to hold computer readable instructions for executing a predictive algorithm; and a processing stage coupled to the electronic storage and configured to execute computer readable instructions, the computer readable instructions being configured, when executed, to implement operations comprising:

selecting, by a predictive algorithm executed at the processing stage, a set of machine repair records for use in making a prediction, each of the machine repair records being a record of a machine repair performed after the machine entered active service, each of which comprises or indicates a historical machine age or usage value, and records a repair operation or machine component fault, wherein the predictive algorithm uses the selected set of machine repair records to predict a number of, or resource value for, repair operations or machine component faults for a set of machine records, each of the machine records being a record of a machine entering active service, based on: a number of machines recorded in the set of machine records being of the pre-defined variant, and a current age or usage of each of the recorded machines; and determining a profile for the set of machine repair records based on a number of, or resource value for, repair operations or machine component faults recorded in the set of machine repair records for different historical machine age or usage values, the profile being used to make the prediction, wherein the step of determining the profile comprises: determining a total number of, or resource value for, repair operations/machine component faults recorded in the filtered set of machine repair records, each resource or count value being calculated as a proportion of the total, wherein an earnings value is calculated for each of the historical machine age or usage values of the profile based on the corresponding resource or count value of the profile and the number of machines recorded in the set of machine records whose current age or usage matches that historical machine age or usage value of the profile.

17. A non-transitory computer readable medium having computer readable instructions configured, when executed, to implement operations comprising:

selecting, by a predictive algorithm executed at the processing stage, a set of machine repair records for use in making a prediction, each of the machine repair records being a record of a machine repair performed after the machine entered active service, each of which comprises or indicates a historical machine age or usage value, and records a repair operation or machine component fault wherein the predictive algorithm uses the selected set of machine repair records to predict a number of, or resource value for, repair operations or machine component faults for a set of machine records, each of the machine records being a record of a machine entering active service, based on: a number of machines recorded in the set of machine records being of the pre-defined variant, and a current age or usage of each of the recorded machines; and determining a profile for the set of machine repair records based on a number of, or resource value for, repair operations or machine component faults recorded in the set of machine repair records for different historical machine age or usage values, the profile being used to make the prediction, wherein the step of determining the profile comprises: determining a total number of, or resource value for, repair operations/machine component faults recorded in the filtered set of machine repair records, each resource or count value being calculated as a proportion of the total, wherein an earnings value is calculated for each of the historical machine age or usage values of the profile based on the corresponding resource or count value of the profile and the number of machines recorded in the set of machine records whose current age or usage matches that historical machine age or usage value of the profile.

* * * * *